United States Patent
Pertsinidis

(10) Patent No.: US 12,031,897 B2
(45) Date of Patent: Jul. 9, 2024

(54) TARGET-LOCKING SINGLE-MOLECULE NANOSCOPY

(71) Applicant: Memorial Sloan Kettering Cancer Center, New York, NY (US)

(72) Inventor: Alexandros Pertsinidis, New York, NY (US)

(73) Assignee: Memorial Sloan Kettering Cancer Center, New York, NY (US)

( * ) Notice: Subject to any disclaimer, the term of this patent is extended or adjusted under 35 U.S.C. 154(b) by 292 days.

(21) Appl. No.: 17/598,648

(22) PCT Filed: Mar. 30, 2020

(86) PCT No.: PCT/US2020/025822
§ 371 (c)(1),
(2) Date: Sep. 27, 2021

(87) PCT Pub. No.: WO2020/198750
PCT Pub. Date: Oct. 1, 2020

(65) Prior Publication Data
US 2022/0163440 A1    May 26, 2022

Related U.S. Application Data

(60) Provisional application No. 62/925,114, filed on Oct. 23, 2019, provisional application No. 62/825,740, filed on Mar. 28, 2019.

(51) Int. Cl.
*G01N 15/1433*   (2024.01)
*G01N 21/64*   (2006.01)
(Continued)

(52) U.S. Cl.
CPC ..... *G01N 15/1433* (2024.01); *G01N 21/6458* (2013.01); *G02B 21/0076* (2013.01);
(Continued)

(58) Field of Classification Search
CPC .......... G01N 15/1475; G01N 21/6458; G01N 21/64; G01N 2015/0038;
(Continued)

(56) References Cited

U.S. PATENT DOCUMENTS 9,291,562 B2    3/2016 Hell
2012/0126142 A1*  5/2012 Matsui ............... G01N 21/6452
                                           250/459.1
(Continued)

OTHER PUBLICATIONS

International Search Report & Written Opinion of the International Searching Authority issued in PCT/US2020/025822, dated Aug. 12, 2020.

*Primary Examiner* — Kiho Kim
(74) *Attorney, Agent, or Firm* — Foley & Lardner LLP

(57) ABSTRACT

A target may be tagged, and its position tracked to maintain the position of the target at the center (e.g., zero region) of a suppression beam, where suppression is minimal, so the signal from the target is not suppressed relative to signal from background molecules. Point scanning is not needed, as a pixelated detector of a camera can be used to acquire the position of the target in one shot. Images of the object from the pixelated detector can be analyzed to acquire the position of the target. To maintain the target in the zero, the beams may be steered onto the target. Alternatively or additionally, the sample may be moved to place the sample in the center. A correction signal may be sent to cause the sample and/or beams to be moved to maintain the target in position.

22 Claims, 86 Drawing Sheets

(51) Int. Cl.
  *G02B 21/00* (2006.01)
  *G01N 15/00* (2006.01)
(52) U.S. Cl.
  CPC ..... *G01N 2015/0038* (2013.01); *G01N 21/64* (2013.01); *G01N 2021/6478* (2013.01)
(58) Field of Classification Search
  CPC ....... G01N 2021/6478; G01N 15/1468; G02B 21/0076; G02B 21/0032; G02B 21/361; G02B 27/58
  See application file for complete search history.

(56) References Cited

U.S. PATENT DOCUMENTS

| | | |
|---|---|---|
| 2014/0042340 A1 | 2/2014 | Hell |
| 2014/0152793 A1 | 6/2014 | Staker et al. |
| 2017/0131387 A1 | 5/2017 | Campbell et al. |
| 2019/0011367 A1 | 1/2019 | Hell et al. |

* cited by examiner

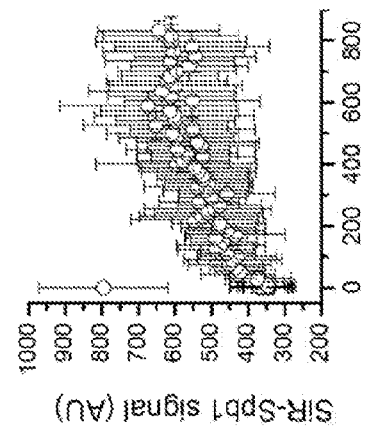
FIGURE 5C
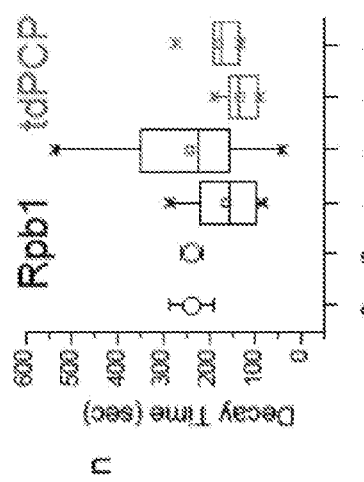
FIGURE 5D
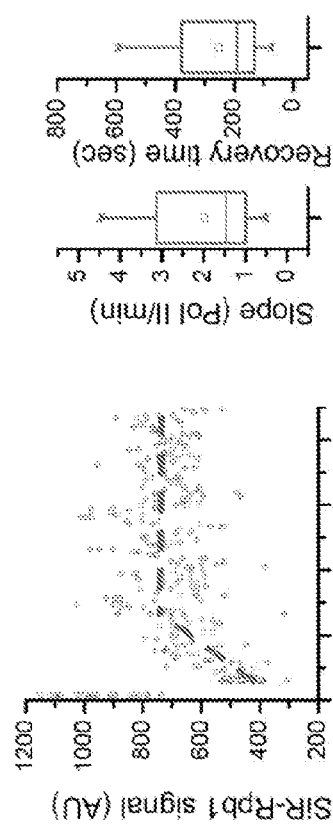
FIGURE 5E
FIGURE 5F

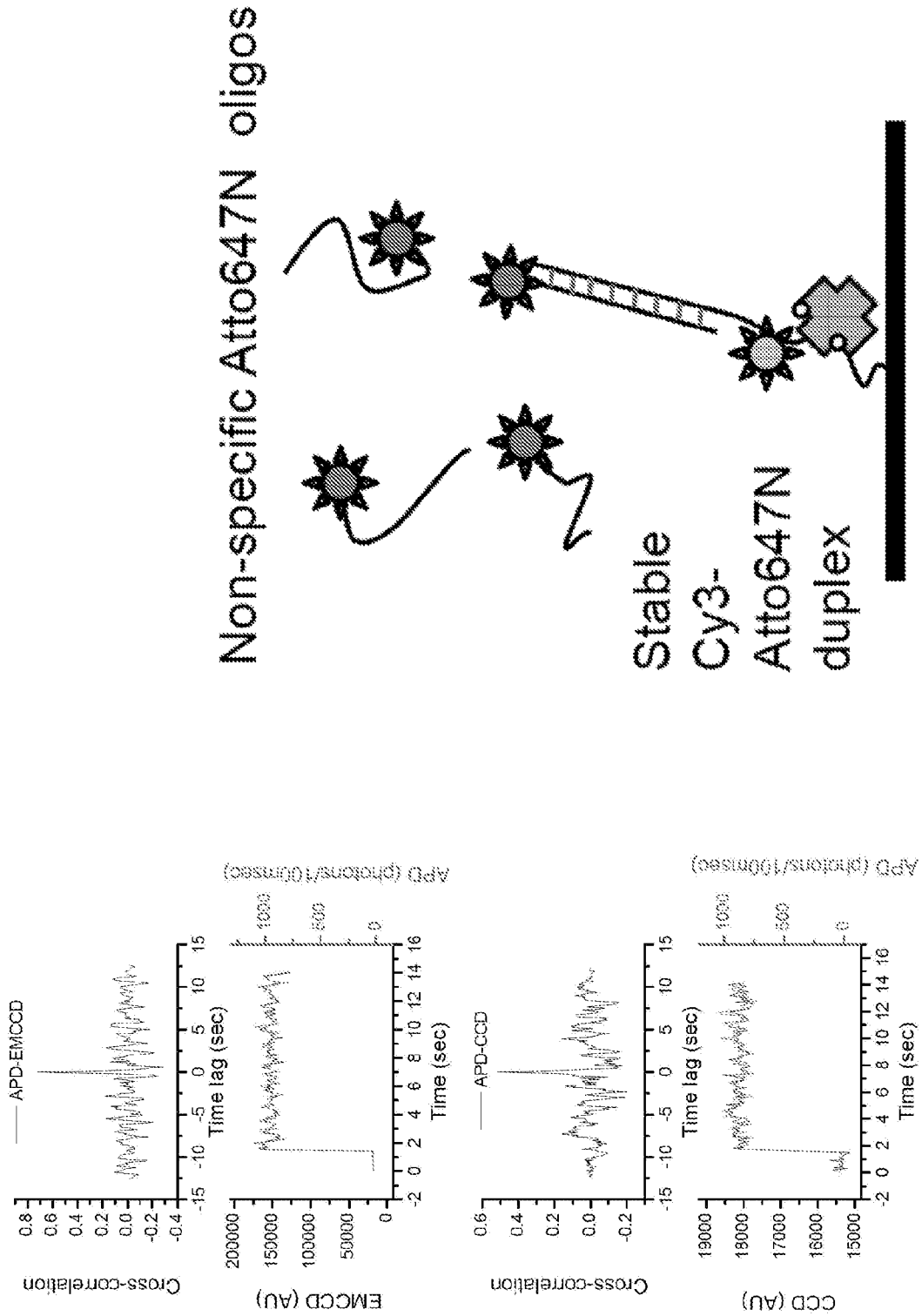

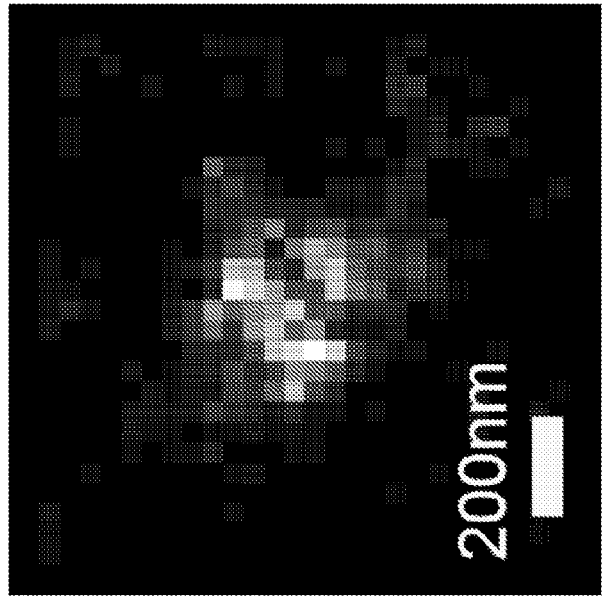
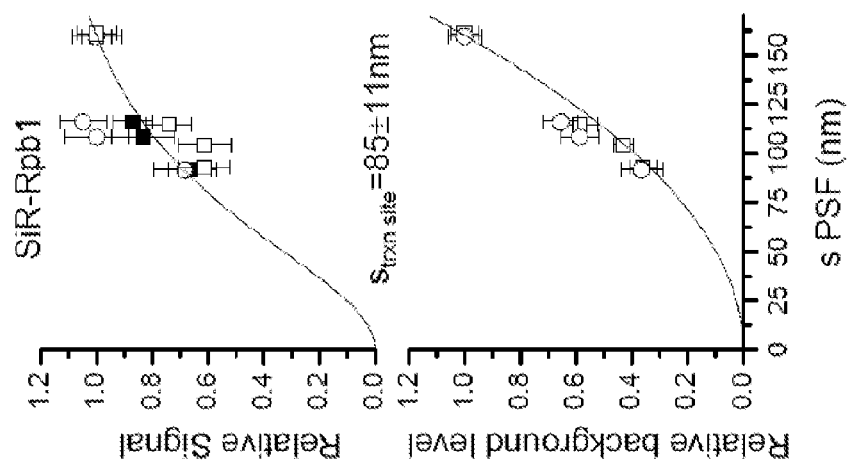
FIGURE 12C
FIGURE 12D

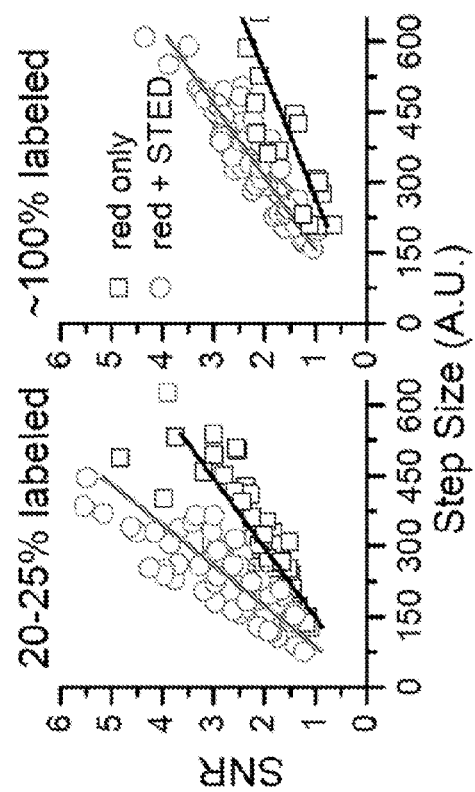
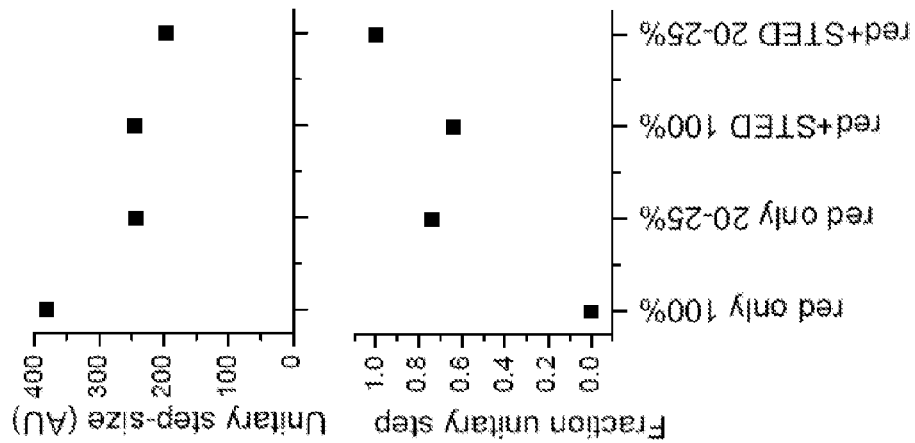
FIGURE 12P
FIGURE 12O

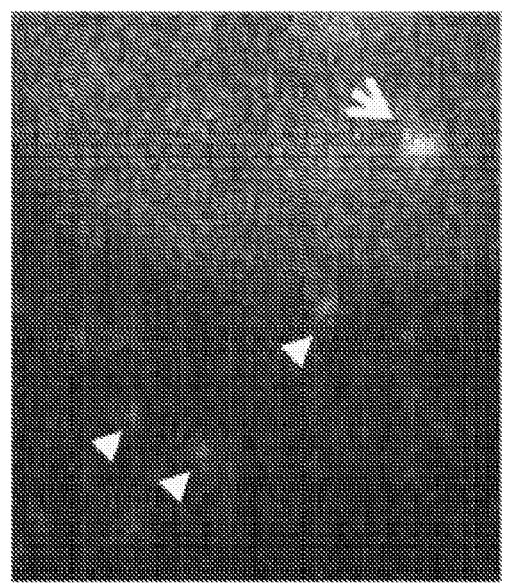
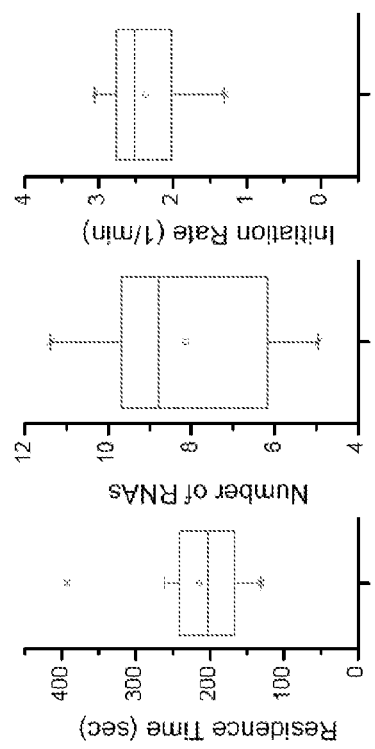
FIGURE 13D
FIGURE 13C

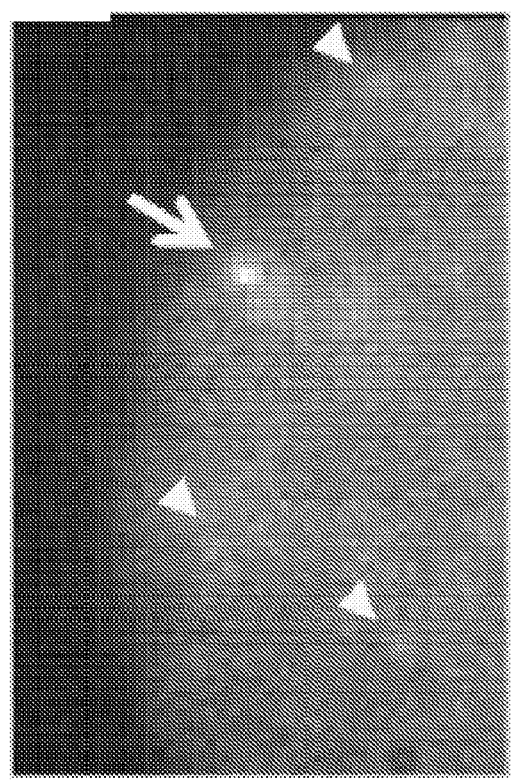
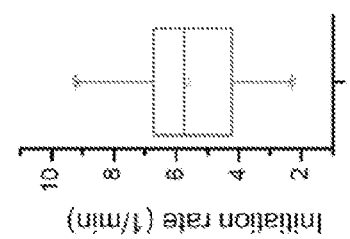
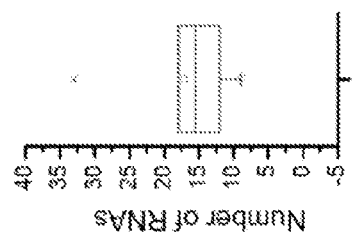
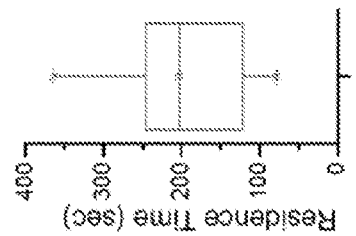
FIGURE 15E
FIGURE 15F

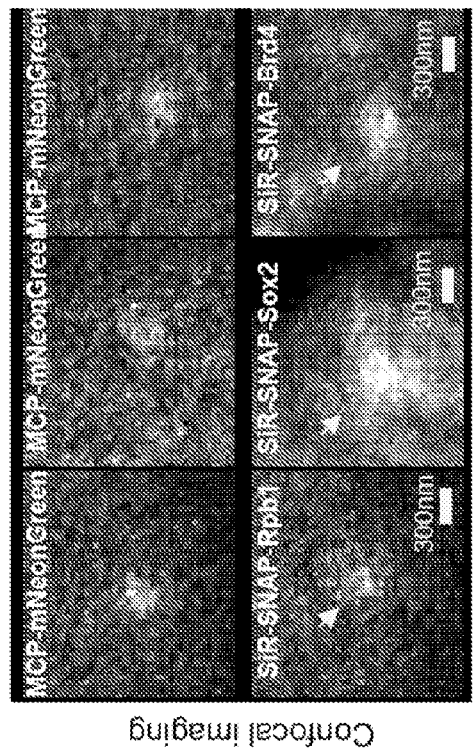
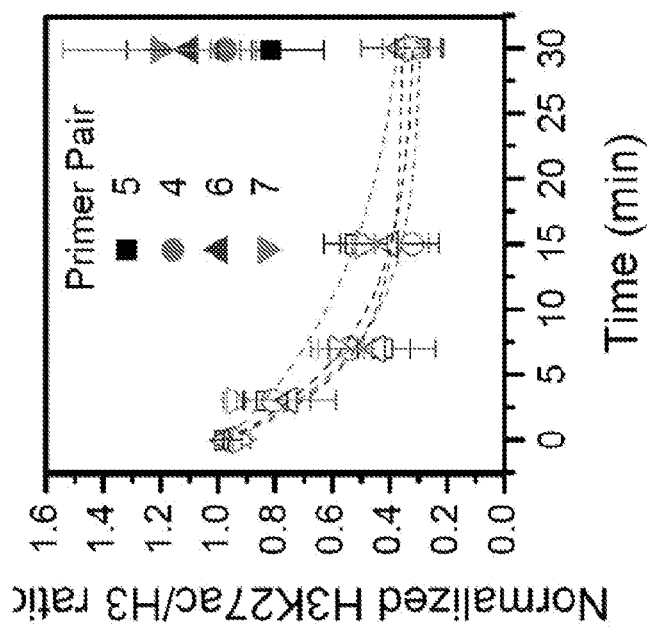
FIGURE 16K
FIGURE 16L

TARGET-LOCKING SINGLE-MOLECULE NANOSCOPY

CROSS-REFERENCE TO RELATED APPLICATIONS

This application claims the benefit of and priority to P.C.T. Patent Application No. PCT/US2020/025822, filed Mar. 30, 2020, which further claims the benefit of and priority to U.S. Provisional Patent Application No. 62/825,740, filed Mar. 28, 2019, and also U.S. Provisional Patent Application No. 62/925,114, filed Oct. 23, 2019, the entire contents of all of which are incorporated herein by reference.

STATEMENT REGARDING FEDERALLY SPONSORED RESEARCH

This invention was made with government support under GM105443 and GM134342 awarded by the National Institutes of Health. The government has certain rights in the invention.

TECHNICAL FIELD

The present application relates generally to molecular nanoscopy well-suited to target-locking nanoscopy of single molecules and macromolecular assemblies, which may be below diffraction limits of, for example, less than 200 nanometers.

BACKGROUND

Transforming the vast knowledge base established by genetics, biochemistry and structural biology into detailed molecular descriptions of biological processes inside cells remains a major challenge—one in sore need for better imaging technologies. For example, transcription involves the complex interplay between RNA Polymerase II (Pol II), regulatory factors and chromatin, but visualizing these dynamic molecular transactions in their native intracellular milieu has been largely unattainable.

SUMMARY

Various embodiments of the disclosure relate to a nanoscopy method. The method may comprise tagging a target (e.g., a target molecule or molecules) in a sample. The method may comprise tracking a position of the target in the sample. The method may comprise maintaining the position of the target at a zero of a suppression beam (e.g., a depletion beam) for a period of time. The method may comprise detecting a set of signals corresponding to the target for the period of time.

As used herein, the "zero" of a beam need not necessarily be exactly zero, but may be near zero, or otherwise a relatively small proportion of the beam's peak intensity. In various embodiments, the "zero" of the beam may be, for example, approximately one percent (or smaller) of peak intensity, approximately 0.5 percent (or smaller) of peak intensity, approximately 0.1% (or smaller) of peak intensity, approximately 0.01% (or smaller) of peak intensity, or approximately 0.001% (or smaller) of peak intensity, and so forth.

A target may be a single molecule but need not be a single molecule, and instead may be, for example, a larger macromolecular assembly. Dimensions of targets may be below the diffraction limit of a microscope, such as below 200 nanometers. As used herein, it should be understood that references to "molecules" being tracked may encompass not only single molecules but also molecular assemblies, unless stated otherwise.

In one or more embodiments, the target that is tagged is a single molecule.

In one or more embodiments, the target that is tagged is a macromolecular assembly.

In one or more embodiments, the target is smaller than a diffraction limit of a microscope that may be used in the nanoscopy method.

In one or more embodiments, the target is smaller than 200 nanometers.

In one or more embodiments, the surrounding molecules are probes. In one or more embodiments, the probes are bindable to the target during the period of time.

In one or more embodiments, the method may comprise mapping movements of the target in the sample over the period of time. The movement may be mapped based on the set of signals.

In one or more embodiments, tracking the position of the target may comprise using an imager to image the sample or a portion thereof.

In one or more embodiments, the position of the target may be tracked using MINFLUX localization In one or more embodiments, the sample or the portion thereof is imaged using a pixelator of the imager. The method may comprise analyzing one or more images of the pixelator to acquire a position of the target.

In one or more embodiments, the method may comprise generating a correction signal. The correction signal may indicate an adjustment of the position of the suppression beam relative to the target. The adjustment may be indicated so as to maintain the target at the zero of the suppression beam.

In one or more embodiments, the correction signal may be configured to cause movement of the suppression beam and/or the sample. Movement of the suppression beam and/or the sample may be caused so as to bring the target into alignment with the zero of the suppression beam.

In one or more embodiments, the target may be tagged with a fluorophore. Signals from the fluorophore may be suppressed by the suppression beam.

In one or more embodiments, the method may comprise identifying two or more locations of the target in the sample. The two or more locations may be identified based on the set of signals.

Various embodiments relate to a nanoscopy method that may comprise locating a tagged target in a sample by analyzing one or more images of the sample. The method may comprise emitting, at the sample, a suppression beam having a zero region. The method may comprise repositioning the suppression beam and/or the sample to maintain the tagged molecule within the zero region of the suppression beam as the target moves. The method may comprise detecting signals from the tagged target in the sample.

In one or more embodiments, the method may comprise mapping movement of the target in the sample based on the detected signals.

In one or more embodiments, the target may be tagged with a fluorophore. The method may comprise emitting an excitation beam at the sample to excite the target. The detected signals may be light from the excited target.

In one or more embodiments, the method may comprise capturing the images using a pixelated detector.

Various embodiments of the disclosure relate to a nanoscopy system. The system may comprise a beam source. The beam source may be configured to emit excitation and/or suppression beams, which may be laser beams. The system may comprise a detection system. The detection system may comprise an imager and/or a signal detector. The system may comprise a controller coupled to the beam source and/or the detection system. The controller may be configured to emit, using the beam source, excitation and suppression laser beams at a sample, which may have a tagged target. The controller may be configured to track a position of the tagged target in the sample. The position may be tracked using the imager of the detection system. The controller may be configured to positionally maintain the tagged target at a zero region of the suppression beam. The controller may be configured to detect a set of signals corresponding to the tagged target. The signals may be detected using the signal detector of the detection system. The signals may be detected while the tagged target is positioned within the zero region of the suppression beam.

In one or more embodiments, the controller may be configured to map movement of the target in the sample over the period of time. The movement may be mapped based on the set of signals.

In one or more embodiments, the controller may be configured to track the position of the target by using the imager to image the sample or a portion thereof.

In one or more embodiments, the imager may comprise a pixelator. The sample or the portion thereof may be imaged using the pixelator of the imager.

In one or more embodiments, the controller may be configured to analyze one or more images of the pixelator to acquire the position of the target.

In one or more embodiments, the controller may be configured to generate a correction signal. The correction signal may indicate an adjustment of the position of the target relative to the suppression beam so as to maintain the target at the zero of the suppression beam.

In one or more embodiments, the controller may be configured to provide the correction signal to the beam source. The correction signal may be provided so as to cause the beam source to reposition the suppression beam. The beam source may be repositioned so as to align the target with the zero of the suppression beam.

In one or more embodiments, the system may comprise a movable platform on which the sample may be placed. The controller may be configured to provide the correction signal to the movable platform. The correction signal may be provided to cause the moveable platform to reposition the sample. The sample may be repositioned so as to align the target with the zero of the suppression beam.

In one or more embodiments, the controller may be configured to track the position of the tagged target via MINFLUX localization.

In various embodiments, suppression may be achieved via one or more depletion beams, such as a depletion beams that may be used in stimulated emission depletion (STED) systems. In various embodiments, other suitable photophysical and/or photochemical processes may additionally or alternatively be employed to suppress fluorescence.

In various embodiments of the disclosed approach, single tagged genes can be zoomed into using nanoscopy techniques, including an active target-locking, ultra-sensitive system that enables single-molecule detection in addressable sub-diffraction volumes, within crowded intracellular environments. Pol II, for example, can be imaged, tracked, and quantified with single-molecule resolution, unveiling its detailed organization and dynamics during the transcription cycle. Further probing multiple functionally-linked events—for example, regulatory factor-chromatin interactions, Pol II dynamics and nascent transcription kinetics—reveals detailed operational parameters of gene-regulatory mechanisms hitherto-unseen in vivo. In various embodiments, the disclosed approach is applicable to single-molecule investigations of other complex molecular processes in live cells.

In various embodiments of the disclosure, a target molecule may be tagged with, for example, a fluorophore or other probe. The target may then be located in one, two, or three dimensions, depending on the mobility of the target. The position of the target may be tracked, for example, on the nanometer scale, below the diffraction limit or resolution of a typical microscope. In order to track the tagged target without point scanning to reconstruct an image, a pixelated detector may be used (instead of, e.g., a point detector of a confocal microscope) to acquire the position of the target in one shot. The position (e.g., x, y, and z values) of the target may be determined by analyzing images acquired using the detector.

An active feedback loop may be used to position excitation and suppression beams such that the target is at the center of the suppression beam where suppression is zero so the signal from the target is not suppressed. Signals from background molecules moving about may be suppressed by the suppression beam. The suppression beam may be aimed and re-aimed at the target to keep the target at the zero of the suppression beam to, for example, minimize variance in the fluorescence of the target molecule. In some implementations, a single excitation beam and two suppression beams may be used.

In various embodiments, the beams may be steered onto the target molecule. In certain implementations, the sample may be physically moved to place the target molecule in the center. In some implementations, the sample as well as the laser beams may be repositioned. In certain implementations, a correction signal may be sent to cause the sample and/or laser beams to be moved to keep the target molecule in the zero of the suppression beam.

Various embodiments relate to an interferometric target-locking system. The system may comprise: a sample mount configured to receive a sample with a target molecule tagged for observation; a beam source configured to emit a tracking beam and an excitation beam at the sample on the sample mount; a photon detector configured to detect photons emitted from the sample on the sample mount; a feedback system configured to receive photon counts from the photon detector and lock onto the target in the sample so as to maintain the target at a minimum of the tracking beam and at a maximum of the excitation beam; and/or a tracking system configured to map movement of the target while the feedback system is locked onto the target.

In one or more embodiments, the beam source may be configured to emit a doughnut tracking beam with a zero at its center.

In one or more embodiments, the system may comprise a mount motor that may be configured to move the sample mount based on control signals from the feedback system. The feedback system may be configured to lock onto the target by transmitting control signals to the mount motor to reposition the sample mount and maintain the target at the minimum of the tracking beam and the maximum of the excitation beam.

In one or more embodiments, the system may comprise a beam source motor that may be configured to aim beams based on control signals from the feedback system. The feedback system may be configured to lock onto the target by transmitting control signals to the beam source motor to maintain the target at the minimum of the tracking beam and the maximum of the excitation beam.

In one or more embodiments, the system may comprise a mount motor that may be configured to move the sample mount based on control signals from the feedback system, and a beam source motor that may be configured to aim beams based on control signals from the feedback system. The feedback system may be configured to lock onto the target by transmitting control signals to the mount motor and to the beam source motor to maintain the target at the minimum of the tracking beam and the maximum of the excitation beam.

In one or more embodiments, the system may be a 3D interferometric MINFLUX target-locking system.

In one or more embodiments, the system may be configured to use an interferometric 4pi scheme for z-tracking.

In one or more embodiments, the system may be configured to use a localization scheme for target locking. In one or more embodiments, the localization scheme may be a MINFLUX localization scheme.

In one or more embodiments, the system may be configured to use an excitation profile that may comprise a point of zero intensity positionable within a field-of-view (FOV).

In one or more embodiments, the beam source may be configured to emit a 488 nanometer (nm) tracking beam, a 561 nm excitation beam, and/or a 642 nm excitation beam.

Various embodiments relate to an interferometric target-locking method. The method may comprise: positioning a sample with a tagged target molecule on a sample mount of a target-locking system; emitting, from a beam source, a tracking beam and an excitation beam at the sample on the sample mount; detecting, using a photon detector, photons emitted from the sample on the sample mount; locking onto the target, using a real-time feedback system configured to receive photon counts from the photon detector, by maintaining the target at a minimum of the tracking beam and at a maximum of the excitation beam based on the photon counts; and/or mapping movement of the target while the feedback system is locked onto the target.

In one or more embodiments, the tracking beam may be a doughnut tracking beam with a zero at its center.

In one or more embodiments, locking onto the target may comprise moving the sample mount to maintain the target at the minimum of the tracking beam and the maximum of the excitation beam. The sample mount may be moved based on control signals from the feedback system to a mount motor to reposition the sample mount.

In one or more embodiments, locking onto the target may comprise moving the beam source to aim the beam source to maintain the target at the minimum of the tracking beam and the maximum of the excitation beam. The beam source may be aimed using control signals from the feedback system to a beam source motor.

In one or more embodiments, locking onto the target may comprise moving both the sample mount and the beam source to maintain the target at the minimum of the tracking beam and the maximum of the excitation beam.

In one or more embodiments, the target-locking method is a 3D interferometric MINFLUX target-locking method.

In one or more embodiments, the method may comprise using an interferometric 4pi scheme for z-tracking.

In one or more embodiments, the method may comprise using a localization scheme for target locking.

In one or more embodiments, the localization scheme may be a MINFLUX localization scheme.

In one or more embodiments, the MINFLUX localization scheme uses one objective lens. In one or more embodiments, the MINFLUX localization scheme uses two objective lenses. In one or more embodiments, the MINFLUX localization scheme uses more than two objective lenses.

Various embodiments relate to an interferometric target-locking nanoscopy system. The nanoscopy system may comprise: a beam source configured to emit a tracking beam and an excitation beam at a sample on a platform; a photon detector configured to detect photons emitted from the platform; a computing system configured to receive photon counts from the photon detector and maintain the target at a minimum of the tracking beam and at a maximum of the excitation beam; and/or a tracking system configured to map movement of the target while the feedback system is locked onto the target. The system may be configured to use 3D MINFLUX localization comprising one objective lens or more than one objective lens.

Various embodiments detect individual molecules in the presence of other molecules at high concentrations or in crowded environments where those additional molecules may prevent extraction of the signal from a molecule in a predefined location. A target molecule may be surrounded by molecules "floating" around, and occasionally, a probe molecule may bind the target. If optical means were used detect the target molecule, such as a focused laser beam in a confocal microscope, within that focused laser beam at any given time there may be many molecules going in and out of the beam, and that would mask the signal from the probe molecule to be detected binding to the target. Embodiments thus are able to extract the signal from that molecule.

In various embodiments, molecules interacting with (e.g., binding to) a target are to be detected. The target may be tagged, such as with a fluorophore of a different color or some other characteristic suited to optical detection. The target may then be located, in one, two or three dimensions, depending on how the target moves. The position of targets may be tracked (e.g., within a nanometer or tens of nanometers, or below the diffraction limit or the resolution of a microscope) faster than the movement of the targets, with an active feedback loop that stabilizes targets at centers of excitation beams (that may be generated to excite signal fluorophores) and also at zeroes of suppression beams (or "background suppression beam") to deplete signals from background fluorophores.

In various embodiments, one or more focused beams may be generated for excitation, and one or more beams with a point of zero intensity (e.g., a "donut" beam) may be generated for depleting or suppressing signals that are not in the zero intensity region. In various embodiments, a single focused excitation beam and two suppression that do not interfere (such that there is no coincidence between the two beams) make a pattern independently of each other, with one beam making a donut pattern (so that it has a zero and is bright around the ring on the xy plane), and another beam that, when focused, makes a blob below the focus and a blob above the focus, so when you combine those two beams, there is a shell of light around the zero.

In various embodiments, a high order laser beam may be used, or a laser beam may be modulated (e.g., a Gaussian laser beam focused with an objective lens to positions above and below the focus). In various other embodiments, multiple beams may be focused by a single objective lens, with, for example, two beams for excitation, two or four beams for suppression, with beams sent to a sample through two opposed lenses to constructively or destructively interfere to create more complex focal patterns.

In various embodiments, a tagged, moving target may be located using, for example, a pixelated detector. The lasers, or the sample, may be repositioned to maintain the target at a center where depletion is near zero (or a small fraction of peak intensity, such as 0.001 or smaller relative to peak intensity) so that the fluorescence of the target is not suppressed. The timescale is sufficiently fast to accommodate diffusion rates of molecules in the sample. Background molecules, which may move in an effectively random fashion, may have their brightness reduced due to the depletion beam. The brightness of target molecules would not be reduced when maintained at the zero of the depletion beam.

In various embodiments, once a position of a target has been determined, beams may be steered onto the target using, for example, one or more motors capable of tipping, tilting, etc., beam sources to aim and re-aim the beams. Alternatively or additionally, a sample may be moved so that a target is positioned at a center of a beam. A detector (e.g., a pixelated detector) may use an algorithm that locates the XYZ based on images and a computing device may transmit a correction signal to move a nano-positioning stage where the sample is mounted.

In various embodiments, a pixelated detector may be, or may comprise, a camera, such as a CCD (charge-coupled device) or CMOS (complementary metal-oxide-semiconductor) device. In various embodiments, a pixelated detector may be, or may comprise, a photodiode array, such as a single-photon avalanche diode (SPAD) array, a segmented photodiode, or a multi-element detector, such as a multi-element gallium arsenide phosphide (GaAsP) detector (also known as an Airyscan detector).

In various potential embodiments, an area detector that provides signals depending on the position of the incident light, such as a position-sensitive detector, may be used for localization.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 3A corresponds with an example scheme of background reduction by STED; FIG. 3B corresponds with an example fluorescence intensity trace focused into a 150 nM Atto647N-streptavidin solution; FIG. 3C corresponds with background noise vs. background level for 15, 50, 150, 500 and 1200 nM Atto647N-streptavidin solutions, with STED reducing both background level and noise proportionally, by 3-fold, where the Poisson limit may be represented by noise=$\sqrt{background\,level}$; FIG. 3D corresponds with an example on-off probe-target hybridization scheme; FIG. (E) real-time trace at 600 nM and (F) SNR at different Atto647N-probe concentrations; FIG. 3E, at top, corresponds with Atto647N photon counts (100 msec time-bins) under direct 642 nm excitation, and at bottom, corresponds with Cy3 (green) and Atto647N (magenta) photon counts under 561 nm excitation, measuring Cy3-Atto647N fluorescence-resonance-energy-transfer (FRET) upon DNA duplex formation; FIG. 3F corresponds with signal-to-noise (SNR) at different Atto647N-probe concentrations; FIG. 3G corresponds with background noise vs. background level for Rpb9-SiR in live Hela cells, with STED reducing both background level and noise proportionally, by ≈3-fold; FIG. 3H corresponds with imaging immobilized Cy3B-Atto647N dsDNA duplexes against 300 nM Atto647N background oligos in solution (2 μm×2 μm ROIs, 8 sec/scan), with arrowheads indicating Atto647N molecules, with SNR~1 for red-only, and SNR~3 for red+STED; FIG. 3I corresponds with Cy3B-Atto647N 2D distances, where STED recovers lost localization precision, reducing the excess localization errors at 300 nM background compared to 0 nM ($\sqrt{\sigma_{x,y}(300nM)^2-\sigma_{x,y}(0nM)^2}$), from ≈41 nm (red-only) to ≈15 nm (red+STED).

FIG. 4A corresponds with a mini-gene schematic; FIG. 4B corresponds with cell with 2 mini-gene integrations (clone 6), with white arrows corresponding with nascent transcription sites; FIG. 4C corresponds with live-cell confocal/STEDxy scans (2 μm×2 μm ROIs, 0.8 sec/scan) showing co-localized tdPCP-EGFP and SiR-Rpb1 (yellow arrow) or TetR-JF646 spots at the transcription site; FIG. 4D corresponds with scatter plots: relative xy coordinates between tdPCP and Rpb1 or TetR. 2D distances (mean±S.D.): 82±32 (64±30) nm Rpb1 red-only (w/ STED), n=31(25), 184±87 nm TetR, n=17 (*: p<0.05; *: p<0.01, Wilcoxon rank sum); FIG. 4E corresponds with xy tdPCP-EGFP displacements when target-locking vs. freely moving; FIG. 4F corresponds with tdPCP-EGFP target-locked image; FIG. 4G corresponds with a SiR-Rpb1 signal obtained with tdPCP-EGFP target-locked at the 642 nm excitation peak, with SiR-Rpb1 images shown when 642 nm beam is initially turned on (S+B$_i$) and when reaches a steady plateau (B$_d$); FIG. 4H corresponds with tdPCP-EGFP and SiR-Rpb1 coordinates (different colors: 3 independent experiments) are within 22-25 nm and 30-33 nm root mean square (r.m.s.) from the set-point respectively; FIGS. 4I-4K correspond with single-molecule SiR-Rpb1 counting by bleaching steps, in 25% (4I, 4K) and 100% labeled (4J) samples, respectively, with red lines corresponding with multi-plateau fits; FIG. 4L** corresponds with number of Pol II molecules detected at the transcription site (4 independent experiments, 100% labeling), Fano factors: 1.7±0.7 and 1.2±0.5 (mean±S.D.) for excitation and excitation+STED respectively.

FIGS. 5A-5G illustrate target-locking enables tracking Pol II dynamics during the transcription cycle at single transcription sites (see also FIG. 13). FIG. 5A corresponds with a transcription cycle schematic; FIG. 5B corresponds with dynamics after adding 1004 flavopiridol, 10 μM triptolide, or 0.1% v/v DMSO. tdPCP-EGFP: individual transcription site traces (wide-field imaging setup). SiR-Rpb1: total signal from different transcription sites (red circles) measured either before (t=0) or after drug addition (using target-locking). Black squares: mean. Error bars: S.D.; FIG.

5C corresponds with exponential decay times. SiR-Rpb1 decay times: (i) fit parameters in (B); 238±49 sec and 239±24 sec for flavopiridol and triprolide respectively; (ii) individual target-locked transcription site traces, as in FIGS. 13J, 13K; 162±71 sec and 242±148 sec (mean±S.D., n=8 and 15 for flavopiridol and triptolide respectively). tdPCP-EGFP: 132±38 sec and 179±57 sec (mean±S.D., n=6 and 5 for flavopiridol and triptolide respectively); FIG. 5D corresponds with SiR-Rpb1 FRAP trace at a single transcription site; FIG. 5E corresponds with SiR-Rpb1 recovery slopes and times: 2.0±1.3 min$^{-1}$ and 253±169 sec (mean±S.D., n=12 and 11); FIG. 5F corresponds with SiR-Rpb1 recovery averaged over multiple individual traces (n=7). Error-bars: S.D., red line: single-exponential fit. FIG. 5G corresponds with 1.2 μm×1.2 μm scans of a single transcription site.

FIG. 6A corresponds with targeted Pou5f1 allele schematic. Black rectangles: exons and 5'/3'-UTR; FIG. 6B corresponds with live-cell confocal/STEDxy scans (2 μm×2 μm ROIs, 0.8 sec/scan) showing co-localized MCP-mNeonGreen and SiR-Rpb1/Sox2/Cdk9/Brd4/Med22 foci (yellow arrows); FIG. 6C corresponds with relative MCP-Rpb1/Sox2/Cdk9/Brd4/Med22 xy coordinates; FIG. 6D corresponds with 2D distances, (mean±S.D): Rpb1 124±75(80±34) nm, Sox2 187±81 (193±96) nm, Cdk9 197±92(185±73) nm, Brd4 227±89 (196±93) nm, Med22 194±97(170±108) nm, n=26(15), 27(9), 24(10), 35(10) and 28(21), w/o STED(w/ STED) respectively (*: p<0.05; **: p<0.01, Wilcoxon rank sum).

FIG. 7A corresponds with dynamics upon adding 10 μM flavopiridol, 10 μM triptolide, 0.1% v/v DMSO or 1 μM JQ1. MCP-mNeonGreen: individual transcription site traces (11 sec/frame, wide-field imaging setup). SiR1-Rpb1: total signal from different transcription sites (red circles) measured either before (t=0) or after drug addition (using target-locking). Black squares: mean. Error bars: S.D.; FIG. 7B corresponds with exponential decay times. Rpb1 from fits in (A): 347±104 sec, 565±109 sec and 310±123 sec, for flavopiridol, triptolide and JQ1 respectively. MCP: 378±193 sec, 378±115 sec and 300±136 sec (mean±S.D., n=11, 7 and 6 for flavopiridol, triptolide and JQ1 respectively). FIG. 7C corresponds with SiR-Rpb1 FRAP trace a Pou5f1 transcription site; FIG. 7D corresponds with SiR1-Rpb1 recovery slopes and times: 0.77±0.66 min$^{-1}$ and 341±206 sec (mean±S.D., n=9) respectively; FIG. 7E corresponds with SiR1-Rpb1 recovery averaged over n=10 individual traces. Error-bars: S.D., red line: single-exponential fit.

FIGS. 8A-8C correspond with FRAP experiments at Pou5f1; FIG. 8A corresponds with 2 μm×2 μm, 0.8 sec/scan. Yellow arrows: Cdk9/Sox2/Brd4/Med22 foci; FIG. 8B corresponds with FRAP curves; FIG. 8C corresponds with recovery times (Cdk9 7±3 sec; Sox2 10±3 sec, Brd4 2±2 sec, Med22 7±4 sec (mean±S.D., n=6); FIG. 8D corresponds with Brd4, Med22, Cdk9 and Sox2 signals upon inhibition with 1 μM JQ1 or 10 μM Flavopiridol. Cdk9/Med22 signals with JQ1 drop close to noise-floor thus the estimated relative decrease might underestimate the actual decrease (only features bright enough above the background are quantified). Bar graph: mean±S.D. of all the points for t>0; FIG. 8E corresponds with relative MCP and Cdk9 signals vs. [JQ1]. Red lines: non-linear least-squares fitting to Hill equation, $$\frac{[JQ1]^n}{K^n + [JQ1]^n},$$

with K=63±39/97±44 nM and n=1.1±0.7/0.8±0.1 for MCP/Cdk9 respectively; FIG. 8F corresponds with Cdk9-MCP relationship based on 8D. Error bars: S.E.M. (Cdk9: n=3-7; MCP: n=5-13); FIG. 8H corresponds with distributions of transcription site intensities at various [A-485] and [JQ1]; FIG. 8I corresponds with Sox2 signal upon adding 1 μM A-485 or 0.1% v/v DMSO. Red line: exponential fit, τ=12.5±8.6 sec; FIG. 8J corresponds with model of interdependencies between RFs, histone marks and Pol II kinetics at Pou5f1.

FIG. 9A corresponds with targeted Nanog schematic. Black rectangles: exons and 5'/3'-UTR. FIG. 9B corresponds with live-cell confocal/STEDxy scans (2 μm×2 μm ROIs, 0.8 sec/scan). Yellow arrows: SiR-Rpb1/Sox2/Brd4 foci. FIG. 9C corresponds with relative MCP-Rpb1/Sox2/Brd4 xy coordinates and FIG. 9D corresponds with 2D distances. 2D distances (mean±S.D): Rpb1 145±88(123±44) nm, Sox2 266±119(275±101) nm, Brd4 228±110(198±96) nm, n=20 (16), 12(26), 23(21), w/o STED (w/STED) respectively (*: p<0.05; : p<0.01; *: p<0.001, Wilcoxon rank sum). FIG. 9E corresponds with Nanog transcription bursting after adding 0.1% v/v DMSO or 30 nM JQ1. FIG. 9F corresponds with burst parameters vs. [JQ1]. Red line for burst frequency: Hill equation fit, K=23±17 nM, n=0.9±0.3. FIG. 9G corresponds with relative Brd4 signal at Nanog vs. [JQ1]. Red line: Hill curve (K=25 nM, n=1.0). FIG. 9H corresponds with relationship between Brd4 cluster size and burst frequency based on the data in (9F, 9G).

FIGS. 10A-10H illustrate STED enables single-molecule imaging at elevated concentrations (related to FIG. 3). FIG. 10A corresponds with an example optical setup. STED subsystem (e.g., beam source 170): STED beam is launched from a fiber collimator. CF: band-pass clean-up filter. WP: Wollaston polarizer. PM: ~90%/10% pick-off mirror. PD: photo-diode for monitoring and stabilizing the laser power. HWP: half-wave plate. PBS: polarizing beam splitter cube. SLM: spatial light modulator. RL relay lenses (RL) for independently fine-steering the STEDxy and STEDz beams. Excitation subsystem (e.g., beam source 170): 642 nm, 490 nm and 561 nm beams launched from fiber collimators. D2-4: dichroic mirrors. Microscope subsystem (e.g., detection system 150): SL scan lens; TL: tube lens. QWP: achromatic quarter-wave plate. Objective lens (60×OL). M: partial mirror reflecting ~95% of incident light. The sample is scanned using a 3D nanopositioning stage (xyz piezo-stage) (e.g., platform 190). Detection subsystem (e.g., detection system 150): D1: long-pass dichroic. RM: removable mirror. APD: avalanche photo-diode detector. In some experiments, a broad-band non-polarizing 50:50 beam-splitter was used instead of the removable mirror, allowing simultaneous use of both EM-CCD and APDs. D5-6: dichroic mirrors. EF1-3: emission filters. QV: Quad-view device, projecting images of Atto647N, GFP and Cy3 in separate quadrants of the camera. FL: focusing lens. CL: cylindrical lens, introducing astigmatism for z localization. PMT: photo-multiplier tube, detecting back-scattered laser light for beam profile calibrations. Real-time feedback control system (e.g., controller 114 of computing device 110): analyzes data from the Detection subsystem (e.g., detection system 150) and actively controls the xyz piezo-stage (e.g., platform 190) to stabilize the target at the desired set-point. FIG. 10B corresponds with Fano factor (variance/mean) vs. laser power for intensity fluctuations in 15, 500 and 1200 nM Atto647N-streptavidin solutions. Solid line: linear relation. FIG. 10C corresponds with SNR (mean/stdev) for the same data as in (10B). SNR varies <3-fold over ~100-fold range of laser power. FIG. 10D corresponds with comparison of background noise simultaneously measured with an APD and an (EM)CCD, from SiR-Rpb1 in live U2OS cells. A 50:50 beamsplitter splits the fluorescence signal equally between the two detectors (FIG. 10A). Top: CCD operated in EM-CCD mode; bottom: conventional CCD mode. The laser is initially off and is turned on at ~1.5 sec. Intensity traces and cross-correlation show high correlation between intensity fluctuations from the two detectors, indicated that noise is dominated by SiR-Rpb1 number fluctuations, while other sources of noise are less prominent. FIG. 10E corresponds with schematic of 2D imaging of immobilized Cy3-Atto647N duplexes, in the presence of free Atto647N oligos in solution. FIG. 10F corresponds with distributions of total counts in Atto647N channel for ROIs centered on molecules vs. ROIs at random locations away from molecules, for 300 nM background Atto647N oligo in solution (FIG. 3H). Signal of Atto647N molecules is not well separated from background when only excitation is used but becomes better separated when excitation+STED are used. FIG. 10G corresponds with 2D images of immobile Cy3-Atto647N duplexes at 600 nM Atto647N oligo in solution. Top panels: Cy3 and Atto647N images obtained through 561 nm excitation. Atto647N molecules indirectly excited through FRET are shown with arrowheads. Bottom panels: Atto647N images obtained through direct 642 nm excitation. In the left image, obtained without STED, Atto647N molecules are not detected above the background (SNR~0.6), while in the right image, obtained with STED, Atto647N molecules are visible with SNR~1.2. FIG. 10H corresponds with SNR obtained for 2D imaging of Cy3-Atto647N duplex at 100, 300 and 600 nM Atto647NH oligo in solution, with 642 nm excitation only and with 642 nm excitation+STED.

FIG. 11A corresponds with southern blot of genomic DNA from clones 5 and 6, digested with HindIII-PvuII, using a probe targeting the Puromycin resistance gene region. Two bands corresponding to two integration sites are observed for each clone. FIG. 11B corresponds with sequencing result of the genomic region close to the 3' junction of the 6-2 integration site, revealing a single-mutation (shown in italic, G→C) at chr19:53833111 that results in a PvuII restriction site (underlined). FIG. 11C corresponds with relative qPCR quantification of junctions between mini-gene and genome and internal mini-gene sequences. Data points and error bars indicate mean and S.D. from n=3-5 experiments. Relative abundances in the genome are 1±0.22 and 2.03±0.34 (mean±S.D.) for junctions and internal sequences respectively (mean values indicated by dashed lines). FIG. 11D corresponds with standard scanning confocal/STED imaging suffers from photo-bleaching and does not provide single-molecule quantification for SiR-Rpb1 in live cells. 2 μm×2 μm ROI, 0.8 sec/scan, 10-slice z-stack, 250 nm z-steps. Inserts: maximum projection from 3 slices centered at the best focus. Traces: quantification of SiR-Rpb1 cluster signal. Contrary to target-locked detection (FIG. 2I-L, FIG. 12M-O), single-molecule steps cannot be identified.

FIG. 11E corresponds with transcription site movement: mean-square-displacement (MSD) scales as $~t^\alpha$, with $\alpha\approx0.5$, indicating anomalous diffusion, typical for genomic loci in live cell nuclei. Mean first-passage times vs. distance: within ~0.2 sec the transcription sites move a distance equal to the radius (HWHM, r=125 nm) of the red excitation beam. FIG. 11F corresponds with axial localization and target-locking of transcription sites with <50 nm precision and reproducibility. Astigmatism calibration and z position estimator $(s_x/s_y)$ vs. z using 100 nm, 200 nm and 500 nm beads. Each calibration curve was obtained by moving in 50 nm z-steps. At each z position the images were fitted to an elliptical 2D Gaussian PSF model with widths $s_x$ and $s_y$ in x and y respectively. The z-position estimator $s_x/s_y$ is robust, exhibiting very similar behavior for different bead sizes. Cyan symbols, left panel: image parameters of individual tdPCP-EGFP transcription sites during target-locking. Individual transcription sites are locked to within ±50 nm from the desired set-point $(s_x/s_y=1.1)$. Trace of a single transcription site showing 29 nm r.m.s. target-locked z precision. FIG. 11G: To dissect the different contributions of S vs. SiR-Rpb1 signal is obtained as in FIG. 2G but with tdPCP-EGFP locked 0.536 μm away from the 642 nm excitation beam (by displacing the blue (GFP) tracking beam). Top panels: SiR-Rpb1 images when the 642 nm beam is initially turned on ($B_i$) and when the SiR-Rpb1 has reached a steady plateau ($B_d$). (H) $S+B_i$, $B_i$ and $B_d$ parameters and bleaching times, obtained by stretched exponential fits (of the form $$e^{-\left(\frac{t-t_0}{\tau}\right)^\alpha},$$

where $t_0$ is the frame when the 642 nm laser is initially turned on) of traces locked at the transcription site (n=24) and 0.536 μm away (n=18). The SiR-Rpb1 traces locked away from the transcription site show a 3-fold decreased initial level and slower decay to the stationary plateau compared to traces locked on the transcription site. Thus any immobile background present at the mini-gene manifests as slow baseline decay (from Pol IIs at the periphery) after the initial sharp peak (from Pol IIs at the center). FIG. 11I corresponds with discerning relative S and $B_i$ contributions by analyzing the amplitudes of the fast vs. slow decay components of traces locked at the mini-gene. S, $B_i$ and $B_d$ parameters and $S/(S+B_i)$ and $B_i/(S+B_i)$ ratios, obtained by double exponential fitting (of the form $$Se^{-\frac{t-t_0}{\tau_1}} + B_i e^{-\frac{t-t_0}{\tau_2}}$$

$+B_d$) of traces locked at the transcription site (n=25). Note that the estimated $S/(S+B_i)$ and $B_i/(S+B_i)$ ratios likely reflect upper limits, since errors such as imperfect target-locking would lead to underestimating S and overestimating $B_i$. FIG. 11J corresponds with linear Dependence of peak and steady-state plateau levels on excitation power. Graphs show peak $(S+B_i)$ and steady-state plateau $(B_d)$ levels, for transcription sites target-locked (at 10 fps) at the peak of excitation intensity. Each data point is the mean of n=21, 20, 15, 20 and 17 transcription sites, for 0.38, 0.5, 1.2, 2.7 and 5 μW 642 nm power respectively. Error bars: S.D. (K,L) SiR-Rpb1 FRAP experiments. FIG. 11K corresponds with snapshots of SiR-Rpb1 in the nucleus of a cell from clone 5 before bleaching and during the fluorescence recovery. FIG. 11L corresponds with average FRAP traces in absence of Flavopiridol (black, n=5 cells) and after ~30-40 minutes incubation with 10 μM Flavopiridol (red, n=4 cells). A fast initial recovery (~10-30 sec to ~60%; black curve) presumably corresponds to diffusion of mobile SiR-Rpb1 into the bleached area, with the slow recovery over ~1000-1500 sec corresponding to a ~40% immobile Pol II population. Incubation with flavopiridol is expected to block promoter-proximal pause release and thus deplete the majority of elongating Pol IIs. Thus, the reduction of the slow-recovering immobile population to 10-15% after Flavopiridol treatment (fast recovery to 85-90%; red curve) indicates that the majority of immobile Pol II observed under normal conditions is likely engaged in transcription elongation.

FIG. 12A corresponds with live-cell confocal scans showing co-localized tdPCP-EGFP and SiR-Rpb1 spots at the transcription site. A 2 μm×2 μm z-section scanned in 0.8 sec is shown. FIG. 12Q corresponds with step-size distributions obtained from reduced-labeled samples. Step sizes are 320±115 A.U. and 242±83 A.U. (mean±S.D.) for excitation and excitation+STED respectively.

FIGS. 13A-13J correspond with tdPCP-EGFP fluctuation analysis and Pol II time-course dynamics at the CMV mini-gene upon transcription inhibition (related to FIG. 5). FIG. 13A corresponds with tdPCP-EGFP intensity trace of a single-transcription site and FIG. 13B corresponds with corresponding (normalized) auto-correlation-function $G(\tau)$. $G(\tau)$ decays to zero at a time delay $\tau=241\pm13$ sec (determined by least-squares fit, red solid line) and remains zero after that, consistence with absence of memory effects and stochastic independent initiation events. FIG. 13C corresponds with transcription kinetic parameters. Nascent RNA residence time $\tau$ estimated by the characteristic time delay when $G(\tau)=0$. Number of tdPCP-EGFP-decorated nascent transcripts N, estimated as $N=\mu^2/\sigma^2$ (Larson et al., 2011), where μ and $\sigma^2$ are the mean and variance of the tdPCP-EGFP intensity trace. Initiation rate c, estimated as $c=N/\tau$. Statistics for (C): RNA residence time 214±66 sec, number of RNAs 8±2 and initiation rate 2.4±0.5 $min^{-1}$, respectively (mean±S.D., n=14 transcription sites). FIG. 13D corresponds with snapshot of a transcription site (arrow) and single 24×PP7 RNA molecules (arrow heads). FIG. 13E corresponds with quantification of nascent transcription site brightness, indicating brightness equivalent to 5.3±2.4 single RNAs (mean±S.D., n=48). FIG. 13F corresponds with schematic of a rearranged CMV mini-gene, with 24×PP7 placed upstream of IRES-Puro. (G) Nascent RNA residence time for the rearranged CMV mini-gene 282±89 sec (mean±S.D., n=9), determined by auto-correlation analysis. The 68±35 sec difference in the mean nascent RNA residence times between original (IRES-Puro-24×PP7) and re-arranged (24×PP7-IRES-Puro) mini-genes reflects the elongation time of Pol II through the 1.24 kb IRES-Puro sequence. Thus the elongation rate is estimated as 1.24 kb/(68±35) sec=1.1±0.6 kb/min. FIG. 13H corresponds with SiR-Rpb1 intensity traces of single-transcription sites after addition of 10 μM flavopiridol, 10 μM triptolide or 0.1% v/v DMSO. SiR—Red solid lines are fits to single exponential decays. Individual curves are vertically offset for clarity. The SiR1-Rpb1 decay time measurements from multiple such transcription sites are shown in FIG. 5C. FIGS. 13I and 13J correspond with ChIP-qPCR assays. Clone 5 cells were treated with 10 μM flavopiridol for the indicated times or with 0.1% v/v DMSO control for 12 minutes. FIG. 13I corresponds with schematic of mini-gene and corresponding regions amplified by qPCR primer pairs. FIG. 13J corresponds with fold-enrichment, calculated as $2^{Ct_{mock}-Ct_{IP}}$, where $Ct_{mock}$ and $Ct_{IP}$ the threshold cycle values obtained from no-antibody control and anti-FLAG samples respectively. Data-points are mean±S.E.M. from n=4 independent ChIP experiments. Note the near-complete loss of Pol II signal from the mini-gene body and terminator regions by the 5-minute time point.

FIGS. 14A, 14B correspond with SiR-Rpb1 signals obtained with MCP-mNeonGreen locked at the center (A) and 0.536 μm away (B) from the 642 nm excitation beam. FIG. 14C corresponds with $S+B_i$, $B_i$ and $B_d$ parameters and bleaching times, obtained by stretched exponential fits (of the form $$e^{-\left(\frac{t-t_0}{\tau}\right)^\alpha},$$

where $t_0$ is the frame when the 642 nm laser is initially turned on) of traces locked at the transcription site (n=12) and 0.536 μm away (n=13). FIG. 14D corresponds with S, $B_i$ and $B_d$ parameters and $S/(S+B_i)$ and $B_i/(S+B_i)$ ratios, obtained by double exponential fitting $$\left(\text{of the form } Se^{-\frac{t-t_0}{\tau_1}} + B_ie^{-\frac{t-t_0}{\tau_2}} + B_d\right)$$

of traces locked at the transcription site (n=14). FIG. 14E corresponds with transcription site movement: mean-square-displacement (MSD) scales as $\sim t^\alpha$, with $\alpha \approx 0.5$, indicating anomalous diffusion, typical for genomic loci in live cell nuclei. Mean first-passage times vs. distance show that within ~0.3 sec the transcription sites move a distance equal to the radius (HWHM, r=125 nm) of the red excitation beam. FIG. 14F corresponds with target-locked SiR-Rpb1 trace at the Pou5f1 locus, showing a single bleaching step and FIG. 14G corresponds with step-size distribution, in reduced-labeled conditions. Step sizes are 283±78 A.U. (mean±S.D.). FIG. 14H corresponds with number of Pol II molecules detected at the Pou5f1 transcription site in ten independent experiments with fully-labeled samples. Fano factors (Top panel) are 0.7±0.2 (mean±S.D.). FIG. 14I corresponds with live-cell scans showing co-localized MCP-mNeonGreen and SiR-Rpb1/Sox2/Cdk9/Brd4/Med22 spots (yellow arrows) at the transcription site. A 2 μm×2 μm ROI scanned in 0.8 sec form a z-stack is shown. FIG. 14J corresponds with relative peak amplitude ($A_0$), background level (B), r.m.s. width $s_{xy}=(s_x s_y)^{0.5}$ and integrated signal ($\pi \cdot A_0 \cdot s_x \cdot s_y$), for the Rpb1, Sox2, Cdk9, Brd4 and Med22 foci respectively, as well as foci of ectopically expressed WT Sox2 and Sox2M mutant, obtained by fitting to an elliptical 2D Gaussian function of the form $$I(x,y) = B + A_0 e^{-\frac{x^2}{2s_x^2} - \frac{y^2}{2s_y^2}}.$$

Peak and integrated signal right-hand y-axes are calibrated based on the Pol II counts obtained by target-locking.

Figure 15A:
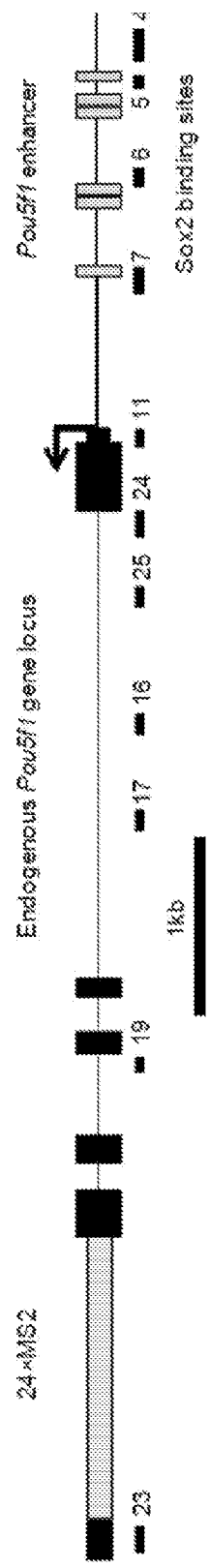
Figure 15B:
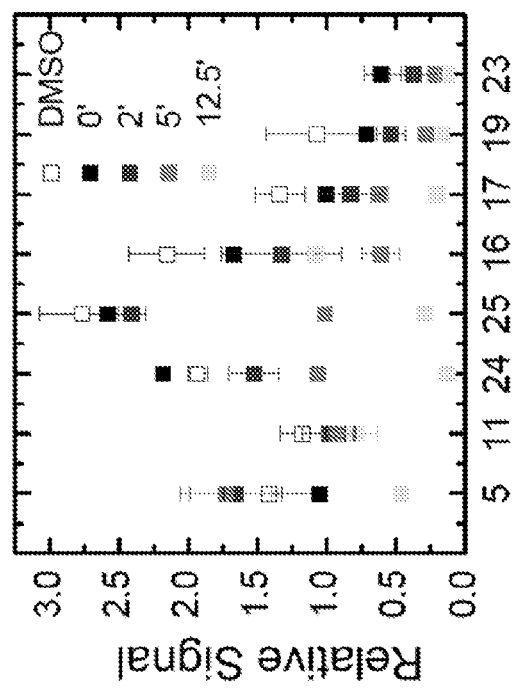
Figure 15D:
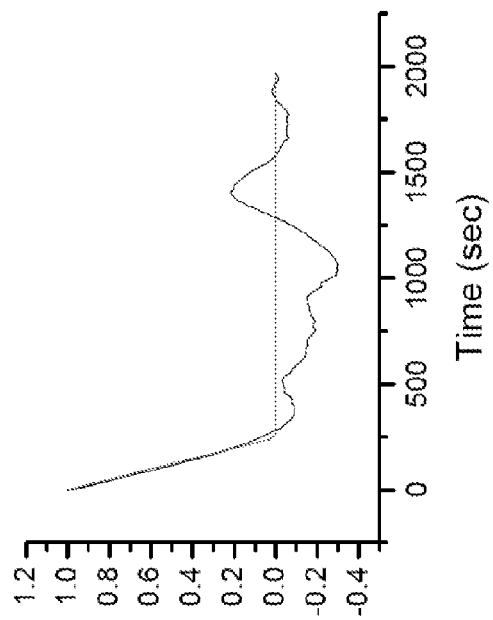
Figure 15C:
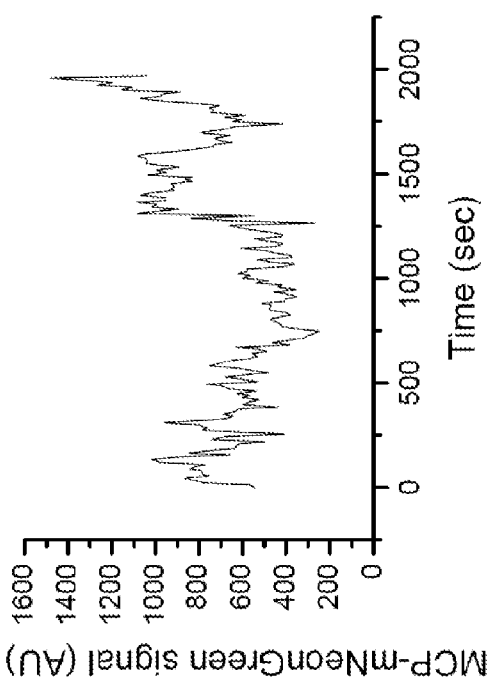
Figures 15G, 15H:
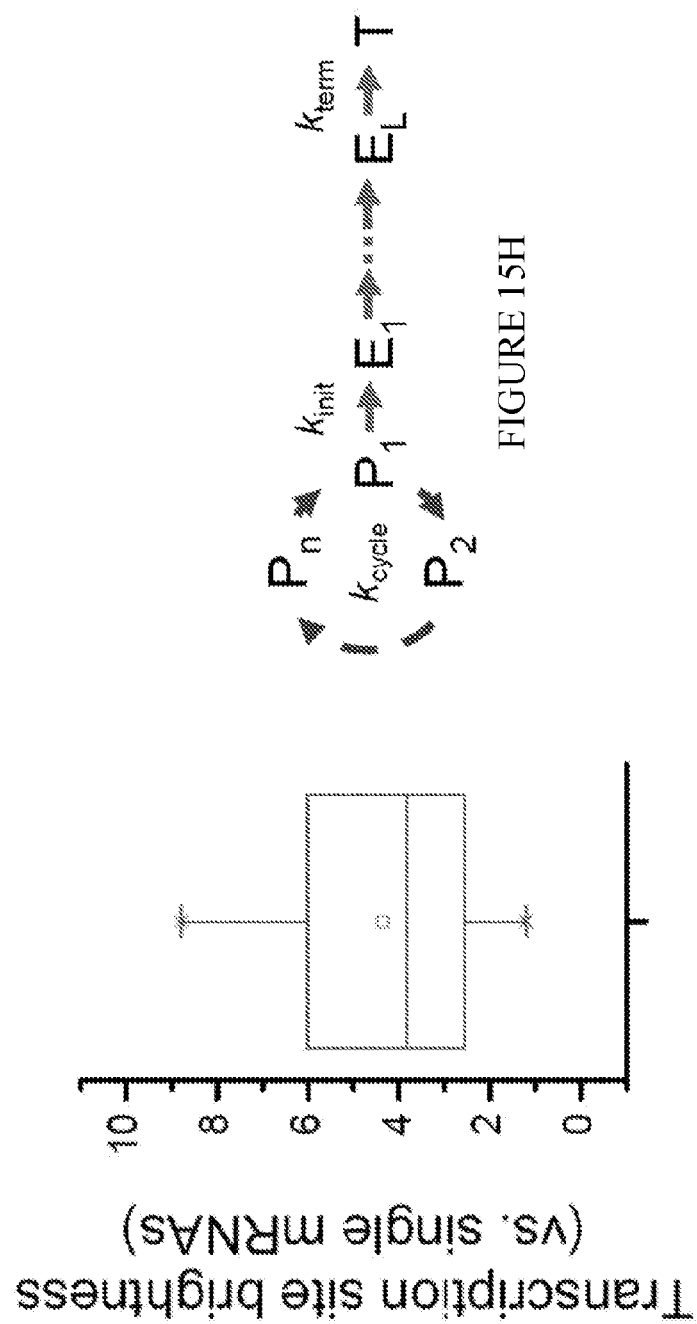
Figures 15I, 15J:
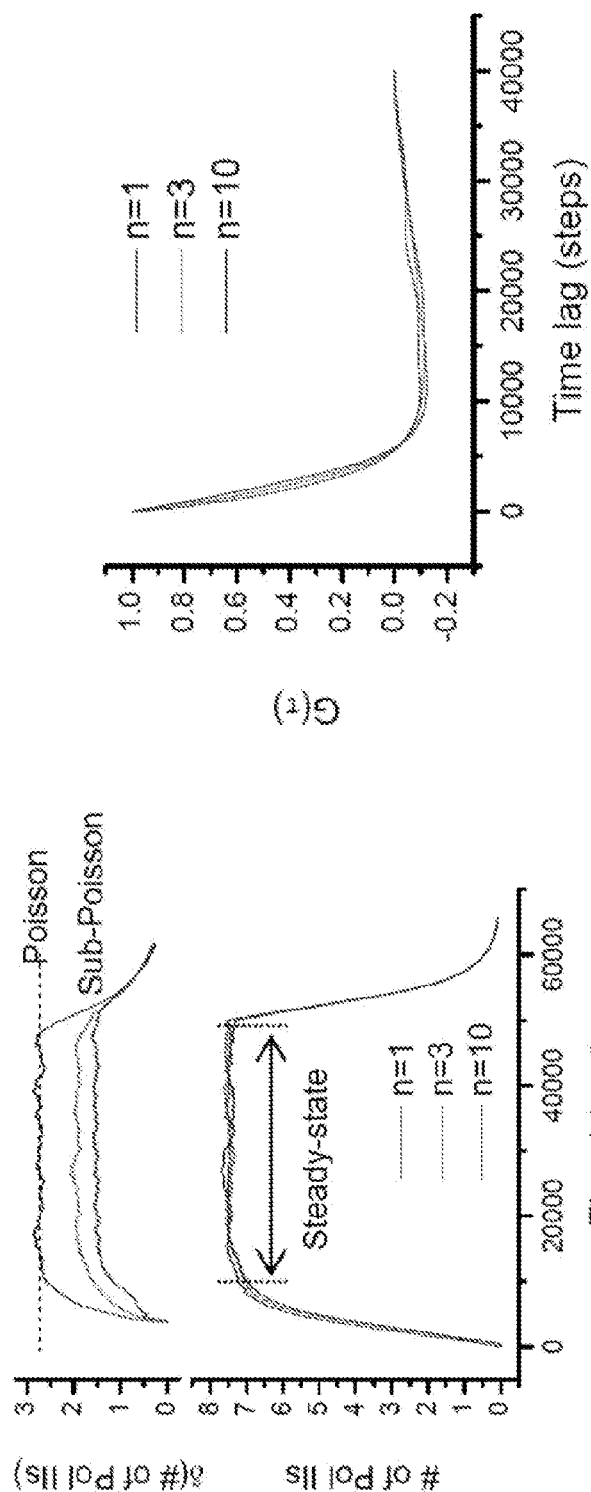
Figure 15K:
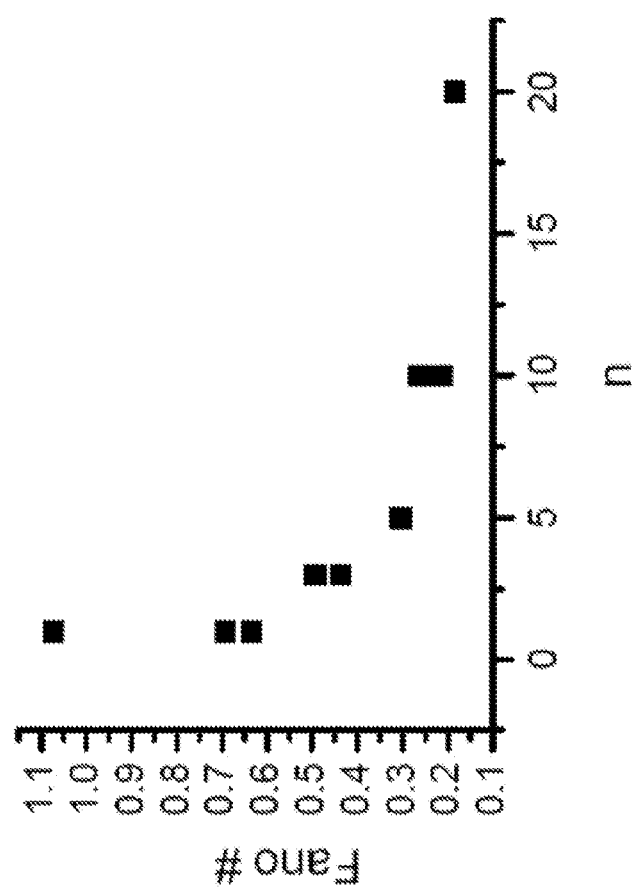

FIGS. 15A-15K correspond with Pol II dynamics at the Pou5f1 locus upon transcription inhibition and MCP-mNeonGreen fluctuation analysis (related to FIG. 7). FIGS. 15A and 15B correspond with ChIP-qPCR assays. OMG1 SNAP-Rpb1 clone 3 cells were treated with 10 μM flavopiridol for the indicated times or with 0.1% v/v DMSO control for 12.5 minutes. FIG. 15A corresponds with schematic of the Pou5f1 locus and corresponding regions amplified by qPCR primer pairs. FIG. 15B corresponds with relative % input, calculated as $100 \cdot 2^{Ct_{input}-5.644-Ct_{IP}}$, where $Ct_{input}$ and $Ct_{IP}$ are the threshold cycle values obtained from the input and anti-FLAG IP samples respectively. All the values were normalized relatively to primer pair #17, t=0 min time-point. Data-points are mean±S.E.M. from n=3 independent ChIP experiments. Note the significant and near-complete losses, by the 5-minute and 12.5-minute time points respectively, of Pol II signal from the Pou5f1 gene body and 3'UTR regions. FIG. 15C corresponds with MCP-mNeonGreen intensity trace of a single Pou5f1 transcription site and FIG. 15D corresponds with corresponding (normalized) auto-correlation-function G(τ). G(τ) decays to zero at a time delay τ=246±12 sec (determined by least-squares fit, red solid line). FIG. 15E corresponds with transcription parameters, Nascent RNA residence time τ estimated by the characteristic time delay when G(τ)=0. Number of MCP-mNeon-Green-decorated nascent transcripts N, estimated as $N=\mu^2/\sigma^2$ (Larson et al., 2011), where μ and $\sigma^2$ are the mean and variance of the MCP-mNeonGreen intensity trace. Initiation rate c, estimated as c=N/τ. Statistics for (E): RNA residence time 203±102 sec (mean±S.D.), number of RNAs 17±8 (mean±S.D.) and initiation rate 5.7±2.3 min$^{-1}$ (mean±S.D.), respectively (n=6 transcription sites). FIG. 15F corresponds with snapshot of a transcription site (arrow) and single 24×MS2 RNA molecules (arrow heads). FIG. 15G corresponds with quantification of nascent transcription site brightness, indicating brightness equivalent to 4.4±2.2 (mean±S.D., n=16) single RNAs. FIG. 15H corresponds with schematic of kinetic scheme a promoter cycle with n states. FIG. 15I corresponds with mean and standard deviation of number of Pol II molecules $N_{polII}(t)$, from N=1000 simulated traces based on the scheme in (H), with n=1, 3 and 10 respectively. Simulation parameters: $L_{DNA}=3700$, $k_{elongation}=1$, $k_{term}=1/3000$ and $k_{init}=1/900$ for n=1 or $k_{init}=1$, $k_{cycle}=n/900$ for n>1, respectively. Initially no polymerases are present ($N_{polII}(t=0)=0$) and the system reaches a steady-state plateau with an average of ≈7.5 polymerases. After t=50,000 steps the initiation rate is reduced to zero and $N_{polII}$ decays back to zero. Dotted line in the top graph marks noise level for Poisson fluctuations. FIG. 15J corresponds with mean auto-correlation function, calculated from N=1000 traces during the steady-state plateau. FIG. 15K corresponds with Fano factor vs. n. indicating reduced Pol II fluctuations for n>1.

Figure 16A:
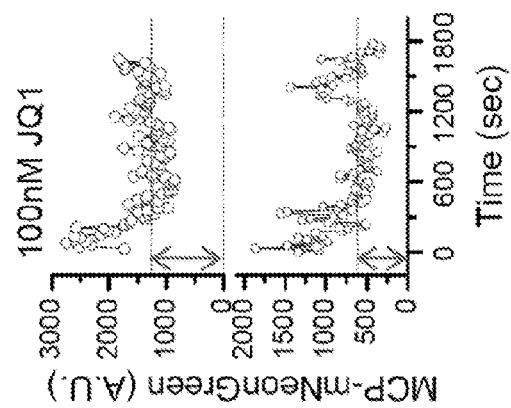
Figure 16B:
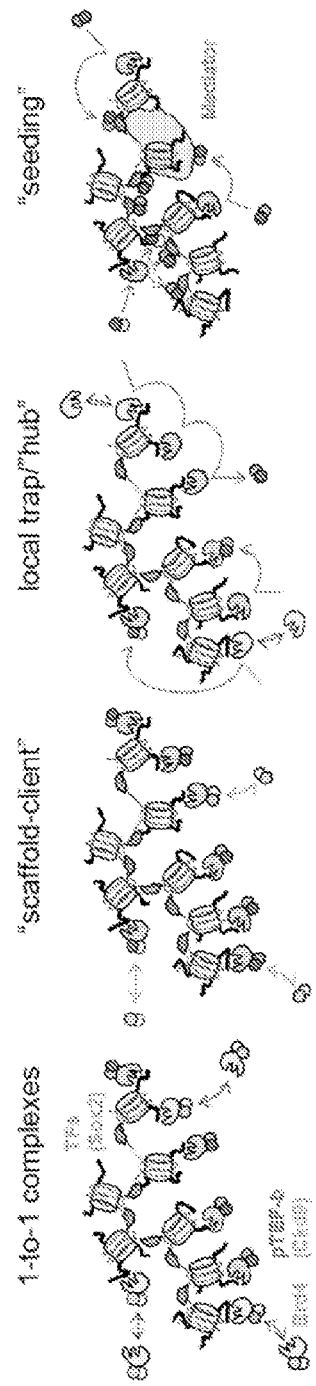
Figure 16C:
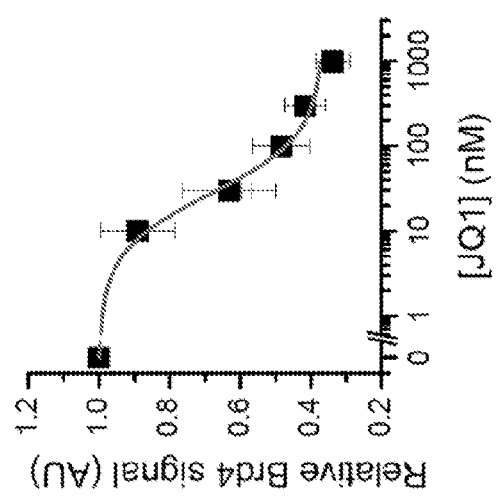
Figure 16D:
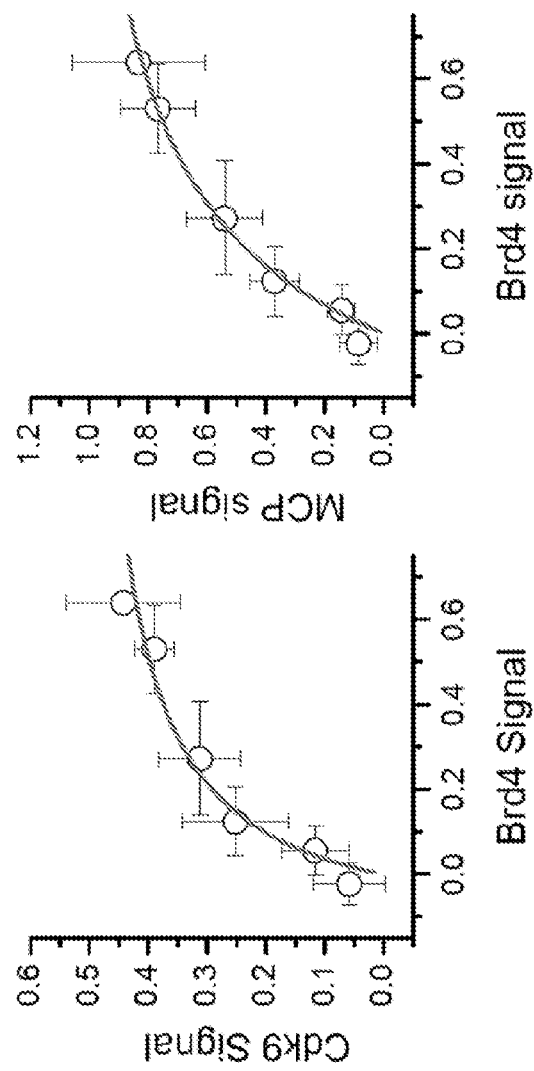
Figure 16F:
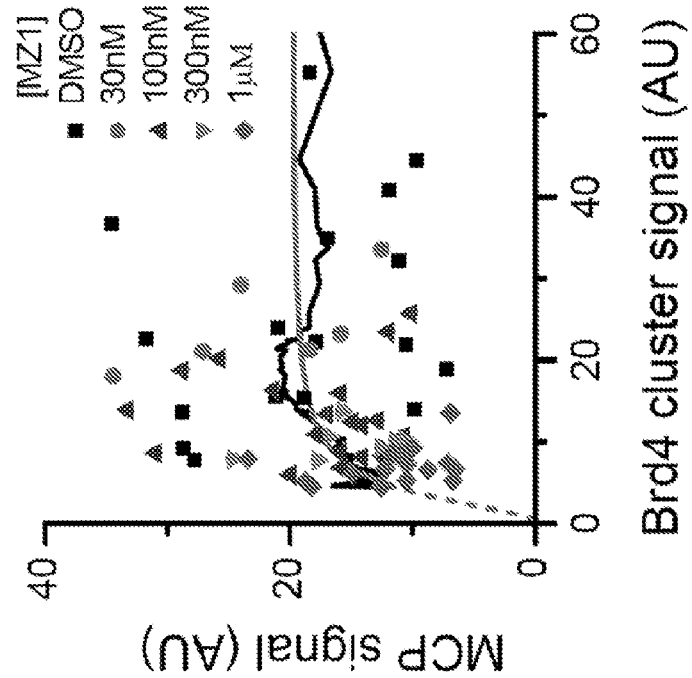
Figure 16E:
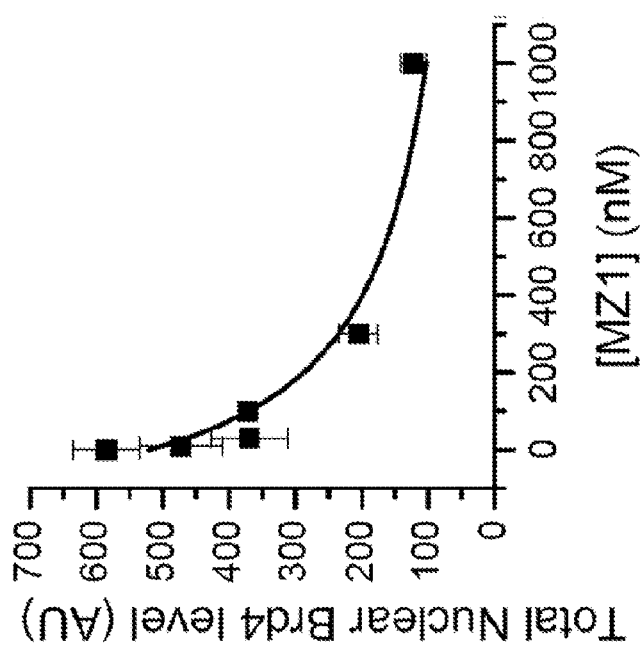
Figure 16H:
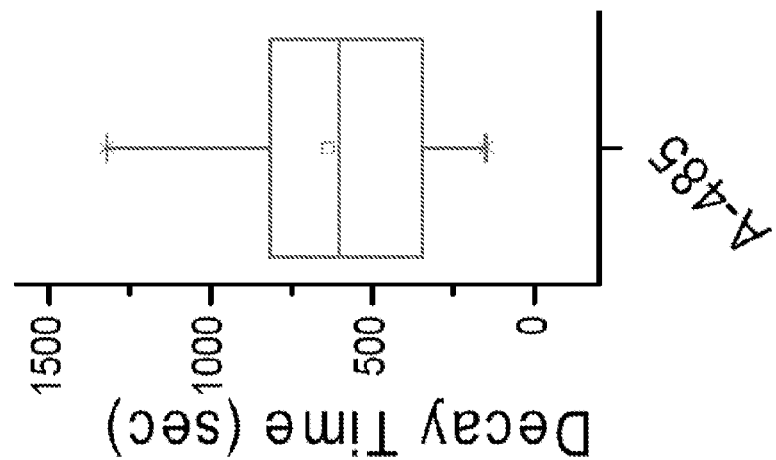
Figure 16G:
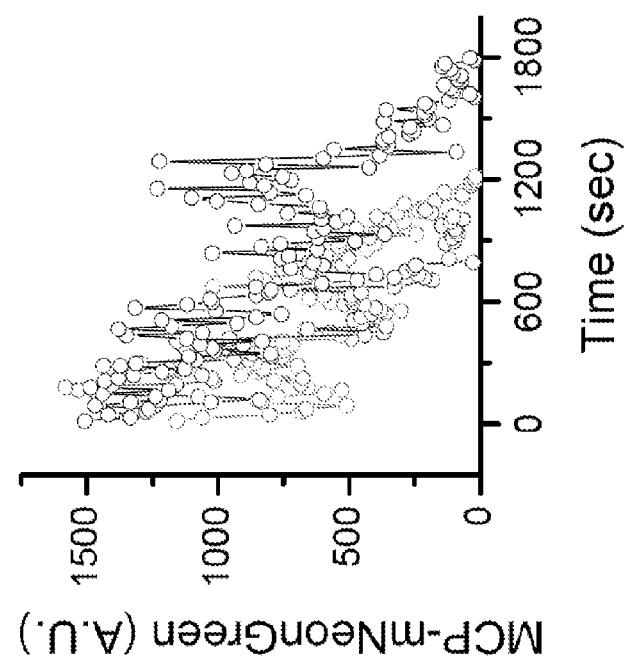
Figures 16I, 16J:
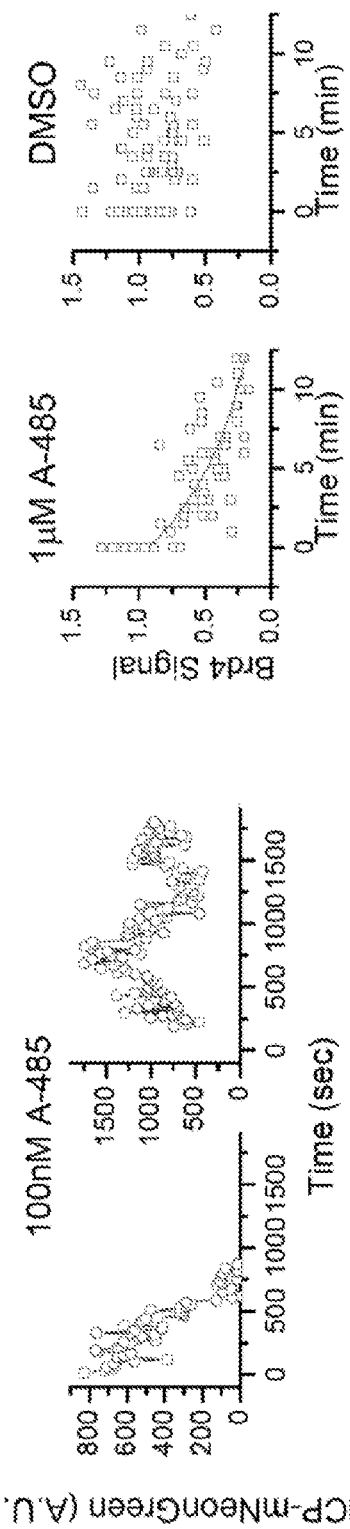
Figure 16M:
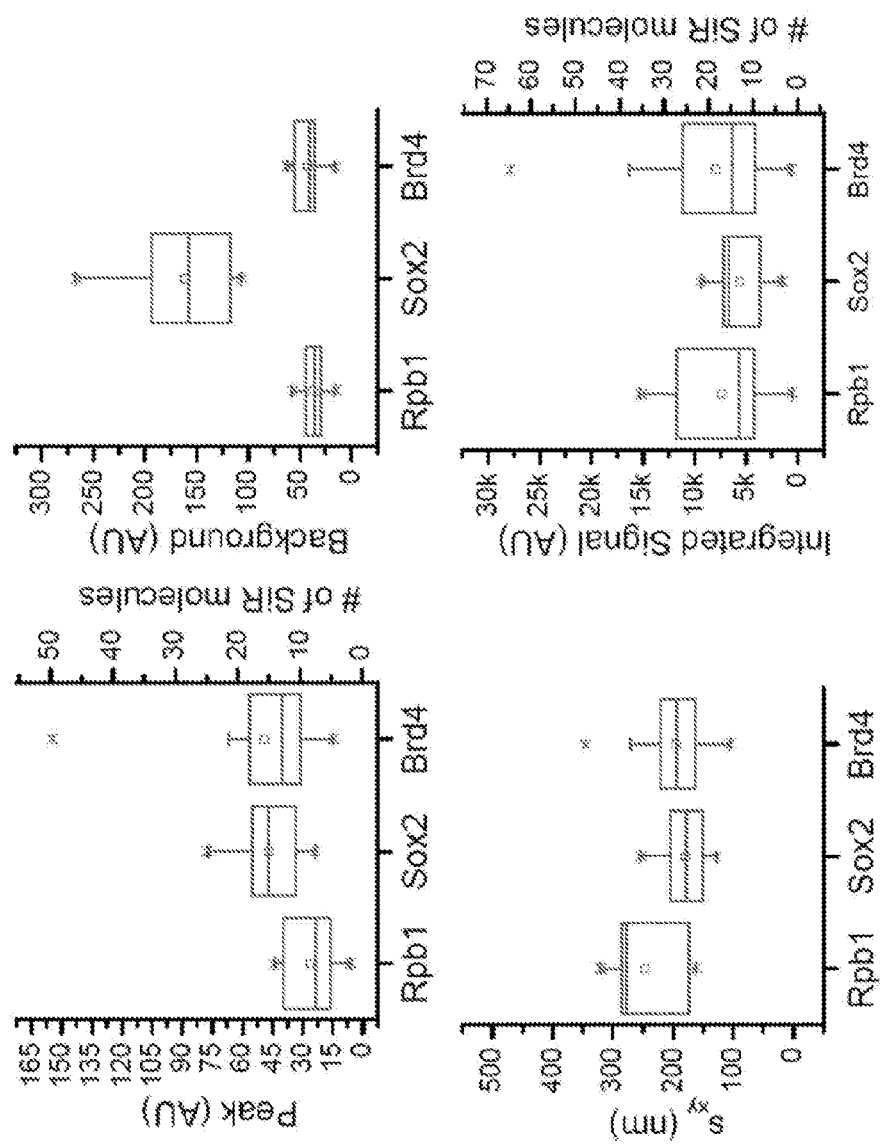

FIGS. 16A-16M correspond with dynamics and interdependencies of RFs at Pou5f1 and quantification of Pol II, Sox2 and Brd4 at the Nanog locus (related to FIGS. 8 and 7). FIG. 16A corresponds with MCP-mNeonGreen dynamics upon addition of 100 nM JQ1. Dashed lines: finite level of attenuated transcription. FIG. 16B corresponds with models for Brd4-dependent P-TEFb recruitment. FIG. 16C corresponds with relative Brd4 signal at Pou5f1 vs. [JQ1]. Red solid line: non-linear least-squares Hill equation fit; K=28±5 nM, n=1.3±0.3. FIG. 16D corresponds with relationships between Brd4 and Cdk9/MCP signals based on the data in (16C) and in FIGS. 8E, 8F. Error bars: s.e.m. FIG. 16E corresponds with rotal nuclear Brd4 signal after targeted Brd4 degradation using various concentration of MZ1. FIG. 16F corresponds with MCP amplitude vs. Brd4 cluster signal at Pou5f1. FIG. 16G corresponds with dynamics of MCP-mNeonGreen upon addition of 1 µM A-485. FIG. 16H corresponds with MCP decay times: 635±350 sec (mean±S.D., n=17). FIG. 16I corresponds with dynamics of MCP-mNeonGreen upon addition of 100 nM A-485, showing transcription sites that shut down (left) or persist (right). FIG. 16J corresponds with time course of Brd4 signal at the Pou5f1 locus upon inhibition with 1 µM A-485 or 0.1% v/v DMSO control. Red line: exponential fit, τ=8±1 sec. FIG. 16K corresponds with ChIP-qPCR analysis of H3K27ac after 1 µM A-485 treatment (open symbols) or 0.1% v/v DMSO (solid symbols, 30 min time-point). Primer pair locations are shown in FIG. 15A. Error bars: s.e.m. Dashed lines: exponential fits, with characteristic decay times 7±4, 7±2, 5±1 and 13±4 minutes for primer pairs 5, 4, 6 and 7 respectively. FIG. 16L corresponds with live-cell scans showing co-localized MCP-mNeonGreen and SiR-Rpb1/Sox2/Brd4 spots (yellow arrows) at the transcription site. 2 µm×2 µm ROIs scanned in 0.8 sec. FIG. 16M corresponds with relative peak amplitude ($A_0$), background level (B), r.m.s. width $s_{xy}=(s_x s_y)^{0.5}$ and integrated signal ($\pi \cdot A_0 \cdot s_y \cdot s_y$), for the Rpb1, Sox2 and Brd4 foci respectively at Nanog, obtained by fitting to an elliptical 2D Gaussian function of the form $$I(x, y) = B + A_0 e^{-\frac{x^2}{2s_x^2} - \frac{y^2}{2s_y^2}}.$$

Peak and integrated signal right-hand y-axes are calibrated based on the Pol II counts obtained by target-locking at Pou5f1.

Figure 17:
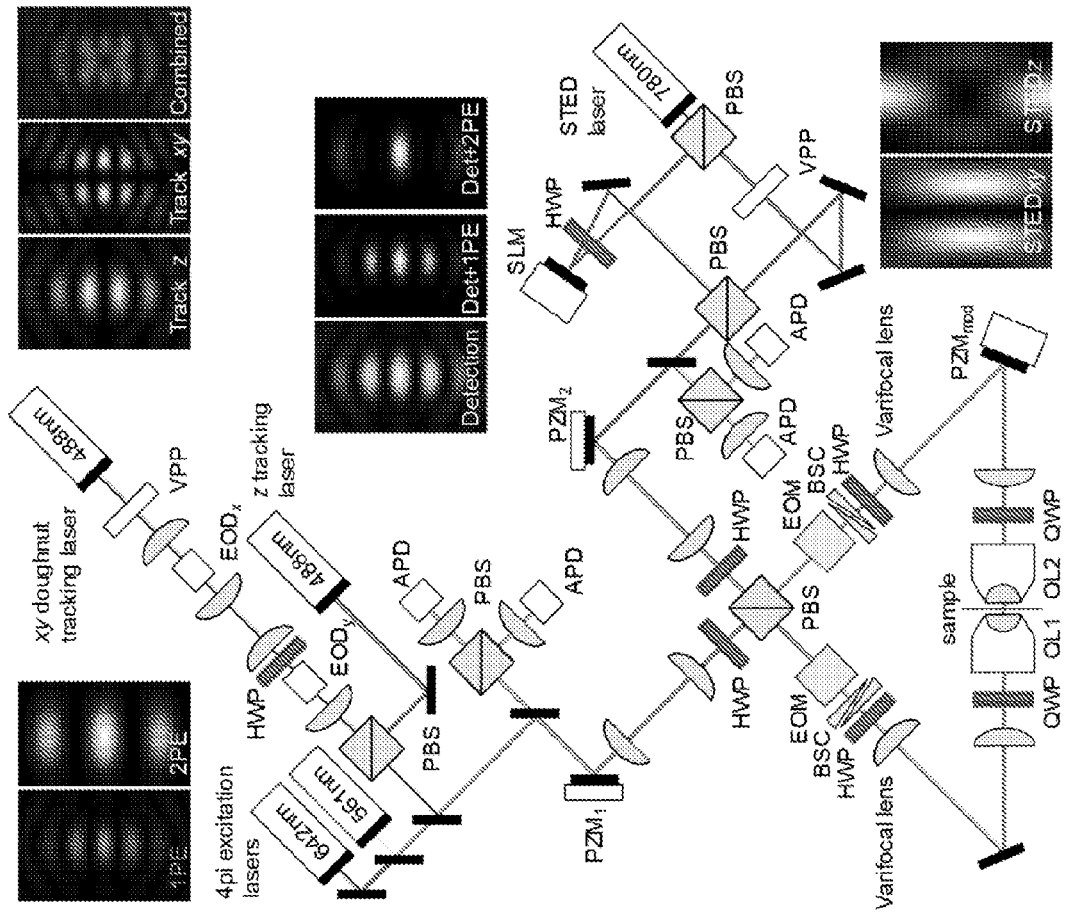

FIG. 17 illustrates a 3D interferometric target-locking setup, according to potential embodiments. A sample may be mounted between two opposed objective lenses (OL1,2) in a 4pi configuration. 488 nm tracking beams, 561/642 nm excitation beams and 780 nm beams are appropriately phase modulated, combined and delivered to the 4pi setup. The combination of half-wave plates (HWP) and Babinet-Soleil compensators (BSC) phase-shift the z tracking 488 nm beam by π (to create destructive interefence at the focus), compared to the 561/642 nm excitation and xy doughnut 488 nm tracking beams (which interfere constructively at the focus). Quarter-wave plates (QWP) before the objectives render all the beams circularly polarized. The STED configuration consists of an xy doughnut pattern, created by a 0-2π vortex phase plate (VPP), and a z "bottle" pattern created by a 0-π circular mask written on a spatial light modulator (SLM). The STED beams can either be combined coherently or each delivered separately through one of the objectives. Tracking of the target may be achieved by scanning the xy doughnut 488 nm beam, using two Electro-optic deflectors (EODx,y) and in z by shifting the minimum of the z-tracking 488 nm standing wave beam by modulating one of the cavity arms with a piezo-electric mirror mount (PZMmod) or using Electrooptic modulators configured as phase shifters (EOM). Fast focusing may be achieved using varifocal-lenses. Single fluorescence photons are detected with avalanche photo-diode (APD) detectors. A real-time feedback system running on FPGA hardware processes the photon counts and locks the target at minimum of the tracking 488 nm beams (that coincides with the minima of the 780 nm STED beams and maxima of the 561/642 nm excitation beams. Insets: calculated PSFs for 1-photon (1PE) and 2-photon (2PE) excitation at 642 nm and 1300 nm; tracking z and xy at 488 nm; STEDz and xy at 780 nm (single lens, non-coherent case shown), detection at 700 nm and combined excitation/detection PSFs for 1PE and 2PE. Calculations shown are for circularly polarized beams, NA 1.1. In certain embodiments, the setup may also be built with silicon oil (1.3 NA) or water immersion (1.27 NA) lenses.

Figure 18:
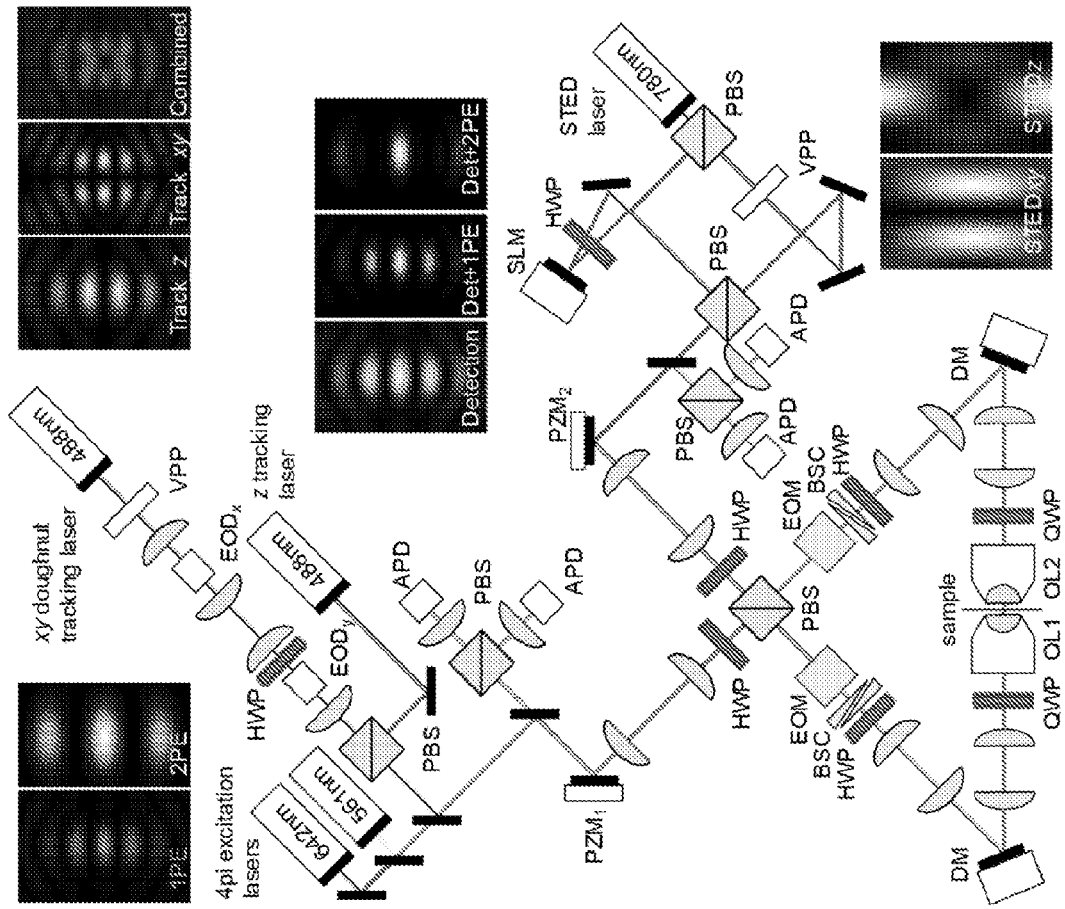

FIG. 18 illustrates potential embodiments of a 3D interferometric target-locking setup with an alternative cavity scheme, using deformable mirrors for both fast-focusing as well as for path-length modulation. The deformable mirrors may also be used, for example, for correcting higher-order optical aberrations and fine-tuning the shapes of the various beams and the depth of the intensity zero at the sample.

Figure 19:
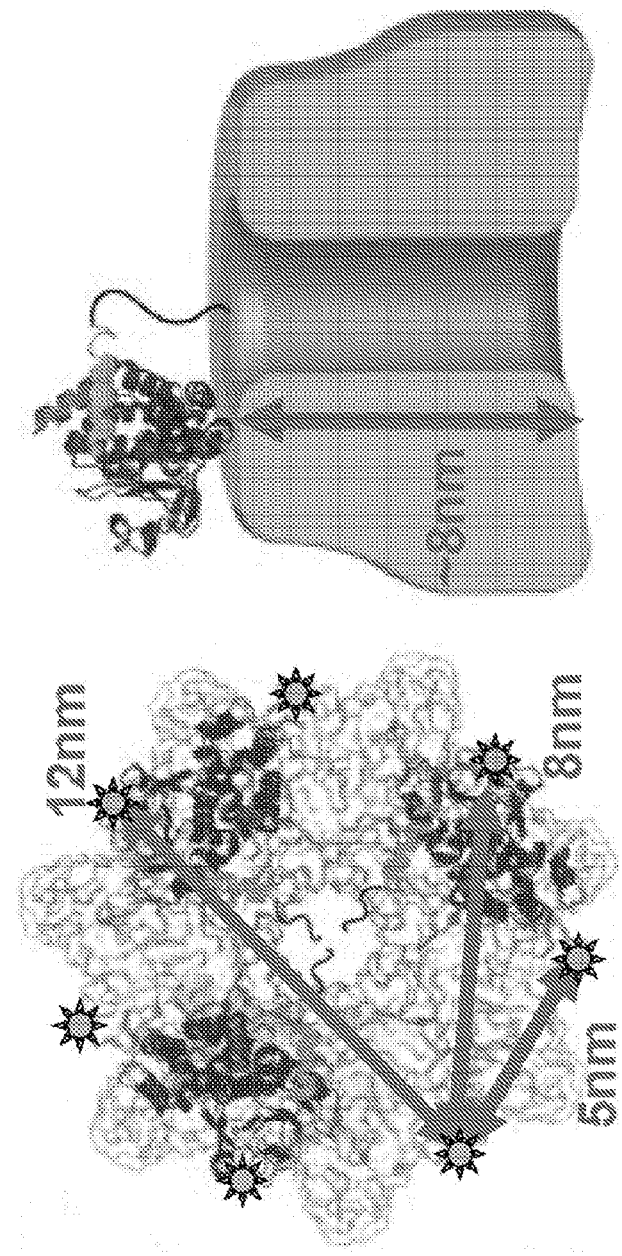

FIG. 19 provides a representation of the structure of Anthrax PA/LF$_N$ (protective antigen/lethal factor N-terminal).

The drawings depict only several embodiments in accordance with the disclosure and are, therefore, not to be considered limiting of its scope.

DETAILED DESCRIPTION

Detecting individual molecules in the presence of other molecules at high concentrations, or in crowded environments in which additional molecules introduce background signals that prevent the extraction of the signal from a target molecule in a predefined location, is challenging. When observing a target molecule in a cell, for example, the target molecule is likely to be surrounded by many other molecules that may be "floating" in the target molecule's vicinity. If a focused laser beam (as in a confocal microscope) is used, at any given time, many molecules may be going into and out of the path of the laser beam, masking the signal from the target molecule. Following below are more detailed descriptions of various concepts related to, and embodiments of, inventive systems, devices, apparatuses, products, and methods for molecular nanoscopy. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Our knowledge of biological processes has vastly expanded over the past few decades. Genetics, biochemistry and molecular, cellular, and structural biology studies identified key components and interactions, provided snapshots of macromolecules in action, and begun to elaborate on the dynamic and interconnected nature of biological pathways.

A major challenge is transforming this vast knowledge base into a complete description of how biological processes take place inside live cells. Developing tools to visualize complex molecular transactions unfolding in real-time in the native intracellular milieu is a pressing unmet need.

Gene control, for example, is a fundamental problem transcending biomedical fields. Transcription of eukaryotic protein-coding genes involves the coordination of the RNA polymerase II ("Pol II") machinery with multiple regulatory factors: DNA-specific transcription factors, chromatin remodelers, histone modifying enzymes, chromatin readers and Mediator complexes. The detailed operation of this intricate biochemical system in vivo remains obscure. Due to technical challenges related to visualizing and quantifying dynamics of individual molecules at specific 3D loci in vivo, little is known about the spatio-temporal organization of Pol II and regulatory factors during transcription in live cells. Even less is understood about mechanisms that dictate assembly of transcription complexes at specific gene loci and how regulatory factor interactions/activities shape nascent transcription kinetics. A technology capable of imaging Pol II and transcription factor molecules engaging a single gene, concomitant to nascent transcription kinetics, would greatly advance our understanding of these hitherto-unseen molecular processes in vivo.

Visualizing transcription at single genes in live cells presents unique challenges. First, single-molecule tracking experiments often detect the behavior of transcription factors at unspecified/random nuclear locations and without additional functional readouts. How observations at unspecified locations relate to the function of these factors at specific gene loci remains unclear. Second, real-time single-molecule detection at specific loci requires discriminating the signal of individual molecules functionally engaged at the gene-of-interest from an overwhelming background from molecules transiently diffusing through the optical detection volume, as well as from molecules bound to loci nearby. High nuclear Pol II/regulatory factor concentration—100 s nM to low µM—is a formidable barrier. Finally, addressing functional consequences of observed molecular dynamics requires imaging multiple functionally linked events at the transcription site and promptly analyzing the effects of perturbations—to capture primary effects and test causal relationships. Addressing yet the most basic questions about transcription at the single-molecule/single-gene level requires new integrated solutions and improved optical imaging approaches.

Single-molecule tracking, fluorescence spectroscopy, and sub-diffraction optical microscopy may be implemented in achieving these goals. Prior techniques sought single-molecule resolution by sparse labeling or stochastic photo-switching, multi-copy signal amplification, or multi-event averaging via temporal-correlation approaches. In naturally or artificially amplified multi-copy tandem gene arrays, for example, the strong signal from 100's-1000's fluorescent molecules recruited to the array enabled powerful quantitative analyses. However, imaging single-copy genes remained elusive. Setups optimized for minimal out-of-focus background could only detect single molecules at up to ~10 nM concentrations, achieved by under-labeling or stochastic photo-switching. Because such approaches detected only a small (0.01-0.1%) fraction of molecules at any given time, the effective sensitivity during dynamic imaging was dramatically decreased. Live-cell photo-activated localization microscopy (PALM) could detect interpretable signals only when an estimated ~100 Pol II molecules were simultaneously present in the same sub-diffraction volume. As PALM traces contain mostly an un-interpretable absence of signal, fewer molecules, e.g. 2-20 possible elongating Pol IIs at a gene-of-interest, and real-time dynamic changes involving such small Pol II numbers, could not be detected in live cells. Also, multiple on-off transitions of the same molecule during PALM ("blinking"), is a serious complication when the exact number of molecules is to be counted. Thus, despite remarkable technical advances, methods to directly visualize the organization and dynamics of a small number (e.g., 1-10) of Pol II and regulatory factor molecules, in relation to nascent transcription kinetics, at the general and physiological setting of endogenous single-copy genes, were lacking.

For purposes of reading the description of the various embodiments below, the following descriptions of the sections of the specification and their respective contents may be helpful:

Section A describes various embodiments of single-molecule nanoscopy techniques including active target-locking; and Section B describes various embodiments of 3D modulation interferometry combined with a localization scheme.

Section A: Single-Molecule Nanoscopy with Active Target-Locking

Example embodiments of the disclosure relate to spatially-targeted optical nanoscopy techniques capable of efficiently suppressing background at high concentrations. A real-time target-locking system may be used to maximize signal from detected molecules while allowing for the elimination of time-consuming and signal-wasting point-by-point scanning. In various embodiments, the techniques discussed herein may be applied, for example, to elucidate processes related to gene expression. When zooming onto individual transcription sites, for example, point-scanning provides 3D spatial perspective and improved localization precision, while target-locking achieves optimum detection Signal-to-Noise Ratio (SNR), allows long-term tracking with minimal or otherwise reduced photobleaching and, by employing stimulated emission depletion (STED) for background suppression, enables single-molecule detection sensitivity. The disclosed capabilities enable elucidation of the nanometer-scale organization of, for example, proteins and protein complexes, such as Pol II and regulatory factors at single tagged gene loci, visualization of Pol II dynamics during the transcription cycle, dissection of the hierarchies and interdependencies of regulatory factors at the enhancer and linking of these complex molecular transactions to nascent transcription kinetics at the promoter. Although the focus of certain example implementations being discussed herein is on transcription, the approach can be applied broadly to, for example, other biological processes. The disclosed approach enables the exciting application of real-time single-molecule detection focused on, for example, a single mRNA, a single DNA damage site, or a single membrane-docked vesicle, to study translation dynamics and RNA metabolism, DNA damage sensing, and repair or membrane fusion and content release. The improved tools facilitate a wide range of applications to understand the molecular processes that underlie important cellular functions, in situ.

Figure 1:
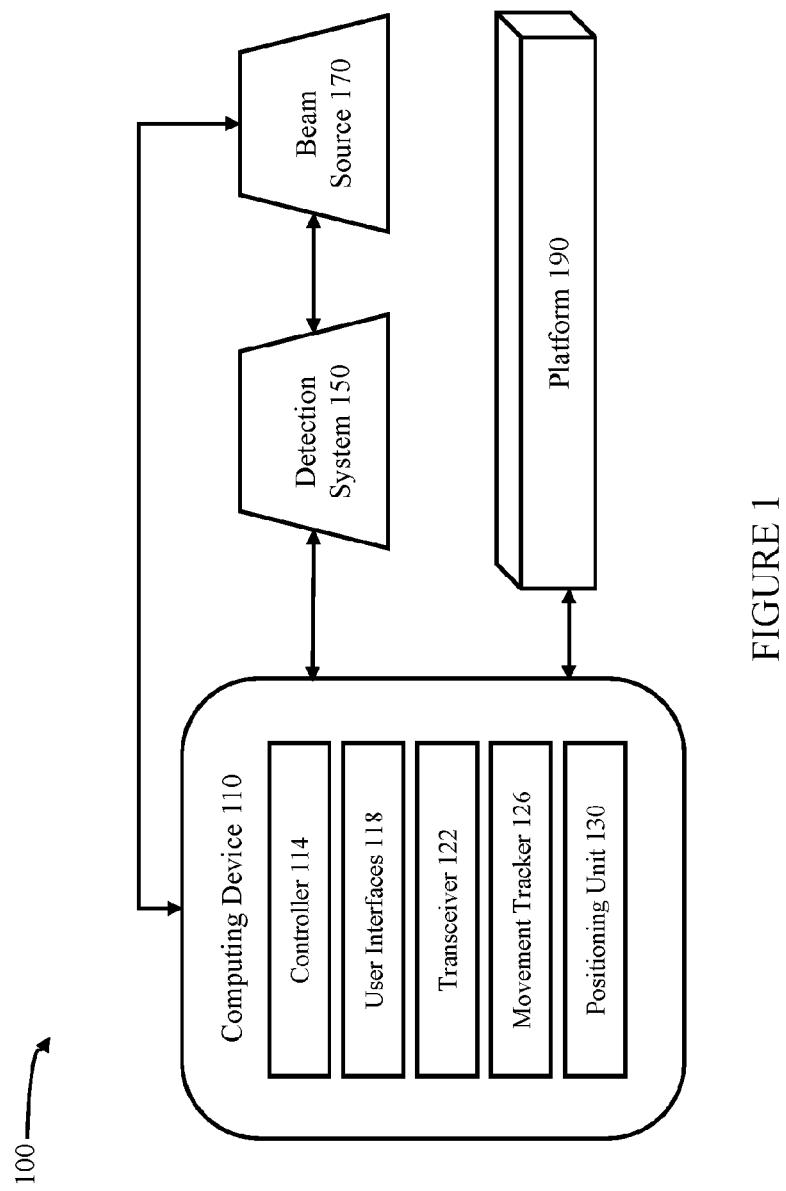
FIG. 1 corresponds with an example system comprising a computing device communicatively coupled with a detection system, a beam source, and a sample platform, according to potential embodiments.

Referring to FIG. 1, an example system 100 for implementing potential embodiments of the disclosure is depicted. System 100 includes a computing device 110 (or multiple computing devices, co-located or remote to each other) communicatively coupled with a moveable platform 190 on which a sample may be placed, a detection system 150

(which may include one or more light detectors, cameras or other imagers microscopes, photodiodes, charge-coupled devices, etc.) that may acquire images of the sample on the platform 190 for use in tracking a target molecule in the sample and which may detect signals from target molecules (e.g., light from fluorophore-tagged and excited target molecules), and a beam source 170 (e.g., a laser system that emits laser light or other highly-coherent light) capable of emitting excitation and depletion beams at the sample on the moveable platform 190. Alternatively or additionally to the moveable platform 190, beam source 170 (or components thereof) may be movable to steer or otherwise redirect beams at the target molecule at the target molecule moves within the sample.

The computing device 110 may include a controller 114 that may be configured to exchange control signals with the detection system 150 (or components thereof), allowing the computing device 110 to be used to control the capture of images and/or signals via sensors of the detection system 150, retrieve imaging data or signals, direct analysis of the data and signals, and output analysis results. The controller 114 may be configured to exchange control signals with the beam source 170 (or components thereof) allowing the computing device 110 to be used to control the excitation and signal depletion with respect to samples on platform 190. The controller 114 may also be configured to exchange control signals with the platform 190 (or components thereof), allowing the computing device 110 to be used to control the position of the sample with respect to the detection system 150 and/or the beam source 170. The controller may moreover be configured to analyze images to, for example, locate target molecules, and map movement of molecules based on detected signals. The controller 114 may include one or more processors and one or more volatile and non-volatile memories for storing computing code and data that are captured, acquired, recorded, and/or generated.

One or more user interfaces 118 allow the computing device 110 to receive user inputs (e.g., via a keyboard, touchscreen, microphone, camera, etc.) and provide outputs (e.g., via a display screen, audio speakers, etc.). A transceiver 122 allows the computing device 110 to exchange readings, control commands, and/or other data with, for example, detection system 150, beam source 170, and/or platform 190, or components thereof, or with other systems and devices. Computing device 110 may include a movement tracker 126 configured to track the movement of, for example, a molecule in a sample on platform 190 based on signals acquired via detection system 150. The movement tracker unit 126 may acquire data from or via, for example, controller 114, positioning unit 130, detection system 150, beam source 170, and/or platform 190 in determining how the target molecule is moving in the sample. Computing device 110 may also include a positioning unit 130 that may determine how to position the sample relative to the detection system 150 and/or beam source 170 in tracking the movement of target molecules. The positioning unit 130 may acquire data from or via, for example, controller 114, movement tracker 126, detection system 150, beam source 170, and/or platform 190 and determine how components of the beam source 170 (e.g., one or more depletion beams) and/or the movable platform 190 would need to be repositioned to maintain the target molecule within a zero region of the depletion beam (e.g., at a center of the depletion beam, such a central zero region of a doughnut-shaped depletion beam).

Figure 2:
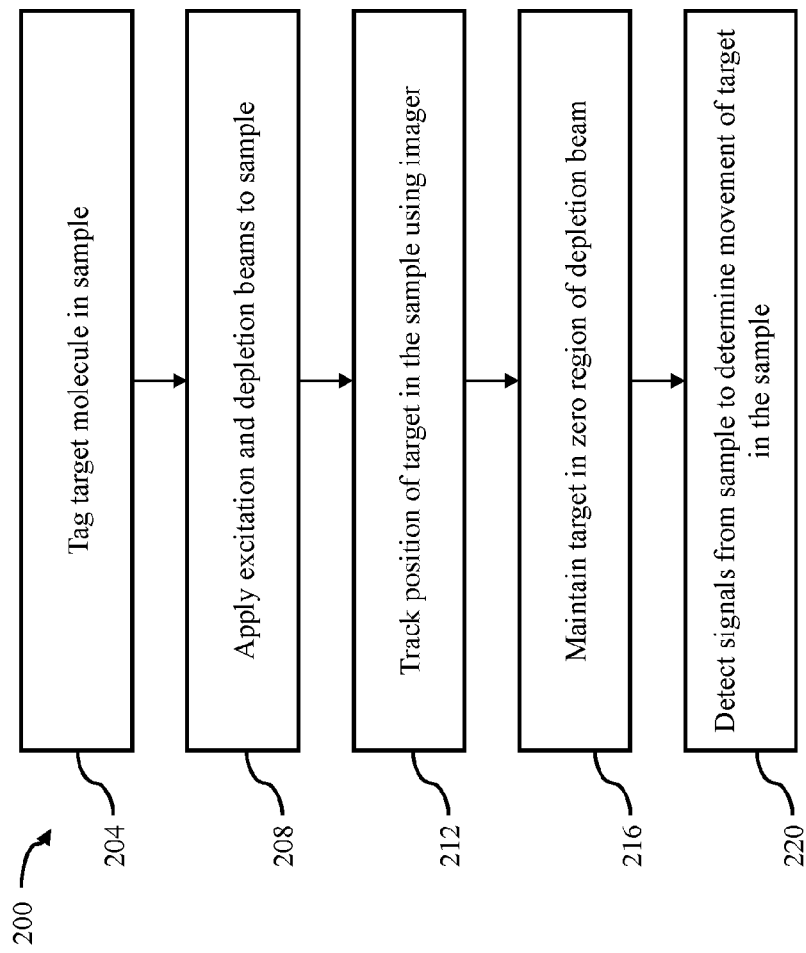
FIG. 2 corresponds with an example flowchart for determining the movement of a target molecule in a sample, according to potential embodiments.

FIG. 2 depicts an example flowchart 200 for determining the movement of a target in a sample. At 204, a target molecule may be tagged in a sample, such as using a fluorophore. At 208, excitation and depletion beams may be emitted at the sample. For example, controller 114 may transmit (via transceiver 122) one or more control signals to the beam source 170 to energize components thereof so as to emit suitable excitation and depletion beams directed at the sample on platform 190. At 212, the changing position of the target molecule in the sample may be tracked using, for example, a detection system 150. For example, movement tracker 126 may acquire, via controller 114, signals (e.g., light from an excited target molecule) captured via detection system 150 and transmitted to the computing device 110 via transceiver 122. At 216, the depletion beam (e.g., by redirecting or re-aiming the beam) and/or sample (e.g., by moving a movable platform 190) may be repositioned to maintain the target molecule within the zero region of the depletion beam. For example, positioning unit 130 may send, via controller 114, one or more control signals (transmitted via transceiver 122) to the beam source 170 to activate one or more actuators that move one or more depletion beam emitters so as to aim or re-aim the depletion beams so as to maintain the target in the zero region of the depletion beam. Alternatively or additionally, positioning unit 130 may send, via controller 114, one or more control signals (transmitted via transceiver 122) to the platform 190 to activate one or more actuators so as to position or re-position the sample relative to one or more depletion beam emitter so as to maintain the target in the zero region of the depletion beam. At 220, signals from the sample on platform 190 may be detected to map the movement of the target molecule in the sample. For example, controller 114 may receive signals from detection system 150 (transmitted via transceiver 122) and the movement tracker 126 may determine how the target is moving in the sample. Movement may be determined, for example, by comparing a previous position determined using previous signals from the detection system 150 with a current position determined using subsequent signals from the detection system 150.

Figure 10A:
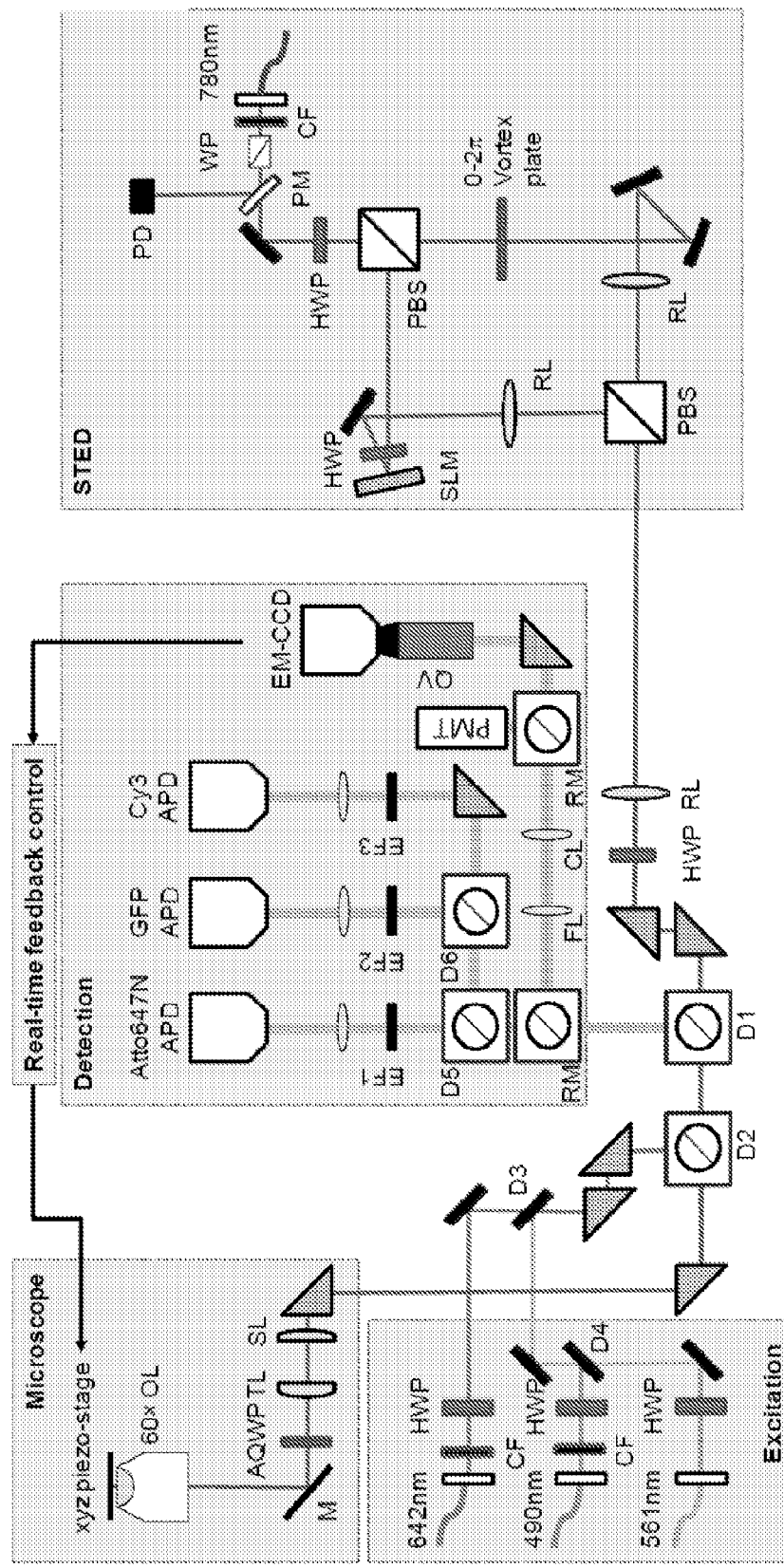
Figure 10C:
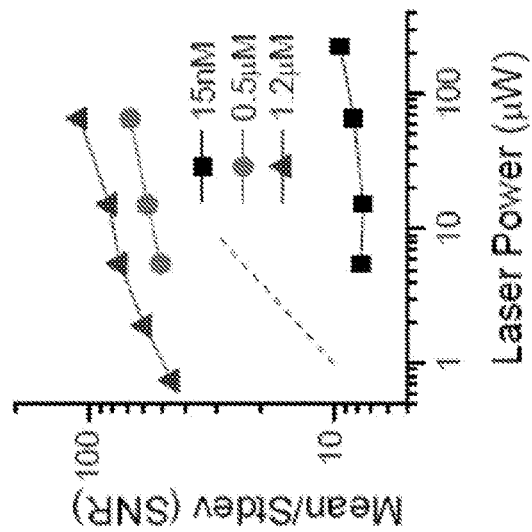
Figure 10B:
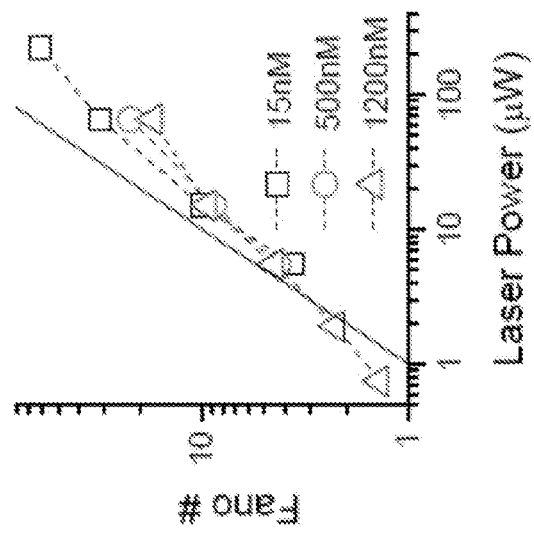
Figure 10G:
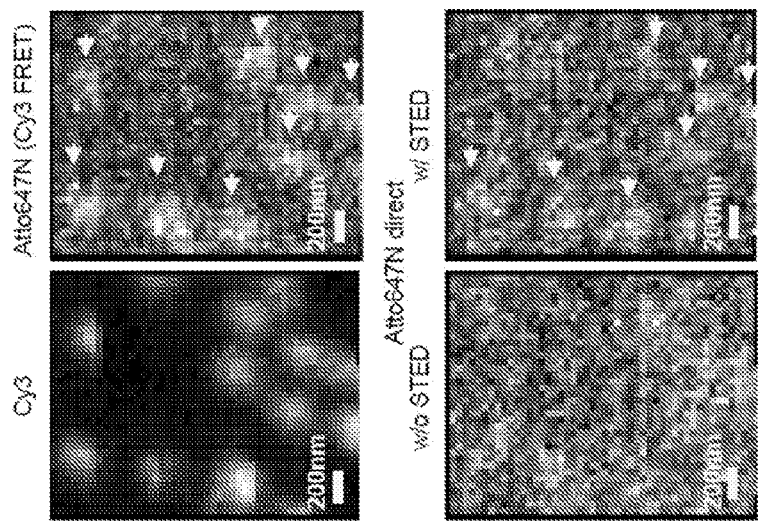
Figure 10F:
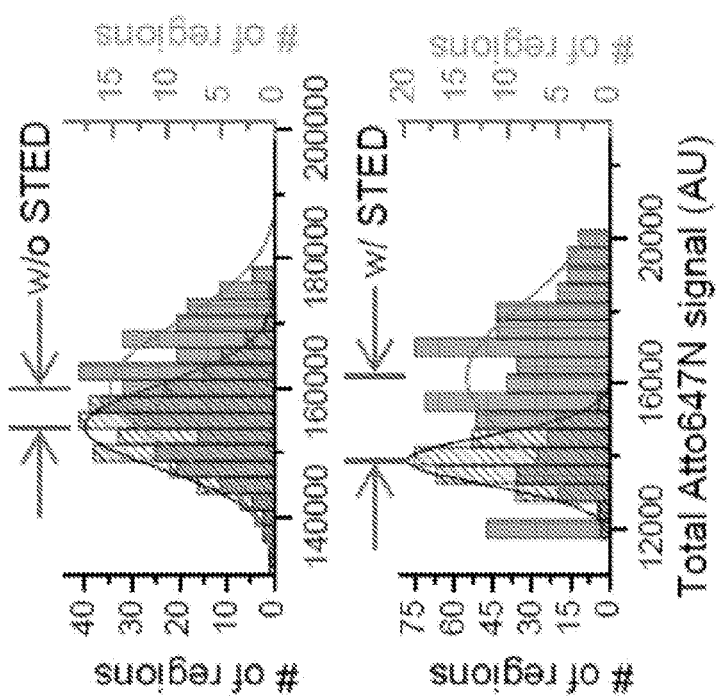
Figure 10H:
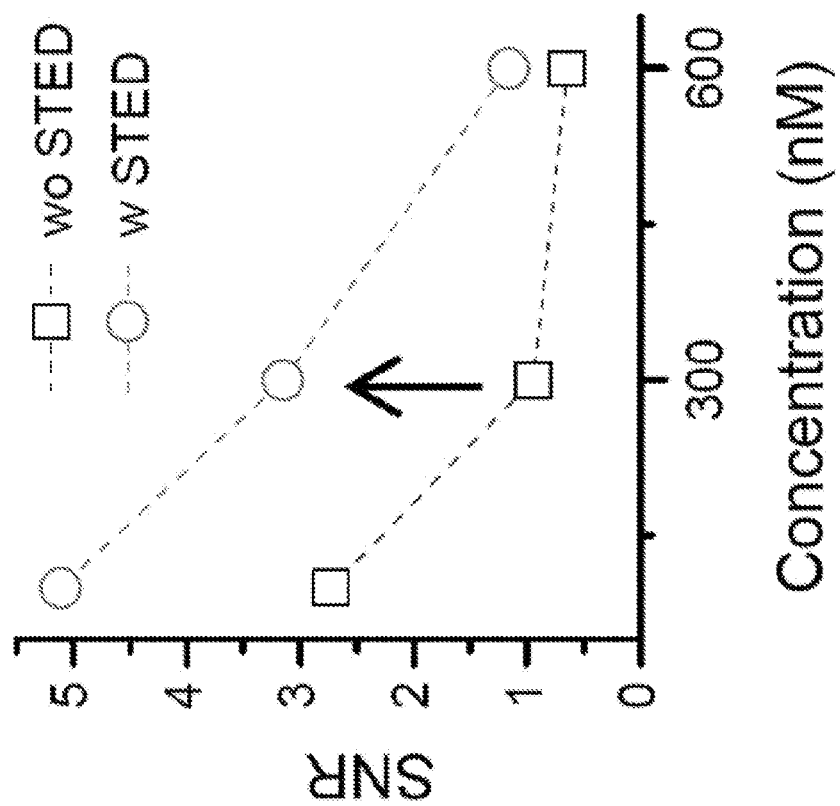

In various embodiments, 3D STED enables single-molecule detection and nanometer localization at high background concentrations. Spatially-targeted fluorescence suppression in the periphery of a focused excitation beam appeared promising for single-molecule detection in the presence of high background concentrations. In constrained 1D/2D geometries, STED nanoscopy could visualize dense molecules. The fundamental limits of single-molecule detection using 3D STED (FIGS. 3A, 10A) were explored. Conceptually, two distinct types of noise, Poisson-distributed shot-noise and super-Poisson particle number fluctuations, emerge in different experimental systems and molecular concentration/brightness regimes (STAR Methods). To understand which noise type dominates under single-molecule detection conditions, background level (mean of intensity) and noise (standard deviation of intensity) in 15 nM-1 µM solution concentrations were measured. Noise exceeds several-fold the Poisson limit (FIGS. 3B, 3C), while the Fano factor (variance/mean) increases proportionally with excitation power (i.e. molecular brightness s), independent of concentration (FIGS. 10B, 10C). Hence, super-Poisson number fluctuations hinder single-molecule detection at up to 1 µM solution concentrations in certain implementations. Theoretical considerations indicate that STED should be particularly effective in suppressing noise from super-Poisson number fluctuations (STAR Methods). Experimentally, STED proportionally reduces background level and noise (FIG. 3B, 3C), confirming that number fluctuations are the dominant source of noise under our conditions, and demonstrating effective background noise suppression at high solution concentrations.

Figure 3A:
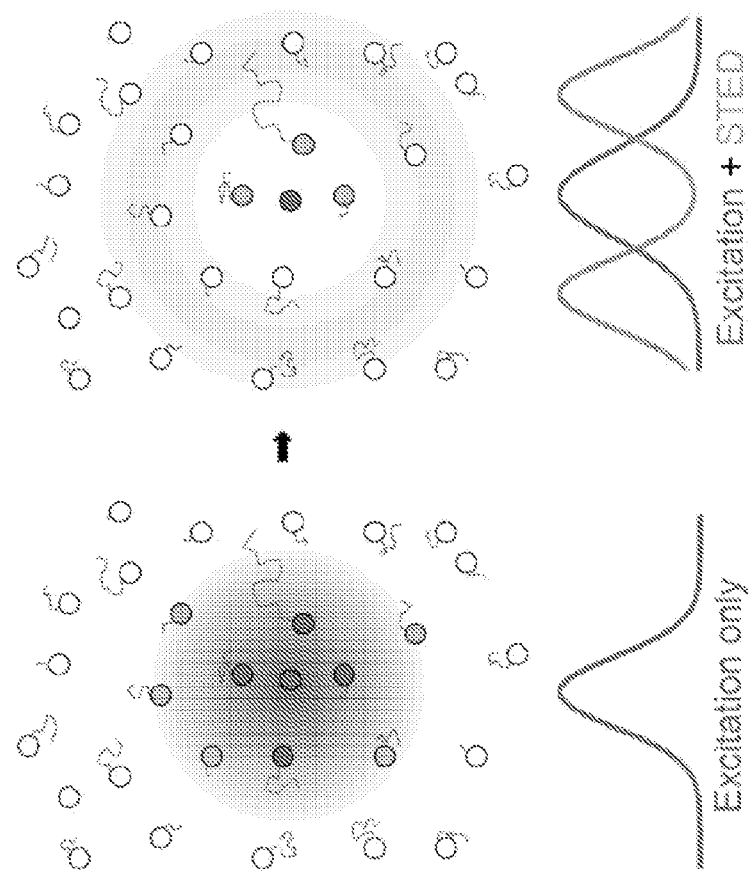
FIGS. 3A-3I illustrate an example three-dimensional stimulated emission depletion (3D STED) system that enables single-molecule detection and nanometer localization at high background concentrations, according to potential embodiments (see also FIG. 10).
Figure 3B:
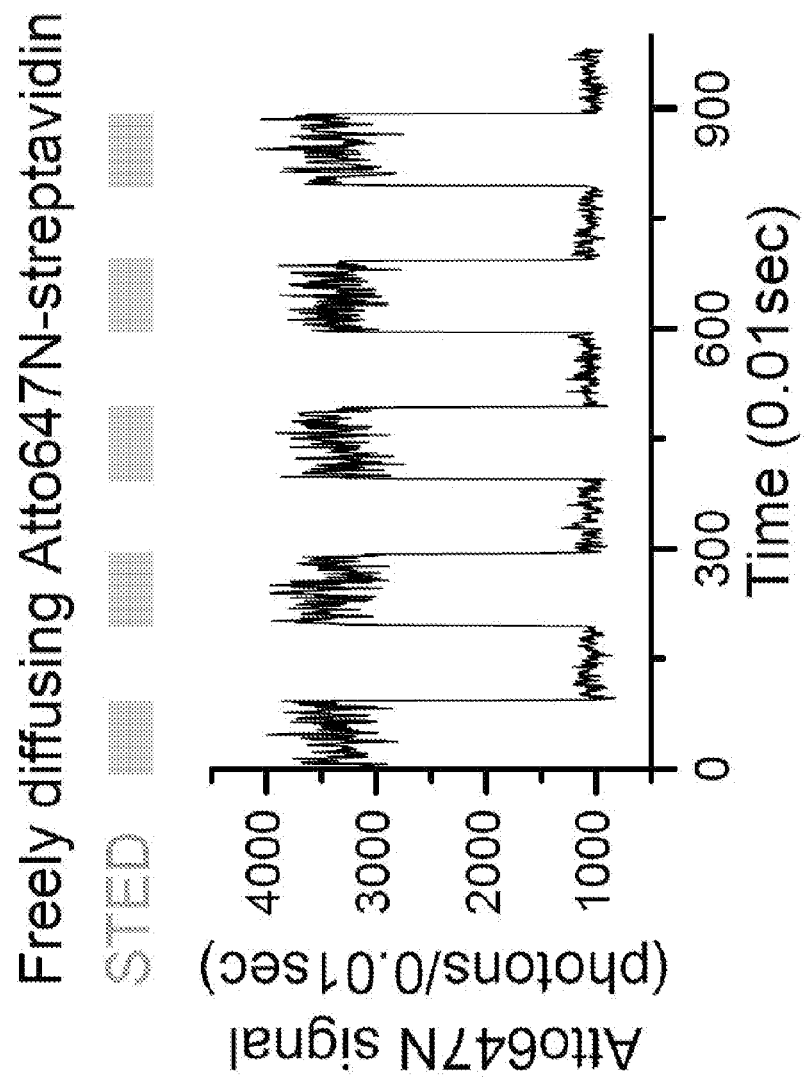
Figure 3C:
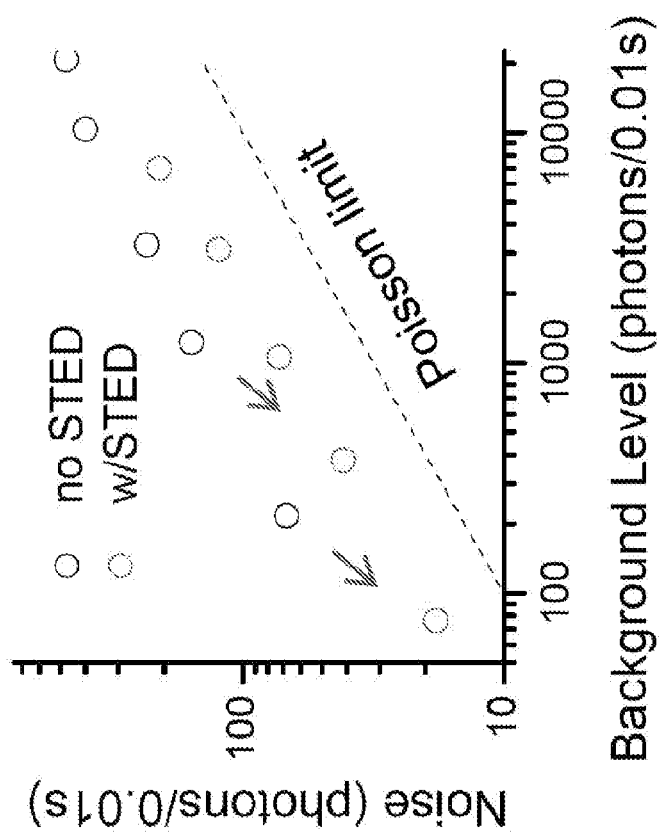
Figure 3D:
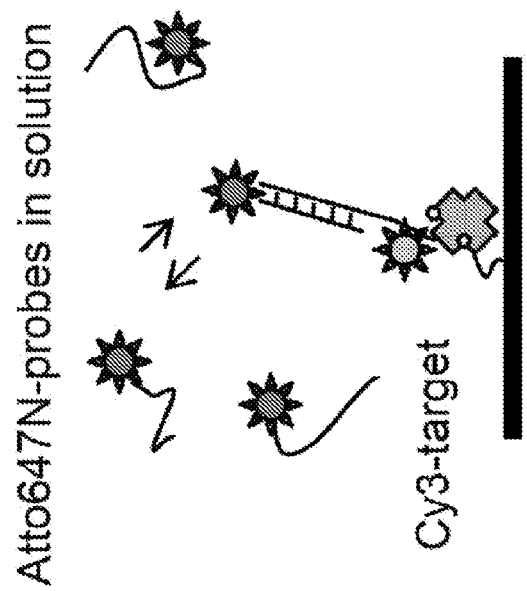
Figure 3E:
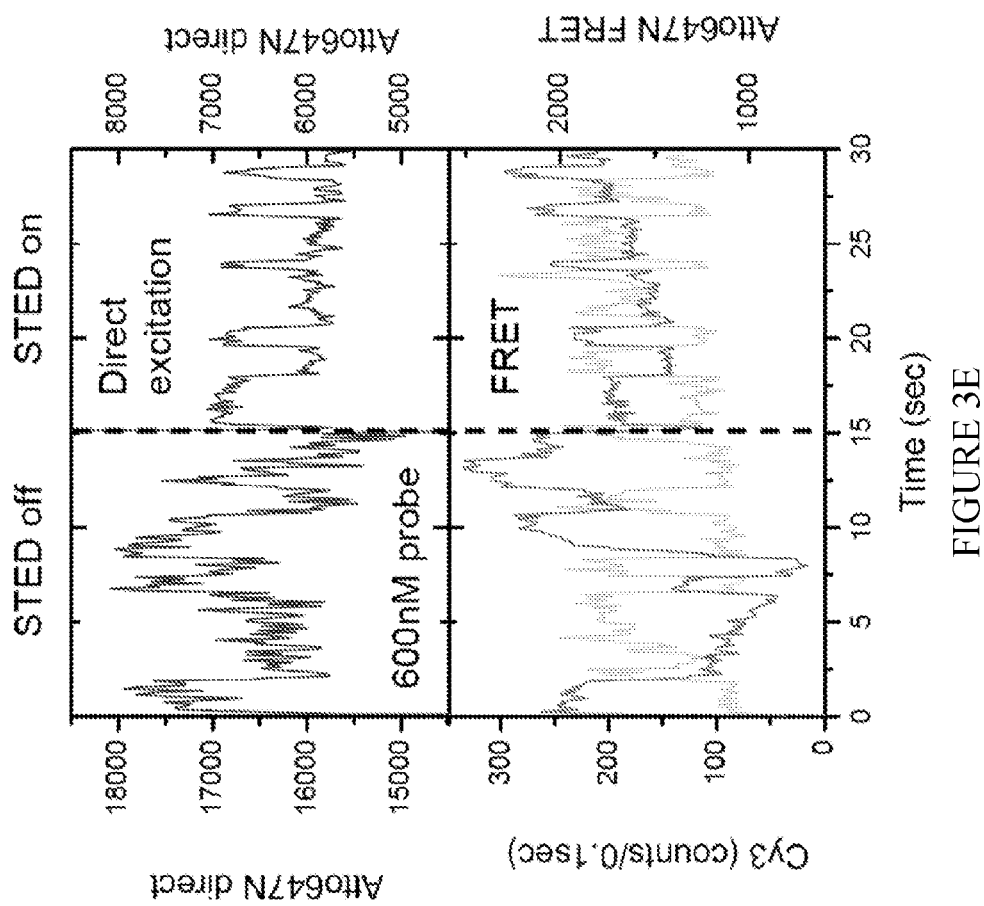
Figure 3F:
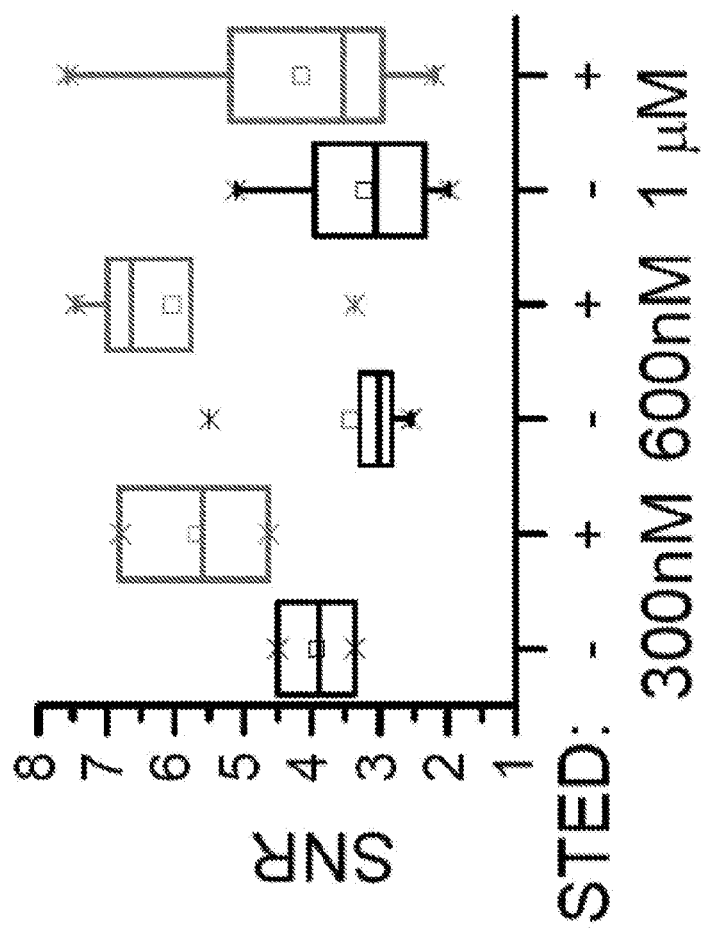

To demonstrate the ability of STED to enable single-molecule detection at high concentrations, example implementations may center surface-immobilized Cy3-labeled ssDNA targets at the STED zero and measure the real-time on-off binding of short Atto647N-labeled complementary probes at up to 1 µM in solution (FIG. 3D). Real-time traces of directly excited Atto647N reveal noisy intensity fluctuations (FIG. 3E), while STED markedly improves SNR (FIGS. 3E, 3F) and enables unambiguous identification of binding events. In various implementations, target-locking STED achieves single-molecule detection at 0.6-1 µM solution concentrations.

Figure 3G:
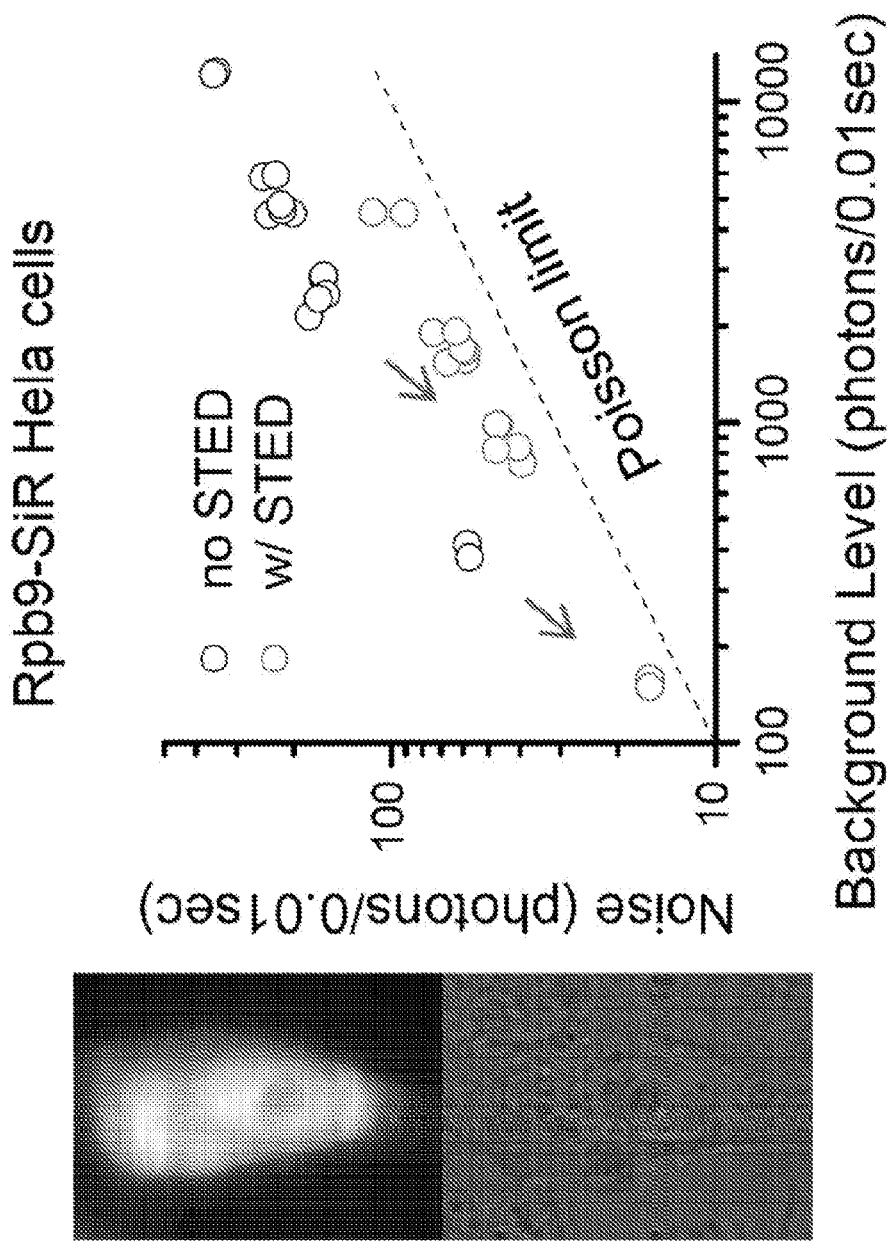

Next, example implementations may test the noise suppression efficiency of STED in live HeLa cells that stably express a SNAP-tag fusion of the Rpb9 Pol II sub-unit, labeled with SNAP-silicon-rhodamine (SiR). Background level and noise measurements over a range of SiR-Rpb9 levels reveal super-Poisson characteristics, reminiscent of number fluctuations of freely diffusing molecules in solution (FIG. 3G). Notably, STED reduces background level and noise proportionally, showing efficient background suppression for single-molecule detection in cells.

If the 3D coordinates where molecules reside are not pre-defined, additional spatial information may be obtained by imaging the sample point-by-point, in various embodiments. As the beams are raster-scanned over the sample, the molecules do not always reside in the peak of highest intensity, thus some signal is traded for spatial information—the optimum SNR is obtained when the detected molecules are exactly at the center of zero STED intensity (STAR Methods). Nonetheless, STED still reduces background and improves SNR (FIGS. 3H and 10E-10H): individual molecules obscure in confocal-only images become visible in confocal+STED images, at up to 0.3-0.6 µM background in solution.

Figure 3H:
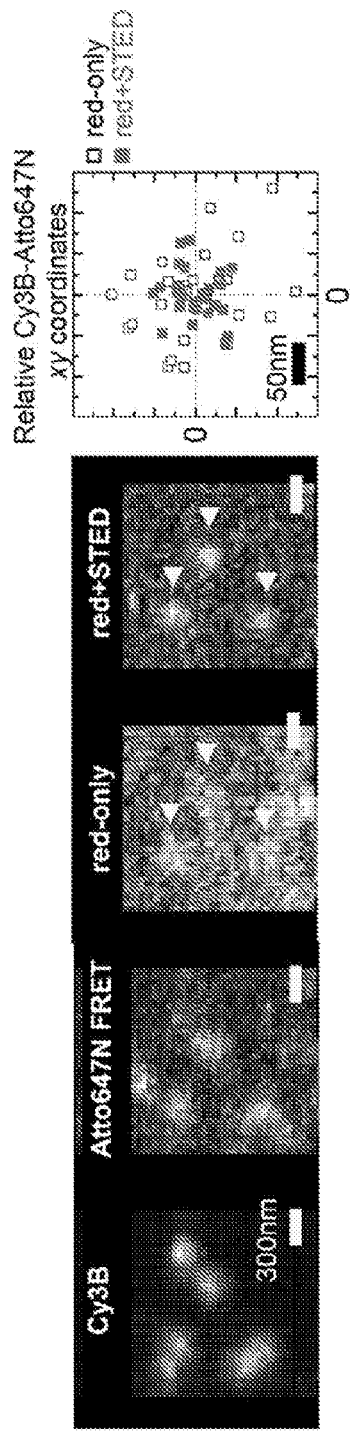
Figure 3I:
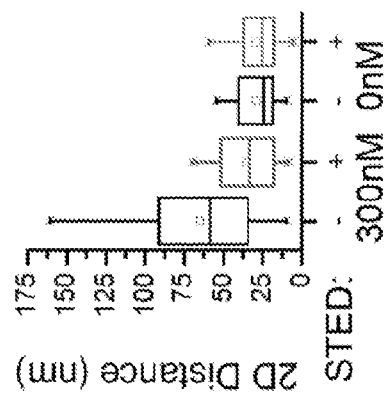

Beyond merely detecting the presence of a molecule in the images, molecular position information at length-scale much shorter than the spatial resolution can also be extracted. Sub-nanometer localization is achievable at low background, but at high background performance dramatically deteriorates due to super-Poisson number fluctuations (STAR Methods). Efficient noise suppression by STED recovers the lost precision, enabling nanometer measurements at elevated background concentrations (FIGS. 3H, 3I). Notably, both increased detection SNR and improved localization precision rely on suppressing noise from number fluctuations, a previously uncharacterized property of STED, distinct from the well-known $1/\sqrt{1+\zeta}$ ($\zeta$: depletion saturation) reduction in effective PSF size that enabled sub-diffraction spatial imaging. Since both noise and localization precision degrade as $\sim\sqrt{\text{concentration}}$, background suppression by STED results in quadratic increase ($\sim(1+\zeta)^2$, $\zeta$ depletion saturation) in the maximum working concentration for single-molecule detection. A modest $1+\zeta=3$-$4$ depletion (vs. $1+\zeta>10$ used for super-resolution imaging) provides an order-of-magnitude increase in concentration range for single-molecule detection and localization experiments.

Figure 4A:
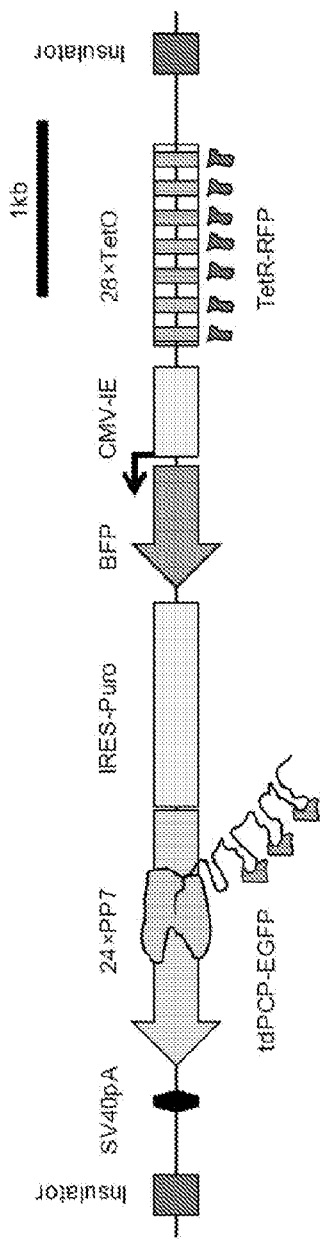
FIGS. 4A-4L illustrates Pol II accumulates at transcription sites and target-locked 3D STED enables Pol II quantification with single-molecule resolution (see also FIGS. 11 and 12).
Figure 4B:
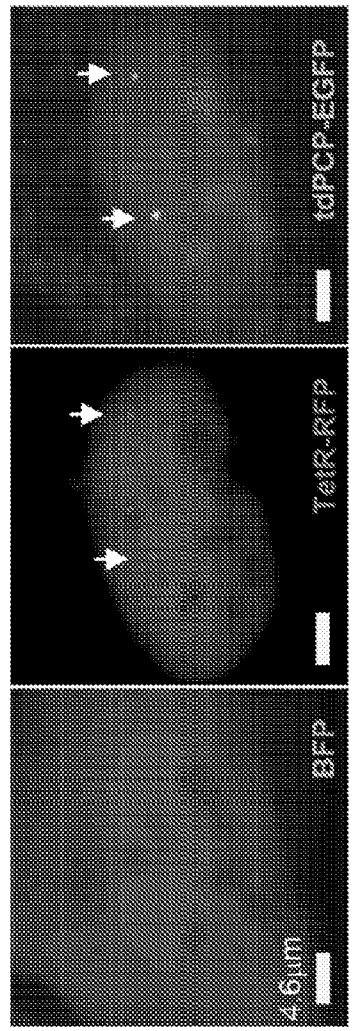

It can be observed that Pol II accumulates at sites of active nascent transcription. Example implementations may first image Pol II dynamics relative to transcription from a single promoter in a synthetic "mini-gene" system, stably integrated as single copies in U-2 OS cells (FIGS. 4A, 11A-11C). Example implementations may track nascent RNA production via phage PP7-derived stem-loops (24×PP7) and a tandem-dimer phage coat protein EGFP fusion (tdPCP-EGFP). Use of the highly active Cytomegalovirus immediate-early (CMV-IE) promoter and enhancer results in bright tdPCP-EGFP nuclear foci, reflecting transcription sites that contain multiple nascent RNAs, that also co-localize with Tetracycline-repressor-RFP (TetR-RFP) bound at an upstream tetracycline operator array (28×TetO) (FIG. 4B).

Figure 4C:
Figure 4D:
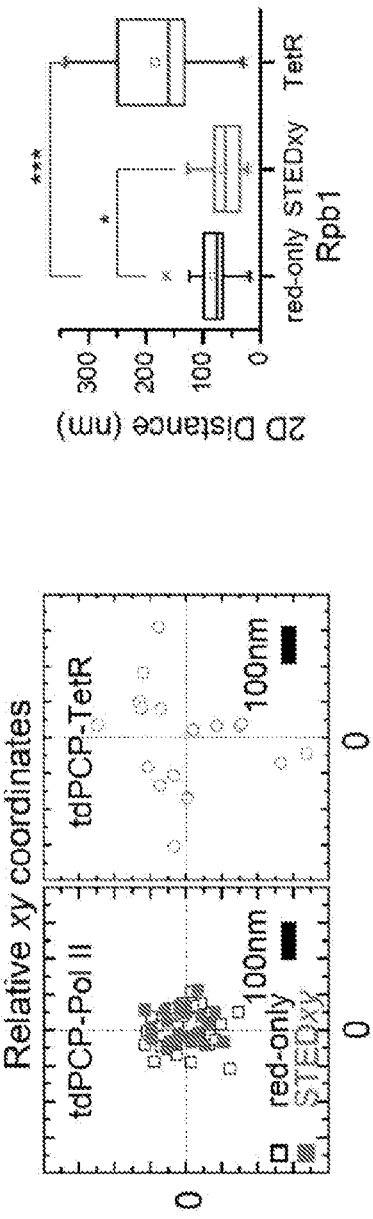

To visualize Pol II, example implementations may express a SNAP-tagged Rpb1 Pol II subunit (SNAP-Rpb1). Fast-scanning imaging, in a small region-of-interest (ROI) around the transcription site, reveals SiR-Rpb1 foci that co-localize with tdPCP-EGFP (FIGS. 4C, 4D). Rpb1-tdPCP colocalization is higher for STED vs. confocal-only, indicating higher localization precision due to background suppression by STED (STAR Methods). tdPCP-TetR do not strictly overlap, indicating resolvable nanometer separation between 3' and upstream regions. Importantly, the brightness and gradual SiR-Rpb1 photobleaching within these foci (see below) indicates multiple Pol II molecules accumulating at the mini-gene. Previously, it was unclear to what extent transcription is carried out by individual, solitary Pol II molecules, or whether it involves multiple Pol II molecules. When Pol II clustering occurs, as typically little information on genomic position and promoter activity is simultaneously available, it has been hard to establish whether and how this phenomenon relates to transcription. Our observations reveal that focal Pol II accumulation and transcription activity from a specific promoter at a specific genomic locus are spatially and temporally linked.

Figure 4E:
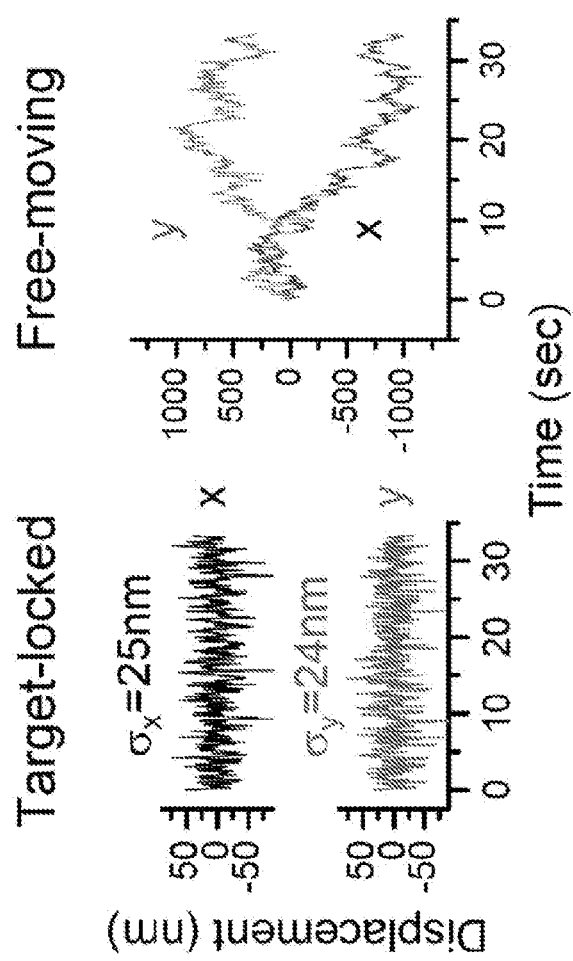
Figure 4F:
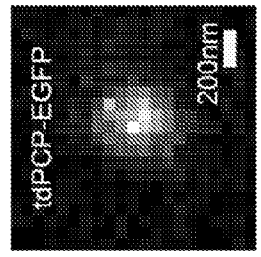
Figures 11A, 11B:
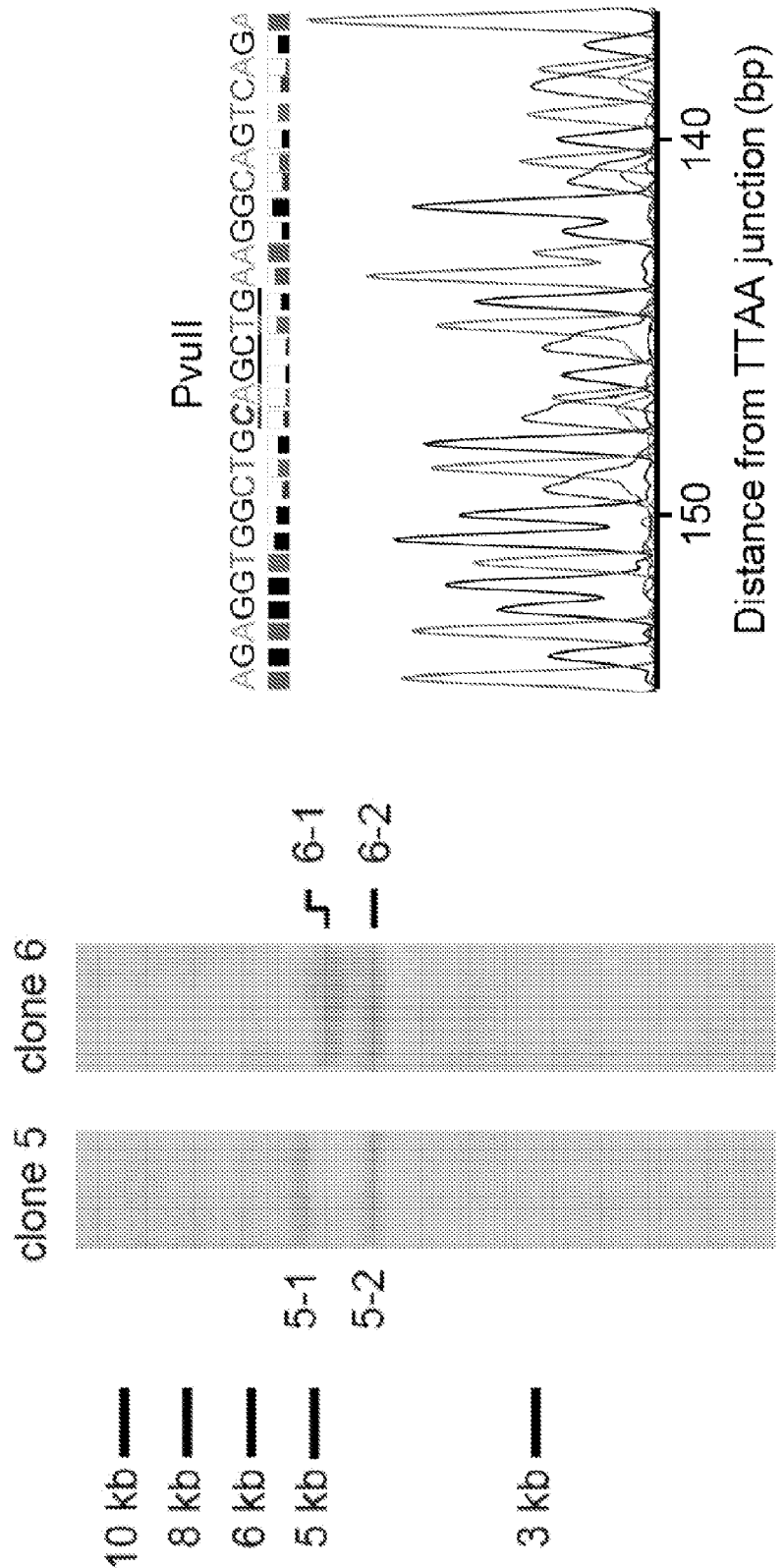
FIGS. 11A-11L depicts characterization of mini-gene integrations, illustration of scanning imaging limitations, axial localization performance and estimation of Pol II immobile background (related to FIG. 4).
Figure 11C:
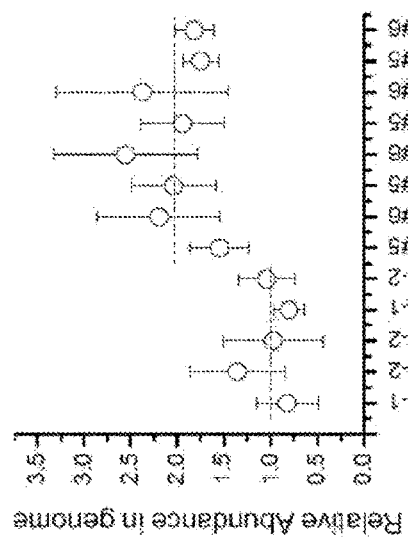
Figure 11D:
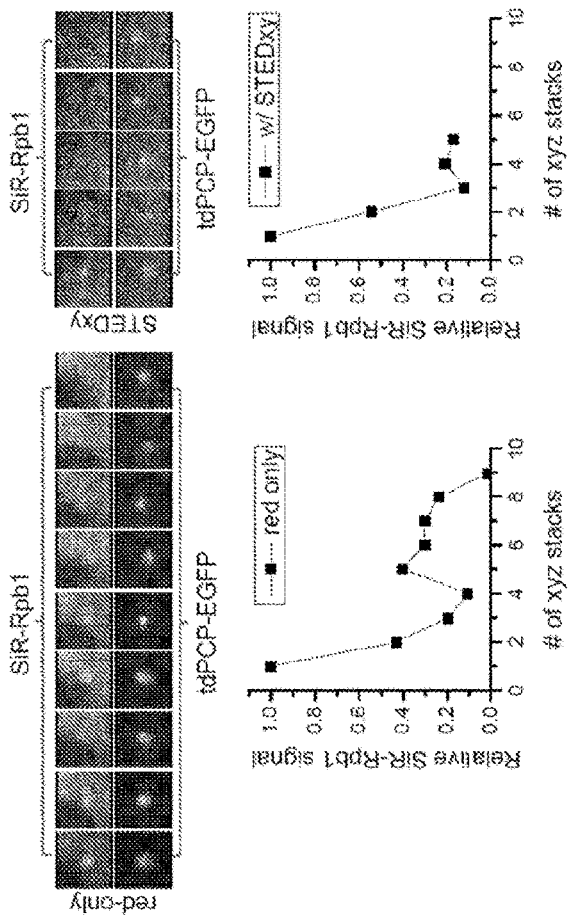
Figure 11E:
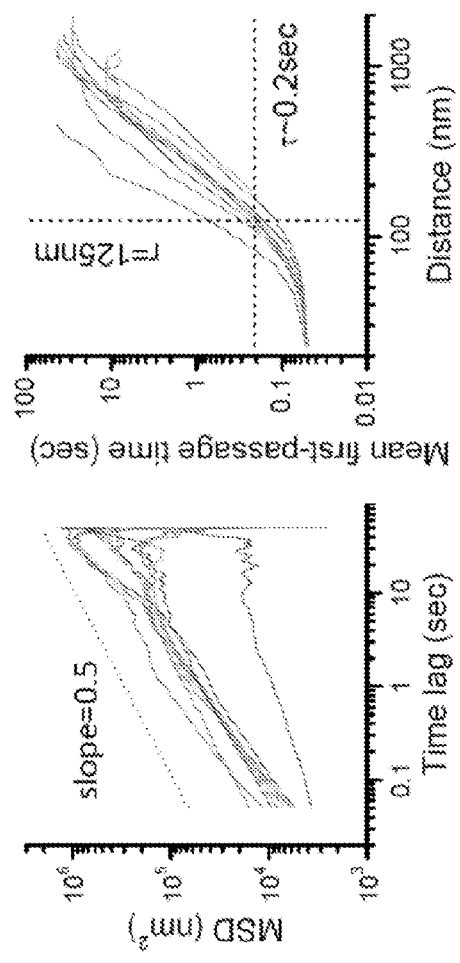
Figure 11F:
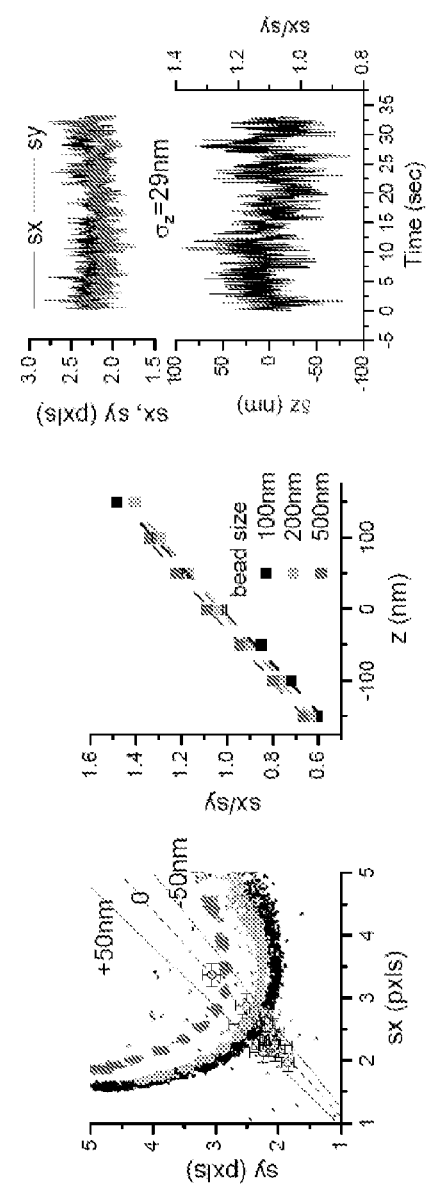

Regarding target-locking probes nanometer Pol II organization at the transcription site, motion blur and bleaching during scanning distorts the 3D images, limits the observation times and makes quantifying and tracking Pol II at the transcription site, with single-molecule sensitivity and higher spatio-temporal resolution, extremely difficult (FIGS. 11D, 11E). To eliminate scanning, example implementations may develop a target-locking system that obtains single-shot spatial information (FIG. 10A) and actively stabilizes the transcription site at the (common) excitation maximum/STED zero. With feedback loop speeds up to 30 fps, tdPCP-EGFP is locked within ~30 nm root-mean-square (r.m.s.) from the desired set-point (FIGS. 4E, 4F, 11F). Target-locking at the excitation maximum provides the same total photon counts as scanning, but at orders-of-magnitude lower power, improving photostability. Importantly, example implementations of target-locking STED reduces background more efficiently than scanning (STAR Methods) and is useful for single-molecule detection with optimum SNR at a mobile locus, such as the transcription site.

Figures 12A, 12B:
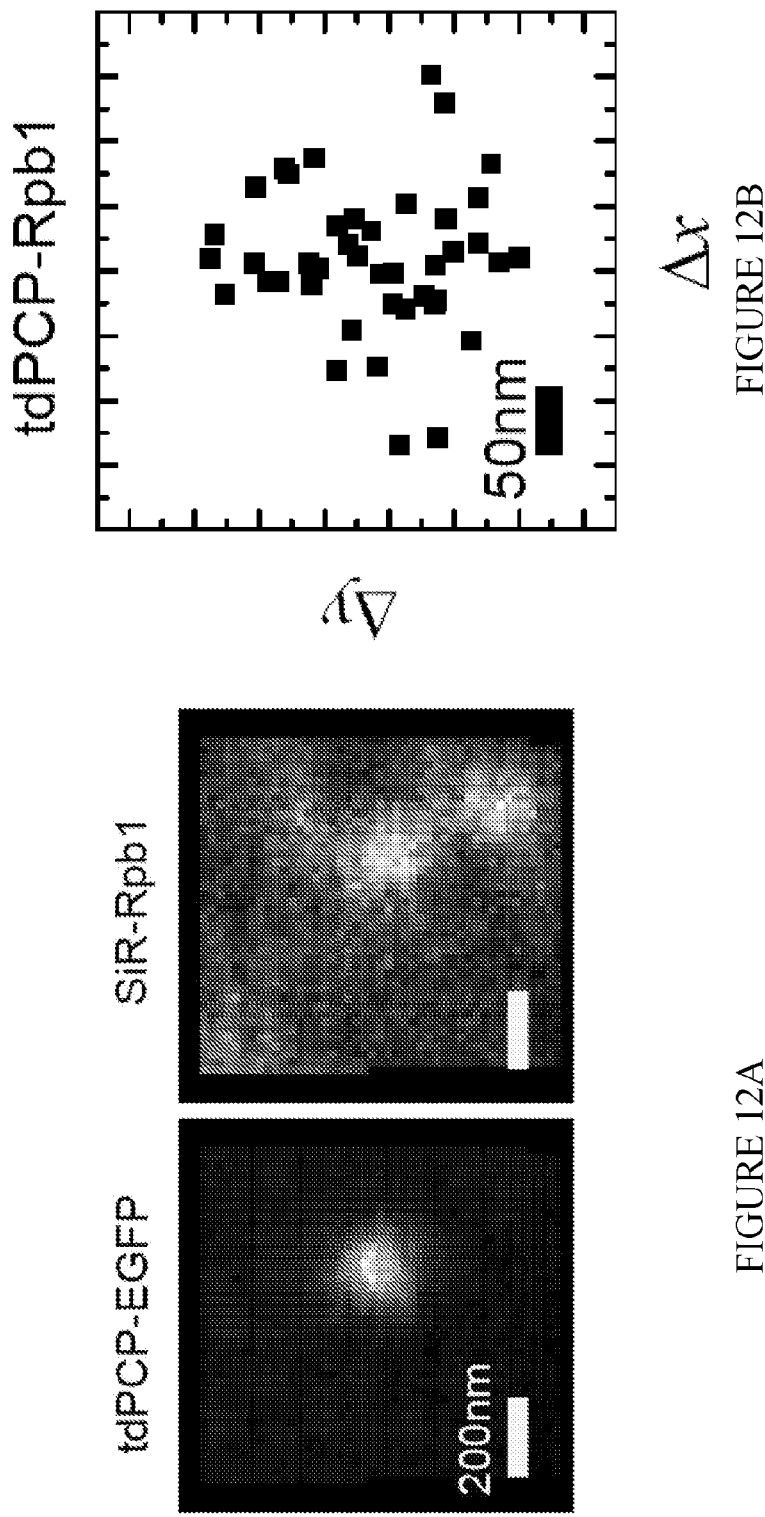
FIGS. 12A-12Q correspond with organization of transcription sites and SNR for single-molecule Pol II counting (related to FIG. 4).
FIG. 12B corresponds with relative xy coordinates of tdPCP-EGFP and SiR-Rpb1 from n=42 images, indicating 50-60 nm r.m.s. co-localization.
Figure 12F:
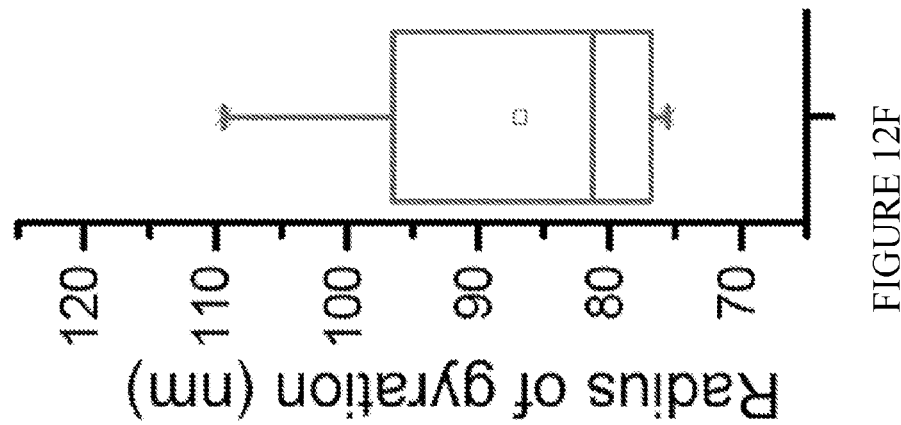
FIG. 12F corresponds with radii of gyration from n=9 transcription sites, indicating an average 85±13 nm (mean±SD).
Figure 12E:
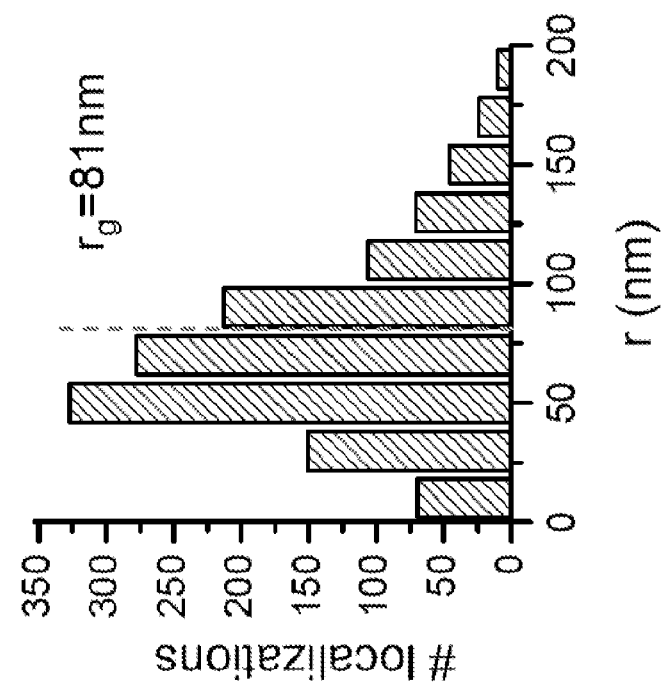
FIG. 12E corresponds with radial distribution of the Alexa 647 localizations in (12D), indicating an 81 nm radius-of-gyration.
Figure 12H:
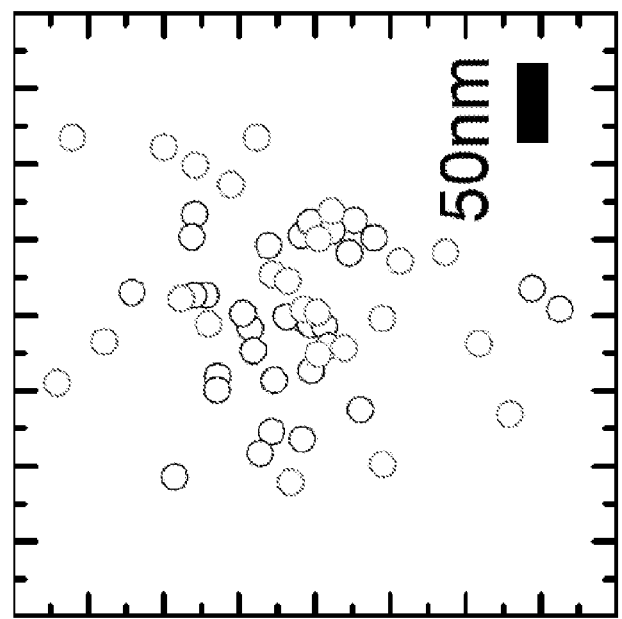
FIG. 12H corresponds with relative xy coordinates of tdPCP-EGFP and SiR-Rpb1 from n=31 (black symbols) and n=24 (red symbols) images scanned with excitation only and with excitation plus STEDxy beams respectively.
Figure 12G:
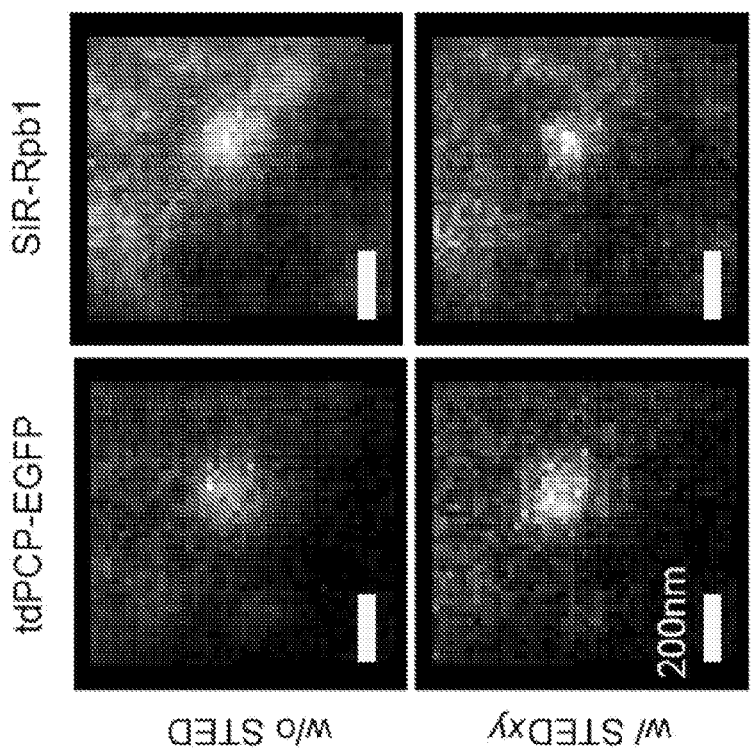
FIG. 12G corresponds with fixed-cell images (2 μm×2 μm scans) of transcription sites, obtained with excitation only (top) and excitation plus 430 mW STEDxy beams (bottom).
Figure 12J:
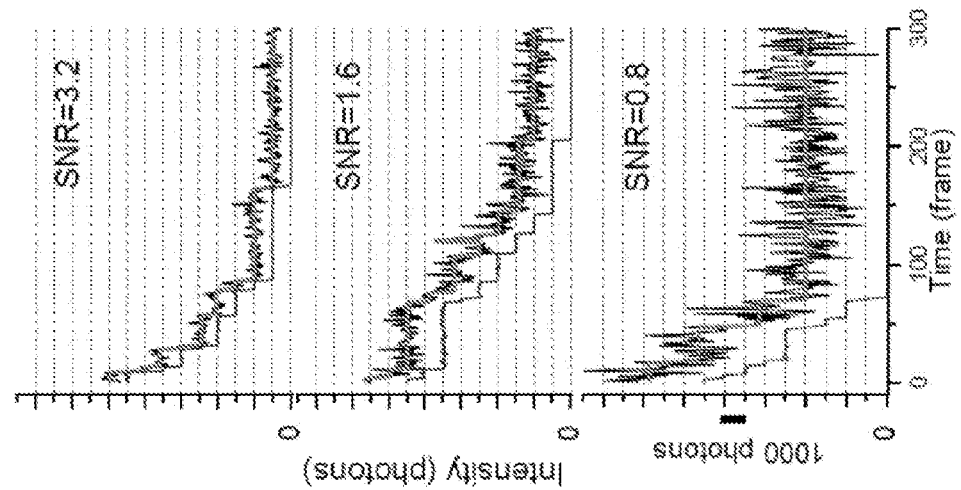
FIG. 12C corresponds with relative SiR-Rpb1 (top) signal and (bottom) background, detected when locked at the transcription site vs. r.m.s. width $s=\sqrt{s_x^2+s_y^2}$ of the STED PSF. A progressively stronger STEDxy beam was used (0~400 mW at 780 nm). Data from two experiments using clone 5 cells (open symbols) and one experiment using clone 6 cells (solid symbols) are shown. For each STED power, n>10 transcription sites were measured. Error bars: s.e.m. In order to isolate the effect of geometric confinement (narrower PSF) from the signal loss due to (i) non-ideal STED zero (~20% at highest STED power) and (ii) movement away from the center, the data in the top graph were corrected based on (i) measurements of the signal loss of single Atto647N-labeled dsDNA molecules placed at the center of the STEDxy doughnut, (ii) a (first-order) correction factor of $\exp(\partial x^2/s_{PSF}^2)$, where $\delta x=32$ nm is the residual r.m.s. displacement of the SiR-Rpb1 cluster from the STED zero setpoint (B). Note that this correction neglects the finite size of the SiR-Rpb1 cluster and assumes a Gaussian profile for the PSF. Solid lines are fits to functional dependencies of the forms $s^2/(s^2+s_{trxn\ site}^2)$ (top) and $s^2$ (bottom) respectively. The estimated r.m.s. size for the transcription site is $s_{trxn\ site}=85\pm11$ nm.
FIG. 12D corresponds with super-resolution image of tdPCP-EGFP tagged with an Alexa 647-labeled GFP-nanobody.
FIG. 12I corresponds with sizes of SiR-Rpb1 spots in fixed-cell images with excitation only and excitation plus STEDxy. SiR-Rpb1 images were fitted to 2D Gaussian peak functions with sigmas $s_x$, $s_y$, and r.m.s. size s was estimated as $s=\sqrt{s_x^2+s_y^2}$. Median values are 168 nm and 98 nm for excitation and excitation+STEDxy respectively, indicating an r.m.s size $s_{trxn\ site}$~40-50 nm, estimated as $s_{trxn\ site}^2=s^2-s_{PSF}^2$ (J, K) Step detection performance in simulated traces. Simulation parameters: n=10 signal molecules initially present, $N_{ph}=1,000$ photons/frame average molecular brightness. Individual molecules bleach at random times with an exponential time constant $\tau_{bleach}=50$ frames. Blue traces contain only Poisson noise from random photon statistics. To simulate background number fluctuations, example implementations may assume that $n_B$ additional background molecules are present in the detection volume. $n_B$ is drawn from a Poisson distribution with average $n_B=10$, while each background molecule brightness is $\varepsilon\times N_{ph}$ ($\varepsilon=0.1$, 0.133, 0.2, 0.267, 0.4 for SNR=3.2, 2.4, 1.6, 1.2 and 0.8 respectively). Black traces: total photon emission from signal and background molecules. Magenta traces: steps identified using a test-statistic algorithm.
FIG. 12K corresponds with histograms of step sizes for different SNR. Red curves: fits to multi-Gaussian peaks.
FIG. 12L corresponds with fraction of bleaching steps identified that correspond to the unitary step size population for simulated traces.
FIG. 12M corresponds with experimental target-locking bleaching traces of SiR-Rpb1 at the CMV minigene. Red lines: steps identified by the test-statistic algorithm.
FIG. 12N corresponds with histograms of identified steps sizes. A sub-population of positive steps could reflect binding of new Pol II molecules or photophysics such as blinking events. Red lines: fits to a Gaussian mixture model (Chen et al., 2014b). Note that for red-only traces in 100% labeled samples there is no Gaussian peak component identified at the expected unitary step size based on the under-labeled (20-25%) SiR-Rpb1 samples.
FIG. 12O corresponds with fraction of bleaching steps identified that correspond to the unitary step size population and unitary bleaching step size, for experimental SiR-Rpb1 traces.
FIG. 12P corresponds with SNR vs. step size for reduced- and fully-labeled samples respectively. Solid lines are linear fits, showing ~2-fold improvement in SNR (comparing red vs. black line slopes for each panel) and ~4-5 increase in working concentration range (comparing black line in 20-25% to red line in 100%) when STED is used.
Figure 12I:
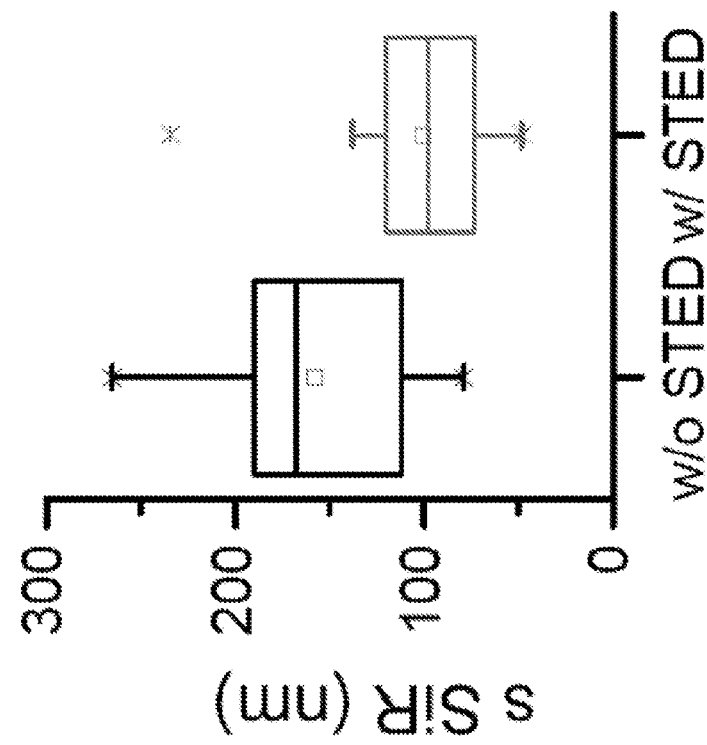
Figure 12L:
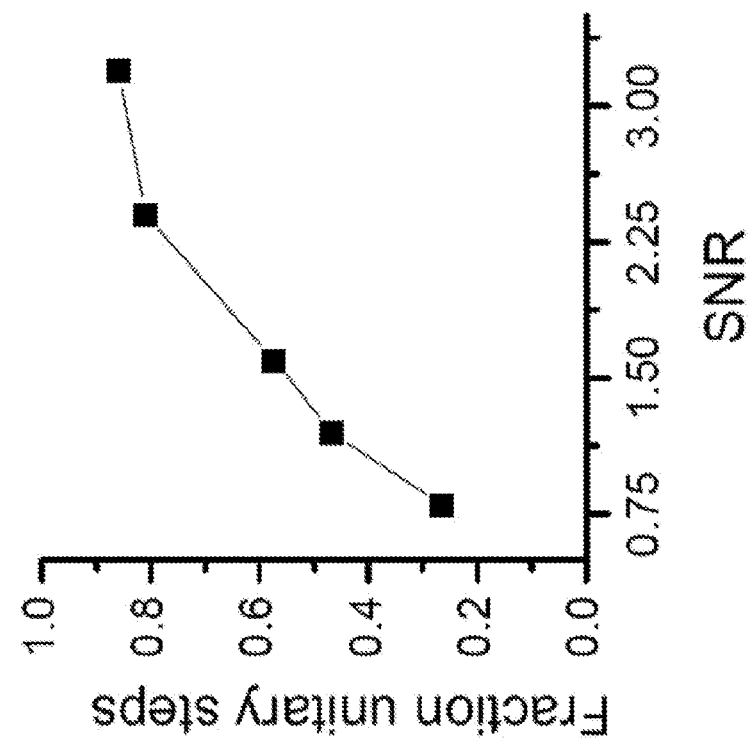
Figure 12K:
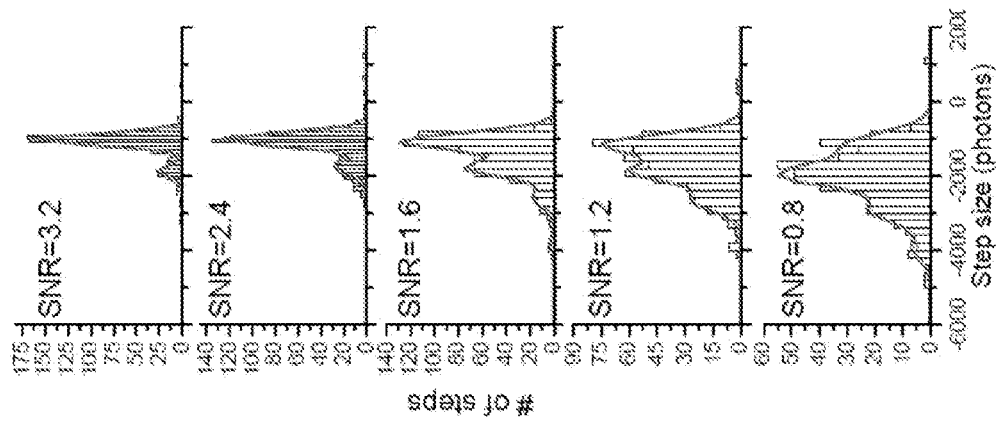

Target-locking enables further quantifying nascent RNA-Pol II co-localization and spatial Pol II distribution at the transcription site. The centroid of background-subtracted SiR-Rpb1 images—obtained immediately after the red laser turns on and before appreciable photobleaching—is within 30-33 nm r.m.s. from the tdPCP-EGFP set-point (FIGS. 4G, 4H), consistent with lower precision Rpb1-tdPCP colocalization from scanning data (FIGS. 4C, 4D, FIGS. 12A, 12B). By tuning (via, e.g., controller 114) STEDxy doughnut beam intensity (from, e.g., beam source 170) and monitoring depletion of Pol II molecules at progressively smaller radii from the center, while target-locking at the transcription site, example implementations may obtain 85±11 nm (mean±SD) r.m.s. SiR-Rpb1 cluster size (FIG. 12C). As signal is additionally lost due to residual movement away from the STED zero, this approach likely overestimates the real Pol II cluster size. Nonetheless, the result is consistent with an 85±13 nm (mean±SD) radius of gyration obtained by tdPCP-EGFP super-resolution imaging (FIGS. 12D-12F), and in rough agreement with ~40-50 nm r.m.s. size from SiR-Rpb1 confocal/STEDxy imaging (FIGS. 12G-12I), in fixed cells. Nascent transcripts and Pol II appear to co-occupy the same sub-diffraction volume ($R_g$~45-85 nm) around the transcription site, extending less than the $R_g \geq 100$ nm obtained for ∞10 kb active chromatin domains with super-resolution microscopy (Boettiger et al., 2016), but significantly larger than a single ~15 nm diameter Pol II molecule.

Figure 4G:
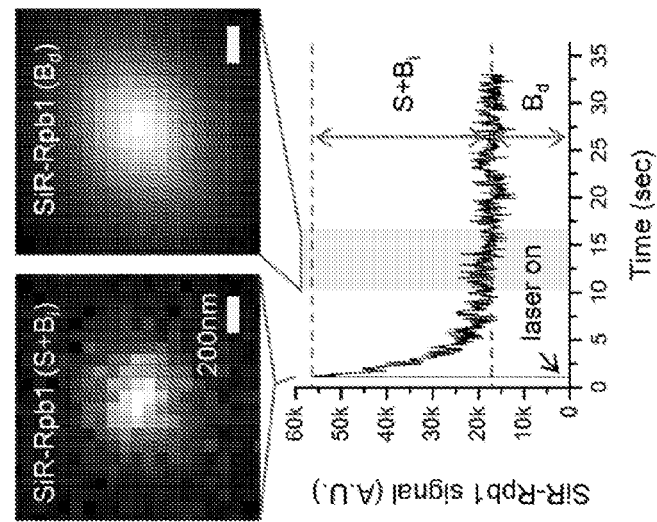
Figure 4H:
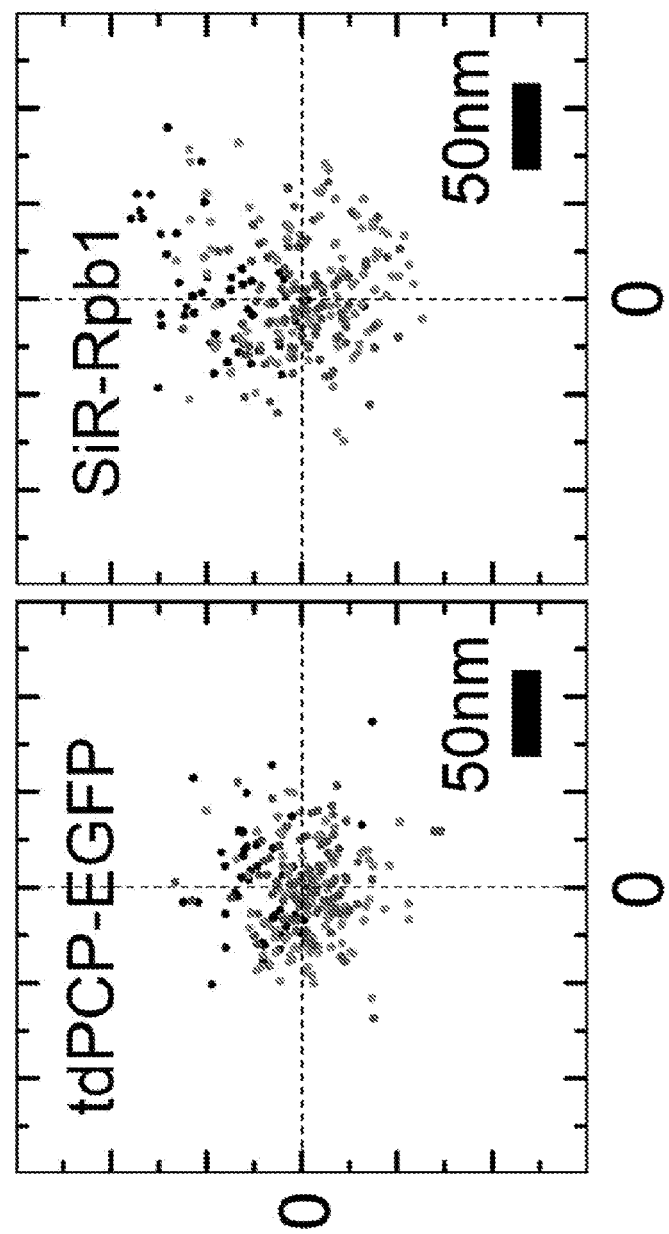
Figure 4J:
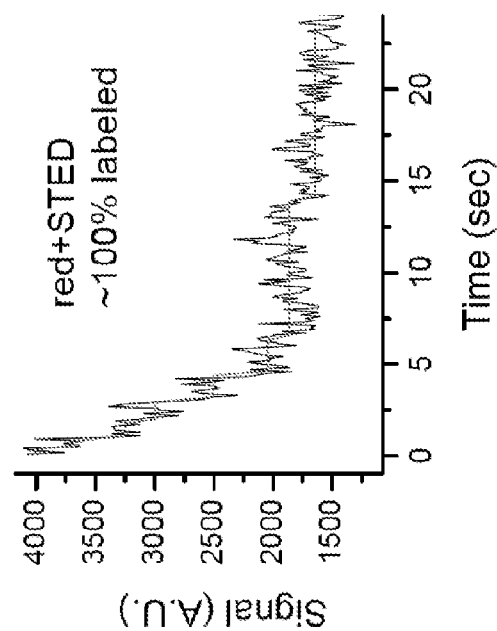
Figure 4I:
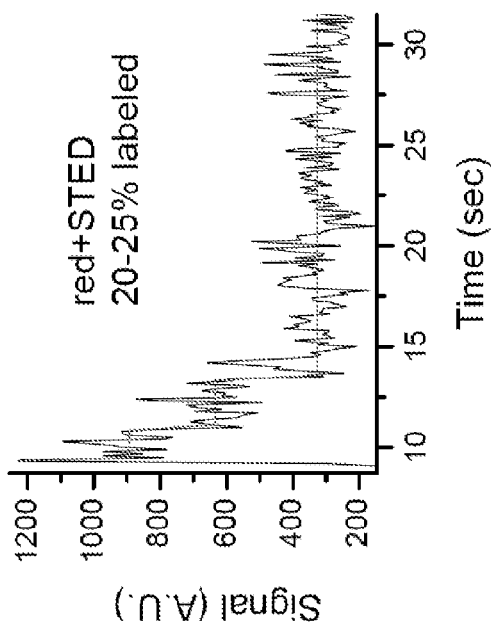
Figure 4L:
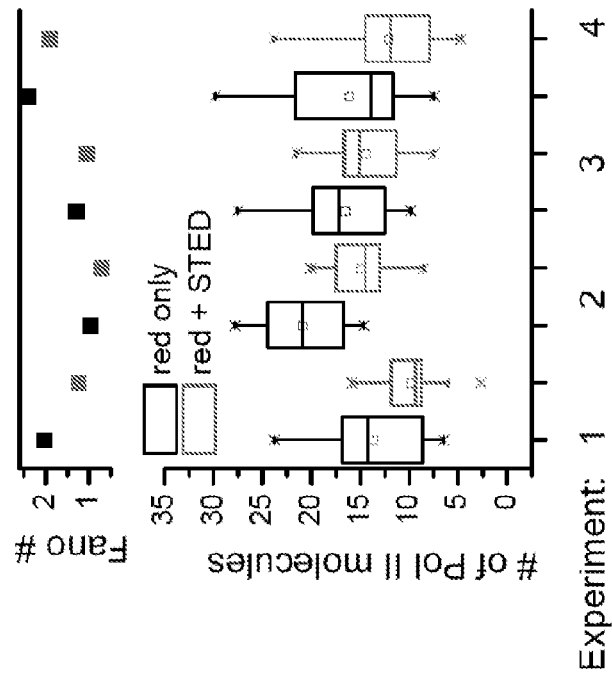
Figure 4K:
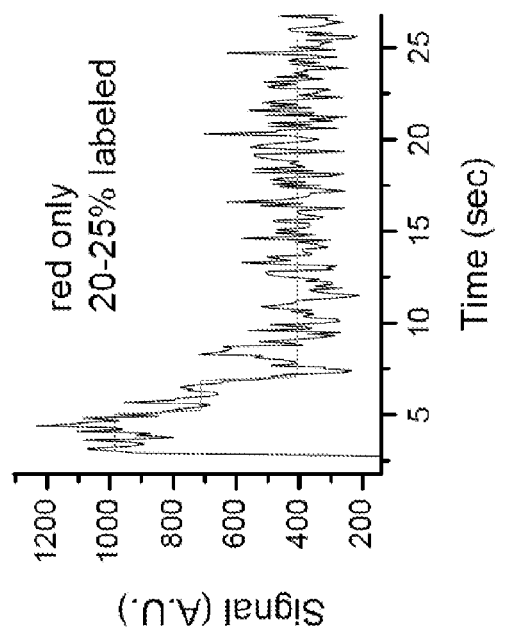
Figure 12N:
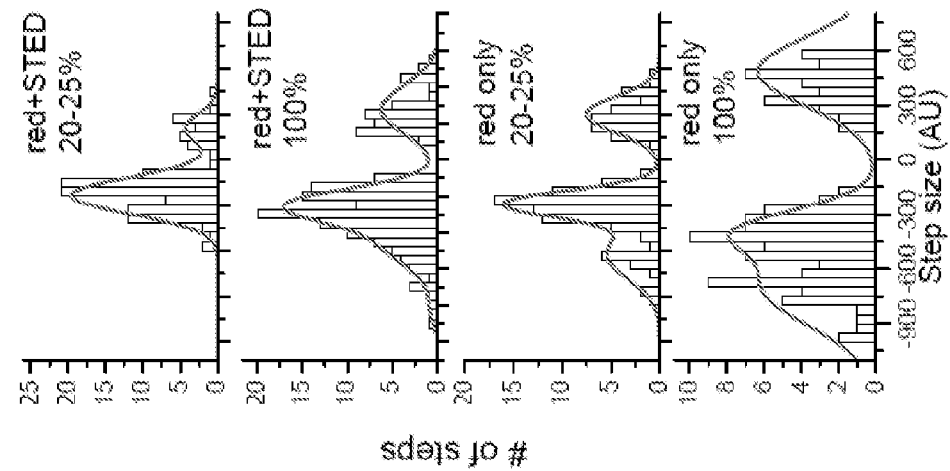
Figure 12M:
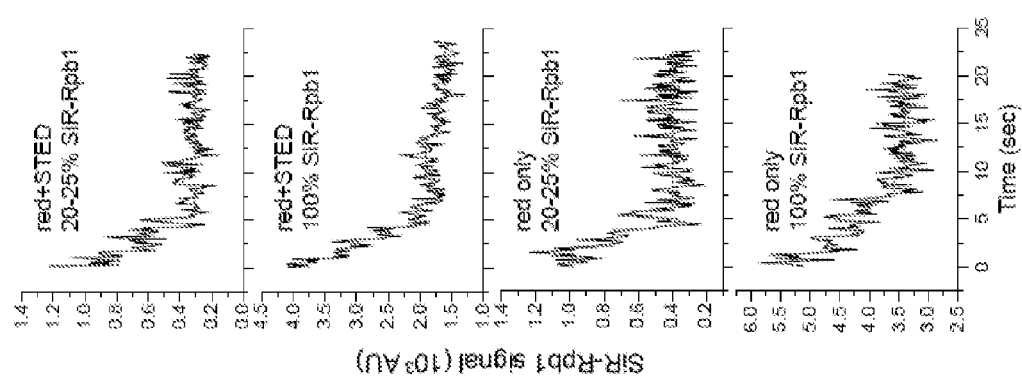

It can be observed that target-locking 3D STED enables single-molecule Pol II quantification at transcription sites. To count single Pol II molecules, example implementations may first calibrate the brightness of one SiR-Rpb1 by labeling at 20-25% of maximal SiR nuclear level. Under these under-labeled conditions, SiR traces show clear bleaching steps (SNR up to 6:1), detecting 2-4 Pol II molecules at the transcription site (FIGS. 4I, 4K). With STED, single-molecule bleaching steps are also clearly evident in traces of fully stained samples (FIG. 4J), but not in traces without STED (FIGS. 12M-12O). These results demonstrate that in certain embodiments target-locking STED is essential for detecting single SiR-Rpb1 molecules in fully-labeled nuclei. Furthermore, SNR in fully stained samples with STED is comparable to SNR in under-labeled samples without STED (FIG. 12P), highlighting how target-locking STED enables single-molecule detection at 4-5-fold elevated concentrations, in live cells.

Figure 11H:
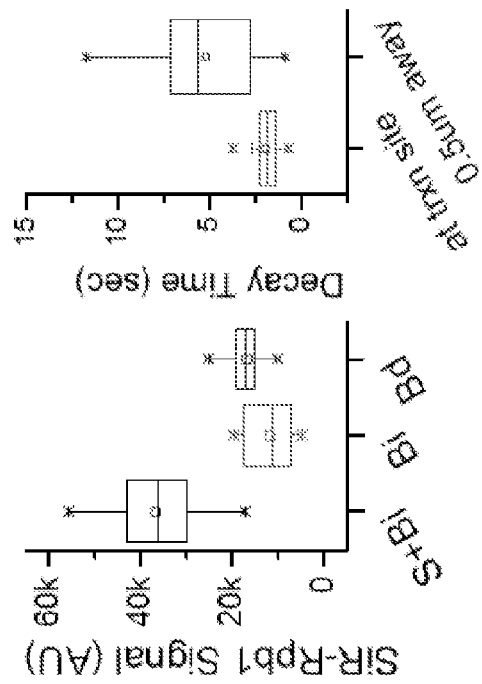
Figure 11G:
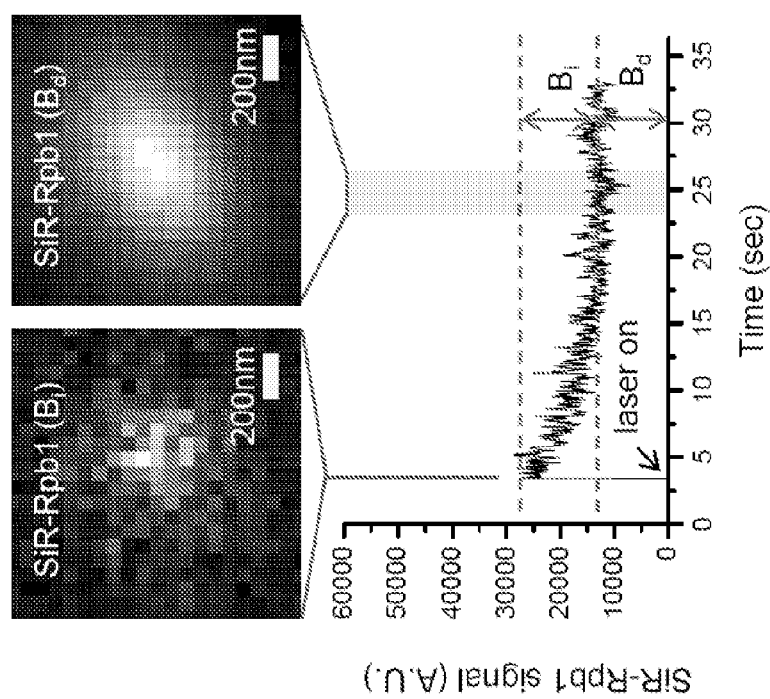
Figure 11I:
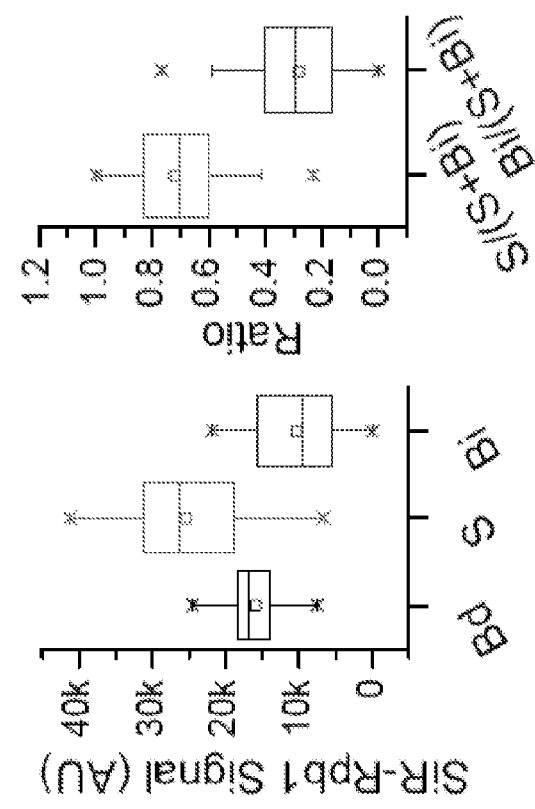
Figure 12Q:
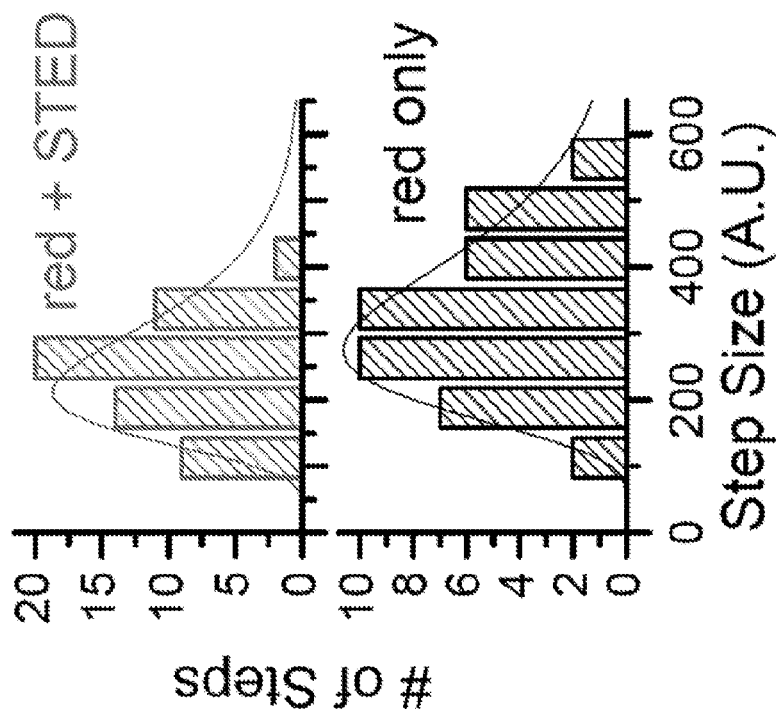
Figure 13B:
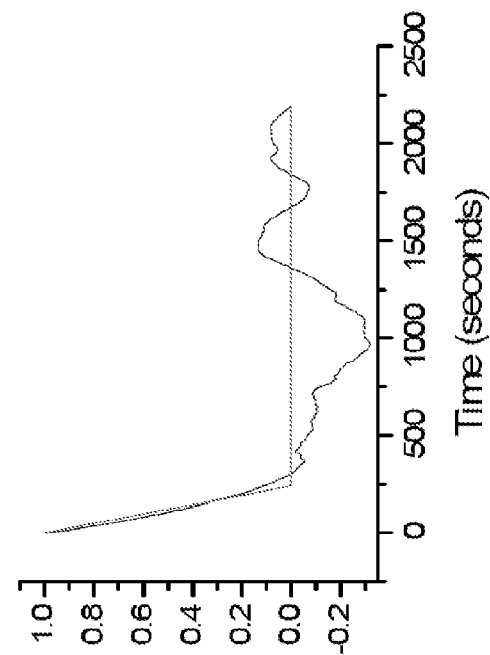
Figure 13A:
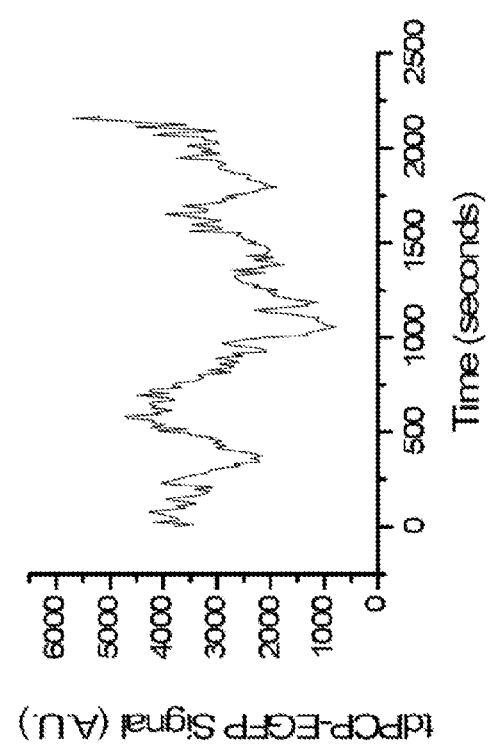

Counting absolute mRNA and protein numbers in a cell allowed testing quantitative gene expression models, but elucidating transcription mechanisms involves direct measurements at the transcription site. Using disclosed single-molecule calibration (FIG. 12Q), example implementations may obtain 17±3(13±2) detected Pol II molecules, for excitation-only (excitation+STED) (FIG. 4L; mean±S.D., n=4 independent experiments). Based on quantification of relative contributions of signal from mini-gene-engaged Pol II and immobile Pol II background (STAR Methods, FIGS. 11G-11I), at least ~12 (~9) detected molecules correspond to Pol II accumulated at the CMV mini-gene, while immobile background level is equivalent to up to 5-6 (3-4) molecules, for excitation-only (excitation+STED). The Fano factors of the Pol II distributions over the cell populations are between 1 and 2 (FIG. 4L), suggesting absence of significant transcription "bursting" and hinting that a Poisson process underlies Pol II recruitment/accumulation. Analysis of tdPCP-EGFP dynamics also supports absence of memory effects and indicates stochastic uncorrelated initiation events (FIGS. 13A-13C).

Figure 5A:
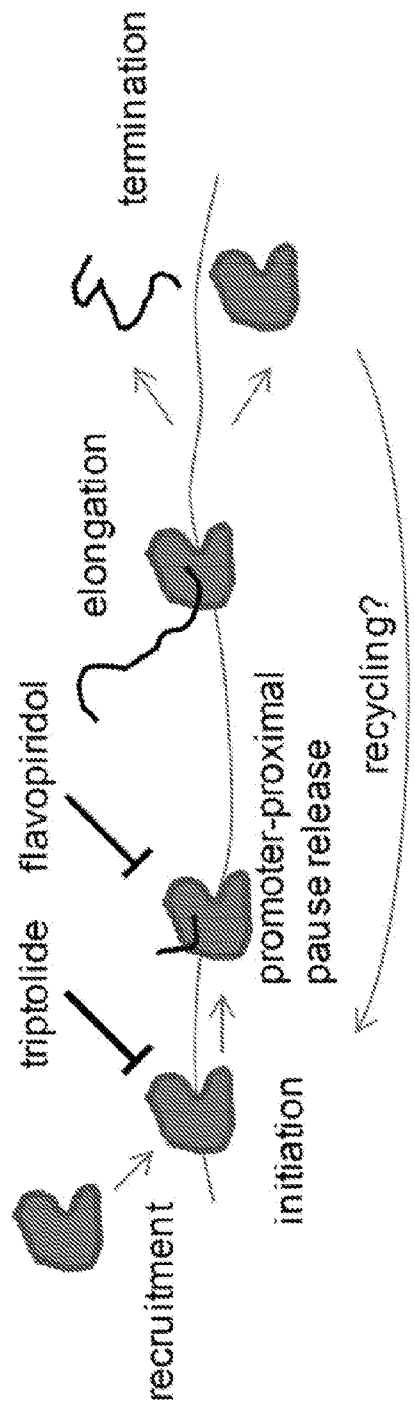
Figure 5B:
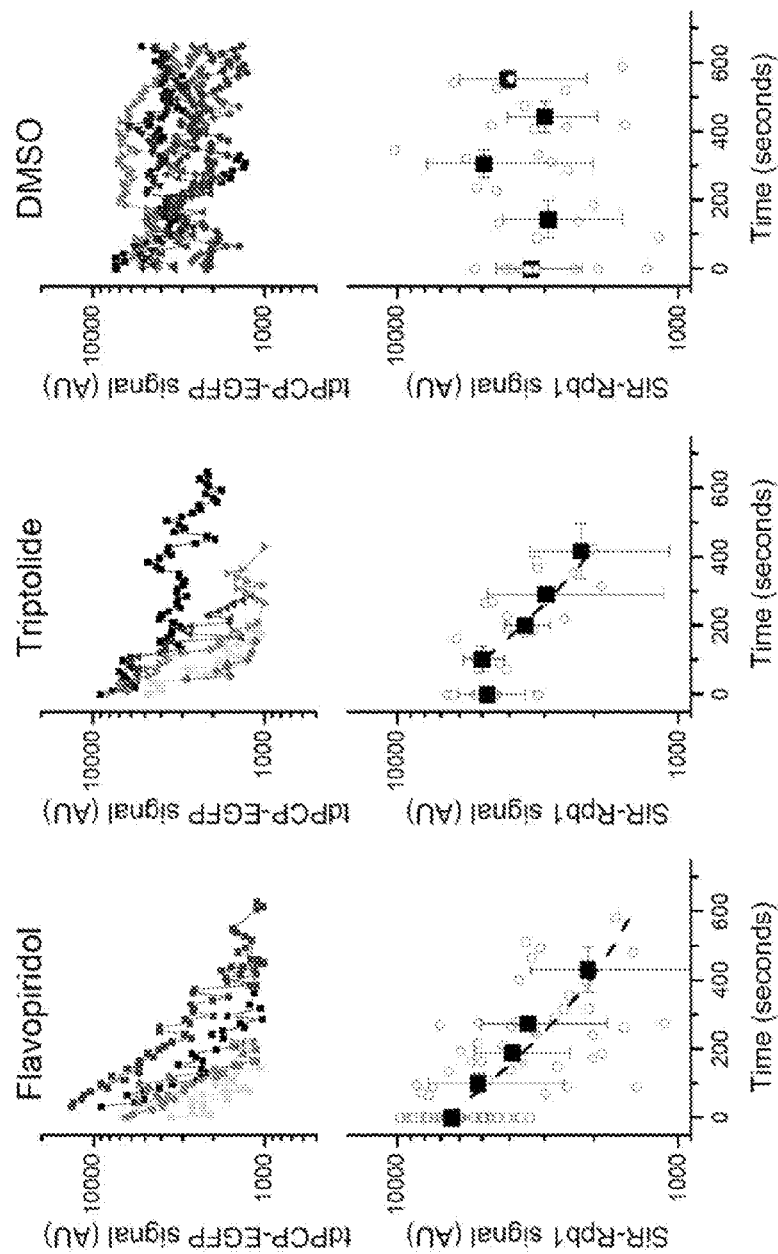
Figure 5G:
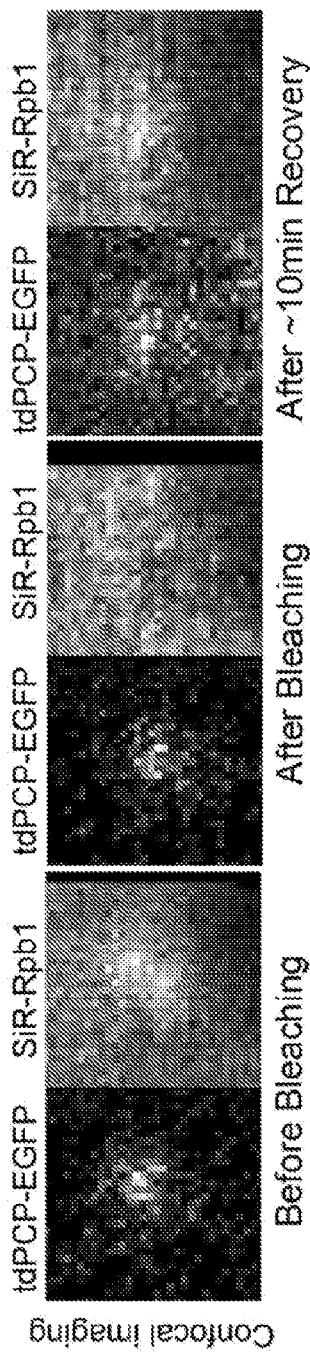

It can be observed in various embodiments that target-locking enables tracking Pol II dynamics during the transcription cycle. Accumulated Pol II on one gene has been postulated to exist as: (i) closely-spaced molecules engaged in transcription elongation; (ii) dynamic self-assemblies that potentiate transcription (pre)-initiation via molecular crowding effects; (iii) spatially-restricted compartments that prevent exchange with the nucleoplasm and facilitate multi-round transcription through local Pol II recycling. These models predict different fates for Pol II clusters upon transcription inhibition, as well as distinct Pol II residence times at the transcription site under steady-state conditions. Example implementations used fast-acting small-molecule inhibitors to block the transcription cycle at two stages: (i) initiation, using triptolide; (ii) promoter-proximal pause-release/transition to elongation, using flavopiridol (FIG. 5A). Upon adding either inhibitor, but not for DMSO control, tdPCP-EGFP gradually disappears from transcription sites (FIGS. 3B-3E; decay times 130-180 sec). This result is consistent with completion of elongation and release of nascent transcripts by Pol IIs already engaged and indicates complete inhibition of new productive initiation events.

Figure 13E:
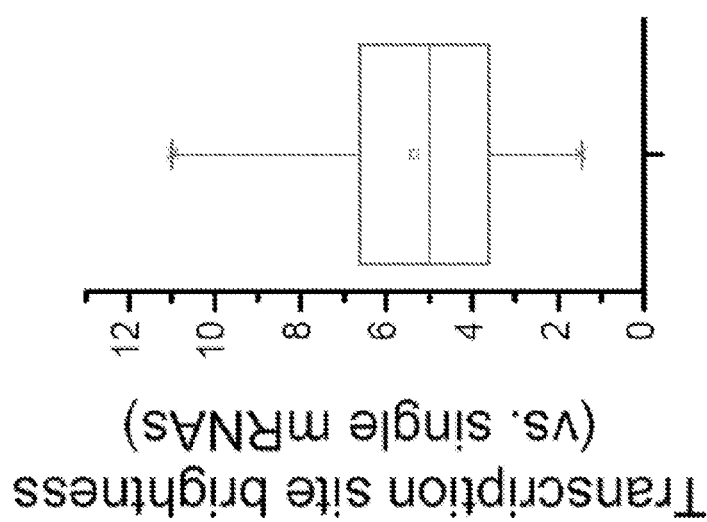
Figure 13F:
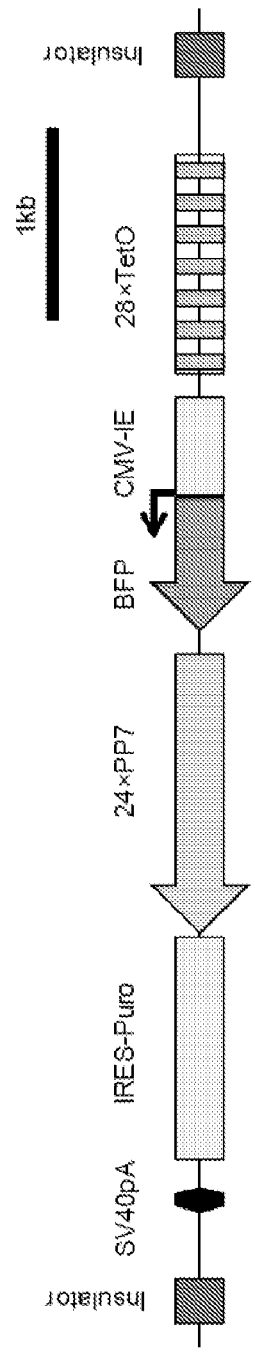
Figure 13G:
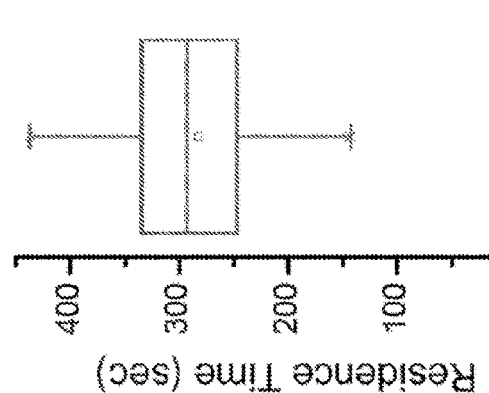
Figure 13H:
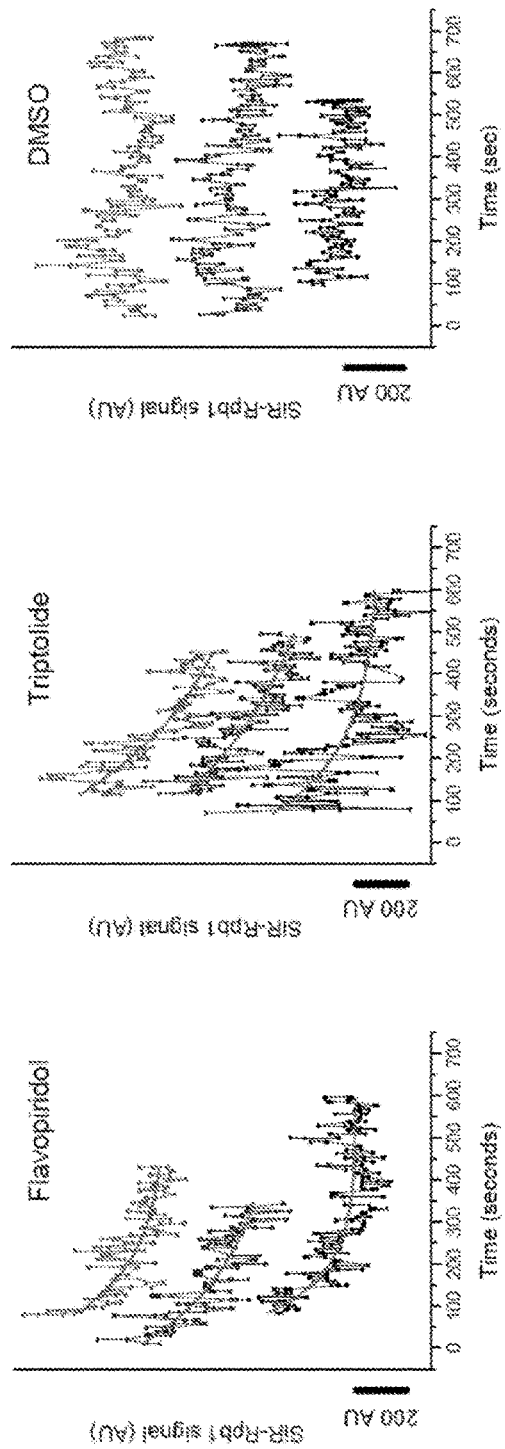
Figure 13I:
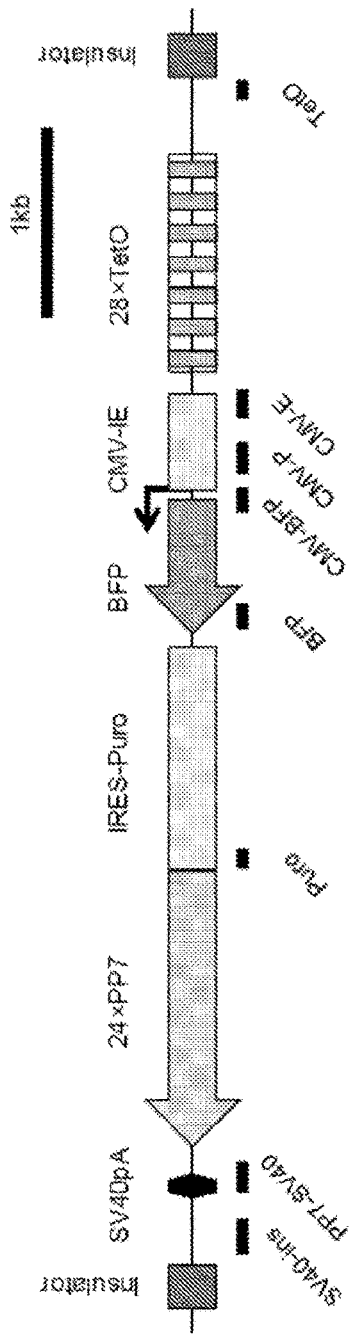
Figure 13J:
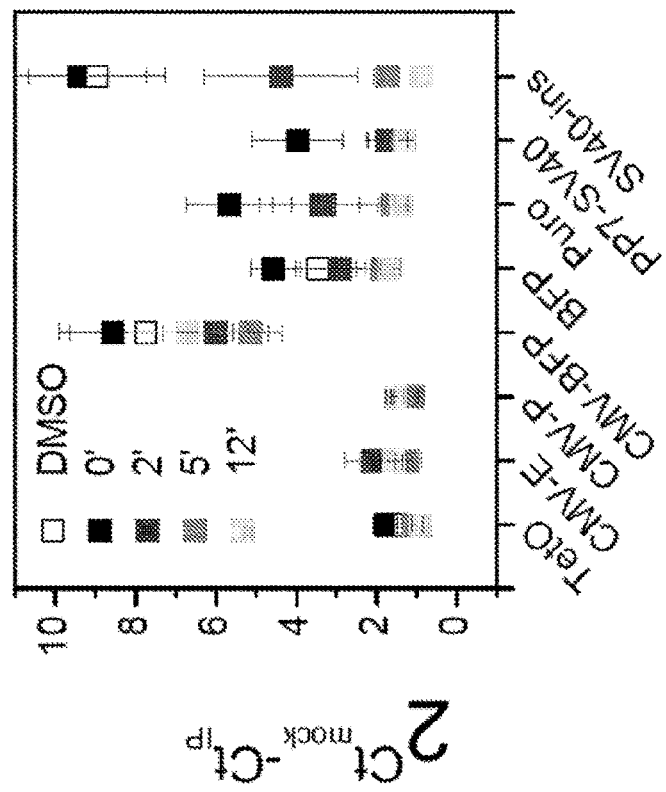

Pol II closely follows the fate of nascent transcripts: SiR-Rpb1 accumulation gradually decreases after inhibitor addition (FIGS. 3B, 3C and 13H decay times 160-240 sec). Thus Pol II accumulation at the mini-gene does not persist in the absence of de novo transcription. Since Pol II is lost upon blocking initiation/pause-release, with kinetics similar to completion of elongation and RNA release, Pol II most likely accumulates at the mini-gene at a step after pause release, engaged in elongation/termination. This contrasts models proposing transient Pol II clusters forming before initiation and persisting upon transcription inhibition. SiR-Rbp1 traces at target-locked mini-genes (with and without STED and from ~1.6 kW/cm$^2$ down to an ultra-low ~6.4 W/cm$^2$ average excitation) are absent of features such as large intensity "spikes" that would have indicated transient clustering of ~100 Pol II molecules. Chromatin immunoprecipitation (ChIP) experiments show near-complete Pol II loss from the mini-gene body and terminator regions, within 5 min upon transcription inhibition (FIGS. 13I, 13J). The good agreement with decay rates measured optically further supports the notion that the accumulated SiR-Rpb1 signal reflects multiple elongating/terminating Pol IIs.

During multi-round transcription, Pol II could be locally recycled, due to spatial restriction or termination-initiation coupling. Example implementations may devised target-locking FRAP experiments to probe Pol II dynamics at the transcription site under normal, steady-state activity conditions. Target-locked FRAP traces show SiR-Rpb1 signal initially recovering linearly, reaching a plateau over a few minutes (FIG. 5D). Concomitantly, the Pol II cluster reappears (FIG. 3G). The initial recovery rate, 2±1 Pol II/minute (FIG. 5E), is close to the estimated 2.4±0.5 RNA/minute initiation rate (FIG. 13E). The population-averaged recovery has a non-linear concave shape due to site-to-site variability: slower-recovering sites dominate the rate at longer times. An (empirical) single-exponential function fit provides estimates of ~290 sec/~60% for recovery time/efficiency (FIG. 5F). The recovery time agrees with an estimated ~310 sec taken to complete mini-gene elongation and termination (STAR Methods). The recovery amplitude is consistent with close-to-full recovery of the Pol II population accumulated at the mini-gene (70%, S), as the immobile background population (30%, B) is expected to recover at a much slower rate (1000-1500 sec, FIGS. 11K, 11L). Taken together, our results indicate that a Pol II molecule is recruited to the mini-gene from the nucleoplasm, enters productive elongation, and upon termination after one transcription round, is predominantly released back into the nucleoplasm rather than being retained and recycled over multiple rounds.

Figure 6A:
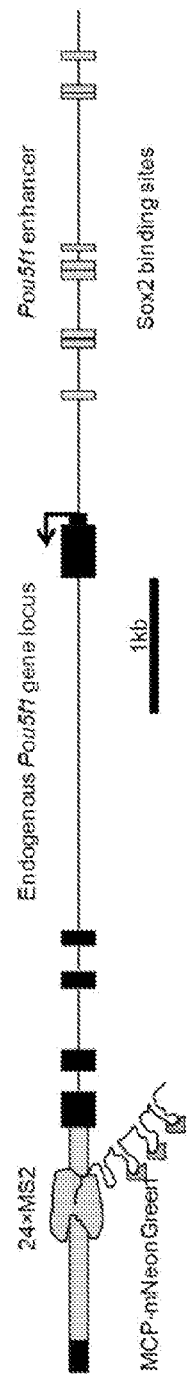
FIGS. 6A-6D illustrate Pol II, Sox2 and Cdk9 form spatially distinct foci at the endogenous Pou5f1 locus in mESCs (see also FIG. 14).

It can be observed that Pol II and regulatory factors form spatially distinct foci at the endogenous Pou5f1 locus in mouse Embryonic Stem Cells (mESCs). Next focus is on the behavior of Pol II and regulatory factors at the endogenous Pou5f1 locus in mESCs, an essential gene for early embryo development. Pou5f1 is controlled by upstream enhancers (FIG. 6A) that contain clustered binding sites for several TFs, including the pluripotency TFs Sox2, Oct4 and Nanog. Extended genomic regions/enhancer clusters that regulate genes with key, cell-type-specific roles, like the pluripotency TFs in mESCs show high signals of TFs, certain regulatory complexes and histone acetylation in ChIP assays. However, steady-state occupancies, binding kinetics and links to transcription dynamics are not well characterized.

Figure 6B:
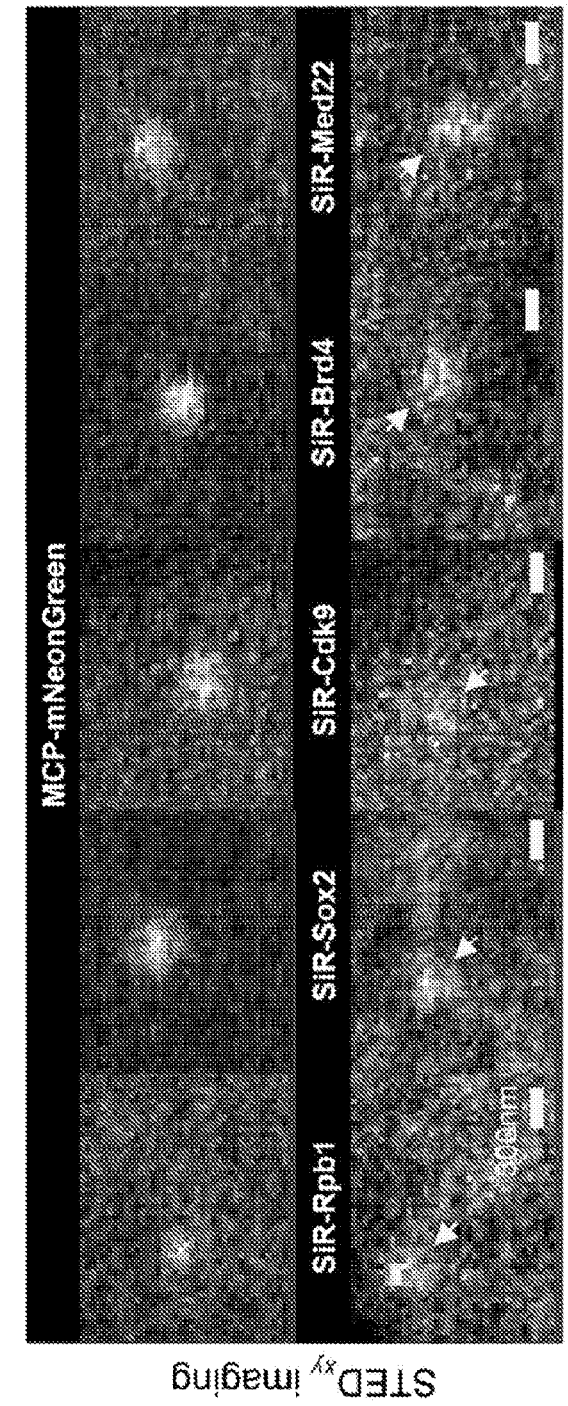
Figure 6C:
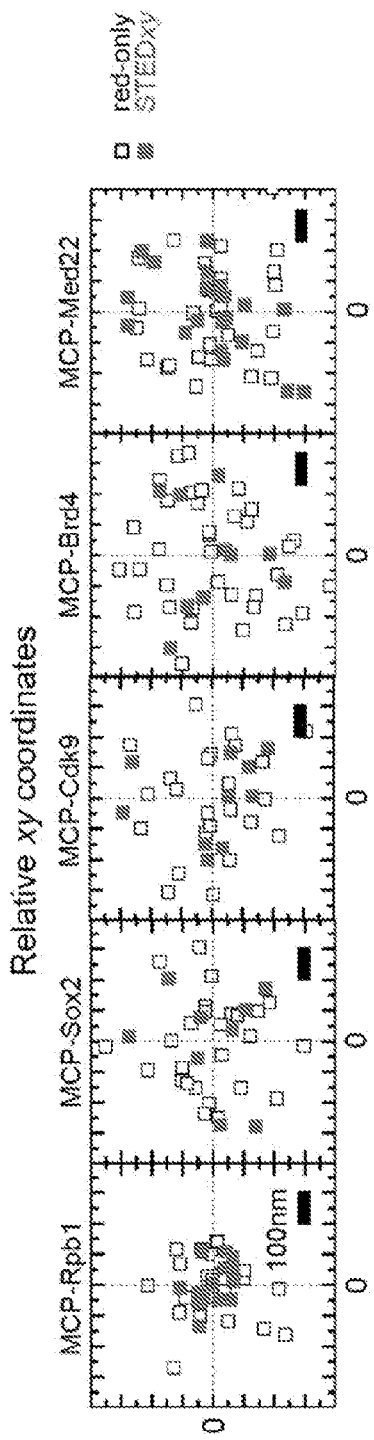
Figure 6D:
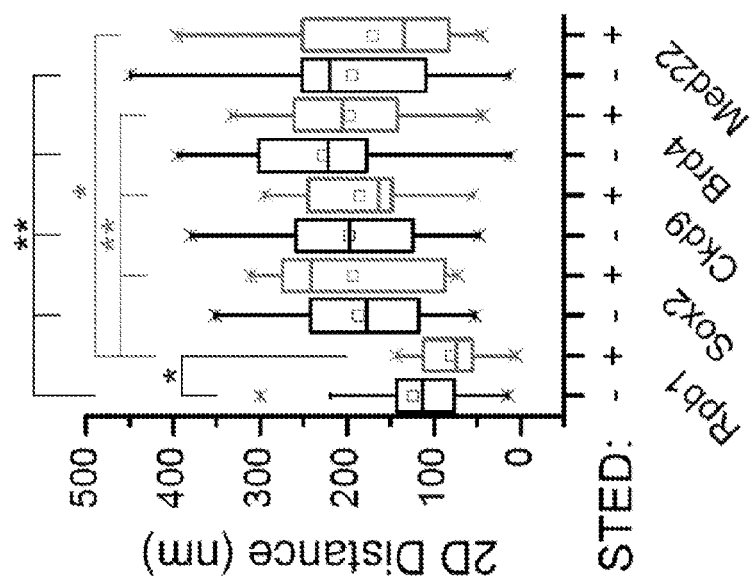

Pou5f1 transcription sites, imaged via 3'UTR-integrated 24×MS2 and an MS2 phage coat protein fused to mNeonGreen (MCP-mNeonGreen), are readily detectable in live cells and persist over ~30 min-long observation times, indicating multiple present nascent RNAs and Pou5f1 promoter on-times significantly longer than one transcription round (see below). Imaging active Pou5f1 loci reveals clusters of SNAP-tagged Rpb1 as well as Sox2, Cdk9, Brd4 and Med22. Rpb1-MCP show better colocalization by STED vs. confocal-only imaging, suggesting higher precision achieved by STED. MCP does not strictly overlap with Sox2, Cdk9, Brd4 and Med22, indicating physical nanometer-scale separation between 3'UTR-tagged RNA and enhancer-bound factors (FIGS. 6B-6D), that markedly resembles the organization of the CMV mini-gene.

Figures 14A, 14B:
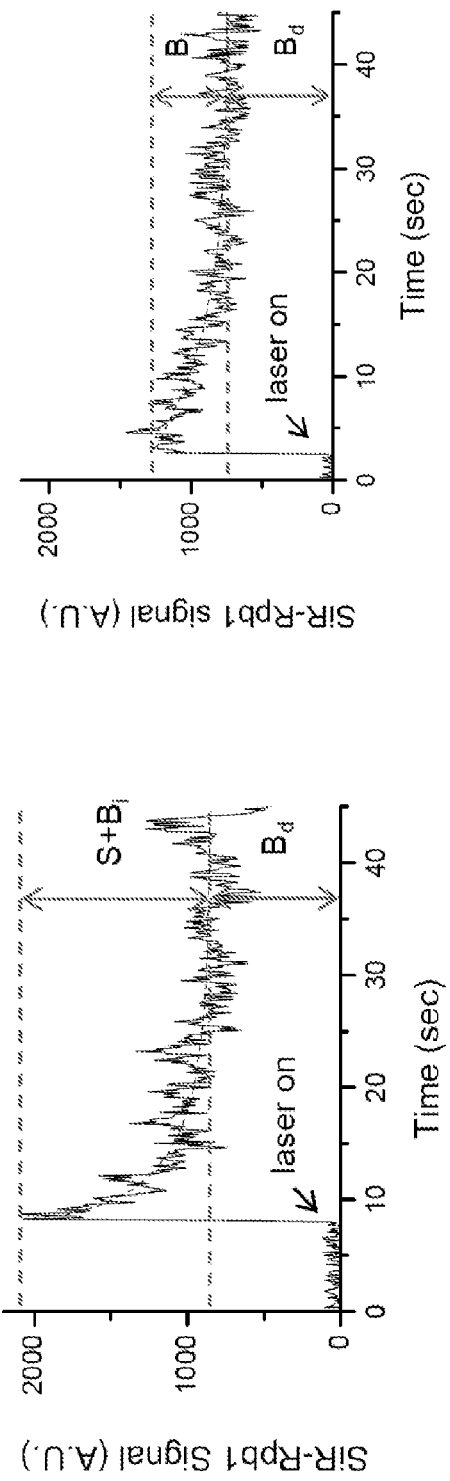
FIGS. 14A-14J correspond with quantification of Pol II, Sox2, Cdk9, Brd4 and Med22 at the Pou5f1 locus (related to FIG. 6).
Figure 14C:
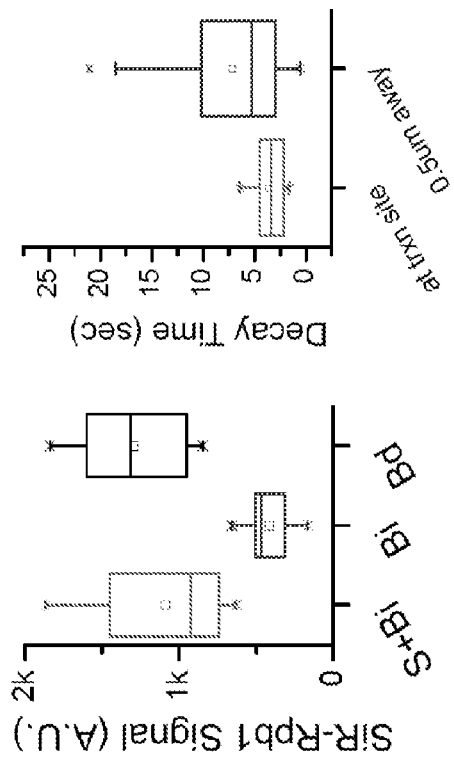
Figure 14D:
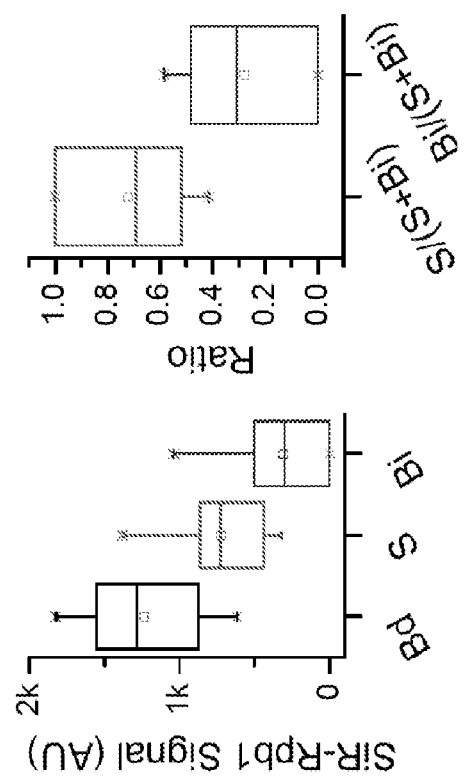
Figure 14E:
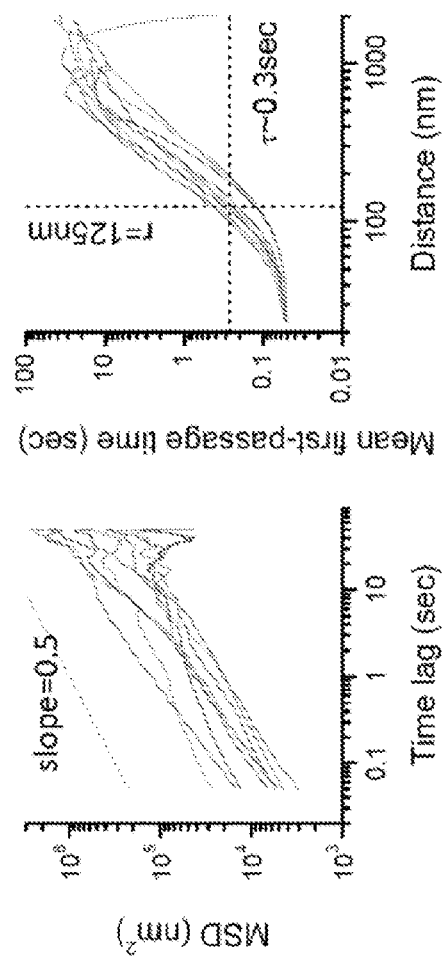
Figure 14F:
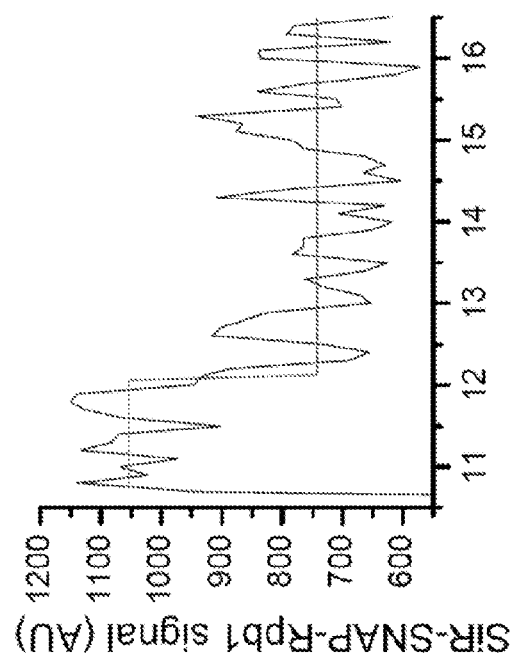
Figures 14G, 14H:
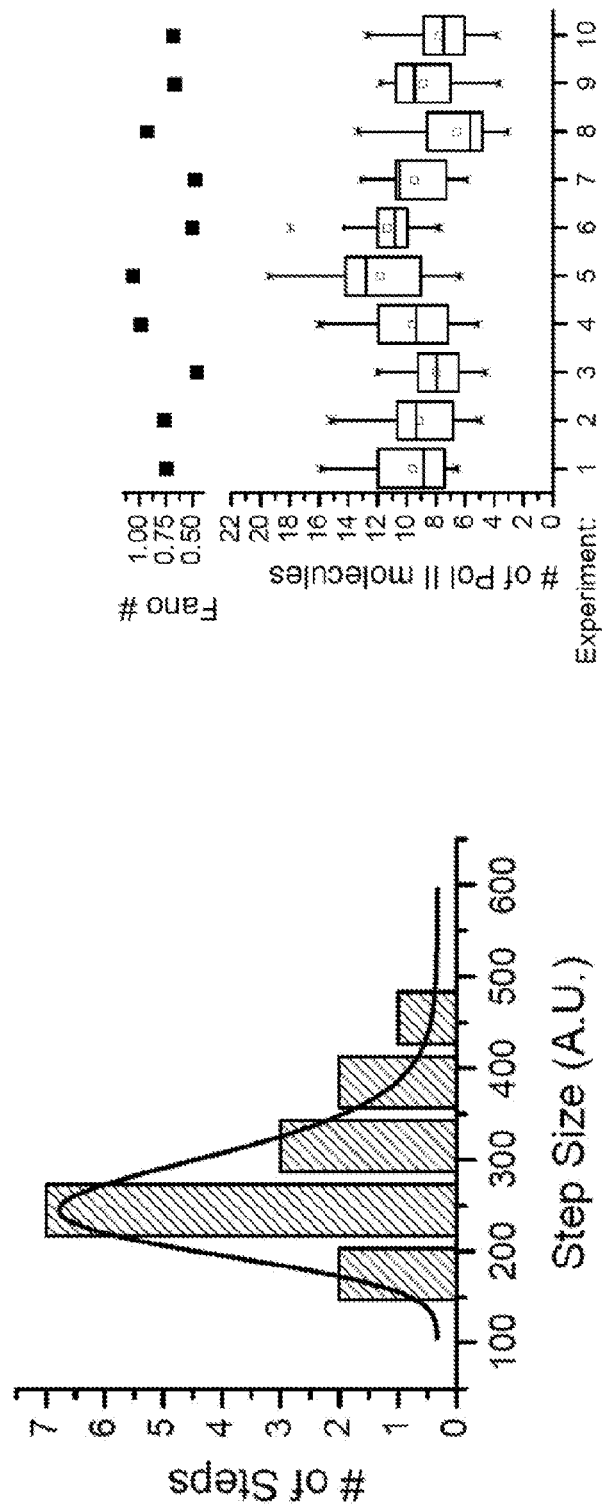
Figure 14I:
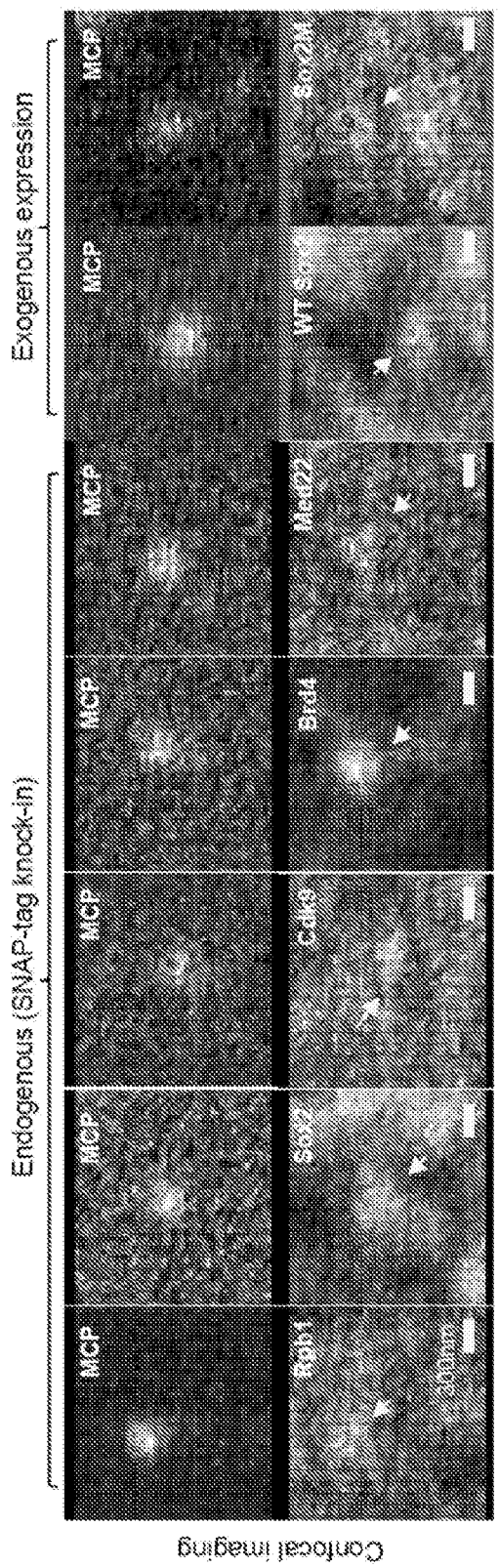
Figure 14J:
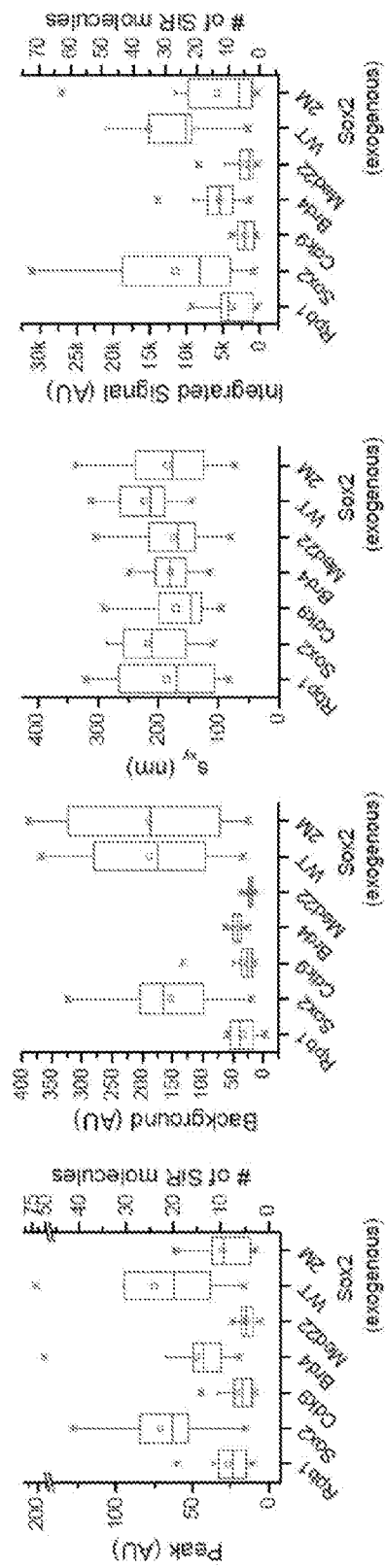

Single-molecule Pol II quantification by target-locking, results in 9.2±1.6 detected SiR-Rpb1 molecules (mean±S.D., n=10 experiments), which reflects at least 6-7 molecules at the Pou5f1 transcription site and immobile background contributions equivalent to up to 2-3 molecules (72%, S and 28%, $B_i$; FIGS. 14A-14H). By further comparing the brightness of Sox2, Cdk9, Brd4 and Med22 foci with Rpb1, it is estimated 14-22, 4-6, 9-15 and 3-5 Sox2, Cdk9, Brd4 and Med22 detected molecules respectively (FIGS. 14I, 14J). These results indicate focal accumulation of multiple Pol IIs at the gene body and multiple Sox2, Cdk9, Brd4 and Med22 molecules at the enhancer region.

Figure 7A:
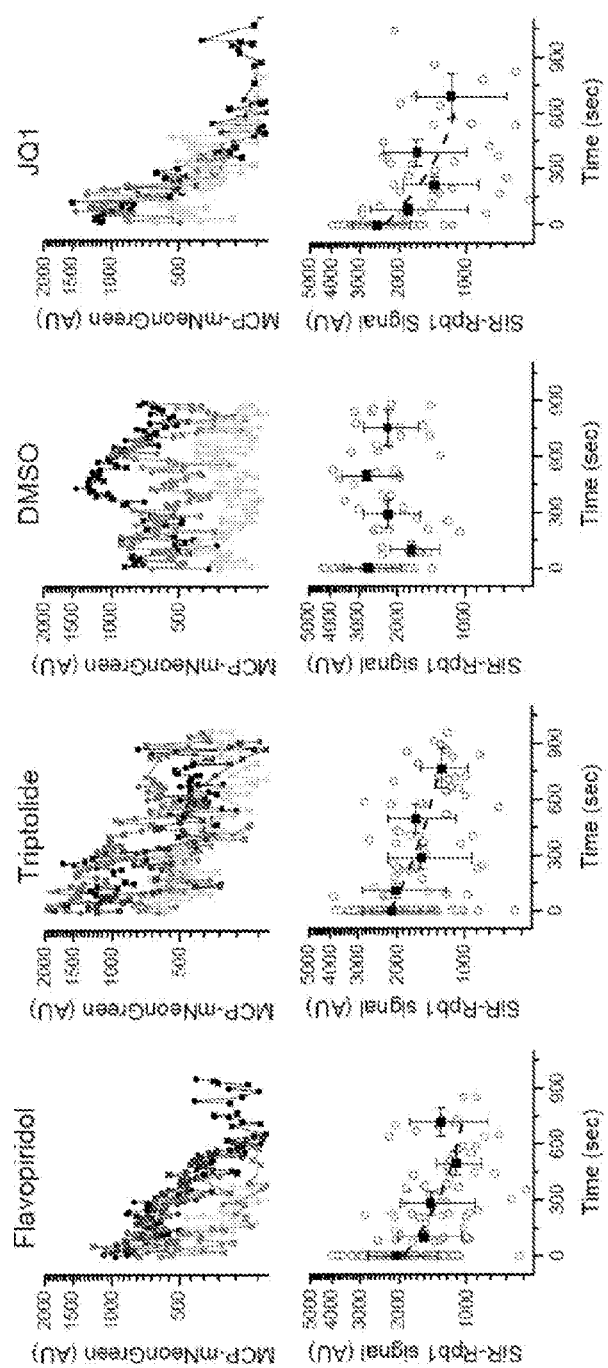
FIGS. 7A-7E illustrate target-locking probes Pol II dynamics during the Pou5f1 transcription cycle (see also FIGS. 14 and 15).
Figure 7C:
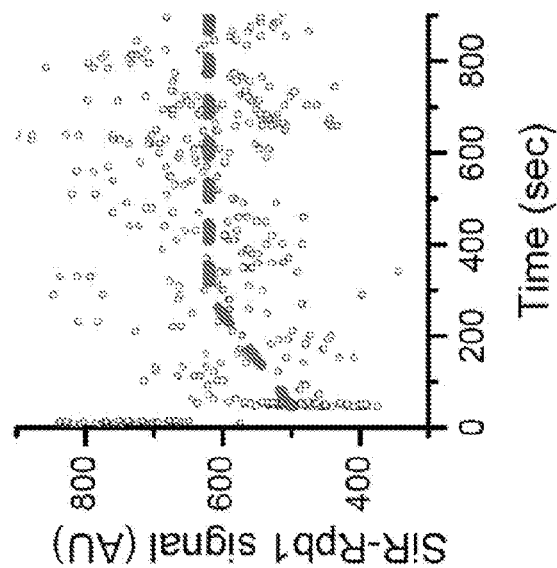
Figure 7B:
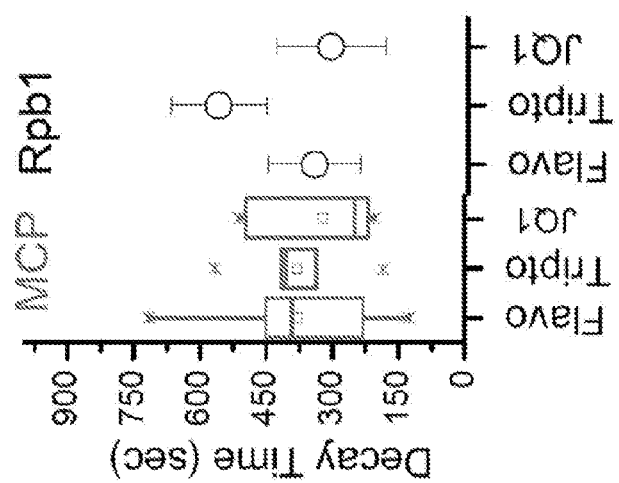
Figure 7E:
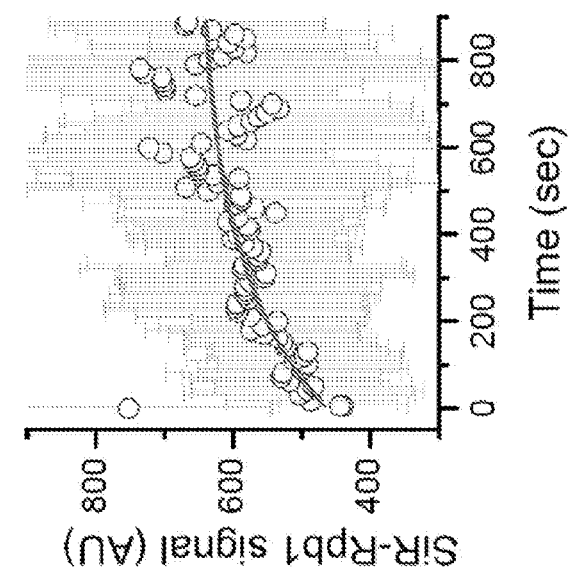
Figure 7D:
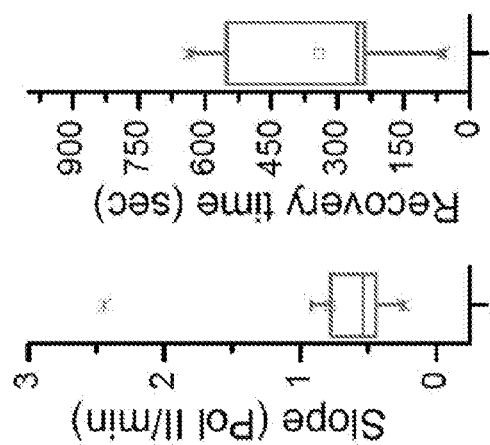

Target-locking reveals Pol II dynamics during the Pou5f1 transcription cycle. Tracking Pol II at Pou5f1 using target-locking reveals that transcription inhibition with flavopiridol or triptolide results in gradual Pol II signal loss, paralleled by nascent RNA loss (FIGS. 7A, 7B), but with slower kinetics than the CMV mini-gene possibly due to longer transcription cycle (6.3 kb vs. 3 kb gene length). Pol II kinetics measured optically agree with kinetics measured by ChIP (FIGS. 15A, 15B). Under steady-state Pou5f1 transcription conditions (without inhibitors), target-locked FRAP experiments show Pol II signal recovery (FIGS. 7C-7E), as at the CMV mini-gene, with ~330 sec/~66% averaged recovery time/efficiency (FIG. 7E). The recovery time (FIGS. 7D, 7E) agrees with an estimated 270-743 sec or a more precise ≈338 sec taken to complete elongation and termination at Pou5f1 (STAR Methods). Hence, during Pou5f1 transcription, Pol II accumulates at steps after initiation/pause-release, likely at elongation/termination, and is predominantly released rather than retained after one transcription round.

The similar dynamics between CMV mini-gene and Pou5f1 prompted analysis of the Pou5f1 promoter kinetics in more detail. Although a Poisson process quantitatively describes tdPCP signal fluctuations and nascent RNA/Pol II quantification at the CMV mini-gene, the Poisson approximation breaks down for Pou5f1. MCP fluctuations appear less noisy than what predicted from a Poisson distribution: assumption of Poisson statistics significantly overestimates the initiation rate and number of nascent Pou5f1 RNAs (FIGS. 15C-15E vs. 15F, 15G). Consistent with reduced transcription noise, Pol II statistics also suggest suppressed fluctuations (FIG. 14H). Suppressed noise might reflect multiple slow/rate-limiting steps in the Pou5f1 transcription cycle, as theoretically predicted for certain multi-step regulatory processes (STAR Methods; FIGS. 15I-15K).

Figure 8A:
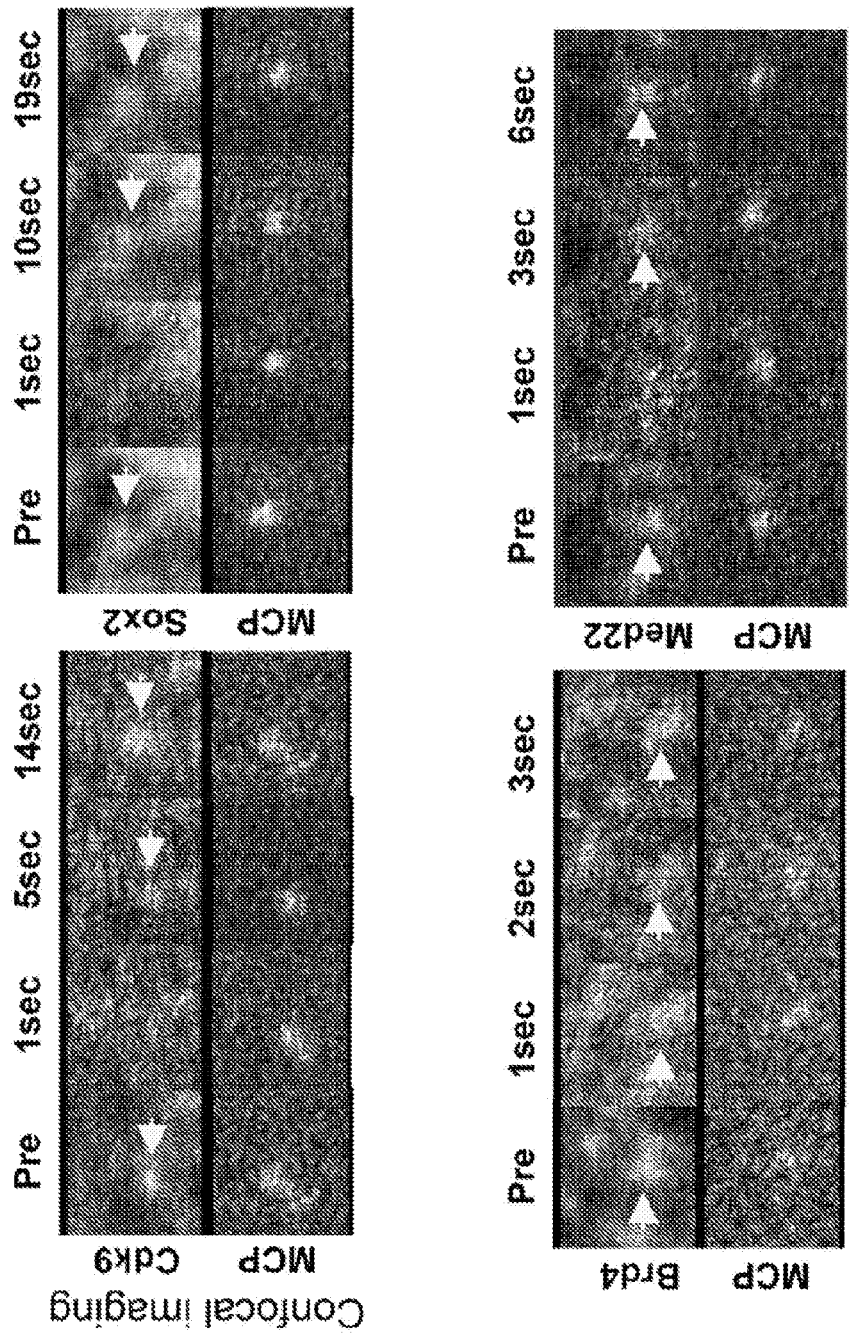
FIGS. 8A-8J illustrate imaging RF dynamics at the endogenous Pou5f1 locus illuminates enhancer mechanisms (see also FIG. 16).
Figure 8B:
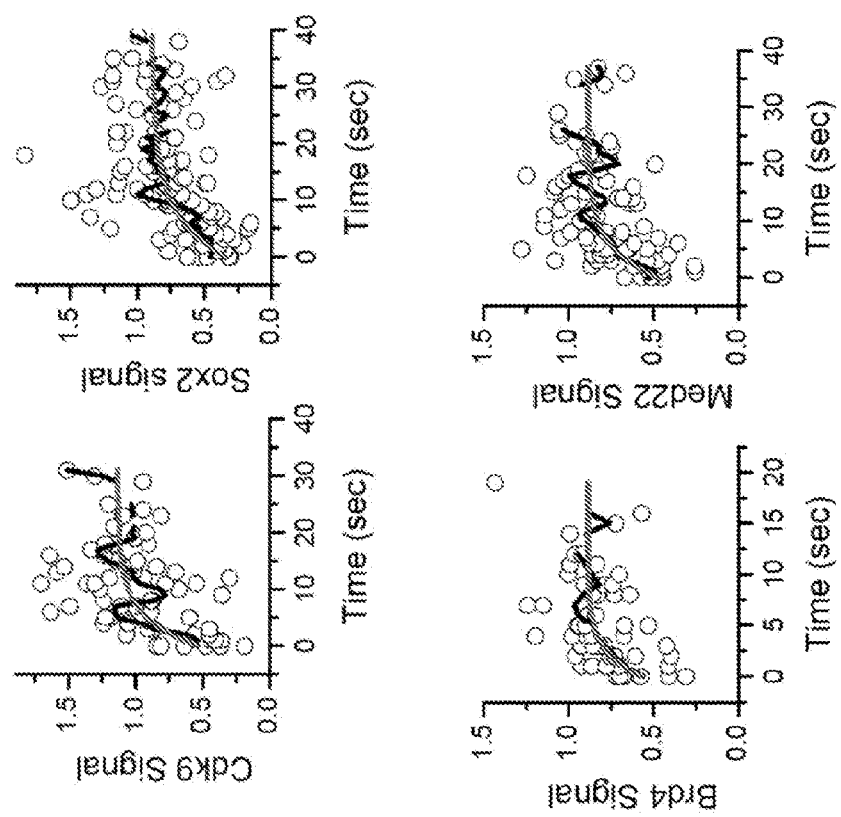
Figure 8C:
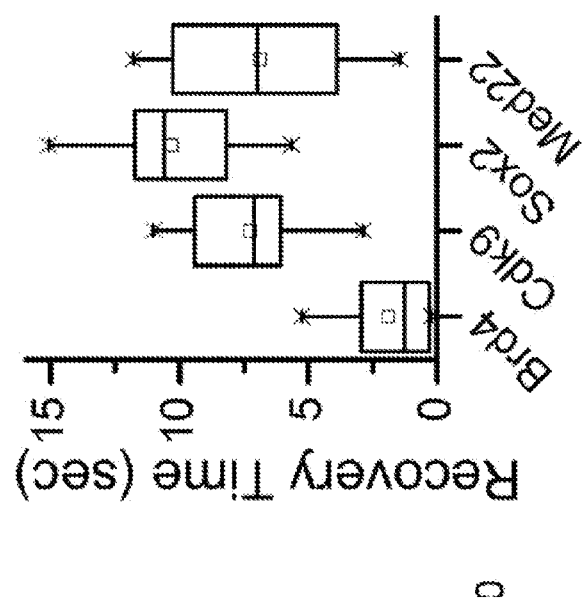

Imaging regulatory factor dynamics at the endogenous Pou5f1 locus illuminates enhancer mechanisms. The ability to visualize accumulated regulatory factors at Pou5f1 enables characterizing their dynamics and elucidating how formation of high-local-concentration foci shapes target promoter kinetics. FRAP experiments show rapid Sox2, Cdk9, Brd4 and Med22 cluster recovery, with characteristic times 2-10 sec (FIG. 8A-8C). Thus regulatory factors exhibit second residence times at Pou5f1 and clusters are stabilized through highly dynamic interactions.

To further investigate the interactions that stabilize Sox2 clustering, example implementations may mutate the High-Mobility-Group (HMG) Sox2 domain, to disrupt Sox DNA motif recognition. HMG mutations significantly (2.5-fold) reduce Sox2 clustering at Pou5f1 (FIGS. 14I, 14J). Thus Sox2 accumulation mostly depends on canonical HMG-Sox motif interactions. Interestingly, since HMG mutations do not completely abolish accumulation, a fraction of Sox2 molecules might also engage in relaxed-specificity, non-canonical interactions, e.g. 1D DNA sliding or degenerate/partial motif binding.

The highly dynamic behavior of Cdk9 at Pou5f1 is particularly intriguing. FRAP experiments had indicated <2 sec Cdk9 residence times in nuclear foci, while at an array of HIV-1 promoters, residence time varied from 11 sec to 71 sec, depending on specific mode of transcription activation. P-TEFb/Cdk9, can be recruited to transcription sites through multiple mechanisms: interactions with transcription factors, Mediator, "super-elongation" complexes, or acetylated chromatin through the chromatin reader Brd4. Brd4 exhibits few-second residence times on chromatin and can be rapidly displaced by small molecules, like JQ1, prompting us to investigate Pou5f1 transcription sensitivity to Brd4 inhibition. JQ1 abruptly abolishes Pou5f1 transcription activity (FIG. 7A), consistent with highly dynamic Brd4 binding to the Pou5f1 enhancer and rapid displacement upon inhibition. This result also indicates tight links between Brd4 binding and key steps in the Pol II cycle.

If rapid Pou5f1 shut-down reflects significant Cdk9 portion being recruited through Brd4-acetylated histone recognition, both Brd4 and Cdk9 clustering would dissipate upon JQ1 inhibition. Consistent with this hypothesis, within 1 min of JQ1 treatment, Brd4 and Cdk9 signals drop sharply (FIG. 8D), indicating that, in large part, Cdk9 accumulation depends on Brd4-acetylated chromatin interactions. Med22 also shows a similar effect to Brd4 inhibition. Brd4, Cdk9 and Med22 signal is not lost when inhibiting Cdk9 kinase activity with flavopiridol, suggesting that most Cdk9 molecules are not tethered to the transcription site through engagement of their CTD substrates or association with Pol II elongation complexes, and Brd4/Cdk9/Med22 clustering is not stabilized by the nascent RNA and/or due the act of transcription itself. Cdk9/Med22 focal accumulation appears to be stabilized through highly-specific molecular recognition-multiple Brd4 molecules binding to multiple acetylated targets throughout the heavily modified Pou5f1 enhancer region—rather than possibly less-selective physicochemical forces, e.g. driven by low-complexity protein domains and RNA.

Figure 8D:
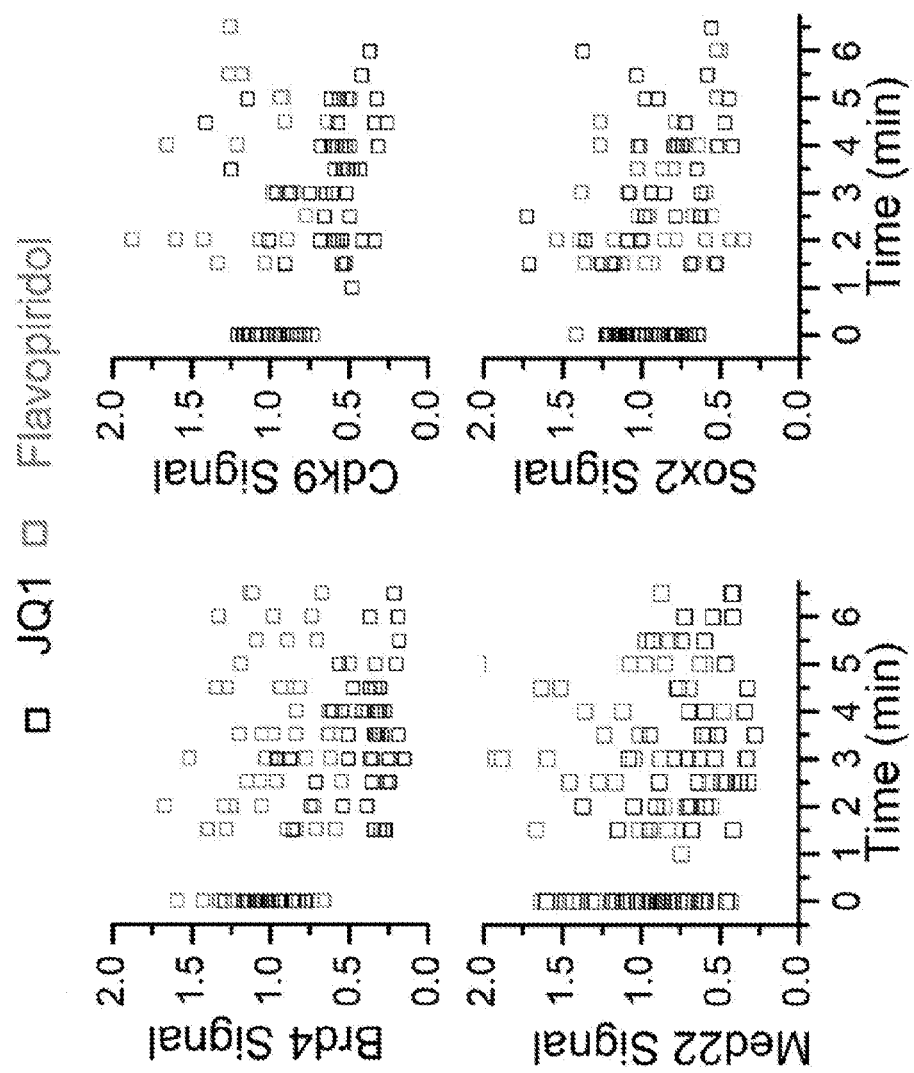
Figure 8E:
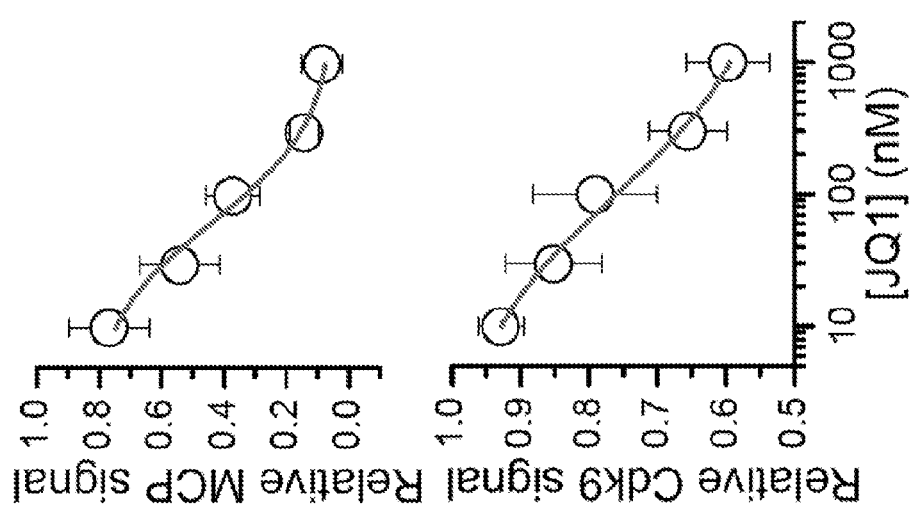
Figure 8G:
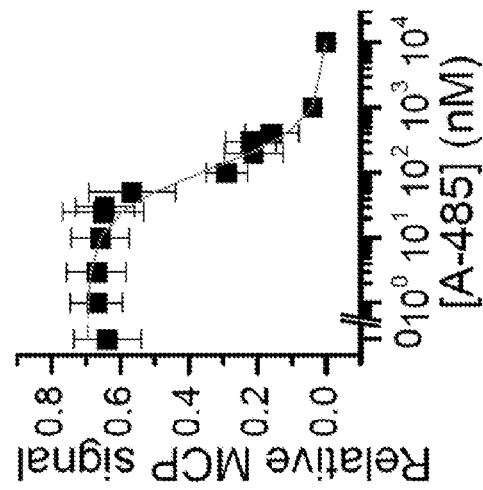
Figure 8F:
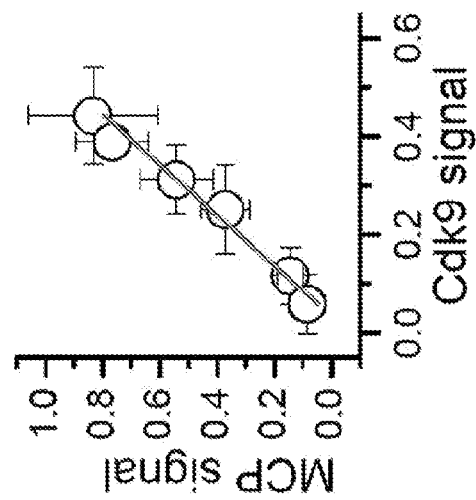

Contrary to Brd4, Med22 and Cdk9, Sox2 clustering persists through transcription inhibition by either JQ1 or FVP (FIG. 8D). The differential sensitivities between factors and modes of transcription inhibition unveil a hierarchy of molecular transactions that control Pou5f1 transcription: Sox2 binding occurs upstream of Cdk9/Med22/Brd4 recruitment and accumulation of all of 4 regulatory factors occurs upstream of Pol II release into productive elongation. Brd4 recognition of acetylation marks does not appear to reinforce Sox2 accumulation, and clustering of all 4 regulatory factors does not depend on the nascent Pou5f1 RNA or the act of transcription itself.

Figure 8H:
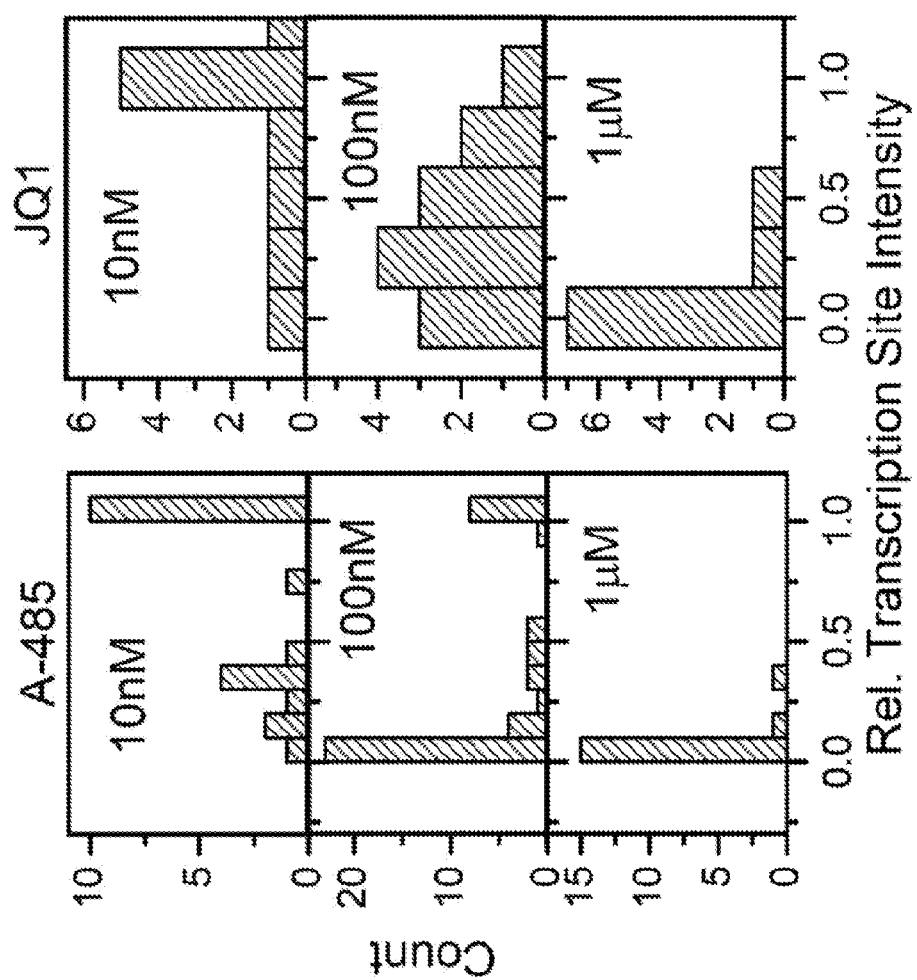

Displacing focally accumulated regulatory factors allows exploring links between clustering and transcription in greater detail. At intermediate [JQ1], individual transcription sites display attenuated response: after treatment, MCP signal decays to a new finite plateau (FIGS. 8H, 16A). Accumulated Brd4 and Cdk9 levels also gradually decrease, as transcription attenuates with increasing [JQ1] (FIGS. 8E, 8F, 16C, 16D), unveiling a hitherto unidentified mechanism, whereby tuning the local concentration of regulatory complexes at the enhancer enables fine control of promoter output. This detailed insight on transcription was previously unattainable with approaches that either lacked gene context and functional readout or only tracked nascent RNA without monitoring factor dynamics.

Brd4 controls Pol II pause release at Pou5f1 by "seeding" rather than "scaffolding" Cdk9 clustering. Co-IPs and ChIP assays showed Brd4-pTEFb interactions and Brd4-dependent Cdk9 enrichment at genomic loci, but how these factors engage each other at individual genes in live cells had not been characterized. The much shorter Brd4 residence time (~2 sec) vs. Cdk9 (~7 sec) at the Pou5f1 locus is inconsistent with on-off binding of binary Brd4:P-TEFb complexes or a canonical "scaffold-client" relationship and indicates partially-overlapping/non-overlapping recruitment/retention mechanisms (FIG. 16B).

Figure 8I:
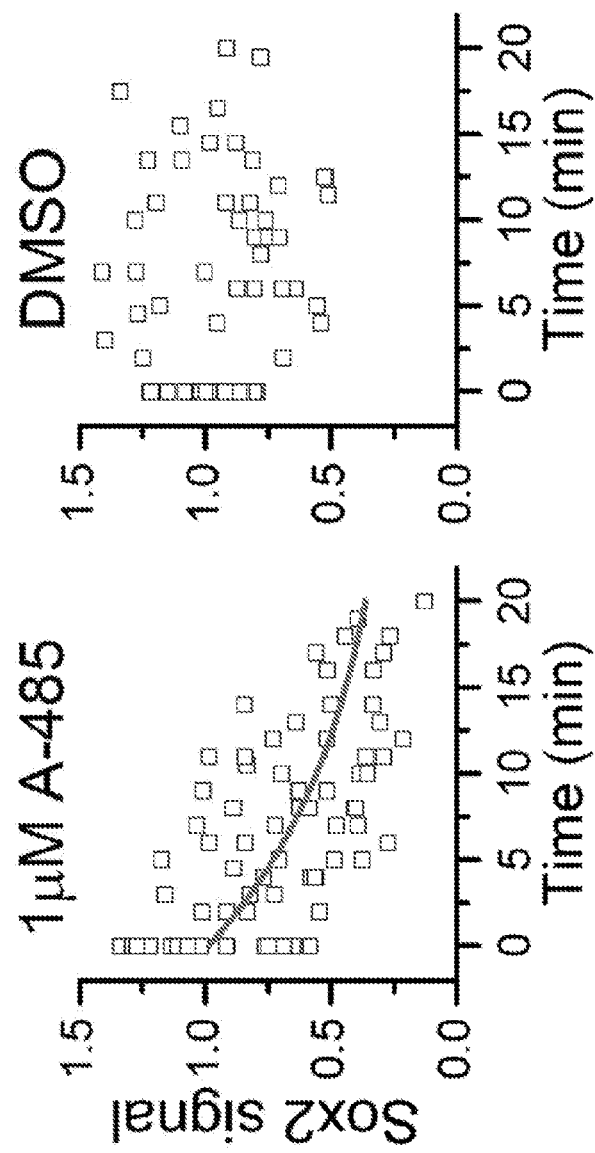

Brd4 clustering at Pou5f1 is significantly more sensitive (K=28 nM, FIG. 16C) to JQ1 inhibition than both Cdk9 clustering and nascent transcription amplitude (K=97 nM and 63 nM, FIG. 8I). Thus, Cdk9 clustering and Pou5f1 nascent transcription amplitude can be sustained with limited amounts of accumulated Brd4 (FIG. 16D). Tuning total nuclear Brd4 levels using targeted degradation further corroborates these findings: consistent with the JQ1 titration results, nascent Pou5f1 transcription output quickly saturates after the onset of Brd4 clustering (FIG. 16E, 16F). These observations do not favor a model where high Brd4 accumulation creates a "local trap", as Cdk9 accumulation should have been highly sensitive to trap size, but hint towards a "seeding" mechanism.

Brd4 is crucial for initial recruitment of Cdk9 (FIGS. 8D-8F), but retention of clustered Cdk9 at the transcription site likely involves additional interactions. Both Sox2 and Mediator interact with P-TEFb and both factors form clusters at Pou5f1. These results suggest that Brd4 initiates/"seeds" and TFs/co-activators likely further stabilize Cdk9 clustering.

The interplay between p300/CBP HAT and Sox2 clustering maintains the active Pou5f1 enhancer state. To further probe the role of histone acetylation, example implementations may inhibit the p300/CREB-binding protein (CBP) histone acetyltransferase (HAT) activity. p300/CBP are essential for early development and occupy mESC enhancers together with Sox2/Oct4/Nanog. However, how p300/CBP HAT activity at mESC enhancers relates to transcription of target promoters has not been characterized in detail.

At 1 µM A-485, a recently developed potent and selective small-molecule p300/CBP HAT inhibitor, nascent Pou5f1 transcription shuts down within ~20 minutes (FIG. 16G). The rapid kinetics indicates a primary A-485 effect and causal relationships between p300/CBP HAT activity and Pou5f1 transcription. The decay time upon p300/CBP HAT inhibition is slower than JQ1, flavopiridol or triptolide treatments (635 sec vs. 340-380 sec, FIG. 16H). Although these other 3 inhibitors act almost instantaneously (within seconds), transcription shutdown by A-485 seems to involve minute-long processes, consistent with histone acetylation turnover time-scales (Katan-Khaykovich and Struhl, 2002; Weinert et al., 2018).

Strikingly, although at the population level titrating A-485 results in gradual Pou5f1 transcription attenuation (FIG. 6G), individual transcription sites exhibit all-or-none responses (FIGS. 8H, 16I). At intermediate [A-485], nascent Pou5f1 transcription either persists or completely shuts down, with [A-485] controlling shutdown probability. This is in stark contrast with the response to Brd4 inhibition, where at intermediate [JQ1] individual Pou5f1 transcription sites show attenuated output, without completely shutting down (FIGS. 8H, 16A).

Figure 8J:
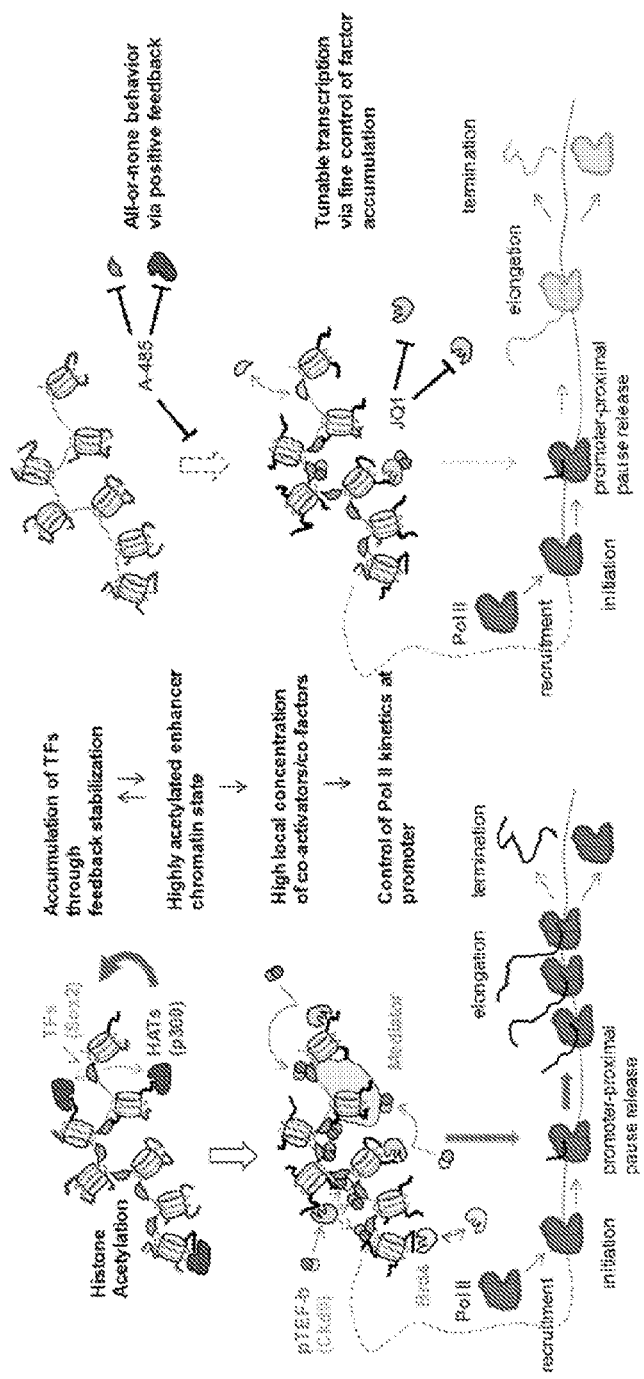

The all-or-none transcription response to p300/CBP HAT inhibition could reflect positive feedback mechanisms, as often seen in "switch-like" biological responses. Histone acetylation can modulate TF-chromatin association, providing a biochemical basis for the observations. Consistent with this hypothesis, upon A-485 inhibition, Sox2 cluster size at Pou5f1 gradually decreases (FIG. 8I), with characteristic decay time close to the transcription shutdown time-scale (12.5 vs. 10.5 min). Brd4 clusters at Pou5f1 also gradually shrink upon A-485 inhibition (8 min, FIG. 16J), with similar kinetics to H3K27ac loss (~7 min FIG. 16K). Our results are consistent with a positive feedback mechanism that maintains/stabilizes the active Pou5f1 enhancer state, whereby Sox2/TF binding recruits p300/CBP co-activators while p300/CBP HAT activity further reinforces Sox2/TF accumulation. Visualizing the interplay between transcription and regulatory factor activities in real-time, at individual genes in single live cells, uncovers new phenomena otherwise masked when averaging an ensemble of cells, providing more detailed views of transcription mechanisms in vivo (FIG. 8J).

Brd4 clustering controls the transcription bursting kinetics of Nanog. To further illustrate how single-molecule/single-gene imaging capabilities address questions that could not be answered otherwise, example implementations may focus on transcription bursting—intermittent switching between active (on) and in-active (off) states—a fascinating but largely unexplored aspect of transcription regulation. In *Drosophila* embryos, transgene reporters show bursting kinetics shaped by developmental enhancers. Whether developmental enhancers generally control bursting of endogenous mammalian genes and which molecular players/mechanisms are involved is unknown.

Nanog, a key pluripotency gene in mESCs, is controlled by distal enhancers and exhibits minute-long transcription bursts. It is discovered that Pol II, Sox2 and Brd4 form foci at Nanog transcription sites, with nanoscale organization akin to Pou5f1—colocalization of Pol II with 3'UTR-tagged nascent RNA and resolvable separation of enhancer-associated regulatory factors (FIGS. 9A-9D). STED reveals additional nanometer details not seen with confocal-only imaging: Brd4 is closer to MCP/Pol II than Sox2, an organization broadly consistent with models postulating co-activators/cofactors bridging the gap from distal enhancer-bound TFs towards the transcription machinery at the target gene. These results also suggest that focal Pol II and regulatory factor accumulation might be a general feature of pluripotency genes and associated enhancers in mESCs.

Figure 9A:
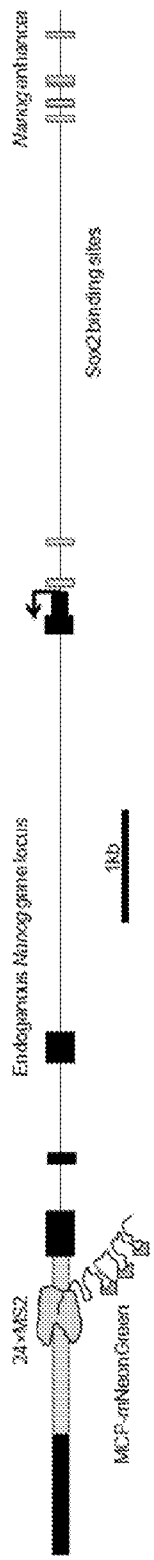
FIG. 9A-9H illustrates Brd4 and enhancer-associated clustering regulates transcription bursting (see also FIG. 16).
Figure 9B:
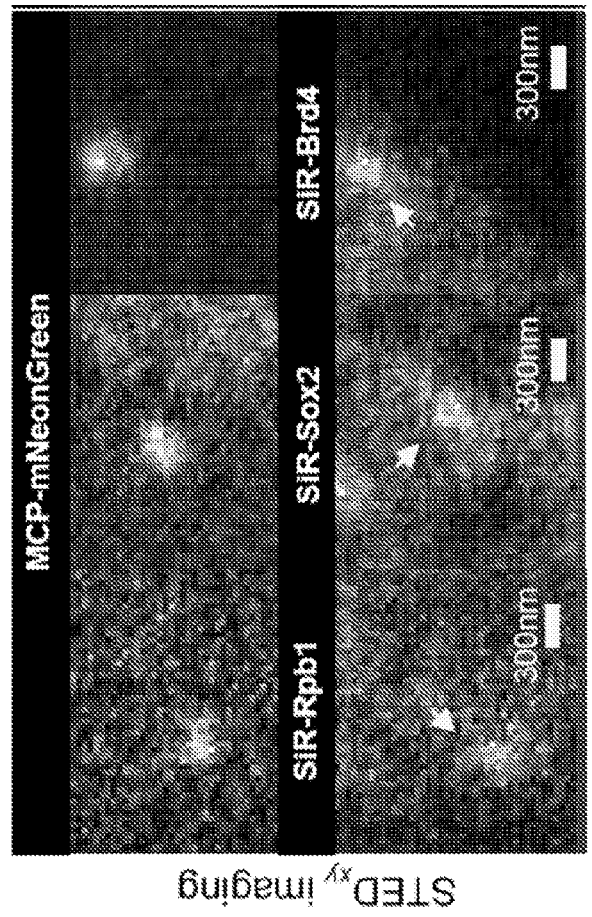
Figure 9C:
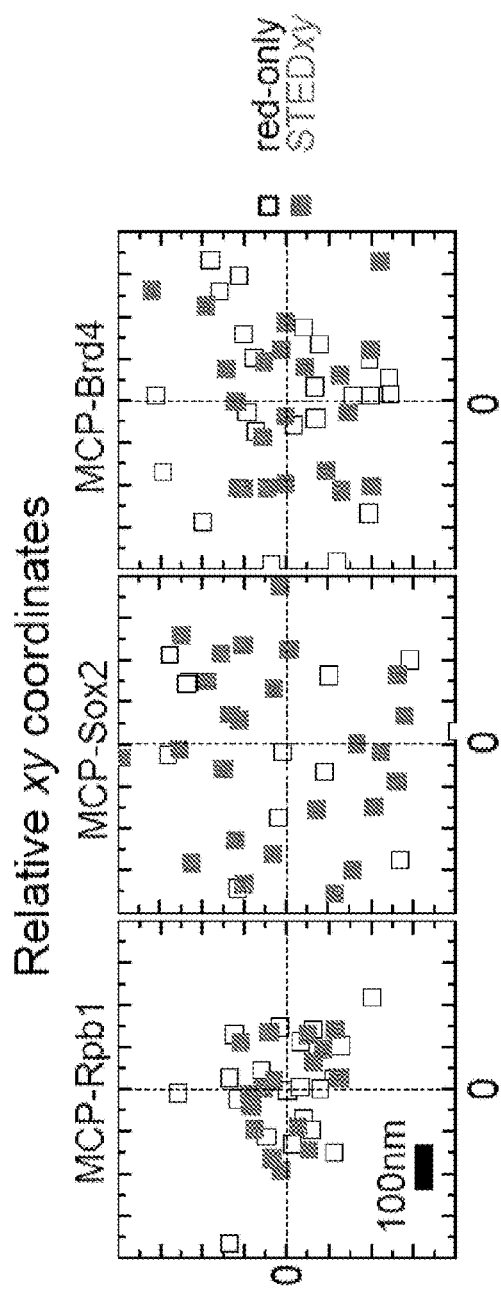
Figure 9D:
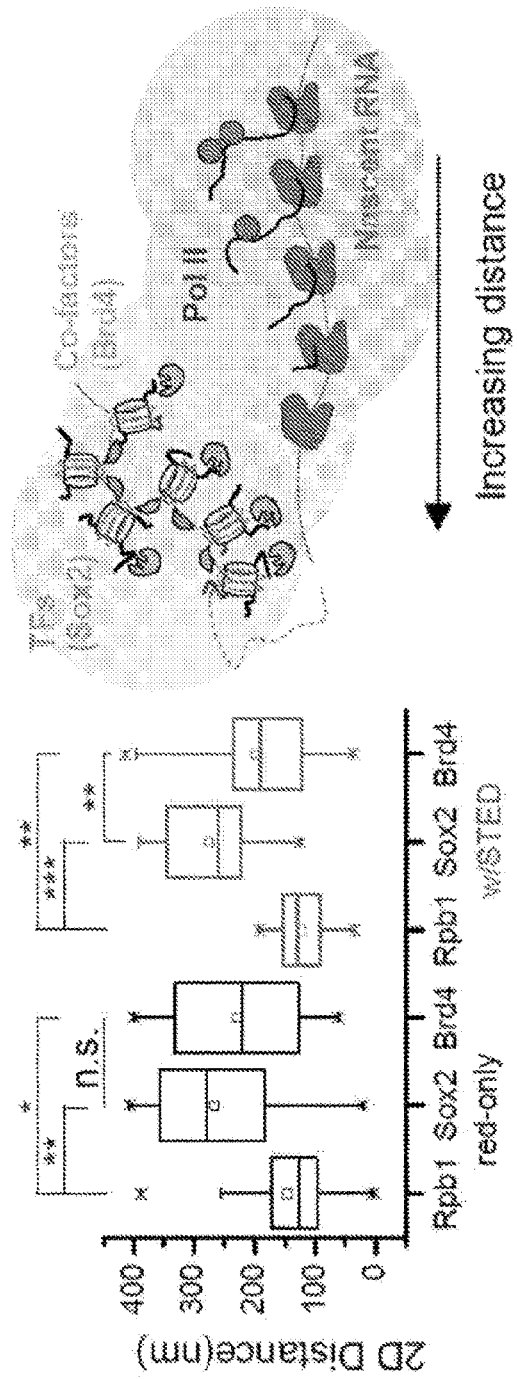
Figure 9F:
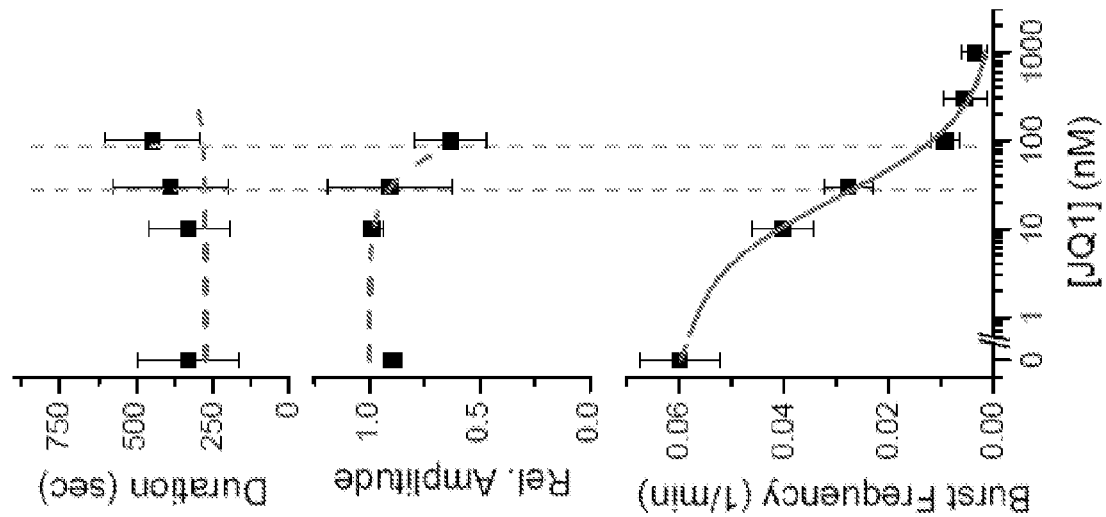
Figure 9E:
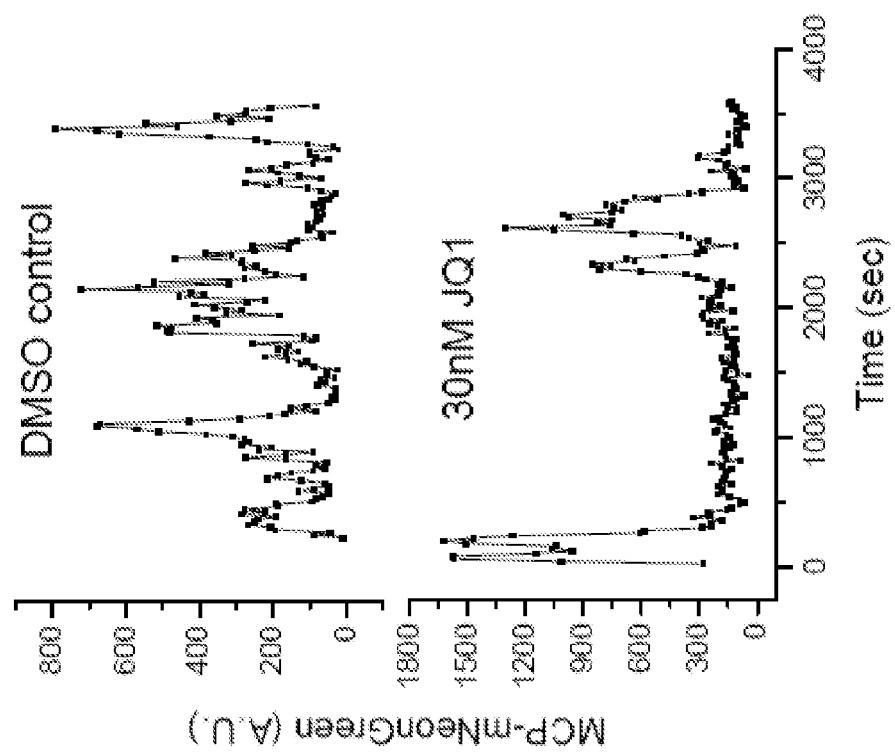
Figure 9H:
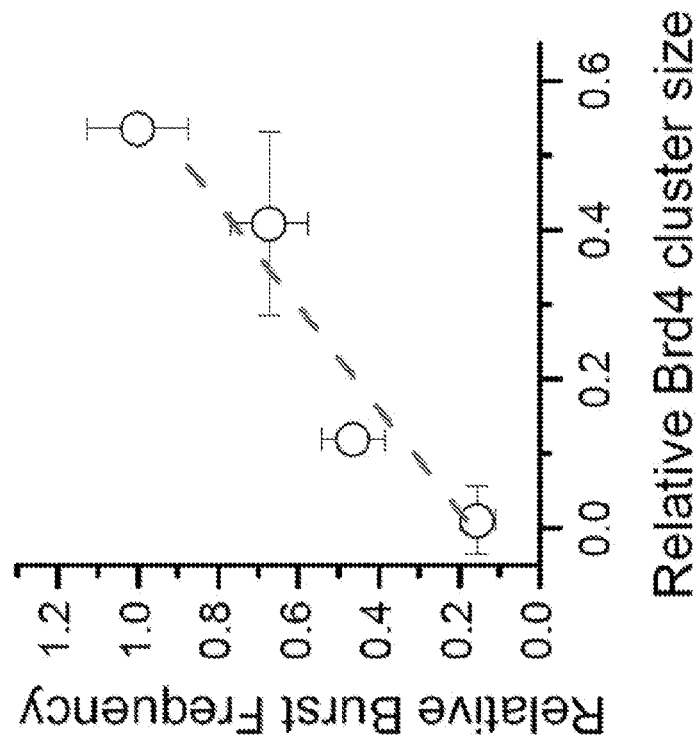
Figure 9G:
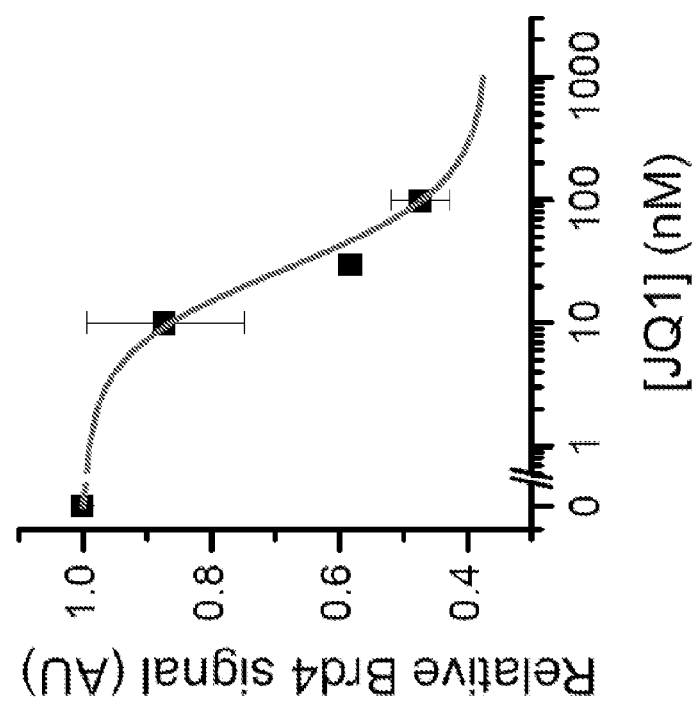

If accumulated Brd4 at Nanog acts mainly as a Pol II pause-release factor, upon Brd4 inhibition a reduction in burst amplitude would be expected. Surprisingly, burst frequency is dramatically reduced at low [JQ1], with a modest reduction in burst amplitude at higher [JQ1] while burst duration remains largely unaffected (FIGS. 9E, 9F). JQ1 titrations show that burst frequency reduction closely follows accumulated Brd4 reduction (FIG. 9G-9H). Thus, beyond controlling Pol II pause-release, Brd4 regulates transcription bursting, exemplified by the striking correspondence between burst frequency and enhancer-associated Brd4 cluster size. Bursting kinetics cannot be captured by static end-point assays that provide information averaged over a population of cells (e.g. ChIP, NET-Seq etc). Our discovery that Brd4 is a bursting regulator is yet another vivid example of how imaging functionally linked events at specific gene loci provides new insights that could not be revealed otherwise.

Elucidating transcription at single genes, in situ. The ability to visualize transcription at single-molecule/single-gene level in live cells addresses questions that could not be answered otherwise. First, imaging, tracking and quantifying Pol II with single-molecule resolution provides unprecedented quantitative insights into its spatial organization, its participation into functional assemblies and its dynamics during the transcription cycle. Since early descriptions of mammalian nuclear ultra-structure and continuing to date, such questions have attracted great interest. This disclosure discusses synthetic mini-genes and the endogenous Pou5f1 and Nanog loci in mESCs as examples. The example methodological framework established for elucidating transcription sets the stage for investigating diverse mechanisms proposed for different genes, cell types or growth conditions, e.g. crowding at pre-initiation during serum stimulation, recycling-related compartmentalization after heat-shock, or facilitated re-initiation due to gene loops. Such applications serve to deepen our understanding of, for example, transcription and its regulation in different settings.

Second, it has been discovered that focal accumulation of regulatory factors at the Pou5f1 and Nanog enhancers directly controls nascent transcription kinetics of the target promoters. By modulating/perturbing these regions of high local concentration while monitoring real-time promoter kinetics, example implementations establish the functional consequences of regulatory factor clustering and unveil the detailed operational parameters of this hitherto unidentified mechanism. Clusters of regulatory factors at Pou5f1 control nascent transcription amplitude, while at Nanog, cluster size controls transcription burst frequency. These detailed, context-specific kinetic mechanisms could be revealed by single gene imaging in live cells. There have been extensive studies of cis-elements at the DNA sequence level (e.g. analyzing number and type of binding sites). Directly measuring steady-state occupancies, on-off binding kinetics and nascent transcription dynamics at single genes now provides a detailed biophysical basis for describing transcription mechanisms.

Third, disclosed results expand understanding of the interdependencies and intertwined activities of the multiple TFs, chromatin regulators and co-activators at active gene loci. How transcription complexes form has been an area of keen interest. Traditional in vitro reconstitution often portrays step-by-step assembly mechanisms and progression between stable configurations in an ordered and static fashion. Live-cell experiments challenge this picture, revealing residence times of single-molecules on chromatin much shorter than the time-scales of in vivo transcription responses. Highly dynamic interactions argue against formation of stable complexes and ordered progression through well-defined static intermediates. Rather, such data are often interpreted in probabilistic frameworks, whereby assembly of large complexes occurs through largely random/stochastic interactions of individual components, without a strict hierarchy. Numerous other examples of nuclear structures/bodies exist that form via such stochastic self-assembly mechanisms. Also, recent models postulate highly cooperative formation of molecular assemblies, driven by multivalent weak and transient interactions between Pol II regulators, but the specific "scaffold-client" relationships remain uncharacterized. The broad range of models proposed—from strictly ordered to almost completely random—contrasts the lack of experimental approaches to visualize the detailed phenomena in live cells. The ability to probe assembly pathways and synergies/interdependencies of molecular interactions, exemplified by the Sox2-Brd4-Cdk9-Pol II hierarchy, the seeding mechanism of pTEBb recruitment by Brd4 and the positive feedback between Sox2 and p300/CBP discovered at the Pou5f1 locus, is a stride towards reconciling these apparent conundrums.

Fourth, disclosed results provide unprecedented glimpses of functional genome organization at the kb scale, shedding new light onto active gene "microenvironments" and nuclear compartmentalization. Nuclear compartments have been associated with distinct genome regulation processes for some time and biophysical mechanisms that govern formation of such membrane-less organelles is an area of keen interest. Although μm-sized nuclear structures containing $10^3$-$10^5$ molecules have been amenable to light-microscopic investigations, nuclear organization at the 10-100 nm scale, in relation to Pol II transcription, has been very hard to probe experimentally in live cells. At Pou5f1 and Nanog, discovered were ~100 nm foci that contain ~10 Pol II and regulatory factor molecules and that are stabilized by specific molecular interactions with DNA and histones. These finite system size effects and spatial constraints of the underlying chromatin scaffold can now provide quantitative frameworks, to synthesize concepts from statistical-mechanics and soft-matter physics into models of transcription control.

Fluorescence-in-situ-hybridization and super-resolution imaging revealed genome folding at the 10's of kb to Mb scale, in fixed cells. Localizing down-to single fluorescent molecules bound at specific genomic sites in live cells would provide even higher resolution views of genomic organization, to the ≤1 kb level, and elucidate regulatory promoter-enhancer interactions in real-time. The resolvable spatial separation between upstream-bound factors and 3'-UTR-tagged nascent RNA suggests that real-time tracking of individual Pol II molecules moving along the gene through a complete transcription cycle in live cells might be within reach.

Additional example implementations of target-locking 3D STED: Target-locking 3D STED can be further improved in speed, photon efficiency, background reduction and photobleaching. Fast electro-optic beam deflectors, single-photon counting electronics and a real-time hardware-based control system would extend temporal resolution to 100 μsec, enabling locking onto fast targets, down to single freely-diffusing molecules. Optimal localization algorithms and 3D interferometry enhances target-locking onto dim targets and 3D resolution. Near-isotropic and more tightly focused excitation/depletion profiles, achieved by two opposed lenses, increases background suppression, at reduced STED intensities. Triplet-/dark-state relaxation and pulsed STED with time-gated detection could further reduce photobleaching/background. Beyond STED, spatially-targeted fluorescence on-off control by other photo-physical/-chemical means, e.g. photo-switching/-activation, could be exploited to suppress background and expand the types of usable fluorophores and possible applications.

Detecting single-molecule dynamics at specific intracellular activity sites is of significance across biomedical fields. The imaging and analysis tools disclosed here are applicable beyond transcription, with transformative potential for studies of a broad range of other molecular processes in live cells. Adapting target-locking nanoscopy to other systems opens up the possibility of real-time single-molecule detection in size-tunable volumes down to e.g. a single DNA lesion, single cytoplasmic mRNAs and translating ribosomes, sub-cellular organelles, presynaptic active zones and signaling complexes and clusters on the membrane. The new capabilities thus allow probing stoichiometry, nanoscale organization and dynamic molecular transactions in a variety of important cellular processes and pathways. Increased speed, resolution and sensitivity enable tracking movement and real-time interactions for any given tagged single molecule inside a cell. Technological innovations to increase photon-efficiency and reduce background henceforth enable single-molecule approaches to fulfill their unrealized potential of elucidating complex molecular mechanisms in vivo.

640 nm (Pico-Quant, LDH-P-C-485B and LDH-P-C-640B, controlled by Sepia 828-S 2 channel driver) and a 561 nm CW solid-state laser (Cobolt, Jive 500). For STED example implementations may use a beam from a Titanium-sapphire oscillator (Coherent MIRA HP-D, pumped by an 18 W 532 nm Verdi G-18 laser or Spectra Physics Tsunami 3941D, pumped by a 10 W 532 nm Millennia Xs laser) operated in CW mode. The MIRA beam was additionally passed through an Electro-optic Modulator (Conoptics, model 350-80) that enabled fast modulation of laser intensity. The STED beam was split into two beams that were independently phase modulated using a vortex phase plate (RPC Photonics, VPP-1a) with a 0-2π ramp that created the STEDxy doughnut profile and a liquid-crystal spatial modulator (Hamamatsu, LCOS-SLM X10468-02) programmed with a circular 0-π phase step that created the STEDz profile. The STEDxy and STEDz beams were combined with the excitation beams, passed through an achromatic quarter-waveplate (Edmund Optics) and delivered to the upper-tier right-side port of the microscope. Additional information on laser parameters is provided in Table 1.

TABLE 1

Laser parameters used in the various experiments (related to FIGS. 2-9, 10-14, 16 and STAR Methods).

| FIG. | 490 nm blue excitation | 642 nm red excitation | 780 nm STEDxy depletion | 780 nm STEDz depletion | Notes |
|---|---|---|---|---|---|
| 3B, 3C | — | 66 μW | 900 mW | — | |
| 3E, 3F | — | 15 μW | 200 mW | 450-600 mW | Also, 10 μW yellow 561 nm excitation interlaced with 642 nm at 50 Hz. |
| 3G | — | 5.5 μW | 400 mW | 700 mW | |
| 3H, 3I | — | 66 μW | 200 mW | 600 mW | Region first scanned with 200 μW yellow 561 nm excitation. |
| 4C | 3.5 μW | 12 μW | 370 mW | — | No STEDxy for TetR-Halo |
| 4I-4K | 0.08-0.12 μW | 1 μW | 100 mW | 400 mW | |
| 5B, 5D | 0.02-0.08 μW | 0.1 μW | — | — | 642 nm on-cycle: 0.4 sec every 10 sec |
| 6B | 1.9 μW | 20 μW | 320-400 mW | — | |
| 7A, 7C | 0.05 μW | 0.22 μW | — | — | 642 nm on-cycle: 0.4 sec every 10 sec |
| 8A-8C | 1.9 μW | 20 μW | — | — | 642 nm~10 sec bleaching: Sox2/Cdk9, 0.2 mW; Brd4, 0.36 mW; Med22, 0.6 mW. |
| 9B | 1.9 μW | 20 μW | 360-380 mW | — | |
| 10D | — | 1 μW | — | — | |
| 10F-10I | — | 66 μW | 200 mW | 600 mW | Region first scanned with 200 μw yellow 561 nm excitation. |
| 11D | 1.9 μW | 20 μW | 370 mW | — | |
| 12C | 0.08-0.12 μW | 1 μW | 0-400 mW | — | |
| 13J | 0.02-0.08 μW | 0.1 μW | — | — | 642 nm on-cycle: 0.4 sec every 10 sec |
| 14A-14D, 14F-14H | 0.16 μW | 1 μW | — | — | |
| 14I, 14J, 6K, 16L | 1.9 μW | 20 μW | — | — | |

STAR Methods: Detailed single-molecule STED Optical Setup. Microscope Optics. The example setup (FIG. 10A) was built around an inverted optical microscope base (Olympus, IX-71) with a two-tier multi-port design to accommodate selectable confocal/STED and wide-field light paths. Example implementations used a silicone oil immersion objective lens (Olympus UPLSAPO60XS, 60×, NA=1.30). For fluorescence excitation example implementations used two pulsed laser diodes operating at 490 nm and Fluorescence emission collected by the objective lens was back-propagated though the same optical path and separated from the excitation and STED beams using dichroic mirrors (Chroma/Semrock). Different emission wavelengths were then separated using additional dichroics and band-pass emission filters and focused onto 3 separate avalanche photo-diode (APD) detectors (Pico-Quant, Tau SPAD and Perkin-Elmer, SPCM-AQRH). The physical size of the APD active area corresponded to ~1 Airy disk unit. Alternatively, the fluorescence was separated using a quad-view device (Photometrics, QV2) and GFP, RFP and SiR were simultaneously imaged onto different quadrants of a back-illuminated EM-CCD detector (Andor iXon3 897). The CCD was operated either in Electron-Multiplication (EM) mode (running at 30 fps) or in conventional CCD mode (at 10 fps). For astigmatism-based axial localization, a weak cylindrical lens was inserted before the quad-view. Final magnification was 67 nm/pixel.

For inspecting cellular samples using wide-field epi-fluorescence, 4 laser beams (405 nm and 642 nm diodes, Thorlabs; 488 nm, Coherent Sapphire HP 500; 561 nm, Cobolt Jive 500) were combined and delivered through the back port of the IX-71 microscope using a multi-band dichroic mirror (Semrock). Fluorescence emission transmitted through the dichroic was imaged at the lower-tier left side-port of the microscope using appropriate relay optics and band-pass filters for BFP, GFP, RFP and SiR onto a back-illuminated EM-CCD (Andor Ixon 860). Selecting between wide-field and confocal/STED light paths was achieved by rotation of the IX-71 fluorescence cube turret.

Control Electronics and Software. The specimen holder was mounted on a direct drive, high-dynamics 3D nanopositioning stage (e.g., platform 190) equipped with capacitive sensors (Physik Instrumente, P-561.3DD), interfaced to a digital controller (Physik Instrumente E-710 or E-712). For 2D and 3D imaging, the built-in wave generator of the controller was programmed to raster-scan the specimen (e.g., via detection system 150) in a pre-defined trajectory over the stationary excitation and STED beams (from beam source 170). The actual trajectory achieved was monitored using the stage capacitive sensors and the position data obtained were used to reconstruct the final images. A typical 2 um×2 um, 8 second scan consisted of 80 lines and 8000 points were sampled to obtain the actual trajectory of the stage (100 points/line).

Individual fluorescence photons detected by the APDs were registered using time-tagging single-photon counting electronics (PicoHarp 300, PicoQuant) with ~4 psec temporal resolution. Instrument control, including communication with the nanopositioning stage controller and the photon-counting electronics was implemented in LabVIEW 2012 & 2014 (National Instruments). The wave generator ran under internal timing of the nanopositioning controller which served as the master clock for synchronization. Trigger pulses were sent to the photon-counting electronics to mark each raster line.

Analysis and image reconstruction may be performed using, for example, in MATLAB 2010b (MathWorks) or other suitable software running on computing device 110. Example implementations may extract the arrival time of each photon from the PicoHarp 300 data and, using the markers from the wave generator, example implementations may bin the detected photons in 1 ms intervals starting at the beginning of each line. Example implementations may then perform a 2D interpolation of the xy stage position and corresponding photon counts at each time-bin to a regular 200×200 grid (10 nm interval). The final image was then binned to a 40 nm pixel size.

For active feedback control, example implementations may adopt a custom LabVIEW program, optimized for fast CCD acquisition (via, e.g., detection system 150), real-time image analysis and active microscope stabilization using nanopositioning equipment (e.g., platform 190). The images obtained from the Ixon3 897 detector (e.g., detection system 150) were analyzed on the fly by non-linear least-squares fitting of a 21×21 pixel ROI to a 2D Gaussian peak function implemented in LabVIEW. Axial localization was achieved either though the degree of defocus or based on astigmatism. The coordinates returned by the 2D Gaussian peak fit were passed onto a PID controller that calculated the desired position correction that was commanded to the nanopositioning stage controller. The LabVIEW application ran at sustained speeds of up to 30 frames/second.

For real-time confocal and STED imaging, example implementations may program the wave generator to scan 2 μm×2 μm or 1 μm×1 μm xy areas in 0.8 sec or 0.2 sec respectively. 3D scanning was performed (via, e.g., detection system 150) by acquiring 5 xy scans while moving the stage by 0.5 μm in z between scans. TTL pulses corresponding to single-photon events from the APDs, together with the trigger pulses from the wave generator were detected using a field-programmable gate array (FPGA) data acquisition system (National Instruments, PCIe-7852R).

For target-locked FRAP experiments at the CMV minigene (FIG. 3), tdPCP-EGFP was tracked using a 0.02-0.08 μW 490 nm beam. SiR-Rpb1 was initially probed with a 0.1 μW 642 nm beam, bleached with 0.9 μW for ~10 sec and recovery was then monitored every 10 sec for 0.4 sec with 0.1 μW. For target-locked FRAP experiments at Pou5f1 (FIG. 5), MCP-EGFP was tracked using a 0.05 μW 490 nm beam. SiR-Rpb1 was initially probed with a 0.22 μW 642 nm beam, bleached with 0.9 μW for ~10 sec and recovery was then monitored every 10 sec for 0.4 sec with 0.22 μW.

Setup operation. For imaging live cells at 37° C. example implementations involve a stage incubator (part of, e.g., platform 190) with a temperature-controlled brass insert that can accommodate chambered coverglass specimens. Flexible kapton heaters and a thermistor sensor were used to control the temperature of the sample with a PID controller (Thorlabs, TC200). A separate set of heater, thermistor and PID controller regulated the temperature of the objective lens. To achieve the desired gas atmosphere, N2 O2 and CO2 were controlled (e.g., via computing device 110 or controller 114 thereof) independently by 3 electronic mass-flow controllers (Omega Engineering), and the gas mixture was passed through a bubbler humidifier before being delivered to the incubator.

Single-molecule in vitro experiments. Glass coverslips and slides were passivated with Poly-ethylene-glycol (PEG), but using 4-arm instead of linear PEG. The high resistance to non-specific adsorption was critical for successful single-molecule experiments at up to ~1 μM concentration, especially using Atto647N, one of the best-performing fluorophores under STED, for which previous attempts using surfactant-passivated surfaces had failed. Coverslips contained 1:100 mixture of biotin-PEG:PEG for immobilizing single molecules through biotin-streptavidin interactions. Flow cells were assembled with a PEG-coated glass slide that contained drilled holes and a PEG-coated glass coverslip, sandwiched with ~100-μm-thick double-sticky tape. Channels were block with 10% w/v BSA for 10 minutes, incubated with 50 ng/μL streptavidin for 10 minutes and rinsed with 1×PBS. 20-100 pM Cy3/biotin-labeled 15 nt target oligo (IDT, 5′Cy3-ACTCT<u>CTTCCTCATC</u>-3′Biotin-TEG, HPLC purified, 8 nt matching to the probe underlined) was then bound to the surface for 10 minutes, followed by 1×PBS rinse. The Atto647N-labeled probe oligo (IDT, 5′Atto647N-TGAGGAAGTC-3′, HPLC purified, 8 nt matching to the target underlined) was diluted in an imaging buffer containing 75 mM HEPES-KOH pH 7.5, 10 mM Potassium Glutamate, 0.18% w/v glucose, 1 mM Methyl Viologen, 1 mM Ascorbic Acid, a mixture of glucose oxidase and catalase enzymes (Pertsinidis et al., 2010) and 10 μM of a random 10 nt oligo as competitor (IDT, 5′-NNNNNNNNNN-3′). Depending on the concentration of the probe oligo, the imaging buffer also contained a variable concentration of NaCl (750, 500 and 100 NaCl for 300, 600 and 1000 nM probe respectively) in order to achieve 50:50 on-off binding equilibrium of the probe to the target.

A 2 μm×2 μm region was first scanned (via, e.g., detection system 150) in 8 seconds with 200 μW 561 nm excitation to localize immobile Cy3 molecules. Subsequently the nanopositioning stage (e.g., platform 190) was moved (via., e.g., computing device 110) to place a selected Cy3 molecule at the zero of the STED beams (from, e.g., beam source 170). Coordinate mapping transformations were calibrated using confocal images of stable 15 bp Cy3-Atto647N duplexes (IDT, Cy3-biotin target oligo described above and 5′Atto647N-AGATGAGGAAGAGAGT-3′, HPLC purified) obtained with 561 nm, 642 nm only and 642 nm+STED lasers. The focus position was adjusted by looking at the reflected images of the lasers beams on the left-side port CCD camera (part of, e.g., detection system 150). With the Cy3 placed at the STED zero, example implementations may obtain 40 second time traces, using 10 μW 561 nm and 15.2 μW 642 nm excitation beams interlaced at 50 Hz. The STED beams were off for the first 20 seconds and on for the last 20 seconds. Time-tagged single photon detection events were simultaneously recorded from the Cy3 and Atto647N APDs. Off-line data analysis was done in MATLAB (MathWorks, R2010b).

For experiments to characterize background level and noise of freely diffusing molecules in solution, sample cells were assembled using PEG coverslips and slides as described above. After 10% BSA blocking, variable concentrations of Atto647N-labeled streptavidin diluted in imaging buffer (75 mM HEPES-KOH pH 7.5, 55 mM Potassium Glutamate, 1.8% w/v Glucose, 1 mM Ascorbic Acid, 1 mM Methyl Viologen, glucose oxidase and catalase enzymes and 0.08~0.125 mg/mL unlabeled streptavidin) flowed in and the sample was sealed with tape and imaged. Atto647N time-tagged single-photon counting traces were acquired with the excitation and STED beams focused ~2 μm above the coverslip surface and into the solution.

For 2D imaging experiments in the presence of background from freely diffusing molecules in solution, the 15 bp Cy3-Atto647N duplex was immobilized on the PEG coverslip surface through biotin-streptavidin interactions as described for the Cy3-biotin-labeled oligo above. An Atto647N-labeled oligo was then diluted at 100-600 nM in imaging buffer (75 mM HEPES-KOH pH 7.5, 55 mM Potassium Glutamate, 1.8% w/v Glucose, 1 mM Ascorbic Acid, 1 mM Methyl Viologen, glucose oxidase and catalase enzymes and 500 □M random 10 nt oligo), flowed in and the sample was sealed with tape. A 2 μm×2 μm region was first scanned in 8 seconds with 200 μW 561 nm excitation to localize immobile Cy3 molecules and look for presence of co-localized Atto647N through FRET. The same region was then scanned two more times, once with 66 μW 642 nm excitation only, followed by 66 μW 642 nm plus 200 mW STEDxy and 600 mW STEDz 780 nm beams. Reconstructed 2D images were analyzed by calculating the total Atto647N photon counts within a certain radius r from the Cy3 position (r=180 nm and 100 nm for excitation only and excitation+STED respectively) and comparing with total photon counts from equal size regions where there was no Cy3 detected.

DNA constructs. An α-amanitin resistant mutant (Rpb1, N792D) of the large catalytic subunit of human Pol II was amplified from Flag-Pol-II WT (Addgene 35175) and cloned into a modified pSNAPf vector (NEB) that contained SNAP-tag with an N-terminal Flag-tag peptide, resulting in Flag-SNAP-Rpb1(αAmR).

The PB007-EF1α-Flag-SNAP-Rpb1(αAmR) vector was constructed in two steps. First CMV-Flag-SNAP-Rpb1 (αAmR) from Flag-SNAP-Rpb1 (αAmR) was cut and pasted into an empty piggyback transposon vector (Transposagen, PB007), resulting in PB007-CMV-Flag-SNAP-Rpb1 (αAmR). Next the CMV promoter was replaced by EF1α promoter (cloned from pEF1a-IRES-Neo, Addgene 28019), resulting in PB007-EF1α-Flag-SNAP-Rpb1 (αAmR).

The subunit Rpb9 of human Pol II was amplified from HeLa cell cDNA and cloned into pSNAPf (NEB) resulting in Rpb9-SNAP. Rpb9-SNAP then was PCR amplified, using a reverse primer with a Flag-tag peptide sequence and cloned into pCDNA4/TO (Invitrogen), resulting in Rpb9-SNAP-Flag.

The CMV mini-gene construct was assembled in multiple steps. First the ZsGreen1 sequence in pLVX-shRNA2 (Clontech) was replaced with mTagBFP2 (amplified from mTagBFP2-Lifeact-7, Addgene plasmid 54602), resulting in pLVX-shRNA2-CMV-BFP. Then 28×TetO sites were inserted upstream of CMV in 3 steps (7×TetO→14× TetO→28×TetO) using the 7×TetO sequence from TRE-TIGHT-EGFP-backward donor (Addgene 22077), resulting in pLVX-shRNA2-28×TetO-CMV-BFP.

A synthetic vector, pJ241-P[IRES-Puro], containing two multiple-cloning sites flanking an Internal Ribosome Entry Site followed by a Puromycin resistance gene (MCSA-IRES-Puro-MCSB) was provided by DNA2.0. The SV40 polyadenylation sequence was amplified from a gene-Block (IDT) and inserted downstream of IRES-Puro, resulting in pJ241-P[IRES-Puro-SV40 pA]. Then the 24×PP7 repeat sequence from pCR4-24×PP7SL (Addgene 31864) was cut and pasted resulting in pJ241-P[IRES-Puro-24×PP7-SV40 pA]. Subsequently CMV-BFP from the construct described above was cut and pasted, resulting in pJ241-P[CMV-BFP-IRES-Puro-24×PP7-SV40 pA]. The 28×TetO was then cut and pasted, resulting in pJ241-P[28×TetO-CMV-BFP-IRES-Puro-24×PP7-SV40 pA]. Finally the 28×TetO- . . . -SV40pA sequence from the pJ241 vector was cut and pasted into the MCS of an empty Piggybac transposon vector (Transposagen, PB007).

tdPCP-EGFP was amplified from phage-ubc-nls-ha-tdPCP-gfp (Addgene 40650) and cloned into a modified pCDNA4/TO vector in which the zeocin resistance gene had been replaced with a blasticidin resistance gene.

TetR was amplified from pCDNA6/TR (Life Technologies) and cloned into pCDNA4/TO. TagRFP was amplified from TagRFP-T-EEA1 (Addgene 42635) with a reverse primer containing an SV40 Nuclear-localization signal (NLS) sequence and cloned into pCDNA4/TO-tetR, resulting in tetR-RFP.

WT and Sox2M mutant Sox2 transient expression constructs were assembled in multiple steps. First EF1α promoter and SV40 terminator were amplified from gene-Blocks (Genscript) and inserted into an empty Piggybac vector (Transposagen Bio, PB007), resulting in PB007-EF1α-SV40. Next, Flag-SNAP-Sox2 WT/2M was amplified from gene-Blocks (Genscript) and cloned into PB007-EF1α-SV40, resulting in PB007-EF1α-Flag-SNAP-Sox2 WT/2M-SV40. Finally, IRES-Puro (amplified from the mini-gene construct) was inserted downstream of Sox2 WT/2M, resulting in PB007-EF1α-Flag-SNAP-Sox2 WT/2M-IRES-Puro-SV40. Sox2M contains 3 mutations in the HMG domain: M47G, F50G and M51G (Chen et al., 2014a; Remenyi et al., 2003).

Gene-targeting constructs. gRNAs were designed using an online tool (http://crispr.mit.edu/), with targeting regions near the translation start sites of the mouse Sox2, Cdk9, Brd4 and Med22 loci. The expected cut sites for are 32 bp, 40 bp and 68 bp after and 7 bp before the translation start sites (AUG codon) of Sox2, Cdk9, Med22 and Brd4 respectively. The target sequences are 5'-GAGACGGAGCT-GAAGCCGCCGGG-3' (Sox2-gRNA), 5'-GGAATGCCCGTTCTGCGATGAGG-3' (Cdk9-gRNA), 5'-ATCCCATCACATTCTTCACCAGG-3' (Brd4-gRNA) and 5'-AGACGACATCAAGTCCATCATGG-3' (Med22-gRNA) (PAM underlined). For gRNA cloning, oligo pairs containing partially complementary sequences were annealed and ligated into the BbsI site of espCas9 (Addgene 71814), resulting in espCas9-gRNA-Sox2, -Cdk9, -Brd4 and -Med22 respectively.

A Sox2 targeting construct was generated for integrating a SNAP-tag at the N-terminus of the endogenous Sox2. First, a gene block was synthesized containing the Sox2 5'-UTR (423 bp) as a left homology arm (HA-L), followed by a sequence encoding Flag-GGSG spacer-SNAP-tag, and finally a Sox2 exon 1 sequence (750 bp) as a right homology arm (HA-R). In the HA-R, 4 silent mutations were included to prevent re-cutting by Sox2-gRNA-programmed CRISPR/Cas9. Finally, the gene block was inserted into the EcoRV site of pUC57.

A Cdk9 targeting construct was generated for integrating a SNAP-tag at the N-terminus of the endogenous Cdk9. First, a gene block was synthesized containing part of Cdk9 promoter and 5'-UTR sequences (610 bp) as a HA-L, followed by a sequence encoding Flag-GGSG spacer-SNAP-tag, and finally a Cdk9 exon 1 sequence (752 bp) as a HA-R. In the HA-R, 3 silent mutations were included to prevent re-cutting by Cdk9-gRNA-programmed CRISPR/Cas9. Finally, the gene block was inserted into the EcoRV site of pUC57.

A Brd4 targeting construct was generated for integrating a SNAP-tag at the N-terminus of the endogenous Brd4. First, a gene block was synthesized containing part of Brd4 intron (714 bp) and 5'-UTR sequences (33 bp) as a HA-L, followed by a sequence encoding Flag-GGSG spacer-SNAP-tag, and finally a Brd4 exon 1 and part of intron 1 sequence (750 bp) as a HA-R. In the HA-L, 1 bp deletion in the 5'-UTR was made to prevent re-cutting by Brd4-gRNA-programmed CRISPR/Cas9. Finally, the gene block was inserted into the EcoRV site of pUC57.

A Med22 targeting construct was generated for integrating a SNAP-tag at the N-terminus of the endogenous Med22. First, a gene block was synthesized containing part of Med22 promoter (173 bp) and 5'-UTR sequences (227 bp) as a HA-L, followed by a sequence encoding Flag-GGSG spacer-SNAP-tag, and finally a Med22 exon 1 and part of intron 1 sequence (750 bp) as a HA-R. In the HA-R, 3 silent mutations were included to prevent re-cutting by Med22-gRNA-programmed CRISPR/Cas9. Finally, the gene block was inserted into the EcoRV site of pUC57.

Validation of CRISPR/Cas9 gRNAs. To test the efficiencies of the gRNAs, 0.25 of espCas9-gRNA-Sox2, -Cdk9, -Brd4 or -Med22 were transfected into $1 \times 10^4$ WT mESCs (Bruce 4 C57BL/6) respectively using Lipofectamine 2000 (Invitrogen 11668019). Genomic DNA was extracted 5 days post-transfection using High Pure PCR Template Preparation Kit (Roche 11796828001). To test the cutting efficiency of espCas9-gRNA-Sox2 and espCas9-gRNA-Med22, a surveyor assay was performed using Surveyor Mutation Detection Kit S100 (IDT 706020). Briefly, DNA samples were PCR-amplified by Herculase II Fusion DNA Polymerase (Agilent 600675) using site-specific primers, the PCR products were denatured by heating-up and then cooled down to form heteroduplexes. Mismatched duplexes were then cleaved by Nuclease S and cleavage products were detected by gel electrophoresis. To test the cutting efficiency of espCas9-gRNA-Cdk9 and espCas9-gRNA-Brd4, a 220-bp amplicon was obtained by Herculase II Fusion DNA Polymerase (Agilent 600675), using specific primers spanning the Cdk9-gRNA and Brd4-gRNA targeting regions. Samples were then submitted for DNA sequencing based on the Illumina HiSeq platform at the Massachusetts General Hospital NextGen Core facility. Single-end reads in FASTA format were obtained from the deep-sequencing data, and used as inputs to analyze the cutting efficiency with CRIS-PResso (http://crispresso.rocks/) (Pinello et al., 2016).

Mini-gene integration characterization. Genomic DNA from CMV clones 5 and 6 was extracted using GenElute™ Mammalian Genomic DNA Miniprep Kit (Sigma-Aldrich). In order to isolate and identify the insertion sites, splinkerette PCR was performed, using PiggyBac™ splinkerette PCR Kit (Transposagen). The PCR products were cloned (Invitrogen, TOPO® TA Cloning® Kit) and sequenced. The genomic sequences beyond the TTAA junctions that were obtained were used to map the integration sites to the human genome with BLAT (https://genome.ucsc.edu/cgi-bin/hgBlat?command=start). Three out of four integration sites (5-2, 6-1, 6-2) were successfully mapped to specific genomic locations (Table 2), while 1 integration site (5-1) is mapped to a SINE element, predicted to exist at thousands of genomic locations.

TABLE 2

Mini-gene integrations characterization (related to FIGS. 4 and 11)

| Clone-Site | Genomic sequence obtained by Splinkerette PCR | Integration site | Annotation | Additional flanking genomic sequence obtained by Junction PCR | | Predicted fragment (Southern) |
| --- | --- | --- | --- | --- | --- | --- |
| | | | | 5' Junction | 3' Junction | |
| 5-1 | 30 bp | n.a. | Repeat AluJB SINE element | n.a. | n.a. | n.a. |
| 5-2 | 105 bp | chr10: 105,051,515-105,051,619 | SORCS3 gene | 830 bp | — | 4 kb |
| 6-1 | 92 bp | chr6_GL000251v2_alt: 163,555-163,646 | Centromeric region | 784 bp | 175 bp | 4.4 kb |
| 6-2 | 131 bp | chr19: 53,833,263-53,833,393 | LTR element | 776 bp | 370 bp | 4 kb* |

*Due to a G→C single-mutation at chr19: 53833111 that results in a PvuII restriction site (FIG. 11B).

In order to verify the integration sites obtained by splinkerette PCR, locus-specific primer pairs were designed near both ends of the identified integration sites and junction PCR was carried out. Example implementations may obtain expected size products for all junction PCRs, except for the 5-2 3' junction. The PCR products were subsequently cloned (Invitrogen, TOPO® TA Cloning® Kit) and sequenced. Sequence results that matched the expected genomic integration sites were obtained for the junctions that had showed correct size PCR products (Table 2).

Example implementations verify correct integration of single intact copies of the mini-genes at the mapped positions using Southern blotting. A digoxigenin-labeled probe specific to the Puromycin-resistance gene in our construct was prepared by PCR (Roche, PCR DIG Probe Synthesis Kit). Genomic DNA from clones 5 and 6 were digested by HindIII and PvuII, separated by gel electrophoresis and transferred onto a nylon membrane. The DIG-labeled Puro probe was hybridized at 65° C. overnight, stained with anti-DIG-AP Fab fragments and detected by chemiluminescence (DIG-High Prime DNA Labeling and Detection Starter Kit II, Roche). The results of the Southern blotting showed two bands for each clone (FIG. 11A), which further verifies the presence of two integration sites in both clone 5 and 6. The sizes of the bands match the predicted sizes based on the distance of the HindIII site in the mini-gene and the nearest 3' PvuII (or in the case of 6-1, the nearest 3' HindIII) site on the genome (Table 2). Based on the reference human genome sequence (hg19), a 6.1 kb band for site 6-2 may be expected, but a 4 kb band may instead be obtained. Upon further inspection of the genomic sequence obtained by junction PCR, a point-mutation (G→C at chr19:53833111) that creates a PvuII site near the 6-2 3' junction (FIG. 11B) was found, thus explaining the observed 4 kb vs. 6.1 kb band.

Finally, the total copy number of mini-gene integrations is quantified using quantitative real time PCR (qPCR) in example implementations. Primer pairs were designed for 4 internal mini-gene regions (Puro, BFP, TetO, SV40) and the 5 mapped (mini-gene)-genome junctions. qPCR was performed on a 7500 Real Time PCR system (ABI), using KAPA-SYBR® FAST Master mix ABI Prism™ (KAPA Biosystems #KK4604) and with 10 ng of genomic DNA in duplicate 10 µl reactions. Final primer concentration was 100 µM. All reactions used standard ABI cycling conditions (initial 2 min at 50° C., denaturation 5 min at 95° C., 40 cycles of 10 sec at 95° C., annealing and extension for 1 min at 60° C.). Copy number for each sequence was determined from the Ct of the genomic DNA reactions, using a calibration curve obtained from 10-fold serial dilution (106-100 copies per reaction) of synthetic dsDNA fragments (IDT, gBlocks). Quantification of the internal sequences relatively to the junction sequences (expected to be unique in the genome) indicates 2.03±0.34 (mean±S.D., n=3-5 biological replicates) mini-gene integrations (FIG. 11C).

It is noted that when imaging individual cells, identifying which transcription site (tdPCP-EGFP spot) corresponds to which integration site may not be possible. However, both tdPCP-EGFP tagged transcription sites seem to behave very similarly, arguing that the CMV mini-gene transcription is not significantly affected by the position that it is integrated in the genome. The mini-genes are flanked by insulators that are expected to further reduce the effects of the nearby chromatin environment. Most of the data in the paper were obtained with clone "5" and similar results were obtained in experiments with clone "6", further suggesting limited effects of the specific genomic integration site.

ChIP-qPCR analysis of Pol II after flavopiridol treatment. U2-OS cells. Fast chromatin immuno-precipitation was performed as described. Confluent 15 cm dishes (20×106 cells) were treated with 10 µM Flavopiridol or DMSO for the indicated times. Methanol-free formaldehyde (Thermo Fisher) was then directly added to the media to 1% v/v final concentration, and dishes were immediately placed on a rotator/shaker for 10 minutes at RT. Formaldehyde was quenched with 125 mM glycine for 5 min at RT, and cells were scraped and collected with centrifugation (2,000 g, 5 min at 4° C.) and washed twice with cold PBS. Cells were lysed in buffer IP (150 mM NaCl, 50 mM Tris-HCl pH 7.5, 5 mM EDTA, 0.5% v/v NP-40, 1.0% v/v Triton X-100) containing protease inhibitors, centrifuged (12,000 g, 1 min at 4° C.), and after one wash, the pellet was resuspended in buffer IP+protesase inhibitors. Volume equivalent to 4×106 cells was sonicated to shear the chromatin (Bioruptor indirect sonicator), and cleared using centrifugation (12,000 g, 10 min at 4° C.). The supernatant was diluted 1:10 in buffer IP+protease inhibitors, pre-cleared using Protein G PLUS-Agarose beads (Santa Cruz Biotech; pre-blocked with salmon-sperm DNA), for ~2 hr at 4° C., centrifuged, and 10% of the pre-cleared supernatant was kept at −20° C. as input. The rest of the sample was split in two halves, one used as a no-antibody control and one mixed with 3 µg with a monoclonal anti-FLAG antibody (M2, Sigma Aldrich F1804) to immuno-precipitate FLAG-SNAP-Rpb1. Samples were incubated overnight at 4° C., and then mixed and rotated for another 2 hr at 4° C. with Protein G PLUS- Agarose beads. The beads were spun-down and then washed at least 5 times with ice-cold buffer IP+protease inhibitors. Chelex 100 resin (Bio-Rad, cat. no. 142-1253), 10% w/v in water, was added to the washed beads. The 10% input sample was precipitated with 3 volumes of ethanol at −20° C., and the precipitated pellet was resuspended, bound to Chelex resin and subsequently processed as the rest of the samples. The samples were boiled for 10 min, and once cool, Proteinase-K was added, incubated 30 min at 55 □C and then Proteinase-K was inactivated by boiling for 10 min. Beads and chelex resin were spun down, and chelex-bound DNA was eluted in water. Eluted chromatin was analyzed with qPCR, using primer pairs specific for different mini-gene regions (FIGS. 13I, 13J).

mESCs. Confluent 15 cm dishes (~10×106 OMG SNAP-Rpb1 clone 3 cells) were treated with 10 µM Flavopiridol or DMSO for the indicated times. Methanol-free formaldehyde (Thermo Fisher) was then directly added to the media to 1% v/v final concentration, and dishes were immediately placed on a rotator/shaker for 10 min at RT. Formaldehyde was quenched with 125 mM glycine for 5 min at RT, and cells were scraped and collected with centrifugation (800×g, 5 min at 4° C.) and washed twice with cold PBS. Cells were lysed with SDS lysis buffer (50 mM Tris-HCl pH 8, 10 mM EDTA, 1% SDS) containing protease inhibitors, and placed on ice for 10 min. Volume equivalent to 2×106 cells was sonicated to shear the chromatin (Branson SFX 150), and cleared using centrifugation (12,000 g, 10 min at 4° C.). The supernatant was diluted 1:10 in dilution buffer (0.01% SDS, 1.1% Triton X-100, 1.2 mM EDTA, 16.7 mM Tris-HCl pH 8, 167 mM NaCl)+protease inhibitors, pre-cleared using magnetic Protein G beads (Thermo Fisher Scientific 10003 D), for ~2 hr at 4° C., cleared by separating the beads with a magnet, and 2% of the pre-cleared supernatant was kept at −20° C. as input. The rest of the sample was split in two halves, one used as a no-antibody control and one mixed with 5 µg of a monoclonal anti-FLAG antibody (M2, Sigma Aldrich F1804) to immuno-precipitate FLAG-SNAP-Rpb1. Samples were incubated overnight at 4° C., and then mixed and rotated for another 4 hr at 4° C. with magnetic Protein G beads. The beads were then washed sequentially with ice-cold low salt buffer (0.1% SDS, 1% Triton X-100, 2 mM EDTA, 20 mM Tris-HCl pH 8, 150 mM NaCl), high salt buffer (0.1% SDS, 1% Triton X-100, 2 mM EDTA, 20 mM Tris-HCl pH 8, 500 mM NaCl), LiCl immune complex buffer (0.25 M LiCl, 1% IGEPAL-CA630, 1% deoxycholic acid, 1 mM EDTA, 10 mM Tris-HCl pH 8) and TE buffer (10 mM Tris-HCl pH 8, 1 mM EDTA). All the samples as well as the inputs were incubated with elution buffer (50 mM Tris-HCl pH 8, 10 mM EDTA, 1% SDS)+Proteinase-K, at 62° C. for 2 hr with shaking. The samples were then boiled for 10 min, and once cool, the supernatants were collected after using a magnet to separate the beads. DNA was then purified by Qiaquick PCR purification kit (Qiagen 28104). Eluted chromatin was analyzed with qPCR, using primer pairs specific for different Pou5f1/Oct4 regions.

ChIP-qPCR analysis of H3K27ac after A-485 treatment. For H3K27ac and H3 ChIP-qPCR experiments, confluent 10 cm dishes (~3×106 OMG SNAP-Sox2 cells) were treated with 1 µM A-485 (Structural Genomics Consortium) or 0.1% v/v DMSO for the indicated times. Fixation, cell lysis, sonicated chromatin preparation, immunoprecipitation and qPCR analysis were performed as described for OMG SNAP-Rpb1 cells in the previous section, with the exception that 5 µg H3K27ac antibody (Active Motif 39685) or 5 µg H3 antibody (Active Motif 39763) were used for each IP respectively.

Preparation of cells for live-cell imaging (wide-field and confocal/STED). All the U2-OS-derived cell lines were maintained in complete McCoy's 5A media (GE Healthcare) without phenol-red and with the appropriate selection drugs, at 37° C., in a humidified 5% CO2 incubator. 106 CMV mini-gene clone 5 and 6 cells were nucleofected with 0.2 µg tdPCP-EGFP and 0.5 µg tetR-RFP plasmids (Amaxa kit VCA-1003, Lonza) and seeded in collagen-coated 8-chamber coverglass (LabTek, 155411), in media containing α-amanitin only. 1-3 days post-nucleofection cells were stained with SiR-BG and used for imaging experiments. To achieve full staining, cells were incubated with media containing 1 µM SiR-BG for 1-1.5 hrs. Decreasing SiR to 0.3 µM or increasing SiR to 3 µM had no significant effect on the SiR-Rpb1 signal at the transcription sites, indicating 100% labeling saturation. To achieve reduced staining, cells were incubated with media containing 0.3 µM SiR for 10 minutes. This modified protocol results in 20-25% of maximum staining, as estimated by the 4-5× reduction in steady-state plateau level Bd that reflects level of diffusing Pol II in the nucleus. Cells were then once rinsed with new media, placed in new media containing α-amanitin and imaged 15 min to a few hours after.

All the mESCs were cultured and maintained in +2i media with appropriate selection drugs on 0.1% gelatin-coated dishes, at 37° C. in a humidified 5% CO2 incubator. +2i media contain D-MEM (Thermo Fisher Scientific 10313021), 15% fetal bovine serum (Gemini Bio 100-500), 0.1 mM β-mercaptoethanol (Thermo Fisher Scientific 21985023), 2 mM L-alanyl-L-glutamine (Thermo Fisher Scientific 35050079), 1×MEM nonessential amino acids (Thermo Fisher Scientific 11140076), 1000 U/mL LIF (Millipore ESG1107), 3 CHIR99021 (Millipore 361559) and 1 µM PD0325901 (Axon Medichem 1408). OMG and NMG SNAP-Rpb1 cells were cultured with +2i media plus 3 µg/ml α-amanitin.

Before imaging, cells were seeded onto 8-chamber coverglass (LabTek, 155411) coated with 5 µg/ml laminin (BioLamina LN511), in −2i media (OMG) or +2i media (NMG) and appropriate drugs. For SiR staining, cells were labeled with media containing 0.3 µM SiR-BG for 10 mins, at 37° C., followed by three washes with new media.

Transient expression of WT and 2M mutant Sox2. OMG-1 cells (1×10$^6$) were transfected with 10 µg PB007-EF1α-Flag-SNAP-Sox2 WT/2M-IRES-Puro-SV40 and 1 µg pCMV-hyPBase vectors using Lipofectamine 2000 (Invitrogen 11668019). One day post-transfection, cells were transferred onto laminin-coated coverglass chambers in −2i+ G418 media and imaged after 1-2 days (for details see Preparation of cells for live-cell imaging).

Preparation of fixed cells for GFP nanobody super-resolution imaging. For super-resolution imaging of tdPCP-EGFP at the transcription site, cells were nucleofected and seeded in 8-chamber coverglass samples as outlined above. Media were removed, cells were briefly rinsed with RT 1×PBS and then fixed with 4% methanol-free formaldehyde (Thermo Fisher) in 1×PBS for 10 min at RT, washed with 1×PBS and quenched with 50 mM NH4Cl in 1×PBS for 5 minutes. Following 3×10 minute washes in 1×PBS, cells were permeabilized for 10 minutes with 0.5% Triton X-100 in 1×PBS, and blocked for 10 minutes with Image-iT FX Signal Enhancer reagent (Cell Signaling Technology) and 1.5 hrs with 5% w/v BSA in 1×PBS. Then the cells were stained with ~20 nM GFP nanobody (Chromotek, GFP-Trap) that was labeled using Alexa 647-NHS (Life Technologies) at ~1:1 dye:nanobody ratio in 5% BSA/×PBS. After 3×5 minute washes in 1×PBS, cells were imaged in photo-switching buffer that contained 75 mM HEPES-KOH pH 7.5, 0.9% w/v Glucose, 55 mM Potassium Glutamate, 100 mM β-Mercaptoethylamine and a mixture of glucose oxidase and catalase enzymes.

Preparation of fixed cells for SiR-Rpb1 confocal/STED imaging. Cells were nucleofected, seeded in 8-chamber coverglass samples and stained with SiR as outlined above. Media were then removed, cells were briefly rinsed with 1×PBS pre-warmed at 37° C. and then fixed with pre-warmed 4% methanol-free formaldehyde (Thermo Fisher) in 1×PBS for 10 min at 37° C. and washed with 1×PBS at RT. Imaging was performed in buffer that contained 75 mM HEPES-KOH pH 7.5, 0.9% w/v Glucose, 55 mM Potassium Glutamate, 1 mM methyl viologen, 1 mM ascorbic acid and a mixture of glucose oxidase and catalase enzymes.

Additional Wide-Field Imaging Optical Setups. Routine cell observations were performed using a commercial epi-fluorescence microscope (Zeiss, Axiovert 200), equipped with an oil-immersion objective lens (Zeiss, Plan-apochromat 63× NA=1.4), a mercury lamp illuminator (VSG HBO100/001-26E), filter sets for DAPI (used for BFP), GFP, TMR (used for RFP) and Cy5 (used for SiR), and a scientific CCD (Hamamatsu, ORCA Flash part #C47428012AG). Image acquisition and analysis was performed using AxioVision software (release 4.8.2).

Home-made super-resolution setup. A wide-field single-molecule and super-resolution imaging setup was built using custom and off-the-shelf opto-mechanics parts (Thorlabs). A custom-machined plate supported a combination of a high-stability coarse positioning stage (Physik Instrumente M-686, with C-867 controllers) with a nanopositioning state (Physik Instrumente P-517.3CD, with E-710.3CD controller). Example implementations may use an oil immersion objective lens (Nikon 60×, NA=1.49) that was mounted on a coarse positioner (Physik Instrumente ND72Z9LAQ with E-861 controller) supported on a 30 mm cage structure (Thorlabs). For fluorescence excitation and photo-switching, 405 nm (Thorlabs laser diode), 488 nm (Coherent Sapphire HP 500), 532 nm (Coherent Verdi G-2) or 561 nm (Cobolt Jive 500) and 640-642 nm (Coherent Cube 640-100C or MPB Communications VFL642, 2W) laser beams were combined using dichroics and focused at the back-focal plane of the objective lens to achieve epi-illumination. A dynamic diffuser (Optotune) was used to reduce laser speckle and interference effects and achieve a spatially homogeneous illumination profile. Fluorescence signal was imaged with an achromatic lens, split using a quad-view device (Photometrics, QV2) and separate images for GFP, RFP and SiR/Alexa 647 were projected on different quadrants of a back-illuminated EM-CCD (Andor Ixon3 897). Final image magnification was ~160 nm/pixel.

A home-made temperature-controlled stage incubator, similar to the one used in our STED microscope described earlier, with independent mass-flow controllers (Omega) for N2, CO2 and O2, was used for live cell imaging experiments. A separate heater and temperature controller were used for the objective lens.

Wide-Field Cell Imaging Experiments. Live cell imaging experiments (tdPCP-EGFP and MCP-mNeonGreen tracking). For time-lapse imaging, a z-stack of 11 frames at 1 frame/second was acquired, by stepping the sample along the z-axis using the nanopositioning stage (250 nm steps). The CCD data were analyzed using IDL 6.4 (ITTVIS). Maximum projection images were calculated for each stack, and the resulting 11 sec/frame movie was used to track the intensities of individual tdPCP-EGFP-tagged transcription sites. A particle tracking routine (Crocker and Grier, 1996) was used for finding the positions of the transcription site in each frame and linking them into a 2D trajectory. The intensity trace of tdPCP-EGFP at the transcription site was corrected for photo-bleaching using the time trace of tdPCP-EGFP in a nearby nuclear region. The auto-correlation function was calculated (for the tdPCP-EGFP fluctuation analysis), or the data were imported in Origin 8.5.0 (OriginLab) and the trace fitted to a single-exponential decay (for the transcription inhibition experiments).

Live cell imaging experiments (SiR-Rpb1 FRAP). For SiR-Rpb1 FRAP experiments, time lapse images were acquired at 1 fps at a focal point adjusted at the mid-plane of the nucleus. To bleach molecules at a spot in the nucleus, an iris was used to block all but a small circle in the center of the excitation beam, the dynamic diffuser was removed and ~7 kW/μm2 642 nm laser power was applied for ~10 seconds. Then, the 642 nm laser power was reduced to ~7 W/μm2, the diffuser was put back in the optical path (resulting in additional drop in the power reaching the sample), the iris was removed and time-lapse acquisition continued. The recovery trace of SiR-Rpb1 at the bleached spot was corrected for photobleaching using the intensity of nearby (non-photobleached) regions in the nucleus.

Super-resolution imaging. For super-resolution imaging based on single-molecule switching, the dynamic diffuser was removed to achieve higher laser power (~7 kW/μm2 at 642 nm). Once most of the Alexa 647 had switched off and single-molecule blinking events were visible (~16 seconds after (~7 kW/μm2 642 nm power was applied), example implementations may acquire 20,000 frames at 36 fps (Ixon3 detector settings: 3 MHz, 5.1× gain, conventional read-out port). Data analysis was performed with the ThunderSTORM ImageJ plug-in (Ovesny et al., 2014). Estimated xy localization precision was ~11 nm. The distributions of single-molecule localizations from individual transcription sites were analyzed using Origin 8.5.0.

An example experimental model and subject details will now be discussed. Cell line generation. U2-OS cells (ATCC) were transfected with Flag-SNAP-Rpb1 (amaR) plasmid and selected with 1 μg/mL α-amanitin. Individual α-amanitin-resistant colonies were picked, expanded, labeled with SiR-BG and imaged. In the presence of α-amanitin the endogenous Rpb1 is degraded and the cells survive solely on the SNAP-tagged version of Pol II (Nguyen et al., 1996). A single clone (dubbed "Rpb1 clone 2-5") that showed SiR nuclear staining consistent with expected Pol II distribution (diffuse and punctuated signal in nucleus together with absence of signal from cytoplasm and nucleoli) was selected for all further experiments.

T-Rex HeLa cells (Invitrogen) were transfected with Rpb9-SNAP-Flag plasmid and selected with zeocin. Individual zeocin-resistant colonies were picked, expanded and labeled with SNAP-Cell TMR reagent (NEB). A single clone that showed minimal TMR signal in absence of tetracycline and strong TMR signal in presence of tetracycline was used for all further experiments.

Rpb1 clone 2-5 cells were transfected with the CMV mini-gene plasmid and either a plasmid expressing piggy-Bac transposase (Transposagen, sPBo) or GFP (Lonza, pMaxGFP) as a control. Cells were selected with 1 μg/mL puromycin for 2 weeks. ~5-fold more puromycin-resistant colonies were obtained for sPBo vs. pMaxGFP, indicating transposase-specific genomic integration. Individual puromycin-resistant colonies were picked, expanded, transfected with tdPCP-EGFP and tetR-RFP plasmids and imaged. Two BFP-positive clones (dubbed as CMV clones "5" and "6")

from the CMV mini-gene/sPBo transfection that showed each two transcription sites in the nucleus were selected for all further experiments.

OM mESCs contain a 24×MS2 cassette integrated in the 3'-UTR of one of the two Pou5f1 (Oct4) alleles. OM cells (1×106) were transfected with 10 μg pPB-LRS-CAG-MCP-mNeonGreen-IRES-Neo and 1 μg pCMV-hyPBase vectors using Lipofectamine 2000 (Invitrogen 11668019). cDNA of mNeonGreen was originally provided by Allele Biotechnology. After incubation for 2 days, cells were subjected to 400 μg/ml G418 (Sigma G8168) selection. Individual colonies were picked, expanded, and imaged. Two single clones (OMG-1, OMG-2) that showed bright MCP-mNeonGreen-tagged Pou5f1 nascent transcription sites were selected for all the further experiments.

NMG mESCs contain 24×MS2 cassettes integrated in the 3'-UTR of both Nanog alleles and also stably express MCP-mNeonGreen (Ochiai et al., 2014).

OMG-1 or NMG mESCs (1×106) were transfected with 10 μg PB007-EF1α-Flag-SNAP-Rpb1 (αAmR) and 1 μg pCMV-hyPBase vectors using Lipofectamine 2000 (Invitrogen 11668019). Cells were subjected to 3 mg/ml α-amanitin 2 days post-transfection. Individual α-amanitin-resistant colonies were picked after ~2 weeks, expanded, labeled with SiR-BG and imaged. Single clones (dubbed "OMG SNAP-Rpb1 clone 3" and "NMG SNAP-Rpb 1 clone 3" respectively) that showed SiR nuclear staining consistent with expected Pol II distribution (diffuse and punctuated signal in the nucleus together with absence of signal from cytoplasm and nucleoli) were selected for all further experiments.

Targeted integration of SNAP-tag in the endogenous Sox2, Cdk9, Brd4 and Med22 genes. To generate OMG or NMG SNAP-Sox2 targeted cells, OMG-1 or NMG mESCs (1×106) were transfected with 10 μg SNAP-Sox2 donor vector and 0.6 μg espCas9-gRNA-Sox2 vector. 10 days after transfection, the cells were trypsinized, labeled with 0.3 μM SiR-BG for 10 mins, rinsed three times with new media, followed by immediate fluorescence-activated cell sorting (FACS). All the SiR-positive cells were collected, expanded for ~2 weeks, trypsinized, labeled with SiR-BG and sorted again. Almost 100% SNAP positive pools were obtained from the second round of sorting and individual clones were picked and expanded. Homozygous clones (dubbed "OMG SNAP-Sox2 clone 8" and NMG SNAP-Sox2 clone 3" respectively) with both Sox2 alleles correctly targeted with SNAP-tag integrations and that show SiR nuclear staining were selected for all further experiments.

To generate OMG SNAP-Cdk9 targeted cells, OMG-1 mESCs (1×106) were transfected with 10 μg SNAP-Cdk9 donor vector and 0.6 μg espCas9-gRNA-Cdk9 vector. 10 days after transfection, the cells were trypsinized, labeled with SiR-BG and subjected to FACS, generating a first-round SiR-positive pool. This pool was then expanded, stained with SiR-BG and subjected to second FACS round and individual clones were picked and expanded. A heterozygous clone (dubbed "OMG SNAP-Cdk9 clone17-8") with one Cdk9 allele correctly targeted with a SNAP-tag integration and that shows SiR nuclear staining was selected for all further experiments.

To generate OMG or NMG SNAP-Brd4 targeted cells, OMG-1 or NMG mESCs (1×106) were transfected with 10 μg SNAP-Brd4 donor vector and 0.6 μg espCas9-gRNA-Brd4 vector. 10 days after transfection, the cells were trypsinized, labeled with SiR-BG and subjected to FACS, generating a first-round SiR-positive pool. This pool was then expanded, stained with SiR-BG and subjected to second FACS round and individual clones were picked and expanded. Homozygous clones (dubbed "OMG SNAP-Cdk9 clone 9" and NMG SNAP-Brd4 clone 7" respectively) with two Brd4 allele correctly targeted with a SNAP-tag integration and that shows SiR nuclear staining was selected for all further experiments.

To generate OMG SNAP-Med22 targeted cells, OMG-1 mESCs (1×106) were transfected with 10 μg SNAP-Med22 donor vector and 0.6 μg espCas9-gRNA-Med22 vector. 10 days after transfection, the cells were trypsinized, labeled with SiR-BG and subjected to FACS, generating a first-round SiR-positive pool. This pool was then expanded, stained with SiR-BG and subjected to second FACS round and individual clones were picked and expanded. A heterozygous clone (dubbed "OMG SNAP-Med22 clone 17") with one Med22 allele correctly targeted with a SNAP-tag integration and that shows SiR nuclear staining was selected for all further experiments.

Quantification and statistical analysis illustrates theoretical considerations for background suppression and single-molecule detection using STED. Types of background noise in single-molecule detection. The signal of a molecule at a predefined 3D coordinate is masked by intensity fluctuations due to an ultimately overwhelming number of n background molecules within the detection volume (FIG. 3A). Two main types of intensity fluctuations are expected to dominate for different experimental systems and measurement regimes. For a closed system, n remains constant during the measurement, and shot noise due to the stochastic nature of fluorescence emission dominates. For shot noise the intensity I, given by $I=n\varepsilon$ ($\varepsilon$: molecular brightness), follows a Poisson distribution, characterized by a variance $\delta I_{shot}^2 = I = n\varepsilon$. Thus $SNR \sim \sqrt{\varepsilon/n}$ and single-molecule detection ($SNR > 1$) is in principle achievable at high molecular brightness ($\varepsilon \gg n$). A fundamentally different situation emerges in open systems, where n can fluctuate. In the simplest case of freely diffusing molecules in a 3D solution, n is Poisson-distributed ($\delta n = \sqrt{n}$), thus giving rise to intensity fluctuations $\delta I_{number}^2 = n\varepsilon^2$. For number fluctuations $SNR \sim \sqrt{1/n}$, thus, irrespective of molecular brightness, single-molecule detection becomes impossible above a certain concentration ($SNR < 1$ for $n \gg 1$).

Under low brightness conditions ($0.5 < \varepsilon < 3$), often used in fluorescence correlation spectroscopy, small deviations from Poisson (characteristic of number fluctuations) were seen in the tails of photon-counting (intensity) histograms at ~1-50 nM molecules in solution. It was further intuitively proposed that the relative effect of number fluctuations diminishes at high concentrations, with the largest deviations from Poisson expected at increasing $\varepsilon$ and decreasing n. However, the molecular concentration and brightness regimes where (Poisson) shot noise and (super-Poisson) number fluctuations respectively dominate, and how these relate to conditions relevant to single-molecule detection ($\varepsilon \gg 1$), have not been fully characterized. Disclosed results (FIGS. 3B, 3C, 10B) strongly suggest that super-Poisson noise dominates at up to 1 μM solution concentrations.

Contributions of other sources of noise. When measuring the fluorescence signal of a single molecule, additional noise sources can play a role: the intrinsic Poisson noise of the molecule's fluorescence emission, the background from cellular autofluorescence, and noise sources dependent on parameters of the detector in use, such as (effective) Quantum Efficiency (QE), as well as read-out and dark noise contributions. Here a detailed account of the relative contributions of these various sources of noise is provided:

Poisson emission statistics. Under the experimental conditions used in this paper, single-molecule brightness corresponds to 100-1000 photons per time-bin or camera exposure (e.g. FIGS. 3E, 4I-4K, 10F-10I, 11M-11Q, 14E, 14F). The intrinsic Poisson noise (10-30 photons) is a negligible contribution to the overall noise, providing in this ideal case SNR~1:10-1:30.

Cellular autofluorescence, laser scattering and other sources of background. The total background in the SiR detection channel when imaging an unstained sample is merely ~1% of the background level when imaging a fully SiR-stained sample. This shows that the combined effects of cellular autofluorescence, laser scattering, cross-talk from GFP/mNeonGreen fluorescence and detector dark counts are only minor contributions to the total noise under our experimental conditions.

Detector QE and read-out noise. Example implementations may use a back-illuminated (EM)-CCD or a far-red-optimized APD, providing >90% and 70% QE at 670 nm (Cy5/SiR emission) respectively. When operating the CCD in electron-multiplication mode, the effective QE is ~45%, while the read-out noise is negligible, while under conventional CCD operation, readout noise is ~15 photo-electrons. For the (EM)-CCD, dark noise is 0.001 photo-electron/sec, and for the APD<20 cps. Thus, there are only minor differences in the performance of the EM-CCD vs. CCD vs. APD detectors: 2-fold QE difference, contributing only 1.4-fold difference in noise, while read-out/dark noise are similar to or less than the intrinsic Poisson noise of the fluorescence signal under our conditions. It is noted that none of these detector-related noise sources fundamentally prohibit single-molecule detection: limitations in the detector can be merely overcome by increasing molecular brightness with higher excitation intensity. This not the case for super-Poisson number fluctuations at high concentrations, which require radically different approaches to overcome.

Thus there is a fundamental reason why QE and read-out noise detector specifications are mostly irrelevant under our experimental conditions. At low brightness conditions when Poisson shot noise dominates, the detector specifications might be important. However, at the laser power used for all our single-molecule detection experiments, shot-noise is negligible and super-Poisson number fluctuations dominate. In fact, intensity traces in solutions of 10 nM-1 μM concentrations show that increasing laser power (and thus molecular brightness) has little effect on achievable SNR (FIG. 10B,C). As detailed in the previous section on Types of background noise, this is a hallmark of super-Poisson number fluctuations.

To further illustrate that number fluctuations dominate and detector noise specifications are mostly irrelevant under our experimental conditions, example implementations may split the fluorescence signal 50:50 between an APD and an (EM)-CCD. When focusing in the nucleus of a U2OS cell with SiR-Rpb1, both detectors may exhibit the same noise magnitude and moreover show δ-correlated intensity fluctuations (FIG. 10D). This indicates that number fluctuations (from the sample) are the dominant source of noise while detector noise is of secondary importance under such conditions.

Efficiency of STED in suppressing different types of background noise. STED reduces the molecular brightness ε and thus background level by a factor inversely proportional to depletion saturation ζ: ε→ε'=ε/1+ζ. The type of dominant background noise has profound effects on the efficiency of noise suppression and the SNR improvement by STED. When shot noise dominates, background fluctuations are reduced proportionally to the square root of background level, improving SNR by $\sim\sqrt{1+\zeta}$. In contrast, for number fluctuations, background noise is reduced proportionally to background level, improving SNR by $\sim 1+\zeta$. Thus, STED is much more effective in suppressing super-Poisson number fluctuations than shot noise, an important consideration for enabling single-molecule detection at high concentrations.

SNR for target-locking vs. scanning STED approaches. Application of STED decreases the molecular brightness ε by a factor of $\sim 1/(1+\zeta)$ and the width of the PSF s by a factor of $\sim 1/\sqrt{1+\zeta}$. In images obtained by 1D, 2D or 3D point-scanning the signal from a molecule will be contained in a length, area or volume of dimensions~s, thus the total signal S~$s^d$ where d is the spatial dimension. Similarly, the noise, given by the fluctuations in intensity integrated over a volume $s^d$, is N~$s^{d/2}$ε. Thus the effect of STED on the SNR=S/N depends on the spatial dimension as SNR~$(1+\zeta)^{(4-d)/4}$. As scanning is performed in higher dimensional space, the effect of STED is progressively diminished, as $SNR_{d=1} \sim (1+\zeta)^{3/4}$, $SNR_{d=2} \sim (1+\zeta)^{1/2}$, and $SNR_{d=3} \sim (1+\zeta)^{1/4}$ in 1D, 2D and 3D respectively. Thus the biggest improvement is obtained for single-molecule detection with the target locked at the center of the STED doughnut (i.e. no scanning or d=0), since $SNR_{d=0} \sim (1+\zeta)^1$.

Localization precision degradation at elevated background concentrations and improvement by STED. The localization precision has contributions from photon and background noise (Thompson et al., 2002): $\sigma_{loc;\ total}^2 = \sigma_{loc;\ photon\ noise}^2 + \sigma_{loc;\ background\ noise}^2$. These two contributions are given by:

$$\sigma_{loc;photon\ noise}^2 \approx \frac{s^2}{N},$$

where s is the standard deviation of the image of the object and N is the number of collected photons;

$$\sigma_{loc;background\ noise}^2 \approx \frac{8\pi s^4 \sigma_B^2}{a^2 N^2},$$

where a the pixel size and $\sigma_B^2$ the variance of the background.

If background is dominated by shot noise (Poisson statistics), $\sigma_{B;\ shot\ noise}^2 = B$, where B: background level. At elevated concentrations, an additional contribution emerges from super-Poisson number fluctuations, $\sigma_{B;n}^2 = n\varepsilon^2$, with n: average number of background molecules in detection volume and ε: molecular brightness. Thus, there is an excess localization error, $$\sigma_{loc;n}^2 \sim n\sigma \text{ or } \sigma_{loc;n} \sim \sqrt{concentration},$$

that dominates at sufficiently elevated background concentrations,

Importantly, when background noise is dominated by number fluctuations, the localization precision becomes independent of laser power: $\sigma_B \sim \varepsilon \sim P_{laser}$ (the molecular brightness $\varepsilon \sim P_{laser}$), while also $N \sim P_{laser}$, thus $$\sigma_{loc;background\ noise}^2 \sim \frac{\sigma_B^2}{N^2} \sim constant.$$

This effect is similar to the independence of SNR vs. laser power (FIGS. 10B, 10C): when background noise is dominated by super-Poisson number fluctuations, both detection SNR and localization precision are fundamentally limited and are not improved by merely increasing the laser power.

STED decreases $s^2$ and N both by a factor of $1/(1+\zeta)$, thus leaving the photon noise term unchanged. Thus, the well-known reduction in PSF width by STED has no net gain in localization precision. Contrary, background noise suppression by STED has a dramatic effect when the background is dominated by number fluctuations: the variance of the background is decreased, $\sigma_{B;n} \sim 1/(1+\zeta)$, thus the localization precision is also improved by a factor of $\sim 1/(1+\zeta)$.

For the Cy3B-Atto647N distance measurements (FIG. 1H,I) the 2D distance precision is given by: $\sigma_{2D\ distance}^2(X\ nM) = 2(\sigma_{loc;\ total}^{Cy3B})^2 + 2(\sigma_{loc;\ total}^{Atto647N}(X\ nM))^2 + 2(\sigma_{systematic})^2$, with X the concentration of free Atto647N in solution and $\sigma_{systematic}$ reflecting any localization errors extraneous to the molecule emission and background, such as instrument drift/instabilities. In the absence of free Atto647N (0 nM/no background), example implementations may obtain $\sigma_{2D\ distance}(0\ nM) = 20$ nm, for both red-only and red+STED imaging. In the presence of 300 nM free Atto647N oligo in solution the localization errors are increased $\sigma_{2D\ distance}^{red-only}(300\ nM) = 46$ nm and $\sigma_{2D\ distance}^{red+STED}(300\ nM) = 25$ nm. Thus the effect of STED is to reduce the excess Atto647N $$\sqrt{(\sigma_{loc;total}^{Atto647N}(300\ nM))^2 - (\sigma_{loc;total}^{Atto647N}(0\ nM))^2},$$

$$\text{from } \sqrt{\frac{46^2 20^2}{2}} = 41 \text{ nm to } \sqrt{\frac{25^2 - 20^2}{2}} = 15 \text{ nm}.$$

Example implementations may theoretically estimate the precision for localizing clusters of Pol II and the various regulatory factors in live cells based on image parameters. For SiR, $s \sim 160$ nm, $a = 40$ nm, $N \sim 1,000$-$4,500$, and $\sigma_B \sim 10$-$30$. Thus SiR localization errors are dominated by background, with $\sigma_{loc;\ total}^{red-only} \sim 22$-$51$ nm (vs. $\sigma_{loc;\ photon\ noise} \sim 3$-$6$ nm). As nascent RNA localization precision is $\sigma_{loc;\ total}^{blue} \sim 12$ nm ($s \sim 120$ nm, $a = 40$ nm $N \sim 1,200$, and $\sigma_B \sim 6$), the 2D distance measurement precision is mostly limited by the SiR localization precision ($\sigma_{2D\ distance}^2 = 2(\sigma_{loc;\ total}^{blue})^2 + 2(\sigma_{loc;\ total}^{red-only})^2$, $\sigma_{2D\ distance} \sim 35$-$74$ nm). Application of STEDxy with $(1+\zeta) \sim 2$-$3$ results in improved precision, $\sigma_{loc;\ total}^{STEDxy} \sim 8$-$20$ nm, and $\sigma_{2D\ distance} \sim 21$-$34$ nm. It is noted that these theoretical considerations assume spatially uniform background over the image of the object that is localized. In cell nuclei, SiR background distribution is inhomogeneous due to local variations in Pol II and RF densities. Spatial background variations over distances comparable to the sizes of the clusters likely further reduce the actual localization precision, especially for the higher-background confocal-only images.

Simulation of background suppression by STED. Example implementations may calculate the electromagnetic field at the focus of an objective lens using the method of (Leutenegger et al., 2006). Calculations are based on NA 1.1, $\lambda_{ex} = 640$ nm, $\lambda_{em} = 700$ nm and $\lambda_{STED} = 780$ nm, with a grid size 10 nm. A $2 \times 2 \times 6$ µm³ simulation box with periodic boundary conditions contains 1,000 Brownian particles. At each simulation step the (x,y,z) displacements of each particle are drown from a normal distribution with $\sigma = 10$ nm. The number of photons emitted by particle i in each step is drown from a Poisson distribution with a mean equal to $N_0 \times I_{ex}(x_i) \times I_{em}(x_i)$ for excitation-only and to $N_0 \times I_{ex}(x_i) \times I_{em}(x_i) \times 1/[1+3I_{STEDxy}(x_i)] \times 1/[1+10I_{STEDz}(x_i)]$ for STEDxyz, with $I_{ex}$, $I_{em}$, $I_{STEDxy}$ and $I_{STEDz}$ normalized to [0,1]. Example implementations may selected $N_0 = 1$, corresponding to a particle bound to a (hypothetical) target exactly at the center emitting on average 1 photon/simulation step. The numerical simulations show proportional reduction of background level and noise by STED ($\approx 3$-fold), further substantiating the "zero-order" approximation for estimating the reduction in noise from Super-Poisson number fluctuations (previous section "Efficiency of STED in suppressing different types of background noise").

Step-detection algorithm. SiR-Rpb1 bleaching intensity traces, I(t), were fit to a multi-plateau function of the form: $I(t) = I_i$, $t_i < t < t_{i+1}$, $i = 1, n_{steps}$, by non-linear least-squares fitting in Origin (FIGS. 4I-4K, 12P, 12Q, 14F, 14G). Alternatively, a test-statistic-based algorithm programmed in MATLAB (FIG. 12J-12O) may be used.

Figure 11J:
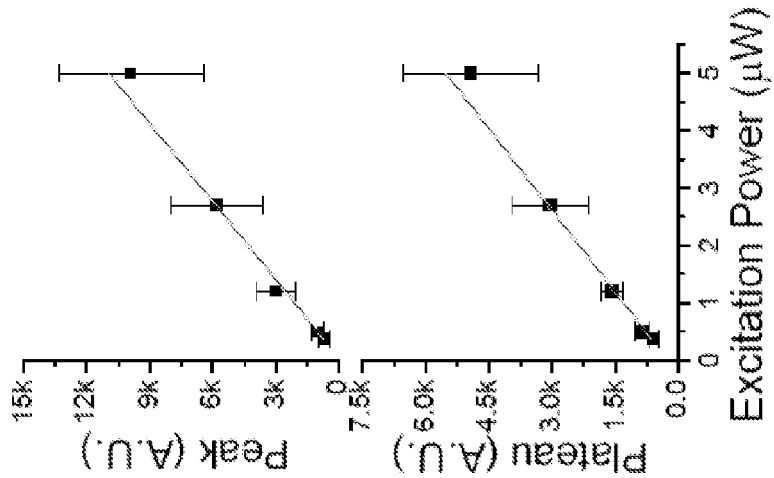
Figure 11K:
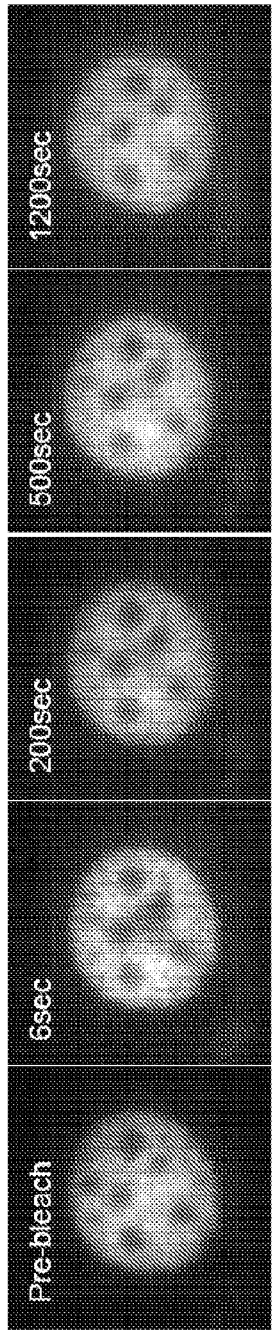
Figure 11L:
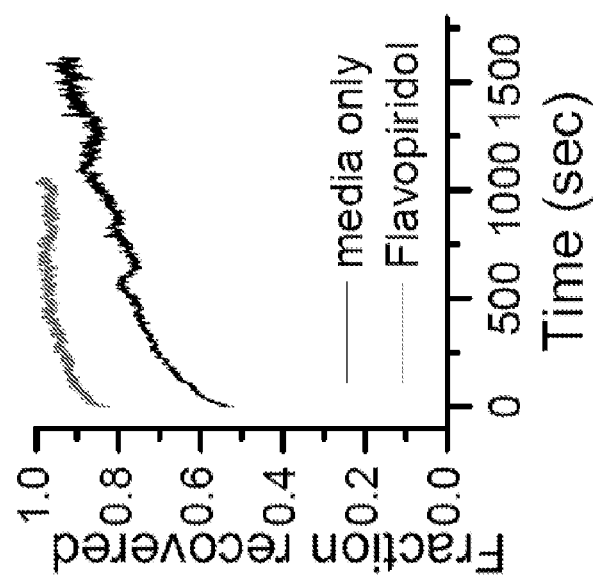

Quantification of signal (S) and immobile background (Bi) at the transcription site. With tdPCP-EGFP locked-on, upon activating the red excitation beam SiR-Rpb1 signal shows an initial spike, followed by decay to a stationary plateau (FIG. 4G). This behavior reflects gradual photobleaching of Pol II molecules residing within the excitation volume during the measurement and a constant background of molecules rapidly diffusing in and out. The immobile population reflects Pol IIs accumulated at the mini-gene (signal, S), as well as Pol IIs bound to other genomic regions and/or nuclear structures nearby (immobile background, Bi). Comparison of initial levels and decay times with traces locked 0.536 µm away from the transcription site (well beyond the clustered Pol II) (FIGS. 11G-11I), as well as analysis of the fast and slow decay components of traces locked at the transcription site, provides upper-limit estimates of the relative S and $B_i$ contributions (FIGS. 11H-11I): (i) at least $71 \pm 1.3\%$ of the initial peak signal corresponds to Pol II accumulated at the mini-gene (S), while up to $29 \pm 1.3\%$ is immobile background ($B_i$); (ii) the final plateau total background consists of $\leq 37 \pm 3.5\%$ immobile ($B_i$) and $\geq 63 \pm 3.5\%$ diffusing (Ba) background (mean±SD, n=3 experiments, >10 transcription sites each). These ratios are robust; peak signal and steady plateau level are linear over a 10-fold excitation intensity range (FIG. 11J). The $B_i/B_d$ ratio is also consistent with: (i) Fluorescence Recovery After Photobleaching (FRAP) measurements at random nuclear locations (FIGS. 11K, 11L), showing that ~40% of total Pol II is immobile (recovery time ~20 min) and likely transcriptionally engaged; (ii) previous GFP-Pol II FRAP results in a related system.

Estimation of CMV mini-gene transcription cycle duration. Example implementations may obtain ~302 sec for the duration of one transcription cycle. This estimate is based on 202 sec median residence time of the tdPCP-EGFP nascent RNA (FIG. 12C) that reflects the time taken to elongate through the last 1.7 kb of the mini-gene and release the RNA, plus an additional ~109 sec taken for Pol II to elongate at a speed of ~1.1 kb/min (FIGS. 13F, 13G) through the first 2 kb before the 24×PP7 repeats.

Estimation of the Pou5f1 transcription cycle duration. Example implementations may obtain a range of 270-743 seconds or a more precise $\approx 338$ sec for the duration of one transcription cycle. This estimate is based on 203 sec median residence time of the MCP-mNeonGreen nascent RNA (FIG. 15E) that reflects the time taken to elongate through the last 1.8 kb of the 24×MS2-tagged Pou5f1 allele and release the RNA, plus an additional 67.5-540 sec or $\approx 135$ sec taken for Pol II to elongate through the first 4.5 kb before the 24×MS2 repeats, at reported speeds of 0.5-4 kb/min based on genome-wide GRO-Seq or ≈2 kb/min based on live-cell imaging of MS2-tagged Nanog.

Sox2 binding sites at Pou5f1 and Nanog enhancers. Example implementations may scan the 0-5 kb Pou5f1 and 0-7 kb Nanog upstream regions by the JASPAR CORE database 2018. Example implementations may mask regions with Sox2 ChIP-Seq signal (GSM1082341) and searched for Sox2 and Pou5f1::Sox2 motifs at p<0.001. Motifs found are annotated in FIGS. 6A and 9A.

Promoter kinetics and transcription noise. Certain multi-step kinetic processes that are characterized by finite wait times ("memory") between individual events can exhibit reduced noise. Suppression of intrinsic noise is theoretically predicted in models of e.g. transcription, translation or RNA decay characterized by several small steps between individual birth or death events. Applied to transcription kinetics, if the promoter cycles between multiple (inactive) states, there is effectively a memory between productive initiation events: after one Pol II escapes into elongation, a new Pol II has to wait a certain time for the promoter cycle to be completed. The end result for such a simple kinetic scheme (FIG. 15H) is that individual initiation events would be more regularly spaced in time, thus reducing the transcription noise. This feature is also recapitulated in numerical calculations based on this simple multi-step kinetic scheme for promoter activation (FIGS. 15I-15K). Interestingly, if release of RNA and Pol II upon termination occurs in a single step, characterized with a release time constant that is comparable to the total elongation time, the autocorrelation functions of transcription traces of a Poisson promoter (n=1) or promoters that cycle through multiple steps (n>1) closely resemble each other (FIG. 15J). When the auto-correlation functions are dominated by the RNA/Pol II release time, additional experimental parameters (e.g. mean and variance of RNA/Pol II numbers) allow discriminating between different promoters (n=1 vs. n>1).

Section B: 3D Modulation Interferometry with Localization

As suggested above, reaching a more complete understanding of biological processes and mechanisms that underlie health and disease demands a better integration of information spanning multiple length and time scales. Super-resolution microscopy and single-molecule approaches have emerged as potent tools that extend the spatial resolution and detection sensitivity in live biological imaging. However, the prior techniques achieved limited 3D resolution that precluded visualizing spatial organization at the molecular scale. Moreover balancing trade-offs between temporal and spatial resolution, while operating with a limited photon budget often results in severely shortened single-molecule observation times. Further, many microscope configurations are challenged when imaging weak signals from single-molecules, especially due to high background in crowded cellular specimens. Thus, although promising, the full potential of single-molecule/super-resolution methods for transforming our molecular understanding of biological processes has yet to be realized. To fill critical technical gaps, new optimized microscope configurations are needed—that can operate at the limits of spatiotemporal resolution while maximizing the information content of dim fluorescence signals. This goal can be achieved through novel combinations of 3D interferometry, targeted fluorescence switching, while further harnessing emerging photon-efficient algorithms to increase resolution as well as prolong total observation times. Based on these ideas, novel super-resolution and single-molecule fluorescence imaging tools are developed, focusing, in various embodiments, on at least two specific aims: (1) To extend the spatiotemporal scales of localization-based single-molecule imaging and tracking to, for example, 1 nanometer isotropic 3D resolution and to ~1,000 data-point in vivo observation traces at down to (sub)millisecond sampling rates; (2) To achieve real-time single-molecule detection sensitivity in addressable 3D volumes, at presence of micro-Molar background concentrations, and inside highly crowded intracellular environments. The new techniques significantly increase abilities to interrogate dynamic biological processes with molecular detail, thus having widespread and immediate impact across biomedical disciplines.

With respect to the key remaining challenge for biomedical research—of transforming the vastly expanded knowledge base established by genetics, biochemistry and structural biology into a detailed molecular understanding of the physical reality inside live cells—fluorescence imaging approaches may be applied to interrogate live biological systems with molecular-specificity and increased spatiotemporal resolution. Single-molecule/super-resolution techniques can be used to track the movement of individual biomolecules in live cells, watch signaling events and cargo trafficking in real-time and begin to elaborate on the spatial organization of large macromolecular assemblies and sub-cellular ultra-structure in situ. However, major advances in the understanding of certain molecular mechanisms may require integrating information over multiple length and temporal scales.

Understanding the organization of certain multi-subunit complexes may require reaching 3D spatial resolutions approaching the (sub)-nanometer level. Similarly, elucidating molecular movements and interactions in live cells (e.g. using single-particle tracking) may entail following individual molecules often over extended (e.g., ~μm) 3D volumes and over prolonged (e.g., ~min) time scales. Further, understanding a particular process may necessitate discriminating individual molecules that engage, for example, with a specific target of interest, from an often overwhelming background of many other molecules diffusing nearby.

The above requirements may face certain challenges: (i) the limited brightness of fluorescent probes, especially photoswitchable probes used for super-resolution imaging, often limits the obtainable localization precision and thus spatial resolution to several nanometers, significantly above the molecular scale; (ii) the finite photon budget afforded by single molecule probes restricts useable observation times to merely seconds before photobleaching; (iii) the high background at endogenous concentrations of intracellular factors (e.g., ~100's nM-μM) severely hinders single molecule detection and live-cell single-molecule tracking applications often rely on labeling only a small fraction (e.g., less than 1-10 nM) of expressed molecules.

In potential embodiments, the limits of 4D spatio-temporal resolution may be approached or reached, while extending the workable concentration range for single-molecule detection in cells, by combining 3D interferometric tracking and target-locking, phase-sensitive detection, and spatially-controlled on-off fluorescence switching. Example embodiments enable photon-efficient single-molecule approaches with molecular-scale resolution, maximized or otherwise enhanced observation times, as well as high sensitivity in presence of background. Various embodiments may be implemented using a system such as system 100 in FIG. 1.

Various embodiments relate to photon-efficient methods for molecular-scale super-resolution 3D imaging and long-term 3D single-particle tracking. They may employ instruments, building upon principles of 3D modulation interferometry and localization schemes, such as a MINFLUX (minimal photon fluxes) localization process, that enable 3D localization precisions down to, for example, ≤1 nm at significantly fewer collected photons (e.g., $N_{ph}$<1,000 vs. ~10,000). The higher 3D resolution, now obtained for dim fluorophores typically used in super-resolution imaging, can greatly expand the scope of possible structural biology applications. Potential embodiments demonstrate 3D visualization specific subunit organization within larger macromolecular complexes. The higher photon efficiency may also enable, for example, 10× to 100× longer single-molecule 3D tracking (e.g., minutes), greatly expanding the spatiotemporal scales of single-molecule detection in vivo.

Various embodiments relate to optical technologies for 4D single-molecule detection at addressable loci, inside crowded environments in live cells. Example implementations employ 3D modulation interferometry to achieve single-particle tracking and target-locking in live cells with, for example, less than 20 nm xyz precision and, for example, around 1 msec temporal resolution. Additional structured optical fields may achieve targeted fluorescence depletion/photo-switching to further reduce background and allow achieving single-molecule detection sensitivity at high concentrations (e.g., ~μM), for example for endogenous intracellular factors. Example implementations enable 3D tracking of individual tagged genomic loci inside the nucleus of live cells, while simultaneously monitoring the dynamics of individual fluorescent transcription factors and RNA Pol II molecules engaging the locus of interest.

In various potential embodiments, instruments cross into uncharted regimes of photon-efficiency, combined spatiotemporal resolution, as well as detection sensitivity. Example potential embodiments provide a transformative potential to visualize molecular structures, as well as probe dynamic biological processes, inside crowded intracellular environments, down to, for example, the single-molecule level and over prolonged observation times. These transformative capabilities may be applicable over broad areas of biomedical research, from structural/cell biology, to neuroscience, developmental biology, immunology, and beyond.

Our knowledge of biological processes and mechanisms has vastly expanded over the past few decades. The traditional tools of biochemistry and molecular, cellular, and structural biology have enabled the identification of key components and interactions, provided snapshots of macromolecules as they function, and elaborated on the dynamic nature of biological pathways, linking structure to function. A major remaining challenge is transforming this vastly expanded knowledge base into a more complete molecular description of how the cell works. Single-molecule/super-resolution (SR) microscopy methods, although a step towards this goal, face significant technical hurdles.

Various embodiments aim to reach a detailed understanding of molecular processes in cells by integrating information across several orders of magnitude in length and time scales; from the (sub-)nanometer and (sub)millisecond movements of molecules and molecular complexes, to the micron-sized organelles and large macro-molecular assemblies and the minutes-/hours-long progression of the cell cycle. SR imaging may be used to achieve down to ≤10 nm 3D resolution, bridging over to the molecular-scale (sub) nanometer 3D resolution of electron microscopy and tomography remains very challenging. Similarly, single-particle tracking can observe the movements and interactions of molecules in cells, however typical observation traces are frequently shortened by photobleaching to ~10 data points, hindering quantitative analysis of underlying kinetics, and classification of heterogeneous behaviors at the single-molecule level. Finally, often single-molecule detection in dense crowded environments is precluded by high background, thus constraining imaging only to sparse/sparsely-labeled samples.

In various embodiments, biological processes inside cells can be described in detailed molecular terms to ultimately translate basic mechanistic understanding into opportunities for new therapeutic applications. Various embodiments comprise SR/single-molecule methods that reach previously unattainable combinations of spatiotemporal resolution and photon efficiency. Potential embodiments focus on achieving true molecule-scale (~1 nm) 3D SR imaging and prolonged (~1,000 observation points) single-particle tracking in live cells. Potential embodiments entail approaches that achieve single-molecule detection sensitivity in highly crowded environments, such as high concentrations (≥1 μM) of endogenous intracellular factors.

Potential embodiments comprise optical instrumentation with significantly improved spatiotemporal resolution and detection sensitivity capabilities not provided by current tools. Such transformative capabilities enable molecular imaging of biological processes in a broad range of cell biology, neuroscience, developmental and cancer biology and immunology systems. Probing molecular mechanisms in detail, will lead not only to a better understanding of basic biology but also could be applied in translational settings, such as single-molecule/super-resolution tests for novel therapeutics.

Understanding biology at the molecular level entails a quantitative description of molecular structures and interactions and their dynamics. To reach this technical capability with single-molecule/SR methods, potential embodiments optimize the information content in the limited photon budget afforded by low-brightness fluorescent probes, and achieve close to noise- and background-free detection schemes.

Potential embodiments comprise real-time single-molecule/SR imaging paradigms that enable visualizing molecular-scale structures, probing molecular movements and interactions for prolonged observation times and allow such single-molecule visualizations in the interior of densely crowded intracellular environments. Various potential embodiments comprise unique syntheses of principles that increase resolution and sensitivity combined with photon-efficient methods. Such approaches may achieve unprecedented combinations of 4D resolution, detection sensitivity, and photon efficiency.

The performance characteristics of various potential embodiments may include: (1) ~1 nm isotropic 3D resolution, using low-brightness fluorophores (e.g. switchable dyes with merely 100's detected photons; >20-times less photons than what currently required); (2) single-molecule observations in cells with trajectories containing ~1,000 observations (10-100 times longer than currently available), at ~30 nm 3D resolution and ~1 msec data rate; (3) single-molecule detection in presence of >1 μM concentration of background molecules (>20 times increased background discrimination). These technical capabilities can bring us toward the ultimate goal of visualizing the molecular reality in the interior of living cells.

Section B(1): Photon-Efficient Systems and Methods for Molecular-Scale Super-Resolution 3D Imaging and Long-Term 3D Single-Particle Tracking Various potential embodiments relate to photon-efficient methods for molecular-scale super-resolution 3D imaging and long-term 3D single-particle tracking. Optical technologies may maximize or otherwise substantially enhance the information content of each fluorescence photon detected from a single molecule (e.g., detection system 150), to enable more efficient use of the limited photon budget. Potential embodiments aim to achieve: 1) molecular-scale (≤1 nm resolution) super-resolution 3D imaging; 2) dynamic prolonged (100's to ~1,000 observation points) 3D tracking of single-molecules in live cells.

In various embodiments, single molecule localization may achieve, for example, 1.5 nm precision in tracking individual molecular motors. Single-molecule localization is also an enabling factor behind super-resolution approaches such as PALM/STORM, that rely on reconstructing a sub-diffraction image through accurate measurements of the positions of the fluorophores attached to the structure of interest. However, as PALM/STORM rely on stochastic on-off fluorophore switching, the resolution is often limited by the relatively small number of photons (<1,000 to a few 1,000s) collected in each cycle. Thus, although ~1 nm precision can be achieved after averaging multiple images from multiple particles, it remains challenging to analyze the structure of individual molecular complexes. Potential embodiments relate to a much more photon-efficient localization method that may push the obtainable resolution towards true molecular scale, greatly expanding the scope of structural biology applications of localization-based super-resolution imaging.

Single-particle tracking (SPT) has enabled direct observations of movement/diffusion, and interactions/binding in live cells. However, accurately obtaining quantitative information from SPT is hindered from the typically short trajectories obtained (limited to ~10 frames, due to photo-bleaching and/or due to out-of-focus movement). For example, diffusion coefficients are rarely estimated to better that ~50-70%, while often observing more complicated movement (e.g. anomalous diffusion, transient binding, "hopping" etc.) of single-molecules is almost impossible with the short trajectories previously obtained by camera-based 2D SPT. Even classifying a given short trajectory as "bound" or "free" is often very challenging with conventional methods. Obtaining trajectories with extended number of points may be vital for certain quantitative measurements of single-molecule dynamics in cells.

In various potential embodiments, new limits of spatio-temporal resolution can be reached by a combination of 3D modulation interferometry, a technique with high 3D localization precision, and a localization scheme (e.g., MIN-FLUX), which achieves high photon efficiency. Various embodiments may be critical for structural analysis of certain molecular complexes using localization-based super-resolution imaging and also for enabling quantitative long-term tracking of single-molecule dynamics in cells.

Section B(1)(a): Photon-Efficient 3D Single-Molecule Localization and Super-Resolution Imaging at the Molecular Scale With respect to achieving photon-efficient 3D single-molecule localization and super-resolution imaging at the molecular scale, potential embodiments may achieve unprecedented 3D localization precision by synthesizing principles from an implementation of modulation interferometry (see Wang, G., Hauver, J., Thomas, Z., Darst, S. A. & Pertsinidis, A. Single-Molecule Real-Time 3D Imaging of the Transcription Cycle by Modulation Interferometry. *Cell* 167, 1839-1852 e21 (2016)) and a photon-efficient 2D localization approach comprising, for example, MINFLUX (Balzarotti, F. et al., Nanometer resolution imaging and tracking of fluorescent molecules with minimal photon fluxes. *Science* 355, 606-612 (2017)). MINFLUX is a concept for achieving high single-molecule localization precision with limited number of collected fluorescent photons. The crux of MINFLUX involves an excitation profile featuring a point of zero intensity that can be precisely positioned within a small field-of-view (e.g., <50 nm to ~150 nm) centered on the molecule of interest. With such a configuration, the limited number of emitted photons may be used to fine-tune the molecular position estimation within this small field of view around the predefined excitation zero. In a 2D implementation, a "doughnut" beam may be used to create a 2D zero, achieving impressive xy localization performances.

To create a 3D excitation intensity distribution that features a central intensity zero, various embodiments utilize schemes from the modulation interferometry approach (see Wang et al.) FIG. 17 depicts a detailed layout of an example implementation. Tracking, for example, a target tagged with green fluorescent protein (a GFP-tagged target) may be achieved with, for example, two separate 488 nm beams (from, e.g., beam source 170) that are modulated to feature an intensity zero at the focus (via, e.g., movement tracker 126). It is noted that similarly modulated 561 nm/642 nm beams (not shown in FIG. 17, which only shows Gaussian 561/642 nm beams for clarity) will track orange/far-red dyes. For xy tracking, various embodiments may utilize a "doughnut" beam as in the original 2D MINFLUX implementation (see Balzarotti et al.). For z tracking, various embodiments may utilize an interferometric 4pi scheme, with one of the beams phase shifted by 7C, to cause destructive interference at the focus. Scanning in xy may be accomplished with EODs, while in z various embodiments may use modulation interferometry with a piezoelectric mirror (PZM) that modulates the path-length in one of the interferometer arms. Alternatively, to achieve faster modulation, an EOM configured as phase-shifter may be inserted into the interferometer cavity.

To measure the location of the molecule of interest, the excitation intensity zero point may be placed at, for example, 6 xyz positions in the proximity of the molecule (via, e.g., movement tracker 126 and positioning unit 130), in various embodiments. First, the xy doughnut may be placed at three positions in a circle of diameter L the xy plane and fourth position at the origin; then the destructive interference zero of the z tracking beams may be placed at two positions at ±L along the z axis. At each position, the number of emitted photons may be measured (using, e.g., detection system 150), and the set N1, . . . , N6 may be used for calculating the 3D emitter position (using, e.g., computing device 110). The localization precision depends on the "field-of-view", L. In 1D, for a quadratic approximation, $$\sigma \sim \frac{L}{4\sqrt{N}},$$

where $N = N_1 + \ldots + N_6$ total number of photons. Thus, reducing L provides increased resolution over a limited dynamic range. Practical choices of L are determined by the size of the region over which molecules reside (e.g., the size of the structure investigated) and the signal-to-background ratio (see Eilers, Y., Ta, H., Gwosch, K. C., Balzarotti, F. & Hell, S. W. MINFLUX monitors rapid molecular jumps with superior spatiotemporal resolution. Proc Natl Acad Sci USA 115, 6117-6122 (2018)). Choosing L smaller than the diffraction limit $$s \approx \frac{FWHM}{2.35} - FWHM = \frac{\lambda}{2NA}$$

i.e. s≈80 nm and for GFP and SiR respectively at 1.27 NA—increases the localization precision beyond the conventional (e.g. camera-based) limit ($\sigma_{camera} \sim s/\sqrt{N}$). In various embodiments, molecular-scale 3D precision (at and below lnm) may be achievable by choosing L≈30-50 nm, for N~100. Previously, using modulation interferometry, <2 nm z precision was obtained, but needed N~10,000 photons.

Section B(1)(b): Achieving Prolonged Trajectories for 3D Single-Particle Tracking To further harness the photon-efficient 3D localization capabilities outlined in Section B(1)(a) for dynamic single-particle tracking, various embodiments may employ a target-locking feedback mechanism. To achieve dynamic tracking the following considerations may apply: (i) the molecule to be tracked is brought within the field-of-view L; (ii) the feedback loop, including 6-point photon-counting measurements, position estimation and re-centering the field-of-view on the molecule, is completed before significant motion occurs. Various embodiments may employ a scheme of localized photo-activation, molecule identification and 3D coarse positioning. A Gaussian tracking beam (e.g., 561 nm for PA-JF549 or 640 nm for PA-JF646) may be raster scanned across a ~µm sized area, while a 405 nm beam may photoactivate molecules in the vicinity. In various embodiments, once the fluorescence photon counts reach a certain threshold indicating activation of a molecule, the 405 nm beam may be turned off and 8 photon count measurements may be performed, first at 4 points in the xy plane, by placing the Gaussian beam using the EODs on a circle with diameter ~300 nm, followed by centering in xy, then measuring 4 points over ~1.2 µm along the z axis using the tunable acoustic gradient (TAG) lenses (see Hou, S. G., Lang, X. Q. & Welsher, K. Robust real-time 3D single-particle tracking using a dynamically moving laser spot. Optics Letters 42, 2390-2393 (2017)) and finally centering in z.

Once initial centering of the molecule in the field of view has been achieved (via, e.g., movement tracker 126 and positioning unit 130), various embodiments turn off the Gaussian tracking beam and use the doughnut xy and destructive interference z tracking beams. 3D localizations within a field of view L~100 nm may be performed as discussed in Section B(1)(a). In various embodiments, two nested feedback loops may be used for target-locking: a fast microsecond (µec) loop using the EODs and EOMs (for xy deflection and z phase shifting respectively); this loop may update after each position measurement; a slower (e.g., ~1-2 msec) loop using the 3D piezoelectric stage (e.g., platform 190); this loop may allow tracking over extended (~µm) dynamic range. In certain embodiments, all calculations and beam/stage control (e.g., controller 114) may be implemented in dedicated FPGA hardware. Both EODs and varifocal lenses feature µsec responses, so once a molecule is identified, it may be tracked at, for example, ~100-200 µsec update rate, satisfying the speed requirements. Overall, various embodiments may be able to track molecules diffusing, for example, as fast as ~10 µm2/sec (~30 nm rms displacements over ~100 µsec), which is the diffusion of a Halo-3×NLS protein (see Hansen, A. S. et al. Robust model-based analysis of single-particle tracking experiments with Spot-On. elife 7 (2018)). In various embodiments, this performance will more than suffice to capture diffusion of larger/slower Halo-tagged proteins and protein complexes (see Hansen et al.).

Additional enabling details with respect to certain potential embodiments may be found in, for example: Wang, G., Hauver, J., Thomas, Z., Darst, S. A. & Pertsinidis, A. Single-Molecule Real-Time 3D Imaging of the Transcription Cycle by Modulation Interferometry. Cell 167, 1839-1852 e21 (2016); Li, J., Dong, A. & al., e. Single-molecule nanoscopy elucidates Pol II transcription at single genes in live cells; Pertsinidis, A., Zhang, Y. & Chu, S. Subnanometre single-molecule localization, registration and distance measurements. Nature 466, 647-51 (2010); Pertsinidis, A. et al. Ultrahigh-resolution imaging reveals formation of neuronal SNARE/Munc18 complexes in situ. Proc Natl Acad Sci USA 110, E2812-20 (2013).

With certain potential embodiments of a 3D interferometric MINFLUX tracking/target-locking setup, implementing high quality 3D excitation "zeros" for the MINFLUX beams may encounter a finite visibility of excitation fringes attributable to the non-ideal properties of the non-polarizing beamsplitter in use. Consequently, various embodiments may employ a redesigned intereferometric cavity based on a polarizing beam-splitter cube (see isoSTED microscopy of Schmidt, R. et al. Spherical nanosized focal spot unravels the interior of cells. Nat Methods 5, 539-44 (2008)). Tuning the polarization of the incoming beams allows precisely balancing the laser intensities in the two arms, achieving a pattern in the focal plane that features deep zeros. Various embodiments may employ a polarization-sensitive detection scheme to coherently superimpose the emitted fluorescence. It is noted that emission coherence is not crucial for embodiments related to Section B(1), while the axial confinement may further reduce background with respect to certain embodiments related to Section B(2). Full-vectorial 3D electromagnetic field calculations validate the proposed design.

In various embodiments, aberrations from intracellular refractive index inhomogeneity will likely not introduce more than a few 10s of nm phase changes (see Shtengel, G. et al. Interferometric fluorescent super-resolution microscopy resolves 3D cellular ultrastructure. Proc Natl Acad Sci USA 106, 3125-30 (2009); Huang, F. et al. Ultra-High Resolution 3D Imaging of Whole Cells. Cell 166, 1028-40 (2016); Wang, G., Hauver, J., Thomas, Z., Darst, S. A. & Pertsinidis, A. Single-Molecule Real-Time 3D Imaging of the Transcription Cycle by Modulation Interferometry. Cell 167, 1839-1852 e21 (2016)). Furthermore, these often vary slowly over several µm cellular length scales and should not be a problem for measuring smaller-scale distances (<500 nm). If needed, various embodiments may employ additional deformable mirrors in the interferometric cavity arms to better correct for any system and sample induced aberrations and achieve an optimized 3D PSF. Additionally, various embodiments may introduce slight astigmatism with the deformable mirrors in the detection PSF for use for localization over multiple periods and phase-unwrapping (see Huang, F. et al. Ultra-High Resolution 3D Imaging of Whole Cells. Cell 166, 1028-40 (2016); Gorgidze, L. A., Oshemkova, S. A. & Vorobjev, I. A. Blue light inhibits mitosis in tissue culture cells. Biosci Rep 18, 215-24 (1998)).

In various embodiments, adjustable lenses in the interferometric cavity may be single-crystal KTN (potassium tantalate niobate—KTaxNbil-xO3) electro-optical lenses. Alternatively or additionally, other technologies for varifocal lenses, such as tunable acoustic gradient (TAG) lenses, may be employed in various embodiments. In various embodiments, deformable mirrors conjugate to the back-focal plane of the objectives may be used as adjustable lenses.

Various embodiments relate to 3D Interferometrix MINFLUX for 3D superresolution imaging at the molecular scale and for long-term single-particle tracking in live cells. To validate the 3D single-particle tracking capabilities of the instrument of potential embodiments, single immobilized molecules and/or fluorescent nanospheres may be imaged, and different molecular trajectories (nanometer-steps, random walks etc.) may be simulated with a 3D piezoelectric scanning stage. Validation of molecular-scale resolution using 3D super-resolution standards and the ability of the instrument to resolve molecular-scale structures using 3D DNA origami scaffolds (comprised by two stacked rings, ~25 nm diameter and variable separation, provided by GATTAquant), as well as a previously characterized protein complex, the Anthrax Protective Antigen (PA), bound to Lethal Factor N-terminus (LFN) (Feld, G. K. et al. Structural basis for the unfolding of anthrax lethal factor by protective antigen oligomers. Nat Struct Mol Biol 17, 1383-90 (2010)) may be performed. PA forms 7- or 8-mer ring structures of ~15 nm diameter, ~7.5 nm thick, and binds 3-4 $LF_N$ molecules at defined positions on one face of the ring (FIG. 18). Regarding molecular movement measurements in vitro, the 3D single-molecule tracking capabilities may be tested using a single-molecule transcription system, tracking RNA Polymerase through the full transcription cycle (Wang, G., Hauver, J., Thomas, Z., Darst, S. A. & Pertsinidis, A. Single-Molecule Real-Time 3D Imaging of the Transcription Cycle by Modulation Interferometry. Cell 167, 1839-1852 e21 (2016)).

Regarding molecular movement measurements in live cells, with the 3D tracking capabilities of interferometric MINFLUX in place, the 3D motions of a variety of transcription regulators may be measured in live cells. A nuclear localized inert probe (NLS-Halo/SNAP-tag) may serve as control. Mouse embryonic stem cell (mESC) systems with the endogenous Pol II, Sox2, pTEFb, Brd4 and Mediator with SNAPtag integrations13 may be used. For L~100 nm and N~10, various potential embodiments may be able to track, for example, single SNAP-JF549 or SNAP-JF646 molecules with ~30 nm precision, at <1 msec resolution, providing traces with 1,000 time points.

In various potential example embodiments: a 3D interferometric MINFLUX instrument with 3D tracking capabilities for immobile molecules and simulated stepping/random walk trajectories achieves ≤1 nm 3D localization precision for N~100 photons; a 3D single-molecule super-resolution imaging at molecular scale able to resolve 3D DNA origami structure (~25 nm diameter rings at ~10 nm and 30 nm axial separation), resolve PA and LFN subunits (~12 nm diameter ring, ~8-10 nm axial separation); 3D single-molecule tracking in vitro using 3D interferometric MINFLUX able to track the movement of single RNA Polymerases through the transcription cycle, at ~2 nm precision and 50 msec temporal resolution (~20-fold higher temporal resolution than before); 3D single-molecule tracking in live cells using 3D interferometric MINFLUX able to track single Halo-tagged proteins (Sox2, Pol II, pTEFb, Brd4, Mediator) in live cells, at ~30 nm 3D localization precision, obtaining trajectories of ~1,000 consecutive time points.

Section B(2)(a): Optical Technologies for 4D Single-Molecule Detection at Addressable Loci, Inside Crowded Environments in Live Cells Various embodiments are capable of detecting single molecules in real-time, at addressable 3D loci, in the background of endogenous concentrations (≥1 μM) inside live cells. Single-molecule/super-resolution techniques are capable of transforming cell biology studies; however unmet challenges for single-molecule detection in live cells preclude these techniques from reaching their full potential. Single-molecule detection in live cells often requires discriminating the signal from individual molecules e.g. functionally engaged at a target-of-interest, from an overwhelming background of molecules transiently diffusing through the optical detection volume, as well as from molecules bound to loci nearby. The high intra-cellular concentration—e.g. 100's nM to low μM for Pol II and many regulatory factors in the nucleus—severely hinders real-time single-molecule detection with conventional epi-illumination microscopy. Even with cutting-edge selective plane/structured illumination setups, optimized to excite molecules in diffraction-limited regions in a cell with minimal out-of-focus background, single molecules have only been detected at up to ~10 nM concentrations, achieved by under-labeling the sample or by stochastic photo-switching. Because such approaches detect only a small (0.01-0.1%) fraction of molecules at any given time, the effective sensitivity during dynamic imaging is dramatically decreased.

Various embodiments comprise an interferometric implementation of target-locking Stimulated Emission Depletion (STED) to suppress background in the periphery of a predefined 3D region of interest, to allow real-time single-molecule detection in crowded environments. Such embodiments may be critical for enabling broad use of single-molecule approaches in cells and may become an indispensable tool for understanding many important biological processes inside the cell in molecular detail.

Section B(2)(b): Combine 3D Interferometry with STED for Single-Molecule Detection Sensitivity at Greater than 1 μM Background Concentrations.

In various embodiments, STED beams are introduced (e.g., via beam source 170) into the interferometer arms and focus them at the sample (on, e.g., platform 190) through the two opposed objectives. STED may operate at red-NIR wavelengths (e.g., $\lambda_{STED}$=780 nm) to achieve single-molecule detection (e.g., via detection system 150) of Halo- and SNAP-tagged factors, stained with JF646/SiR dyes. When operating at target-locking mode (using feedback from the position of e.g. green or orange fluorescent tags), the target of interest may be locked in 3D (using the 3D MINFLUX interferometer) at the excitation maximum/STED doughnut zero setpoint. In various embodiments, two STED configurations may be selected: (1) xy doughnut and z "bottle", without interferometry or (2) xy doughnut and z "standing-wave", in which case the beams are coherently combined from both lenses. In both cases, SNR may be increased by suppressing background at the periphery of the focal spot. Background levels may be suppressed by a factor inversely proportional to the depletion saturation, ~1/(1+ζ), with significant improvements at relatively modest ζ<10. Importantly, target-locking may keep the target of interest exactly at the STED zero, without time-consuming and signal-wasting scanning. Thus, in the SiR channel, the same photon counts may be obtained at orders of magnitude lower excitation power and photobleaching is reduced.

The confined 4pi excitation and detection PSFs may afford an additional ~3-5-fold background suppression (for 1PE and 2PE, FIG. 17), compared to single lens confocal. Thus in total, the 4pi+STED setup may in various embodiments achieve a ~10-fold background suppression compared to confocal. Background fluctuations scale as ~$\sqrt{\text{concentration}}$. Since SNR~1 at ~50-100 nM for confocal, the range of single-molecule detection may be extendable to >1 µM in various embodiments. This may enable adequate detection of factors abundant at ~0.3-1 µM (e.g. Pol II/TFs13,26).

One challenge for target-locking in one color (e.g., GFP) and detecting single-molecule at the other color (e.g., SiR) may involve nanometer registration between colors. For multi-color registration inside cells, for example in the nucleus, various embodiments may tag the same target with 2 different colors, creating zero-distance fiducial marks. Also, for detecting single molecules that bind a predefined target in live cells, it may be important that the target is tracked robustly and for adequately long time to enable meaningful observations. Using CCD imaging (e.g., detection system 150), various embodiments may track genomic loci tagged with multiple (~10) GFP molecules for 10's of seconds at 30 fps. In various embodiments, 3D inteferometric MINFLUX can be expected to increase temporal resolution and reduce photobleaching. Residence time of several transcription factors are merely seconds (estimated by FRAP); minute-long target-locking at msec temporal resolution would capture multiple on-off binding events. Also, since genomic loci in live cells undergo sub-diffusive motions, significantly slower than 3D diffusion of free/unbound proteins, it can be expected that ~10 msec will be more than adequate to target-lock at ~20 nm xyz precision.

In various embodiments, photo-bleaching under target-locking STED conditions need not impede imaging single molecules that bind to a target locked at the center. Point-scanning STED may expose the fluorophores repeatedly to both excitation and STED light. However in potential embodiments, the target and the signal molecules may be locked at the center (STED zero) and not exposed to STED light; thus photo-bleaching can be essentially the same as with excitation only. Each SiR tends to emit several thousand photons before bleaching and can last for ~50 frames when imaged with CCD at 10 fps (Li, J., Dong, A. & al., e. Single-molecule nanoscopy elucidates Pol II transcription at single genes in live cells). In various embodiments, at lower duty cycle (e.g. one frame once every few seconds) SiR may last even longer, and dynamics can be tracked over minutes.

In various embodiments, STED requires higher light intensities than standard one-photon confocal (but still significantly less than two-photon confocal). Live cell STED may be performable without induction of substantial short-term damage. It is noted that, in various embodiments, STED is much more efficient in suppressing background noise, thus requiring only modest depletion intensities—thus although >25 depletion saturation may be needed for ~50 nm spatial resolution, only a modest ~3-4 saturation may be needed for background suppression and ~10-fold increase in working concentration range. This ~6-8-fold reduced STED laser intensity suggests that embodiments of the disclosed interferometric MINFLUX target-locking STED approach will have even less potential phototoxicity vs. scanning STED. Further supporting this notion, transcription has been successfully imaged in live cells using STED.

Various embodiments relate to 3D Interferometrix MINFLUX+STED for 4D single-molecule detection at high concentrations and in crowded environments inside cells. Validation of background suppression of 3D interferometric MINFLUX+STED may be achievable by imaging single molecules in presence of µM free molecules in solution. With respect to molecular interaction measurements in biological test systems in vitro, various embodiments implement target-locking of RNAP elongation complexes and detect the rebinding of the σ70 subunit at µM free σ70 concentrations.

With respect to molecular interaction measurements in biological test systems in live cells, the 3D target-locking and background suppression of interferometric MINFLUX+STED may be used to measure, for example, interactions of proteins with DNA in live cells. An example application may include, for example, tetracycline repressor binding to short operator arrays and endogenous SNAP-tagged Pol II and transcription factors (created with CRISPR knock-in) interacting with the Pou5f1 gene in mouse ESCs.

In various embodiments, cell lines with varying nuclear concentrations of TetR (~10-1000 nM) and constructs with a variable number of TetO sites (7×-112×) may be used to characterize the SNR for TetR bound to the TetO sites to obtain the minimum number of proteins that can be detected in a single locus.

In various embodiments, a STED sub-system is capable of background suppression and single-molecule detection at >1 µM solution concentrations, achieving SNR≥3:1 for single-molecule detection (e.g. surface-immobilized molecules with >1 µM free background in solution); may demonstrate real-time target-probe interactions in vitro using 3D interferometric MINFLUX+STED that achieves target-lock on single Cy3B-tagged RNA Polymerase molecules transcribing a surface-tethered DNA template and detects interactions of single Atto647N-tagged σ70 molecules with the elongation complex31 with SNR≥3:1 at ~1 µM concentration; may demonstrate real-time target-probe interactions in live cells using 3D interferometric MINFLUX+STED that achieves target-lock on a single promoter, tagged with a Tetracycline operator (28×TetO) array, using TetR-GFP, or the endogenous Pou5f1 locus tagged with multiple dCas9-GFP molecules, to <20 nm at <10 msec. Various embodiments are capable of detecting binding of single TetR-Halo-SiR molecules or single (endogenous) Sox2, Pol II, pTEFb, Brd4 or Mediator SNAP-SiR molecules with SNR≥3:1.

Various potential embodiments may include, without limitation:

Embodiment A: A nanoscopy method comprising: tagging a target in a sample; tracking a position of the target molecule in the sample; maintaining the position of the target at a zero of a suppression beam for a period of time; and detecting a set of signals corresponding to the target and surrounding molecules for the period of time.

Embodiment B: Embodiment of A, wherein the target that is tagged is a single molecule.

Embodiment C: Embodiment A or B, wherein the target that is tagged is a macromolecular assembly.

Embodiment D: Any of Embodiments A-C, wherein the target is smaller than a diffraction limit of a microscope used for the nanoscopy method.

Embodiment E: Any of Embodiments A-D, wherein the surrounding molecules are probes.

Embodiment F: Any of Embodiments A-E, wherein the probes are bindable to the target.

Embodiment G: Any of Embodiments A-F, further comprising mapping, based on the set of signals, movements of the target in the sample over the period of time.

Embodiment H: Any of Embodiments A-G, wherein tracking the position of the target comprises using an imager to image the sample or a portion thereof.

Embodiment I: Any of Embodiments A-H, wherein the position of the target is tracked using MINFLUX localization.

Embodiment J: Any of Embodiments A-I, wherein the sample or the portion thereof is imaged using a pixelator of the imager, and wherein the method further comprises analyzing one or more images of the pixelator to acquire a position of the target molecule.

Embodiment K: Any of Embodiments A-J, further comprising generating a correction signal that indicates an adjustment of the position of the suppression beam relative to the target so as to maintain the target at the zero of the suppression beam.

Embodiment L: Any of Embodiments A-K, wherein the correction signal is configured to cause movement of at least one of the suppression beam and the sample to bring the target into alignment with the zero of the suppression beam.

Embodiment M: Any of Embodiments A-L, wherein the target is tagged with a fluorophore, and wherein signals from the fluorophore are suppressed by the suppression beam.

Embodiment N: Any of Embodiments A-M, further comprising identifying two or more locations of the target in the sample based on the set of signals.

Embodiment O: A nanoscopy method comprising: locating a tagged target in a sample by analyzing one or more images of the sample; emitting, at the sample, a suppression beam having a zero region; repositioning at least one of the suppression beam and the sample to maintain the tagged within the zero region of the suppression beam as the target moves; and detecting signals from the tagged target in the sample.

Embodiment P: Embodiment O, further comprising mapping movement of the target in the sample based on the detected signals.

Embodiment Q: Embodiment O or P, wherein the target is tagged with a fluorophore, wherein the method further comprises emitting an excitation beam at the sample to excite the target molecule, and wherein the detected signals are light from the excited target molecule.

Embodiment R: Any of Embodiments O-Q, further comprising capturing the images using a pixelated detector.

Embodiment S: A nanoscopy system comprising: a beam source configured to emit excitation and suppression laser beams; a detection system comprising an imager and a signal detector; and a controller coupled to the beam source and the detection system, wherein the controller is configured to: emit, using the beam source, excitation and suppression laser beams at a sample with a tagged target molecule; track a position of the tagged target in the sample using the imager of the detection system; positionally maintain the tagged target at a zero region of the suppression beam; and detect, using the signal detector of the detection system, a set of signals corresponding to the tagged target while the tagged target is positioned within the zero region of the suppression beam.

Embodiment T: Embodiment S, wherein the controller is further configured to map, based on the set of signals, movement of the target in the sample over the period of time.

Embodiment U: Embodiments S or T, wherein the controller is configured to track the position of the target by using the imager to image the sample or a portion thereof.

Embodiment V: Any of Embodiments S-U, wherein the imager comprises a pixelator, and wherein the sample or the portion thereof is imaged using the pixelator of the imager.

Embodiment W: Any of Embodiments S-V, wherein the controller is further configured to analyze one or more images of the pixelator to acquire the position of the target molecule.

Embodiment X: Any of Embodiments S-W, wherein the controller is further configured to generate a correction signal that indicates an adjustment of the position of the target relative to the suppression beam so as to maintain the target at the zero of the suppression beam.

Embodiment Y: Any of Embodiments S-X, wherein the controller is further configured to provide the correction signal to the beam source to cause the beam source to reposition the suppression beam so as to align the target with the zero of the suppression beam.

Embodiment Z: Any of Embodiments S-Y, further comprising a movable platform on which the sample is placed, wherein the controller is further configured to provide the correction signal to the movable platform to cause the moveable platform to reposition the sample so as to align the target with the zero of the suppression beam.

Embodiment AA: Any of Embodiments S-Z, wherein the controller is configured to track the position of the tagged target via MINFLUX localization.

Embodiment BB: An interferometric target-locking system, comprising: a sample mount configured to receive a sample with a target tagged for observation; a beam source configured to emit a tracking beam and an excitation beam at the sample on the sample mount; a photon detector configured to detect photons emitted from the sample on the sample mount; a feedback system configured to receive photon counts from the photon detector and lock onto the target in the sample so as to maintain the target at a minimum of the tracking beam and at a maximum of the excitation beam; and a tracking system configured to map movement of the target while the feedback system is locked onto the target.

Embodiment CC: Embodiment BB, wherein the beam source is configured to emit a doughnut tracking beam with a zero at its center.

Embodiment DD: Embodiment BB or CC, further comprising a mount motor configured to move the sample mount based on control signals from the feedback system, wherein the feedback system is configured to lock onto the target by transmitting control signals to the mount motor to reposition the sample mount and maintain the target at the minimum of the tracking beam and the maximum of the excitation beam.

Embodiment EE: Any of Embodiments BB-DD, further comprising a beam source motor configured to aim beams based on control signals from the feedback system, wherein the feedback system is configured to lock onto the target by transmitting control signals to the beam source motor to maintain the target at the minimum of the tracking beam and the maximum of the excitation beam.

Embodiment FF: Any of Embodiments BB-EE, further comprising a mount motor configured to move the sample mount based on control signals from the feedback system, and a beam source motor configured to aim beams based on control signals from the feedback system, wherein the feedback system is configured to lock onto the target by transmitting control signals to the mount motor and the beam source motor to maintain the target at the minimum of the tracking beam and the maximum of the excitation beam.

Embodiment GG: Any of Embodiments BB-FF, wherein the system is a 3D interferometric MINFLUX target-locking system.

Embodiment HH: Any of Embodiments BB-GG, wherein the system is configured to use an interferometric 4pi scheme for z-tracking.

Embodiment II: Any of Embodiments BB-HH, wherein the system is configured to use a localization scheme for target locking.

Embodiment JJ: Any of Embodiments BB-II, wherein the localization scheme is a MINFLUX localization scheme.

Embodiment KK: Any of Embodiments BB-JJ, wherein the system is configured to use an excitation profile comprising a point of zero intensity positionable within a field-of-view (FOV).

Embodiment LL: Any of Embodiments BB-KK, wherein the beam source is configured to emit a 488 nanometer (nm) tracking beam and at least one of a 561 nm excitation beam or a 642 nm excitation beam.

Embodiment MM: An interferometric target-locking method, comprising: positioning a sample with a tagged target on a sample mount of a target-locking system; emitting, from a beam source, a tracking beam and an excitation beam at the sample on the sample mount; detecting, using a photon detector, photons emitted from the sample on the sample mount; locking onto the target, using a real-time feedback system configured to receive photon counts from the photon detector, by maintaining the target at a minimum of the tracking beam and at a maximum of the excitation beam based on the photon counts; and mapping movement of the target while the feedback system is locked onto the target.

Embodiment NN: Embodiment MM, wherein the tracking beam is a doughnut tracking beam with a zero at its center.

Embodiment OO: Embodiment MM or NN, wherein locking onto the target comprises moving the sample mount, using control signals from the feedback system to a mount motor, to reposition the sample mount and maintain the target at the minimum of the tracking beam and the maximum of the excitation beam.

Embodiment PP: Any of Embodiments MM-OO, wherein locking onto the target comprises moving the beam source, using control signals from the feedback system to a beam source motor, to aim the beam source to maintain the target at the minimum of the tracking beam and the maximum of the excitation beam.

Embodiment QQ: Any of Embodiments MM-PP, wherein locking onto the target comprises moving both the sample mount and the beam source to maintain the target at the minimum of the tracking beam and the maximum of the excitation beam.

Embodiment RR: Any of Embodiments MM-QQ, wherein the target-locking method is a 3D interferometric MINFLUX target-locking method.

Embodiment SS: Any of Embodiments MM-RR, comprising using an interferometric 4pi scheme for z-tracking.

Embodiment TT: Any of Embodiments MM-SS, comprising using a localization scheme for target locking.

Embodiment UU: Any of Embodiments MM-TT, wherein the localization scheme is a MINFLUX localization scheme.

Embodiment VV: Any of Embodiments MM-UU, wherein the MINFLUX localization scheme uses one objective lens.

Embodiment WW: Any of Embodiments MM-VV, wherein the MINFLUX localization scheme uses two objective lenses.

Embodiment XX: An interferometric target-locking nanoscopy system, comprising: a beam source configured to emit a tracking beam and an excitation beam at a sample on a platform; a photon detector configured to detect photons emitted from the platform; a computing system configured to receive photon counts from the photon detector and maintain the target at a minimum of the tracking beam and at a maximum of the excitation beam; and a tracking system configured to map movement of the target while the feedback system is locked onto the target; wherein the system is configured to use 3D MINFLUX localization comprising one objective lens or more than one objective lens.

Non-limiting examples of various embodiments are disclosed herein. Features from one embodiments disclosed herein may be combined with features of another embodiment disclosed herein as someone of ordinary skill in the art would understand.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that, unless otherwise noted, any parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

What is claimed is:

1. A nanoscopy method comprising:
   tagging a target in a sample;
   emitting an excitation beam and a suppression beam at the sample;
   tracking a position of the target in the sample;
   maintaining the position of the target at a zero of the suppression beam for a period of time; and
   detecting a set of signals corresponding to the target and surrounding molecules for the period of time.

2. The method of claim 1, wherein the target that is tagged is a single molecule.

3. The method of claim 1, wherein the target that is tagged is a macromolecular assembly.

4. The method of claim 1, wherein the target is smaller than a diffraction limit of a microscope used for the nanoscopy method.

5. The method of claim 1, wherein the surrounding molecules comprise probes that are bindable to the target.

6. The method of claim 1, further comprising mapping, based on the set of signals, movements of the target in the sample over the period of time.

7. The method of claim 1, wherein the position of the target is tracked using MINFLUX localization.

8. The method of claim 1, wherein tracking the position of the target comprises using an imager to image the sample or a portion thereof, wherein the sample or the portion thereof is imaged using a pixelator of the imager, and wherein the method further comprises analyzing one or more images of the pixelator to acquire a position of the target.

9. The method of claim 8, further comprising generating a correction signal that indicates an adjustment of the position of the suppression beam relative to the target so as to maintain the target at the zero of the suppression beam, wherein the correction signal is configured to cause movement of at least one of the suppression beam and the sample to bring the target into alignment with the zero of the suppression beam.

10. The method of claim 1, wherein the target is tagged with a fluorophore, and wherein signals from the fluorophore are suppressed by the suppression beam.

11. The method of claim 1, further comprising identifying two or more locations of the target in the sample based on the set of signals.

12. The method of claim 1, wherein the target is maintained at a maximum of the excitation beam for the period of time, and wherein the detected signals comprise signals based on light from the excited target molecule.

13. The method of claim 1, further comprising receiving photon counts from a photon detector, wherein maintaining the position of the target at the zero comprises target-locking onto the target molecule using real-time feedback that is based on the photon counts, and wherein the zero of the suppression beam coincides with a maximum of the excitation beam.

14. The method of claim 1, wherein the method is a three-dimensional (3D) interferometric target-locking molecular nanoscopy method, wherein the sample comprises a live biological cell, and wherein movement of the target corresponds to a function of the live biological cell.

15. A nanoscopy method comprising:

locating a tagged target in a sample by analyzing one or more images of the sample;

emitting, at the sample, an excitation beam to excite the tagged target and a suppression beam having a zero region;

repositioning at least one of the suppression beam and the sample to maintain the tagged target within the zero region of the suppression beam as the target moves; and detecting signals from the tagged target in the sample.

16. The method of claim 15, further comprising mapping movement of the target in the sample based on the detected signals.

17. The method of claim 15, wherein the target is tagged with a fluorophore, wherein the method further comprises emitting an excitation beam at the sample to excite the target molecule, and wherein the detected signals are light from the excited target molecule.

18. A nanoscopy system comprising:

a beam source configured to emit excitation and suppression laser beams;

a detection system comprising an imager and a signal detector; and a controller coupled to the beam source and the detection system, wherein the controller is configured to:
  emit, using the beam source, excitation and suppression laser beams at a sample with a tagged target;
  track a position of the tagged target in the sample using the imager of the detection system;
  positionally maintain the tagged target at a zero region of the suppression beam; and
  detect, using the signal detector of the detection system, a set of signals corresponding to the tagged target while the tagged target is positioned within the zero region of the suppression beam.

19. The system of claim 18, wherein the controller is further configured to map, based on the set of signals, movement of the target in the sample over the period of time.

20. The system of claim 18, wherein the controller is configured to track the position of the target by using the imager to image the sample or a portion thereof.

21. The system of claim 20, wherein the imager comprises a pixelator, wherein the sample or the portion thereof is imaged using the pixelator of the imager, and wherein the controller is further configured to analyze one or more images of the pixelator to acquire the position of the target molecule.

22. The system of claim 21, wherein the controller is further configured to generate a correction signal that indicates an adjustment of the position of the target relative to the suppression beam so as to maintain the target at the zero of the suppression beam, and provide the correction signal to at least one of (i) to the beam source to cause the beam source to reposition the suppression beam so as to align the target with the zero of the suppression beam, or (ii) a movable platform to cause the moveable platform to reposition the sample so as to align the target with the zero of the suppression beam.

* * * * *